United States Patent
Yamaguchi et al.

(10) Patent No.: US 6,515,719 B2
(45) Date of Patent: Feb. 4, 2003

(54) LIQUID CRYSTAL DISPLAY APPARATUS AND MANUFACTURING METHOD FOR THE SAME

(75) Inventors: Hirotaka Yamaguchi, Tokyo (JP); Hiroaki Tanaka, Tokyo (JP); Seiji Suzuki, Tokyo (JP); Hiroaki Matsuyama, Tokyo (JP); Takahiko Watanabe, Tokyo (JP); Yoshihiko Hirai, Tokyo (JP); Masayoshi Suzuki, Tokyo (JP); Toshiya Ishii, Tokyo (JP); Teruaki Suzuki, Tokyo (JP); Syuusaku Kido, Kagoshima (JP)

(73) Assignee: NEC Corporation, Tokyo (JP)

( * ) Notice: Subject to any disclaimer, the term of this patent is extended or adjusted under 35 U.S.C. 154(b) by 38 days.

(21) Appl. No.: 09/877,141

(22) Filed: Jun. 11, 2001

(65) Prior Publication Data

US 2001/0052949 A1 Dec. 20, 2001

(30) Foreign Application Priority Data

Jun. 12, 2000 (JP) ........................... 2000-174648
Aug. 10, 2000 (JP) ........................... 2000-242705
Jun. 6, 2001 (JP) ........................... 2001-171809

(51) Int. Cl.[7] ...................... G02F 1/1343; G02F 1/136; G02F 1/1333; G02F 1/13; G02F 1/1337
(52) U.S. Cl. ............... 349/38; 349/39; 349/43; 349/138; 349/139; 349/187; 349/129
(58) Field of Search .................. 349/38, 39, 42, 349/43, 138, 139, 187, 129; 257/59, 72

(56) References Cited

U.S. PATENT DOCUMENTS 6,057,038 A * 5/2000 Terashita et al. ....... 252/299.01
6,081,315 A * 6/2000 Matsuyama et al. ........ 349/138
6,407,791 B1 * 6/2002 Suzuki et al. ............... 349/129
2001/0019392 A1 * 9/2001 Sakamoto et al. .......... 349/139

FOREIGN PATENT DOCUMENTS

| JP | 63-15472 | 1/1988 |
|---|---|---|
| JP | 5-165059 | 6/1993 |
| JP | 6-43461 | 2/1994 |
| JP | 7-199190 | 8/1995 |
| JP | 7-230097 | 8/1995 |
| JP | 10-20323 | 1/1998 |
| JP | 10-68971 | 3/1998 |
| JP | 2000-111958 | 4/2000 |
| JP | 11-180615 | 6/2000 |
| JP | 2000-164886 | 6/2000 |
| JP | 11-359411 | 12/2000 |

* cited by examiner

Primary Examiner—William L. Sikes
Assistant Examiner—Tarifur R. Chowdhury
(74) Attorney, Agent, or Firm—McGinn & Gibb, PLLC

(57) ABSTRACT

A liquid crystal display apparatus includes a first substrate, a second substrate and a liquid crystal layer interposed between the first substrate and the second substrate. The first substrate includes on a surface facing the second substrate, a plurality of gate bus lines extending into a row direction, a plurality of drain bus lines extending into a column direction, and a plurality of pixels arranged in matrix. Each of the plurality of pixels includes a portion of one of the plurality of gate bus lines associated with the pixel, a portion of one of the plurality of drain bus lines associated with the pixel, a portion of a capacitance line associated with the pixel, a pixel transistor having a source and a drain which is connected with the associated drain bus line, a control electrode connected with the source and formed in at least a portion of a region of the pixel, and a the pixel electrode which is in an electrically floating state and which is formed to cover the control electrode and a portion of the capacitance line through at least one of a first insulating film and second insulating film.

87 Claims, 73 Drawing Sheets

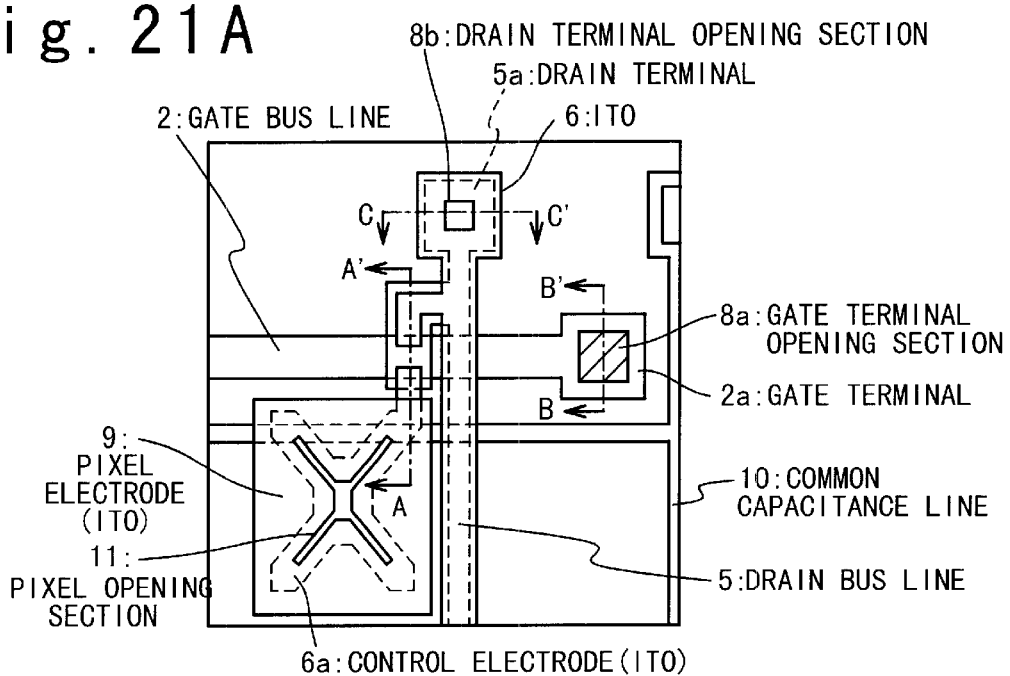
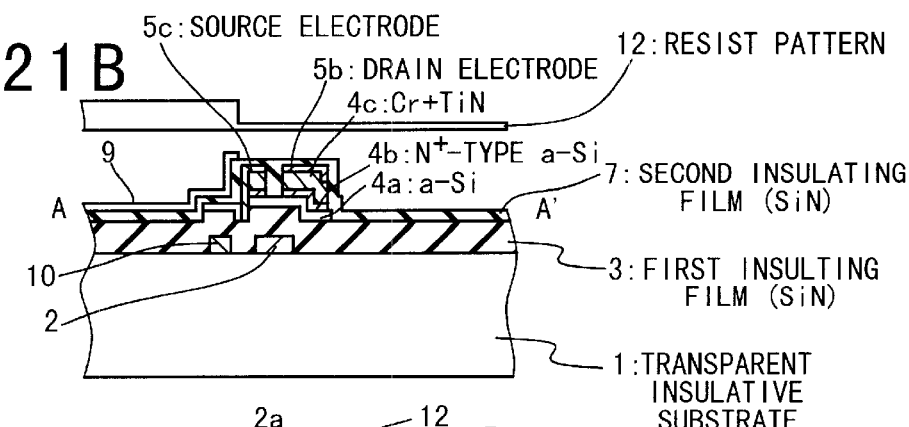
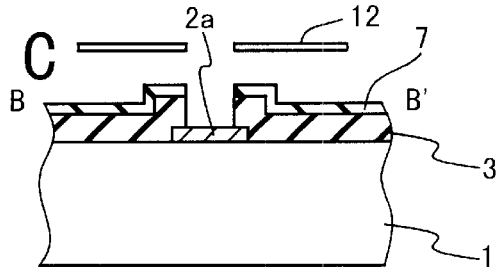
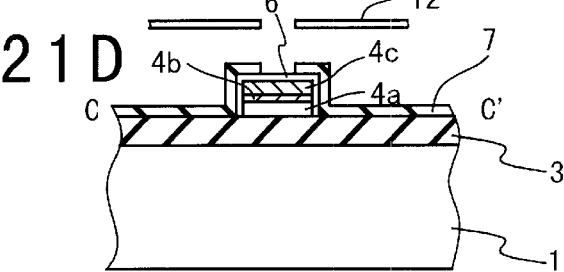

10
2; GATE BUS LINE
10

1; TRANSPARENT INSULATIVE SUBSTRATE

5; DRAIN BUS LINE
5d; BRODER ELECTRODE
4; ISLAND
2; GATE BUS LINE

5c; SOURCE ELECTRODE
5b; DRAIN ELECTRODE
4b; N⁺-TYPE a-Si
4a; a-Si
3; FIRST INSULTING FILM (SiN)
1; TRANSPARENT INSULATIVE SUBSTRATE

- 5: DRAIN BUS LINE
- 10: COMMON CAPACITANCE LINE
- 6a: CONTROL ELECTRODE (ITO)
- 9: PIXEL ELECTRODE (ITO)
- 2: GATE BUS LINE
- 4: ISLAND

- 26b: POLARIZING PLATE
- 31: SECOND TRANSPARENT SUBSTRATE
- 29: COUNTER ELECTRODE
- 22: LIQUID CRYSTAL
- 9: PIXEL ELECTRODE (ITO)
- 7: SECOND INSULATING FILM (SiN)
- 1: TRANSPARENT INSULATIVE SUBSTRATE
- 26a: POLARIZING PLATE
- 21: CONDUCTIVE FILM
- 6a: CONTROL ELECTRODE (ITO)

- 9b: DRAIN TERMINAL
- 2: GATE BUS LINE
- 9a: GATE TERMINAL
- 8a: GATE TERMINAL OPENING SECTION
- 2a: GATE TERMINAL
- 5: DRAIN BUS LINE
- 9c: COMMON CAPACITANCE TERMINAL
- 8c: COMMON CAPACITANCE TERMINAL OPENING SECTION
- 10: COMMON CAPACITANCE LINE
- 9: PIXEL ELECTRODE (ITO)
- 11: PIXEL OPENING SECTION

7: SECOND INSULATING FILM (SiN)

5a
C↓　↓C'
A'←
2: GATE BUS LINE
→B'
2a: GATE TERMINAL
→B
←A
5: DRAIN BUS LINE
10: COMMON CAPACITANCE LINE

- 6: DRAIN TERMINAL
- 2: GATE BUS LINE
- 2a: GATE TERMINAL
- 5: DRAIN BUS LINE
- 6a: CONTROL ELECTRODE (ITO)
- 10: COMMON CAPACITANCE LINE

6: DRAIN TERMINAL

- 8b
- 6
- 2: GATE BUS LINE
- 8a: GATE TERMINAL OPENING SECTION
- 2a: GATE TERMINAL
- 5: DRAIN BUS LINE
- 8c: COMMON CAPACITANCE TERMINAL OPENING SECTION
- 6a: CONTROL ELECTRODE (ITO)
- 10: COMMON CAPACITANCE LINE

7: SECOND INSULATING FILM (SiN)

- 8b
- 6
- 2: GATE BUS LINE
- 8a: GATE TERMINAL OPENING SECTION
- 2a: GATE TERMINAL
- 5: DRAIN BUS LINE
- 8c: COMMON CAPACITANCE TERMINAL OPENING SECTION
- 9: PIXEL ELECTRODE (ITO)
- 11: PIXEL OPENING SECTION
- 10: COMMON CAPACITANCE LINE

7: SECOND INSULATING FILM (SiN)

LIQUID CRYSTAL DISPLAY APPARATUS AND MANUFACTURING METHOD FOR THE SAME

BACKGROUND OF THE INVENTION

1. Field of the Invention

The present invention relates to a liquid crystal display apparatus and a manufacturing method for the same, and more particularly to a multi-domain liquid crystal display apparatus, in which a liquid crystal layer is divided into a plurality of domains by control electrodes and a manufacturing method for the same.

2. Description of the Related Art

An active matrix drive type liquid crystal display apparatus using an active device such as a thin film transistor has characteristics such as a small size, a thin type and a low power consumption. Therefore, such a liquid crystal display apparatus has come to practical use in the fields of office automation (OA) equipment and audio and video (AV) equipment. Various driving system are known for the liquid crystal display apparatus. A liquid crystal display apparatus of a vertical electric field, i.e., a twisted nematic (TN) type is mainly used and is disclosed in Japanese Laid Open Patent application (JP-A-Heisei 10-68971). In the TN type, a liquid crystal layer is interposed between two substrates and the liquid crystal layer is driven in response to the voltage applied between the substrates.

In the typical active matrix drive type TN liquid crystal display apparatus, one of the above substrates is composed of a drain wiring line and a gate wiring line extending in orthogonal directions to each other, a pixel electrode formed in the region surrounded by these wiring lines, and a thin film transistor (TFT) formed in the neighborhood of an intersection of the gate wiring line and the drain wiring line. Also, an orientation film is formed on the TFT and the pixel electrode of the substrate. The orientation film is used to drive liquid crystal molecules to turn to predetermined direction. A color filter, a common electrode, an orientation film are formed by a counter substrate as the other substrate. To form a liquid crystal display apparatus, a liquid crystal layer is interposed between the above substrate and the counter substrate.

A manufacturing method of such a conventional TN-type liquid crystal display apparatus will be described. FIG. 1A to FIG. 5D are diagrams schematically showing the conventional manufacturing method of a substrate of the active matrix drive type TN type liquid crystal display apparatus. FIGS. 1A, 2A, 3A, 4A and 5A are plan views of one pixel, respectively. FIGS. 1B, 2B, 3B, 4B and 5B are cross sectional views of a TFT section along the A–A' lines of the plan views, respectively. FIGS. 1C, 2C, 3C, 4C and 5C are cross sectional views of a gate terminal section along the B–B' lines of the plan views, respectively. FIGS. 1D, 2D, 3D, 4D and 5D are cross sectional views of a drain terminal section along the C–C' lines of the respective plan views, respectively.

As shown in FIG. 1A to FIG. 1D, a Cr layer as a gate electrode metal layer is deposited on a transparent insulative substrate (a TFT substrate) 1 by a sputtering method, and a resist pattern is formed using a first photomask. A Cr layer exposed by a lithography process using the resist pattern is etched and a gate bus line 2, a common capacitance line 10 and a gate terminal 2a are formed.

Next, as shown in FIGS. 2A to 2D, the first insulating film 3 composed of silicon nitride (SiNx) film, an amorphous silicon (a-Si) film 4a, an $n^+$-type amorphous silicon film 4b as an ohmic contact film are continuously formed by a CVD (Chemical Vapor Deposition) method. After that, a resist pattern is formed using a second photomask, and the $n^+$-type amorphous silicon film 4b exposed by a lithography process using the resist pattern and the amorphous silicon film 4a are removed by a dry etching using the resist pattern, to form an island 4.

Subsequently, as shown in FIGS. 3A to 3D, a Cr layer as a source/drain metal layer is formed by a sputtering method. After that, a resist pattern is formed using a third photomask and the Cr layer exposed by a lithography process using the resist pattern is removed by a wet etching using the resist pattern. Thus, source/drain electrodes 5b and 5c of a pixel transistor (TFT: thin film transistor), a drain bus line 5 and a drain terminal 5a are formed. After that, using the Cr layer of the source/drain electrodes as an etching mask, the $n^+$-type amorphous silicon film 4b in the channel region is etched to form the pixel transistor.

Next, as shown in FIGS. 4A to 4D, a second insulating film 7 of silicon nitride SiNx is deposited on the transparent insulative TFT substrate 1, and the second insulating film 7 and the first insulating film 3 are exposed using a fourth photomask and is etched. In this way, openings 8a and 8b of the source/drain terminal are formed. After that, as shown in FIG. 5A to FIG. 5D, an ITO film is deposited on the transparent insulative TFT substrate 1. After that, the ITO film exposed using a fifth photomask is removed, and the pixel electrode 9 and gate/drain terminal electrodes are formed to connect with the source electrode 5c. Subsequently, an orientation film is formed on the pixel transistor on this TFT substrate and on the pixel electrode 9 to make liquid crystal to direct to a predetermined direction. After that, a liquid crystal layer is interposed between this TFT substrate and a counter substrate, so that a liquid crystal display apparatus is completed. Other components such as a color filter, a common electrode, and an orientation film are formed on the counter substrate.

In such a conventional TN-type liquid crystal display apparatus, in the display state of "white" in no voltage application, a liquid crystal molecule has the orientation which is parallel to the TFT substrate. The orientation of the liquid crystal molecule changes from the display state of "white" to the direction of an electric field in accordance with the application voltage. As a result, the display state changes from the display state of "white" to the display state of "black" gradually. The TN-type liquid crystal display apparatus has a small view angle because of the peculiar behavior of the liquid crystal molecules in this voltage application. Also, there is a case where an electric field in the lateral direction is generated due to the unevenness of the TFT substrate and the potential difference between the electrodes in the liquid crystal cell. The existence of the electric field in the lateral direction causes a region where the orientations of liquid crystal molecules are different from each other. As a result, discrimination occurs in the boundary of this region.

For the purpose of the improvement of the above mentioned narrow view angle and discrimination in the conventional TN-type liquid crystal display apparatus, it is proposed to use the liquid crystal having negative permittivity anisotropy. The proposal is given in Japanese Laid Open Patent applications (JP-A-Heisei 6-43461, JP-A-Heisei 7-199190, JP-A-Heisei 7-230097 and JP-A-Heisei 10-20323). In a multi-domain liquid crystal display apparatus in these proposals, a liquid crystal cell is formed such that the liquid crystal has homeotropic orientation in a perpendicular direction. Also, an opening is provided for a common electrode or the pixel electrode, and an oblique electric field is generated in each pixel to form a plurality of domains in the pixel.

Especially, in Japanese Patent Application Nos. (Heisei 11-180615 and Heisei 11-359411) which have been filed by the assignee of the present invention, a control electrode is provided to control the orientation state of liquid crystal. However, these applications were not laid opened until two Japanese Patent Applications corresponding to the present application were filed. The pixel electrode in an electrically floating state is connected through a capacity with the control electrode which is connected in turn with the source electrode. This structure is called a floating pixel electrode structure. In accordance with this structure, a pixel transistor of each pixel controls the control electrode and two electrode potentials of the control electrode and the pixel electrode can be controlled easily.

The liquid crystal display apparatus having such a floating pixel electrode structure will be described below. Drain wiring lines and gate wiring lines extend in orthogonal directions to each other on a pixel transistor (TFT) substrate, and one pixel is formed a region surrounded by these wiring lines. Each pixel has a pixel transistor, the pixel electrode and a control electrode. Also, the pixel electrode is in an electrically floating state and forms coupling capacitances together with the control electrode and a common capacitance line through the insulating film, respectively. The pixel transistor substrate and a counter substrate on which counter electrodes are formed are opposed to each other to have a predetermined interval and the liquid crystal having negative permittivity anisotropy is interposed between the substrates.

When a gate bus line is selected, a signal voltage is applied from the drain bus line to the control electrode which is connected with the source terminal through the pixel transistor. At this time, the potential of the pixel electrode in the electrically floating state is set to a potential between the potential of the control electrode and the potential of the common capacitance line in accordance with the ratio of coupling capacitances. Therefore, the potentials are larger or smaller in the order of the control electrode, the pixel electrode and the common capacitance line. Thus, the liquid crystal drive electric field generated between the pixel electrode and the control electrode or the common capacitance line is generated in an oblique direction to spread from the control electrode toward the outside. Therefore, in the one pixel surrounded by the gate lines and the drain lines, it is possible to direct the liquid crystal molecules to different directions on both sides of the control electrode, so that the view angle visual characteristic can be improved.

However, in order to manufacture the multi-domain liquid crystal display apparatus, the process for forming the control electrode must be added at least, compared with the conventional TN-type liquid crystal display apparatus. Especially, in the above mentioned multi-domain liquid crystal display apparatus, it is necessary to form capacitances between the pixel electrode and the control electrode and between the pixel electrode and the common capacitance line. Therefore, the manufacturing method is not yet established and the establishment of the manufacturing method of a high manufacture yield is demanded.

Also, the pixel electrode is in the electrically floating state in the above liquid crystal display apparatus. Therefore, it is easy to undergo influence of the potential of the bus line and influence of the charging of the substrate. The orientations of the liquid crystal molecules are disordered due to these unintentional potential so that display irregularity is easy caused. Therefore, in the liquid crystal display apparatus of the multi-domain structure, the view angle characteristic has degraded when symmetry in the orientations of the liquid crystal molecules is disordered.

Moreover, in the liquid crystal display apparatus, the uniformity of the display in the entire panel is easily lost due to the voltage drop and the signal delay in the gate bus line and drain bus line. Also, the influence of the backlight light changes the characteristic of the pixel transistor.

SUMMARY OF THE INVENTION

Therefore, an object of the present invention is to provide a multi-domain liquid crystal display apparatus of an electrically floating pixel electrode structure can be manufactured with a high production yield and a manufacturing method for the same.

Another object of the present invention is to provide a multi-domain liquid crystal display apparatus of an electrically floating pixel electrode structure which can be formed in a small number of processes and a manufacturing method for the same.

Still another object of the present invention is to provide a multi-domain liquid crystal display apparatus of an electrically floating pixel electrode structure in which a process for forming the pixel electrode is improved, and a manufacturing method for the same.

Yet still another object of the present invention is to provide a multi-domain liquid crystal display apparatus of an electrically floating pixel electrode structure in which display irregularity due to the potential of the bus line or charging of the substrate can be constrained, and symmetry in the orientations of the liquid crystal molecules is secured so that the view angle characteristic is improved.

Also, it is an object of the present invention to provide a multi-domain liquid crystal display apparatus of an electrically floating pixel electrode structure in which the influence of voltage drop in the bus line or backlight light and signal delay can be eased.

In an aspect of the present invention, a liquid crystal display apparatus includes a first substrate, a second substrate and a liquid crystal layer interposed between the first substrate and the second substrate. The first substrate includes on a surface facing the second substrate, a plurality of gate bus lines extending into a row direction, a plurality of drain bus lines extending into a column direction; and a plurality of pixels arranged in matrix. Each of the plurality of pixels includes a portion of one of the plurality of gate bus lines associated with the pixel, a portion of one of the plurality of drain bus lines associated with the pixel, a portion of a capacitance line associated with the pixel, a pixel transistor having a source and a drain which is connected with the associated drain bus line, a control electrode connected with the source and formed in at least a portion of a region of the pixel, and a the pixel electrode which is in an electrically floating state and which is formed to cover the control electrode and a portion of the capacitance line through at least one of a first insulating film and second insulating film.

Here, in the pixel, a first capacitance may be formed from the pixel electrode and the control electrode and a second capacitance may be formed from the pixel electrode and the capacitance line. In this case, it is desirable that the second capacitances are different depending on a distance from a gate signal supply terminal on the associated gate bus line, in a row of the pixels associated with the associated gate bus line. In this case, at least one of the first capacitances and the second capacitances in the row of the pixels are desirably changed such that the change compensates for a voltage drop of a gate signal from the gate signal supply terminal to keep a feed-through voltage of the pixel transistor constant. Also, the second capacitance may be decreased in the row of the pixels depending on the distance from the gate signal supply terminal. Also, an area of the pixel electrode overlapping with the capacitance line portion may be decreased depending on the distance from the gate signal supply terminal in the row of the pixels.

Also, the control electrode may include a conductive layer, and a bordering layer formed in a peripheral portion of the conductive layer.

Also, the pixels adjacent in the column direction are desirably symmetrical with respect to a line extending in the row direction between the pixels. In this case, the associated gate bus line portion is desirably provided in a lower portion of an upper one of the adjacent pixels, and the associated gate bus line portion is desirably provided in an upper portion of a lower one of the adjacent pixels. Also, the capacitance line portion is desirably provided in an upper portion of an upper one of the adjacent pixels, and the capacitance line portion is desirably provided in a lower portion of a lower one of the adjacent pixels.

Also, the associated drain bus line may have two drain lines extending in the row direction between the associated gate bus line portion in the lower portion of the upper pixel and the associated gate bus line portion in the upper portion of the lower pixel. The pixel transistors of the upper and lower pixels are desirably formed to connect with the two drain lines, respectively. In this case, the two drain lines extend toward the drain bus line associated with the pixels adjacent in the row direction.

Also, each of the plurality of pixels may be symmetrical with respect to a centerline thereof extending in the column direction, except for the associated drain bus line portion.

Also, the pixel transistor of each of the plurality of pixels is desirably formed such that the pixel transistor does not stick out of the associated gate bus line portion.

Also, the liquid crystal display apparatus may further include at least one dummy line provided for at least one of a left portion from a leftmost column of the pixels and a right portion from a rightmost column of the pixels in the row direction. In this case, the dummy line is applied with either of a same potential as that of the capacitance line, a same potential as that of adjacent one of the plurality of drain bus lines, a same potential as that of one drain bus line opposite to the associated drain bus line in the plurality of drain bus lines, and an average of potentials of the plurality of drain bus lines.

Also, the liquid crystal display apparatus may further include a conductive film provided on or above a surface of the first substrate on an opposite side to the second substrate.

Also, the pixel transistor may include the associated gate bus line, the first insulating film formed to cover the associated gate bus line, a semiconductor layer formed on the first insulating film, a drain contact layer and a source contact layer formed on the semiconductor layer, and a drain electrode connected to the drain contact layer and a source electrode connected to the source contact layer. In this case, each of the plurality of drain bus lines may be a laminate film composed of a metal film formed of same material as that of the source electrode and the drain electrode of the pixel transistor, and a conductive film formed of same material as that of the control electrode. Also, each of the plurality of drain bus lines may be a laminate film composed of a semiconductor layer formed of same material as that of the semiconductor layer, a metal film formed of same material as that of the source electrode and the drain electrode of the pixel transistor, and a conductive film formed of same material as that of the control electrode.

Also, the pixel transistor may include a drain electrode and a source electrode formed on the facing surface of the first substrate to the second substrate on the first insulating film, a semiconductor layer formed on the insulating film portion, the source electrode and the drain electrode, a third insulating film formed on the semiconductor layer, the gate electrode formed on the third insulation film, and a light shielding layer provided between the first substrate and the first insulating film. Also, the associated gate bus line includes a laminate film may include a semiconductor layer formed of same material as that of the semiconductor layer, an insulating film formed of same material as that of the third insulating film, and a conductive film formed of same material as that of the gate electrode. Also, the source electrode may be a portion of the control electrode.

Also, each of the control electrode and the pixel electrode may be formed of a transparent conductive film, and each of the source electrode and the drain electrode may be formed of at least one of Cr and Mo.

Also, a drain terminal may be formed in each of ends of the plurality of the drain bus lines.

In another aspect of the present invention, a manufacturing method of a liquid crystal display apparatus in which a plurality of pixels are arranged in a matrix in a column direction and a row direction, is achieved by (a) forming a plurality of gate bus lines and a plurality of capacitance lines on a substrate; (b) forming a first insulating film to cover the substrate and the plurality of gate bus lines at least; by (c) forming a plurality of drain bus lines on the first insulating film; by (d) in a region of each of the plurality of pixels, forming a pixel transistor which has a source and a drain on an associated one of the plurality of gate bus lines through the first insulating film, wherein the drain of the pixel transistor is connected with an associated one of the plurality of drain bus lines; by (e) forming a control electrode connected with the source of the pixel transistor in a portion in the pixel region; by (f) forming a second insulating film to cover the first insulating film, the pixel transistor and the plurality of drain bus lines at least; and by (g) forming a pixel electrode in the pixel region to cover the control electrode and a portion of the capacitance line through at least one of the first insulating film and the second insulating film.

Here, the (d) step may be achieved by (h) forming a semiconductor layer and a contact layer on the associated gate bus line through the first insulating film; by (i) patterning the semiconductor layer and the contact layer in an island manner based on a region for the pixel transistor; by (j) forming an electrode layer to cover the contact layer and the semiconductor layer; and by (k) etching the electrode layer to form a source and a drain. In this case, the (e) step of forming the control electrode is carried out subsequent to the (k) step. Also, the (c) step of the drain bus line may be achieved by forming a first conductive layer on the first insulating film at a same time as the (j) step; and by forming a second conductive layer provided on the first conductive layer or covering the first conductive layer at a same time as the (e) step of forming the control electrode.

Also, the (d) step may be achieved by (l) depositing a semiconductor layer, a contact layer and an electrode layer in order on the associated gate bus line through the first insulating film; by (m) patterning the semiconductor layer, the contact layer and the electrode layer in an island manner based on a region for the pixel transistor; by (n) depositing a control electrode film to cover the electrode layer, the contact layer and the semiconductor layer; and by (o) etching the control electrode film, the electrode layer and the contact layer, and forming a source electrode composed of a source contact layer, a lower source electrode on the source contact layer and an upper source electrode on the lower source electrode, and a drain composed of a drain contact layer, a lower drain electrode on the drain contact layer and an upper drain electrode on the lower drain electrode. In this case, the (e) step of forming the control electrode may be carried out at same time as the (n) step and (o) step.

Also, the (c) step of forming the drain bus line may be achieved by patterning a first laminate layer of the semiconductor layer, the contact layer and the electrode layer at a same time as the (m) step; and by forming a first conductive layer provided on or covering the first laminate layer at a same time as the (n) step and the (o) step. In this case, the (m) step may be achieved by patterning the semiconductor layer, the contact layer, the electrode layer and the first insulating film, in each the pixel region. The (n) step may be achieved by depositing the control electrode film to cover the electrode layer and the substrate. Also, the (g) step may be achieved by depositing a pixel electrode film; by forming a resist layer on the pixel electrode film using a halftone mask, wherein the resist layer has a thick portion and a thin portion; by removing the pixel electrode film in a predetermined region using the resist layer; by removing a thin portion of the resist layer by an ashing; and by patterning the pixel electrode film after the removal using the thick portion of the resist layer to form the pixel electrode.

Also, the (d) step may be achieved by (p) depositing a semiconductor layer, a contact layer and an electrode layer in order as a first laminate layer on the gate bus line through the first insulating film; by (q) patterning the electrode layer using a resist pattern to form a source electrode and a drain electrode; by (r) deforming the resist pattern using organic solvent; and by (s) patterning the contact layer and the semiconductor layer in an island manner for a region for the pixel transistor using the deformed resist pattern. In this case, the (e) step of forming the control electrode is desirably carried out subsequent to the (s) step. Also, the (c) step of forming the drain bus line may be achieved by patterning the first laminate layer at same time as the (q) step; and by forming a second conductive layer provided on or covering the first laminate layer at same time as the (e) step.

Also, the (d) step may be achieved by (t) depositing a semiconductor layer, a contact layer and an electrode layer in order as a first laminate layer on the gate bus line through the first insulating film; by (u) forming a resist layer having a thick portion and a thin portion on the electrode layer by changing an integral value of an exposure light quantity; by (v) patterning the electrode layer, the contact layer and the semiconductor layer using the resist pattern in an island manner; by (w) after the thin portion of the resist layer is removed through an ashing process, removing the electrode layer for a channel region of the pixel transistor using the thick portion of the resist layer, to form a source electrode and a drain electrode. In this case, the (e) step of forming the control electrode is desirably carried out the (w) step.

Also, the (c) step of forming the drain bus line may be achieved by patterning the first laminate layer at same time as the (v) step; and by forming a second conductive layer provided on or covering the first laminate layer at same time as the (e) step.

Also, the (g) step of forming the control electrode may be achieved by depositing a pixel electrode film; by forming a resist layer having a thick portion and a thin portion on the pixel electrode film by changing an integral value of an exposure light quantity; by removing the pixel electrode film and the second insulating film or a set of the second insulating film and the first insulating film in a predetermined region in order using the resist layer; by removing the thin portion of the resist layer by an ashing process; and by patterning the pixel electrode film using the thick portion of the resist layer to form the pixel electrode.

Also, the (e) step of forming the control electrode may be achieved by depositing a control electrode film; by depositing a conductive film on the control electrode film; by patterning the conductive film using a resist pattern; and by patterning the control electrode film using the patterned conductive film as a mask.

Also, the (e) step may be achieved by depositing a control electrode film; by patterning the control electrode film; and by forming a conductive film in a peripheral portion of the patterned control electrode film to form the control electrode.

Also, the (e) step may be achieved by depositing a conductive film; by patterning the conductive film to have a loop; by depositing a control electrode film on the patterned conductive film; and by patterning the control electrode film such that an edge portion of the control electrode film is on the patterned conductive film.

Also, the (g) step of forming the pixel electrode may be achieved by depositing a pixel electrode film; by depositing a conductive film on the pixel electrode film; by patterning the conductive film using a resist pattern; and by patterning the pixel electrode film using the patterned conductive film.

Also, the (g) step of forming the pixel electrode may be achieved by depositing a pixel electrode film; by patterning the pixel electrode film; and by forming a conductive film in a peripheral portion of the patterned pixel electrode film to form the pixel electrode.

Also, the (g) step of forming the pixel electrode may be achieved by depositing a conductive film; by patterning the conductive film to have a loop; by depositing a pixel electrode film on the patterned conductive film; and by patterning the control electrode film such that an edge portion of the patterned pixel electrode film is on the patterned conductive film.

Also, a first capacitance may be formed from the pixel electrode and the control electrode and a second capacitance is formed from the pixel electrode and the capacitance line, in each the pixel. The (g) step of forming the pixel electrode may be achieved by forming the pixel electrode in a row of the pixels associated with the associated gate bus line such that the second capacitances are different depending on a distance from a gate signal supply terminal connected to the associated gate bus line.

Also, the (g) step of forming the pixel electrode may be achieved by forming the pixel electrode such that the second capacitances are decreased depending on the distance from the gate signal supply terminal connected to the associated gate bus line in the associated row of the pixels. In this case, the (g) step of forming the pixel electrode may be achieved by forming the pixel electrode such that an overlapping area of the pixel electrode and the capacitance line portion is decreased depending on the distance from the gate signal supply terminal.

Also, the pixel may be formed such that the pixels adjacent in the column direction are symmetrical with respect to a line extending in the row direction between the pixels. In this case, the associated gate bus line portion may be provided in a lower portion of an upper one of the adjacent pixels, and the associated gate bus line portion is provided in an upper portion of a lower one of the adjacent pixels. Also, the capacitance line portion may be provided in an upper portion of an upper one of the adjacent pixels, and the capacitance line portion is provided in a lower portion of a lower one of the adjacent pixels. Also, the step of forming the drain bus line may be achieved by forming two drain lines extending in the row direction between the associated gate bus line portion in the lower portion of the upper pixel and the associated gate bus line portion in the upper portion of the lower pixel. In this case, the pixel transistors of the upper and lower pixels may be formed to be connected with the two drain lines, respectively. Also, the two drain lines may be formed to extend toward the drain bus line associated with the pixels adjacent in the row direction.

Also, each of the plurality of pixels may be formed to be symmetrical with respect to a center line thereof extending in the column direction, except for the associated drain bus line portion.

Also, the pixel transistor of each of the plurality of pixels may be formed such that the pixel transistor does not stick out of the associated gate bus line portion.

Also, the manufacturing method may further comprising the step of: forming at least one dummy line for at least one of a left portion from a leftmost column of the pixels and a right portion from a rightmost column of the pixels in the row direction.

Also, the manufacturing method may further comprise the step of: forming a conductive film provided on or above a surface of the first substrate on an opposite side to the second substrate.

Also, the step of forming the drain bus line further may be achieved by: forming drain terminals in both ends of each of the plurality of drain bus lines.

In still another aspect of the present invention, in a manufacturing method of a liquid crystal display apparatus comprising a plurality of pixels in a matrix in a row direction and a column direction, the manufacturing method may be achieved by (a) forming a plurality of light shielding layers on a substrate; (b) forming a first insulating film to cover the substrate and the plurality of light shielding layers at least; by (c) forming a plurality of drain bus lines; by (d) forming a control electrode in a portion of a region for each of the plurality of pixels; by (e) in the pixel region, forming a pixel transistor above an associated one of the plurality of light shielding layers, wherein the pixel transistor has a source connected to the control electrode, a drain connected with an associated one of the plurality of drain bus lines, and an associated one of a plurality of gate bus lines; by (f) forming a plurality of capacitance lines; by (g) forming a second insulating film to cover the first insulating film, the pixel transistor and the plurality of gate bus lines at least; and by (h) forming a pixel electrode in the pixel region to cover the control electrode and a portion of the capacitance line through at least one of the first insulating film and the second insulating film.

Also, the (e) step may be achieved by (i) forming a source electrode and a drain electrode on the associated light shielding layer through the first insulating film; by (j) after 5-valence element plasma processing is carried out, depositing a and an electrode layer in order; by (k) patterning the electrode layer, the third insulating film and the semiconductor layer to form the plurality of gate bus lines. In this case, the (f) step of forming the plurality of capacitance lines is desirably carried out at same time as the (k) step. Also, the (d) step of forming the control electrode is desirably carried out at same time as the (i) step such that the control electrode and the source electrode are formed unitarily.

Also, the (c) step of forming the plurality of drain bus lines is desirably carried out at same time as the (a) step. Also, the (c) step of forming the plurality of drain bus lines is desirably carried out at same time as the (i) step.

Also, each of the control electrode and the pixel electrode may be formed of a transparent conductive film.

Also, each of the source electrode and the drain electrode may be formed of a refractory metal film.

Also, the (d) step of forming the control electrode may be achieved by depositing a control electrode film; by depositing a conductive film on the control electrode film; by patterning the conductive film using a resist pattern; and by patterning the control electrode film using the patterned conductive film as a mask.

Also, the (d) step may be achieved by depositing a control electrode film; by patterning the control electrode film; and by forming a conductive film in a peripheral portion of the patterned control electrode film to form the control electrode.

Also, the (d) step may be achieved by depositing a conductive film; by patterning the conductive film to have a loop; by depositing a control electrode film on the patterned conductive film; and by patterning the control electrode film such that an edge portion of the control electrode film is on the patterned conductive film.

Also, the (h) step of forming the pixel electrode may be achieved by depositing a pixel electrode film; by depositing a conductive film on the pixel electrode film; by patterning the conductive film using a resist pattern; and by patterning the pixel electrode film using the patterned conductive film.

Also, the (h) step of forming the pixel electrode may be achieved by depositing a pixel electrode film; by patterning the pixel electrode film; and by forming a conductive film in a peripheral portion of the patterned pixel electrode film to form the pixel electrode.

Also, the (h) step of forming the pixel electrode may be achieved by depositing a conductive film; by patterning the conductive film to have a loop; by depositing a pixel electrode film on the patterned conductive film; and by patterning the control electrode film such that an edge portion of the patterned pixel electrode film is on the patterned conductive film.

Also, a first capacitance may be formed from the pixel electrode and the control electrode and a second capacitance is formed from the pixel electrode and the capacitance line, in each the pixel. In this case, the (h) step of forming the pixel electrode may be achieved by forming the pixel electrode in a row of the pixels associated with the associated gate bus line such that the second capacitances are different depending on a distance from a gate signal supply terminal connected to the associated gate bus line. In this case, the (h) step of forming the pixel electrode may be achieved by forming the pixel electrode such that the second capacitances are decreased depending on the distance from the gate signal supply terminal connected to the associated gate bus line in the associated row of the pixels. Also, the (h) step of forming the pixel electrode may be achieved by forming the pixel electrode such that an overlapping area of the pixel electrode and the capacitance line portion is decreased depending on the distance from the gate signal supply terminal.

Also, the pixel may be formed such that the pixels adjacent in the column direction are symmetrical with respect to a line extending in the row direction between the pixels. In this case, the associated gate bus line portion may be provided in a lower portion of an upper one of the adjacent pixels, and the associated gate bus line portion is provided in an upper portion of a lower one of the adjacent pixels. Also, the capacitance line portion may be provided in an upper portion of an upper one of the adjacent pixels, and the capacitance line portion is provided in a lower portion of a lower one of the adjacent pixels. Also, the step of forming the plurality of drain bus lines may be achieved by forming two drain lines extending in the row direction between the associated gate bus line portion in the lower portion of the upper pixel and the associated gate bus line portion in the upper portion of the lower pixel. The pixel transistors of the upper and lower pixels are formed to be connected with the two drain lines, respectively. In this case, the two drain lines may be formed to extend toward the drain bus line associated with the pixels adjacent in the row direction.

Also, each of the plurality of pixels may be formed to be symmetrical with respect to a center line thereof extending in the column direction, except for the associated drain bus line portion.

Also, the pixel transistor of each of the plurality of pixels may be formed such that the pixel transistor does not stick out of the associated gate bus line portion.

Also, the manufacturing method may further comprising the step of: forming at least one dummy line for at least one of a left portion from a leftmost column of the pixels and a right portion from a rightmost column of the pixels in the row direction.

Also, the manufacturing method may further comprise the step of: forming a conductive film provided on or above a surface of the first substrate on an opposite side to the second substrate.

Also, the (c) step of forming the plurality of drain bus lines further may be achieved by: forming drain terminals in both ends of each of the plurality of drain bus lines.

BRIEF DESCRIPTION OF THE DRAWINGS

FIG. 1A to FIG. 5D are diagrams schematically showing the manufacturing method of a conventional liquid crystal display apparatus, wherein FIGS. 1A, 2A, 3A, 4A and 5A are plan views of one pixel, respectively, FIGS. 1D, 2D, 3D, 4D and 5D are cross sectional views of a drain terminal section along the C–C' lines of the plan views, respectively;

FIG. 7A to FIG. 12D show a manufacturing method of an active matrix or TFT substrate of the multi-domain liquid crystal display apparatus according to a first embodiment of the present invention, wherein FIGS. 7A, 8A, 9A, 10A, 11A and 12A are plan views of one pixel, respectively, FIGS. 7D, 8D, 9D, 10D, 11D and 12D are cross sectional views of a drain terminal section along the C–C' lines of the plan views, respectively;

FIGS. 13A to 17D show the manufacturing process of the active matrix (TFT) substrate in the multi-domain liquid crystal display apparatus according to a second embodiment of the present invention, wherein FIGS. 13A, 14A, 15A, 16A and 17A are plan views of pixel, respectively, FIGS. 13D, 14D, 15D, 16D and 17D are cross sectional views of the drain terminal section along the C–C' lines of the plan views, respectively;

FIG. 18A to FIG. 21D show the manufacturing process of the active matrix substrate of the multi-domain liquid crystal display apparatus according to a third embodiment of the present invention, wherein FIGS. 18A, 19A, 20A and 21A are plan views of one pixel, respectively, FIGS. 18B, 19B, 20B and 21B are cross sectional views of a pixel transistor section along the A–A' lines of the plan views, respectively, FIGS. 18C, 19C, 20C and 21C are cross sectional views of the gate terminal section along the B–B' lines of the plan views, respectively, and FIGS. 18D, 19D, 20D and 21D are cross sectional views of the drain terminal section along the C–C' lines of the plan views, respectively;

FIGS. 22A to 26D show the manufacturing process of the active matrix substrate of the multi-domain liquid crystal display apparatus according to the fourth embodiment of the present invention, wherein FIGS. 22A, 23A, 24A, 25A and 26A are plan views of one pixel, respectively, FIGS. 22D, 23D, 24D, 25D and 26D are cross sectional views of the drain terminal section along the C–C' lines in the plan views, respectively;

FIG. 27A to FIG. 30D show the manufacturing process of the active matrix substrate of the multi-domain liquid crystal display apparatus according to a fifth embodiment of the present invention, wherein FIGS. 27A, 28A, 29A and 30A are plan views of one pixel, respectively, FIGS. 27D, 28D, 29D and 30D are cross sectional views of the drain terminal section along the C–C' lines of the plan views, respectively;

FIG. 31A to FIG. 35D show the manufacturing process of the active matrix substrate of the multi-domain liquid crystal display apparatus according to a sixth embodiment of the present invention, wherein FIGS. 31A, 32A, 33A, 34A and 35A are plan views of one pixel, respectively, FIGS. 31D, 32D, 33D, 34D and 35D are cross sectional views of the drain terminal section along the C–C' lines of the plan views, respectively;

FIG. 39A to FIG. 44D show the manufacturing processes of the active matrix substrate of the multi-domain liquid crystal display apparatus according to an eighth embodiment of the present invention, wherein FIGS. 39A, 40A, 41A, 42A, 43A and 44A are plan views of one pixel, respectively, FIGS. 39D, 40D, 41D, 42D, 43D and 44D are cross sectional views of the pixel region along the B–B' lines of the plan views, respectively;

FIG. 47A is a plan view of one pixel, and FIG. 47B is a cross sectional view along the A–A' line of the plan view, FIG. 48A is a pan view of one pixel in a modification of the ninth embodiment, and FIGS. 48B and 48C are expanded plan views of a dashed line region, respectively;

FIGS. 50A to 50C are plan views of the structure of the active matrix substrate of the liquid crystal display apparatus according to an tenth embodiment of the present invention, wherein FIG. 50A is a plan views of one pixel, and FIGS. 50B and 50C are expanded plan views of the neighborhood of the common capacitance line in the broken line region of the plan view;

FIG. 54A to FIG. 60D show the manufacturing processes of the active matrix substrate of the multi-domain liquid crystal display apparatus according to a twelfth embodiment of the present invention, wherein FIGS. 54A, 55A., 56A, 57A, 58A, 59A, and 60A are plan views of one pixel, respectively, FIGS. 54D, 55D, 56D, 57D, 58D, 59D and 60D are cross sectional views of the drain terminal section along the C–C' lines of the plan views, respectively;

FIG. 61A to FIG. 62D show the manufacturing processes of the active matrix substrate of the multi-domain liquid crystal display apparatus according to a thirteenth embodiment of the present invention, wherein FIGS. 61A and 62A are plan views of one pixel, respectively, FIGS. 61D and 62D are cross sectional views of a drain terminal section along the C–C' lines of the plan views, respectively;

FIGS. 63A to 68D shows the manufacturing method of the multi-domain liquid crystal display apparatus with the electrically floating pixel electrode structure according to the fourteenth embodiment of the present invention, wherein FIGS. 63A, 64A, 65A, 66A, 67A and 68A are plan views of one pixel, FIGS. 63D, 64D, 65D, 66D, 67D and 68D are cross sectional views of a drain terminal section along the C–C' lines of the plan views, respectively; and FIG. 69 to FIG. 70D show the manufacturing processes of the active matrix substrate of the multi-domain liquid crystal display apparatus according to a fifteenth embodiment of the present invention, wherein FIGS. 69D and 70D are cross sectional views of a drain terminal section along the C–C' lines of the plan views, respectively.

DESCRIPTION OF THE PREFERRED EMBODIMENTS

Hereinafter, a liquid crystal display apparatus of the present invention will be described below in detail with reference to the attached drawings using a multi-domain liquid crystal display apparatus with an electrically floating pixel electrode structure.

[The First Embodiment]

Figure 1A:
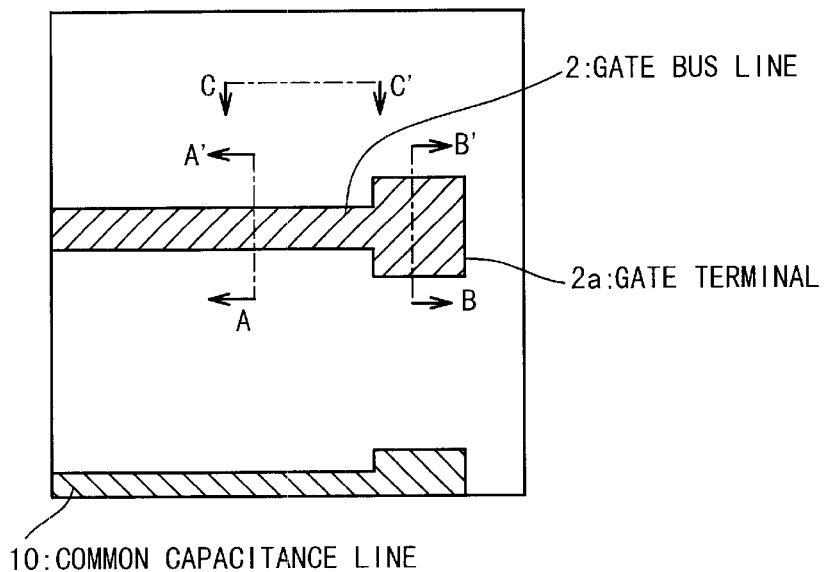
Figure 1B:
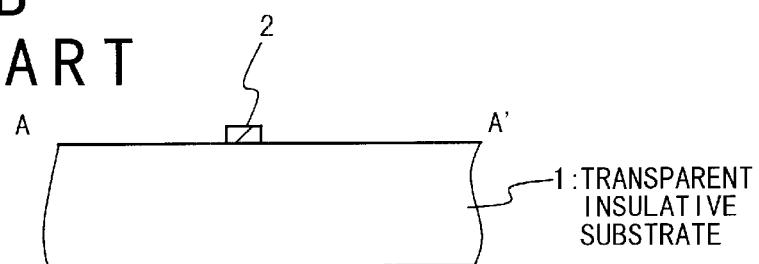
FIGS. 1B, 2B, 3B, 4B and 5B are cross sectional views of a TFT section along the A–A' lines of the plan views, respectively.
Figure 1C:
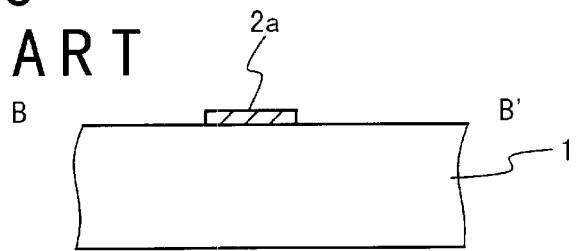
FIGS. 1C, 2C, 3C, 4C and 5C are cross sectional views of a gate terminal section along the B–B' lines of the plan views, respectively.
Figure 1D:
Figure 2A:
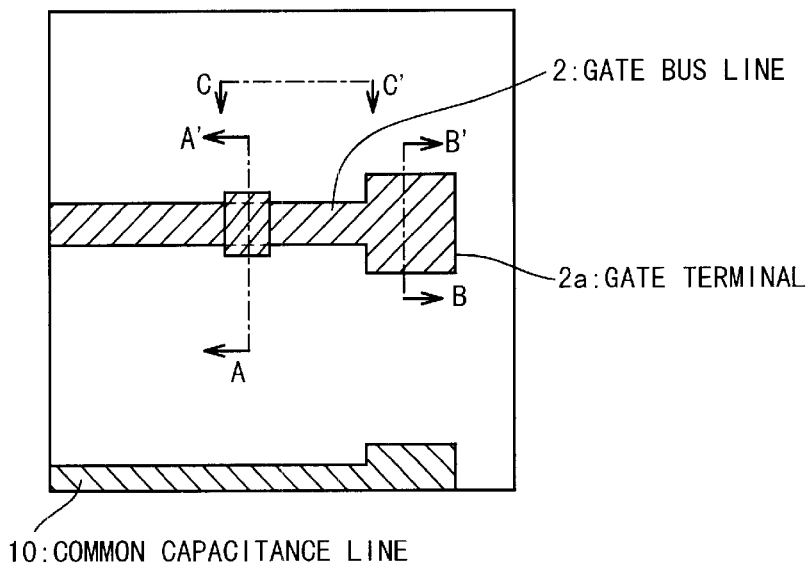
Figure 2B:
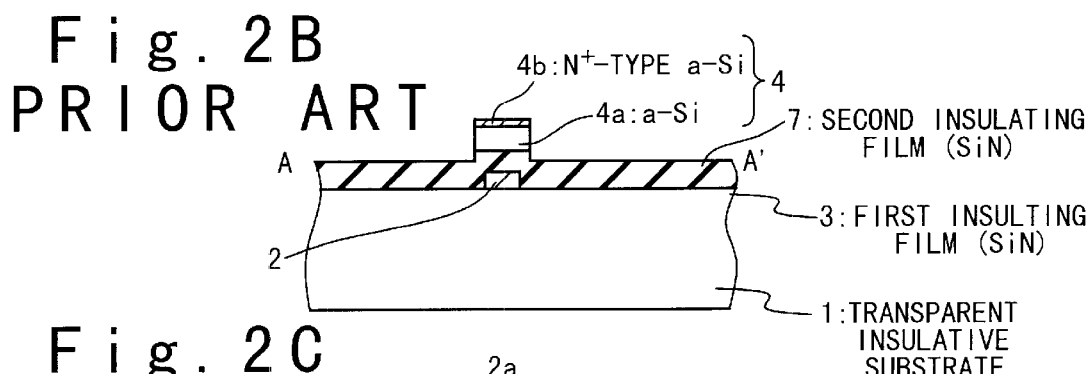
Figure 2C:
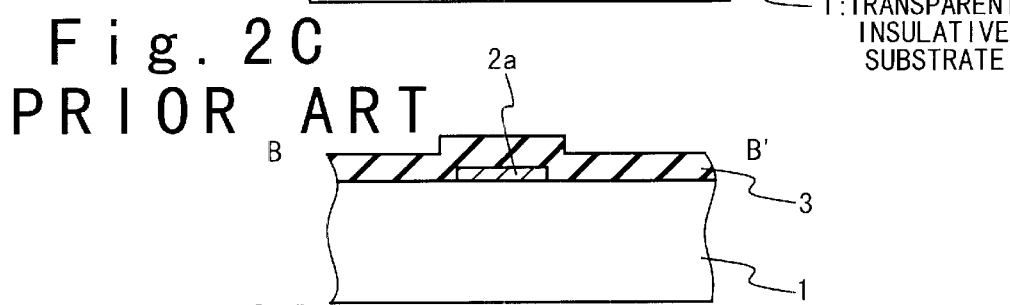
Figure 2D:
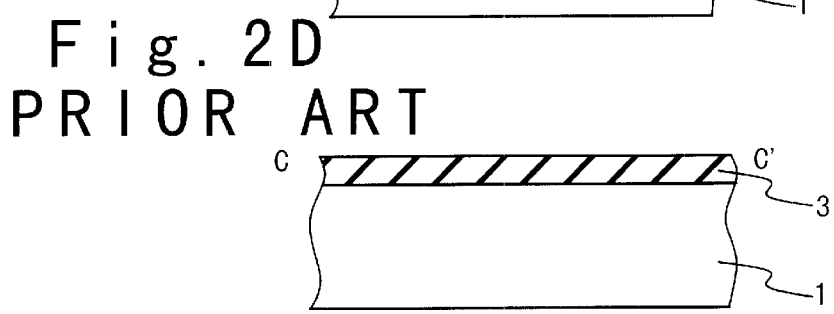
Figure 3A:
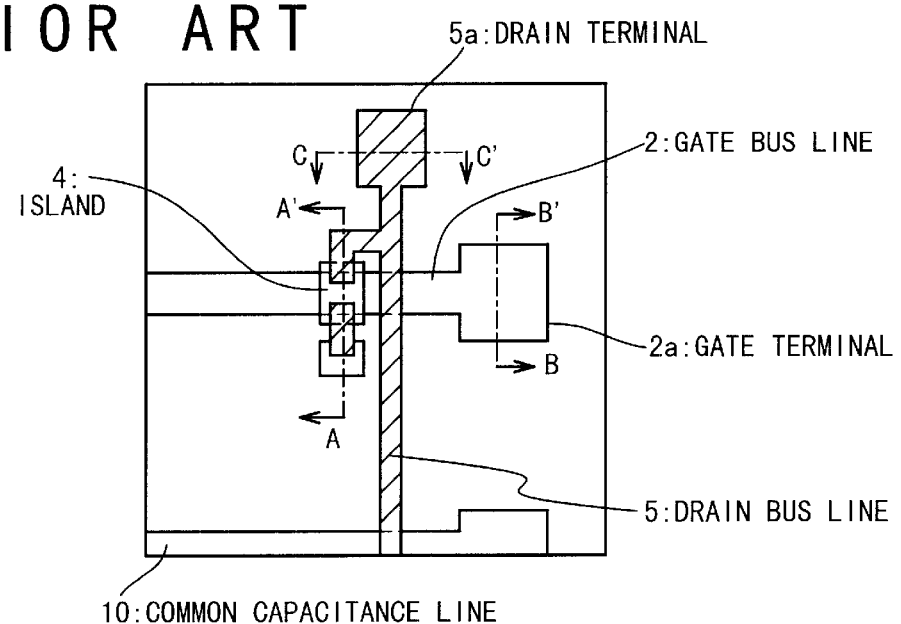
Figure 3B:
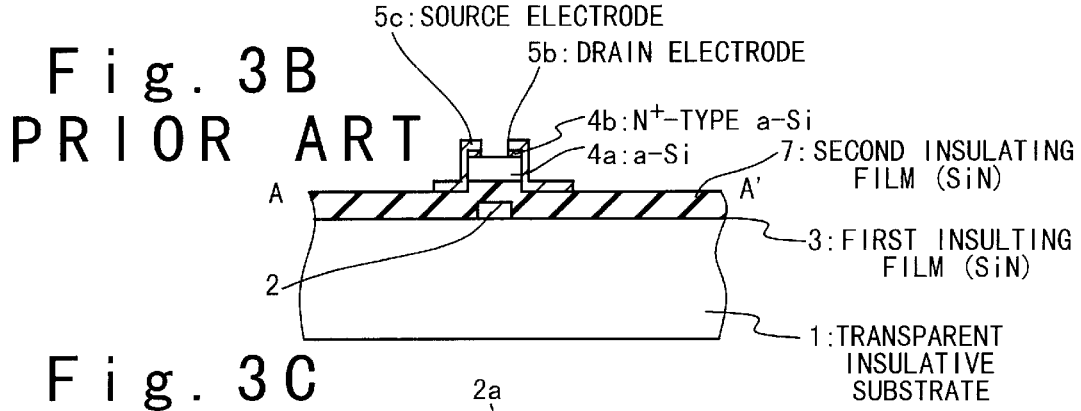
Figure 3C:
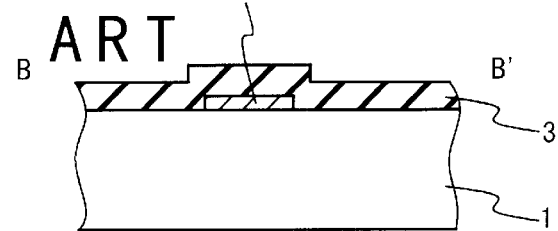
Figure 3D:
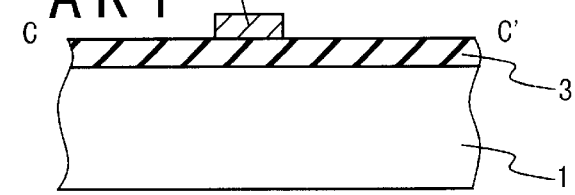
Figure 4A:
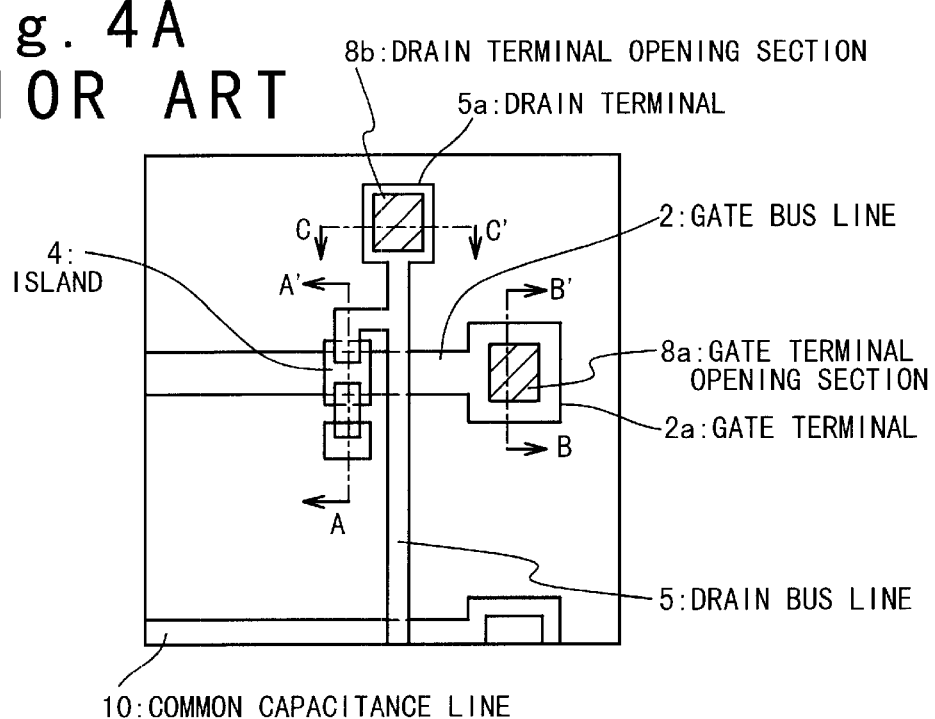
Figure 4B:
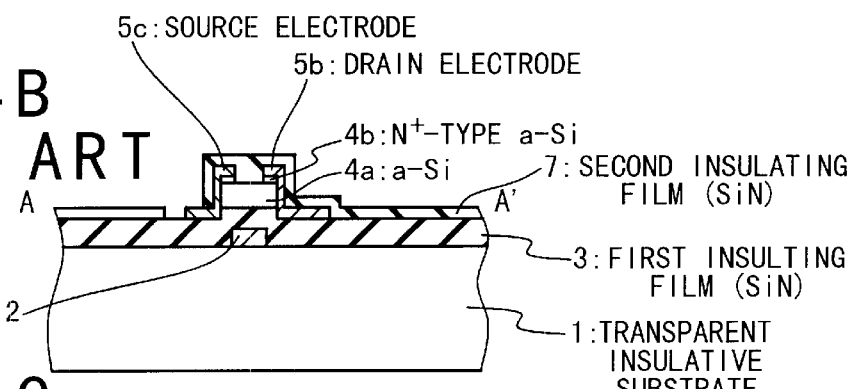
Figure 4C:
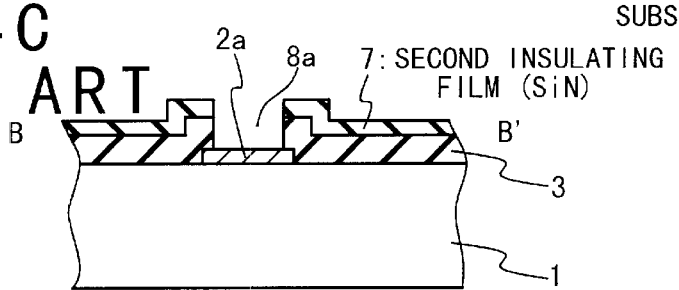
Figure 4D:
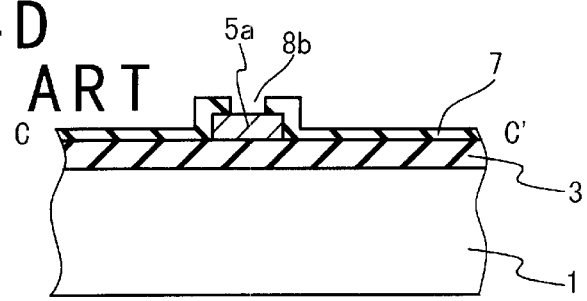
Figure 5A:
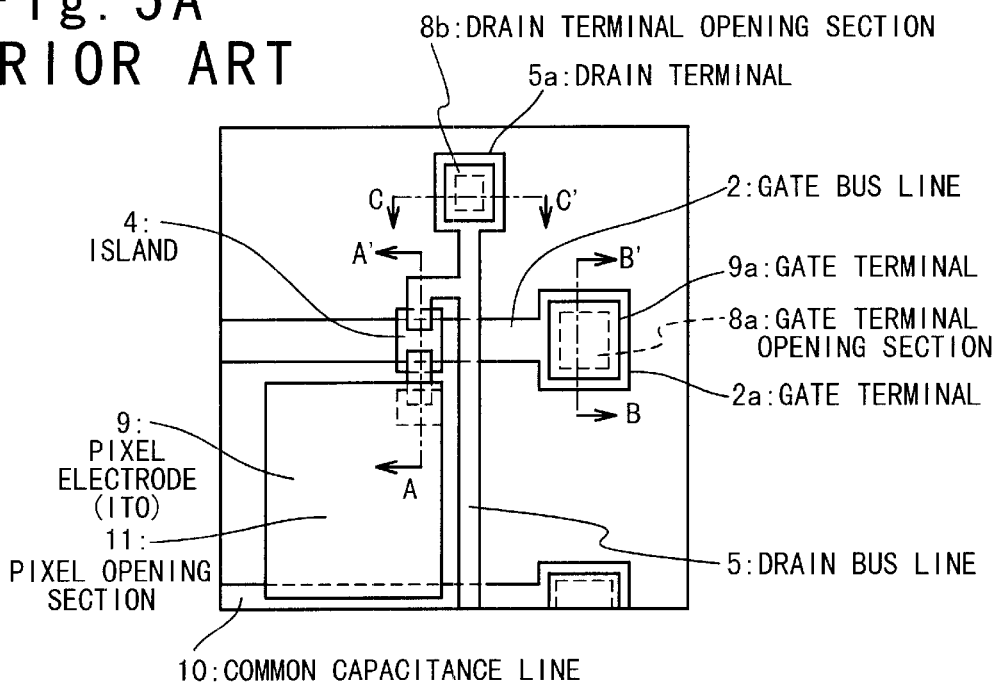
Figure 5B:
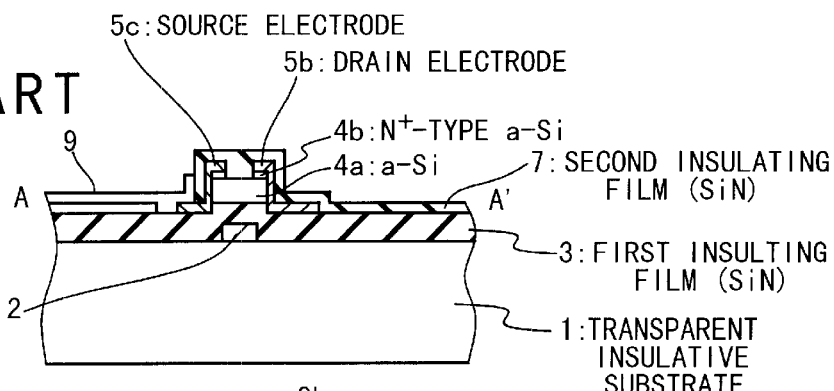
Figure 5C:
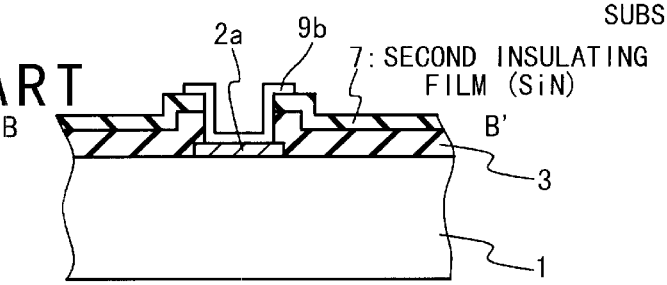
Figure 5D:
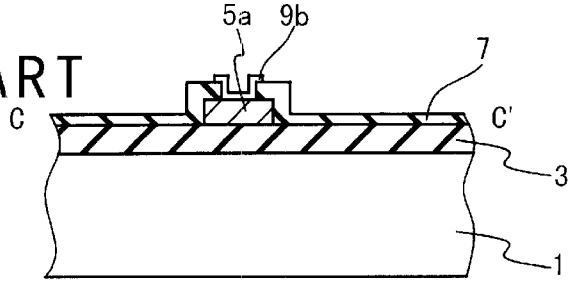
Figure 6A:
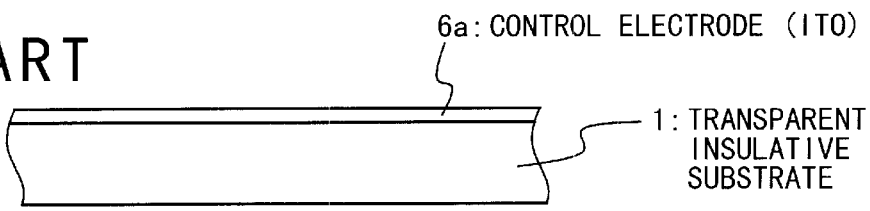
FIGS. 6A to 6F show a conventional manufacturing method of the pixel electrode and the control electrode to match the design size.
Figure 6B:
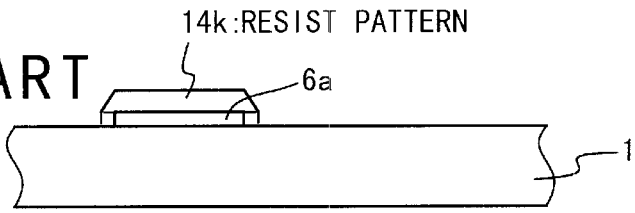
Figure 6C:
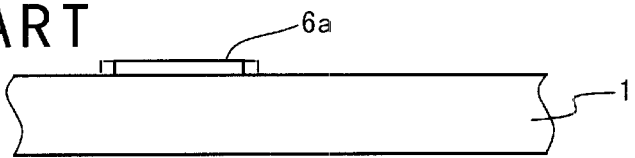
Figure 6D:
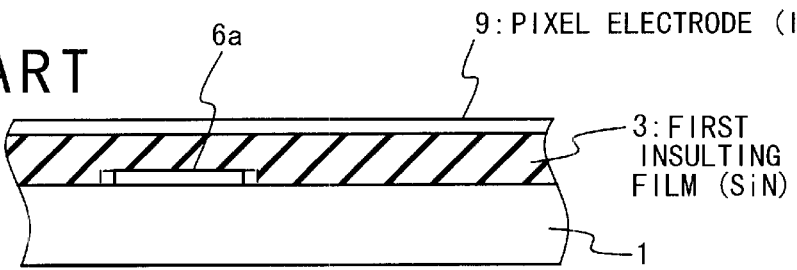
Figure 6E:
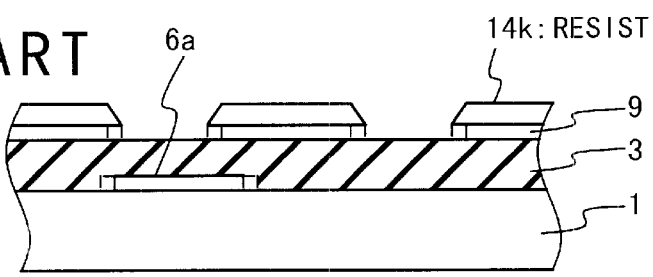
Figure 6F:
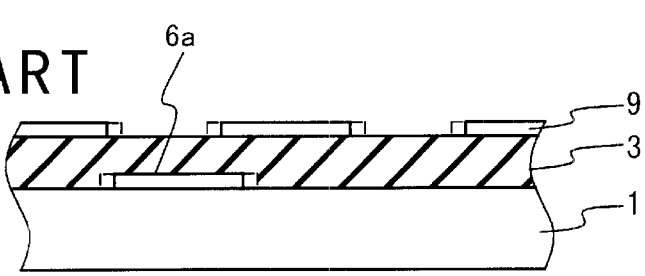
Figure 7A:
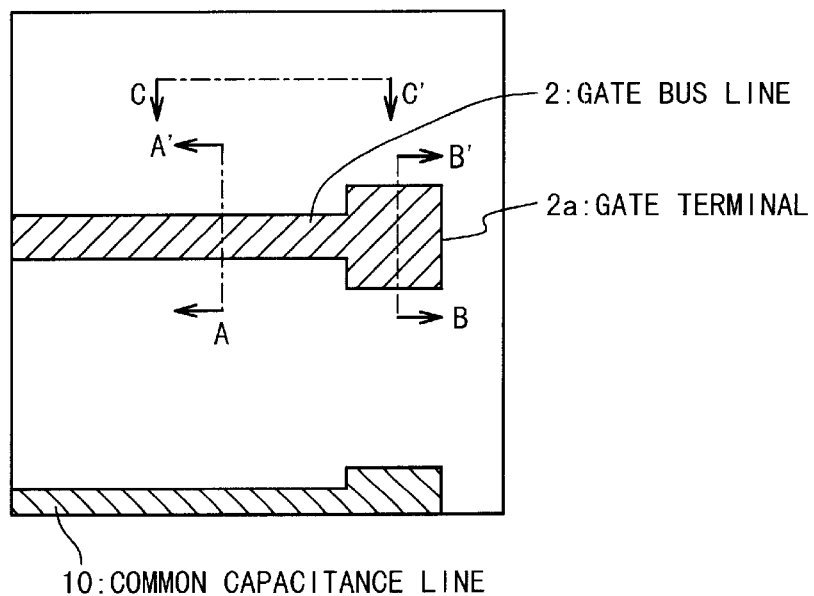
Figure 7B:
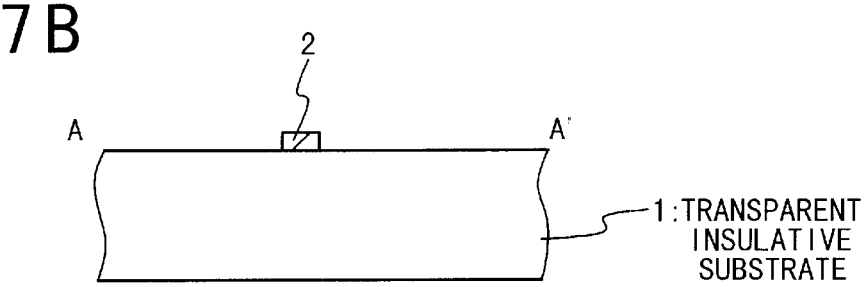
FIGS. 7B, 8B, 9B, 10B, 11B and 12B are cross sectional views of a pixel transistor section along the A–A' lines of the plan views, respectively.
Figure 7C:
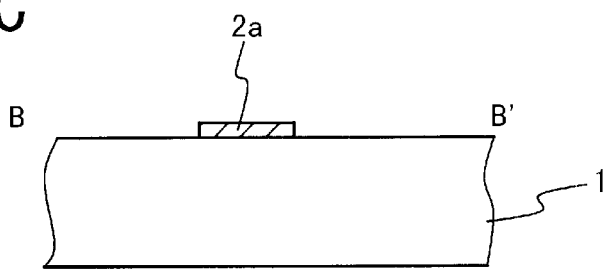
FIGS. 7C, 8C, 9C, 10C, 11C and 12C are cross sectional views of a gate terminal section along the B–B' lines of the respective plan views, respectively.
Figure 7D:
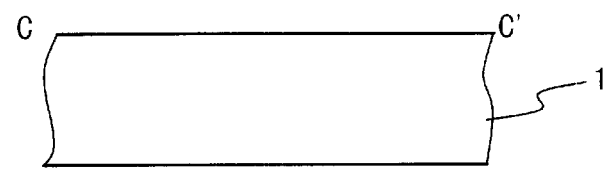
Figure 8A:
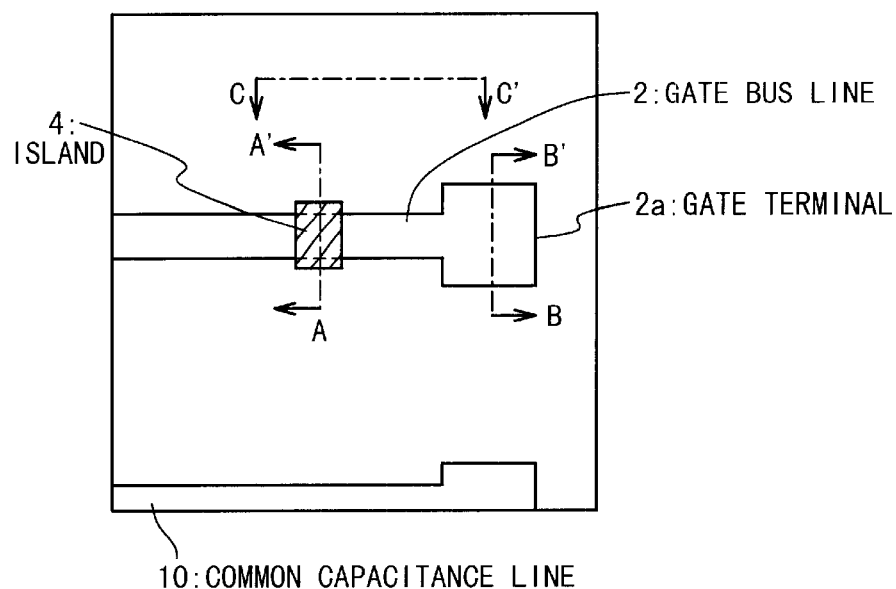
Figure 8B:
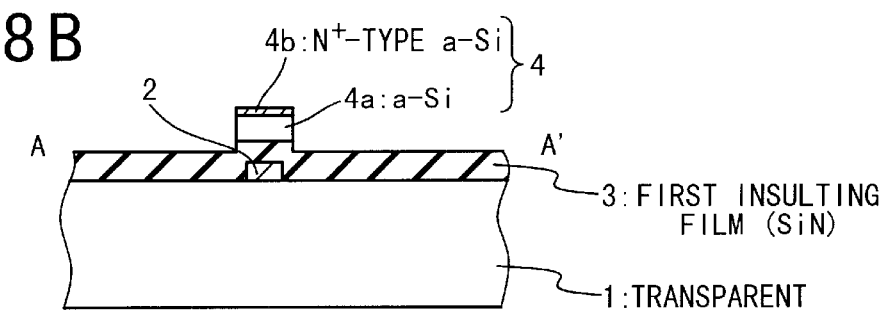
Figure 8C:
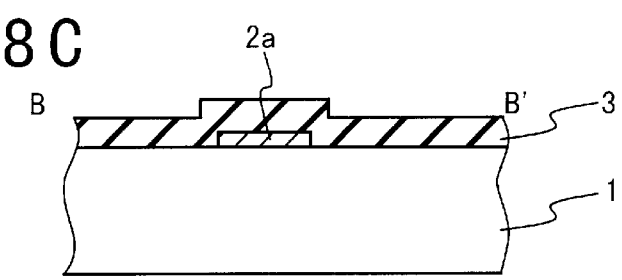
Figure 8D:
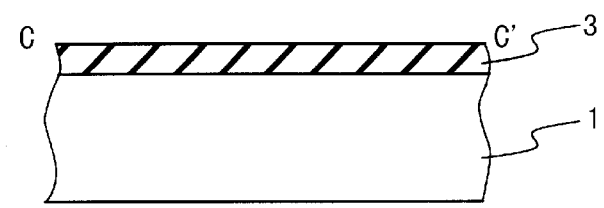
Figure 9A:
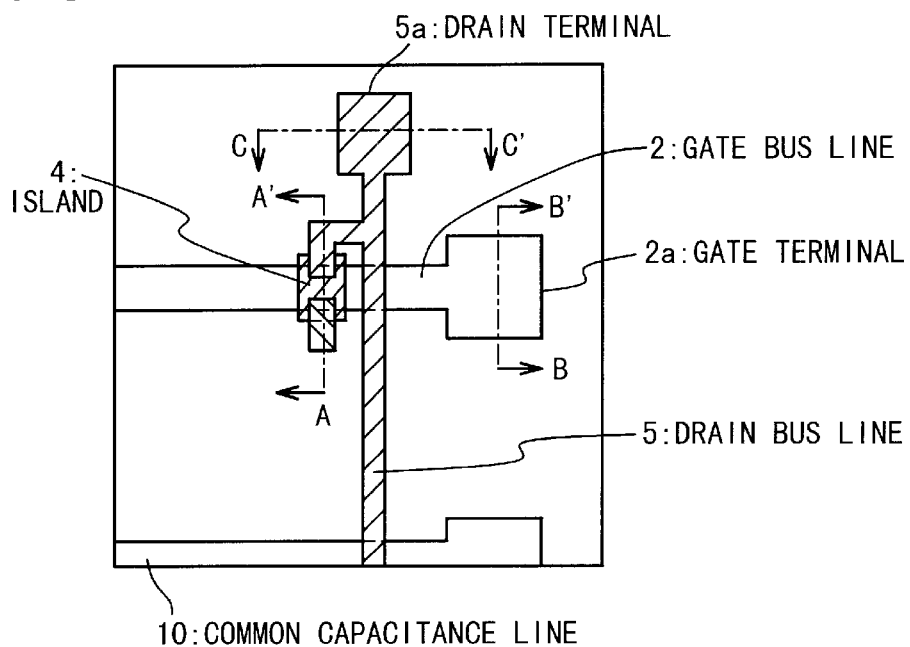
Figure 9B:
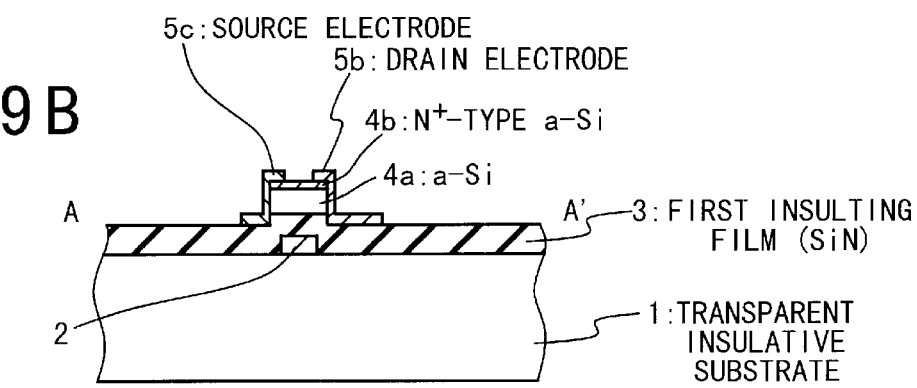
Figure 9C:
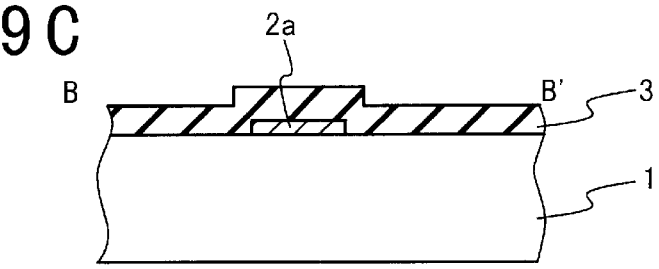
Figure 9D:
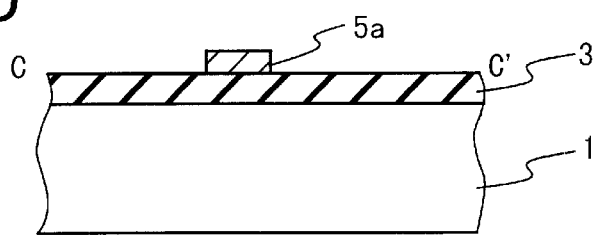
Figure 10A:
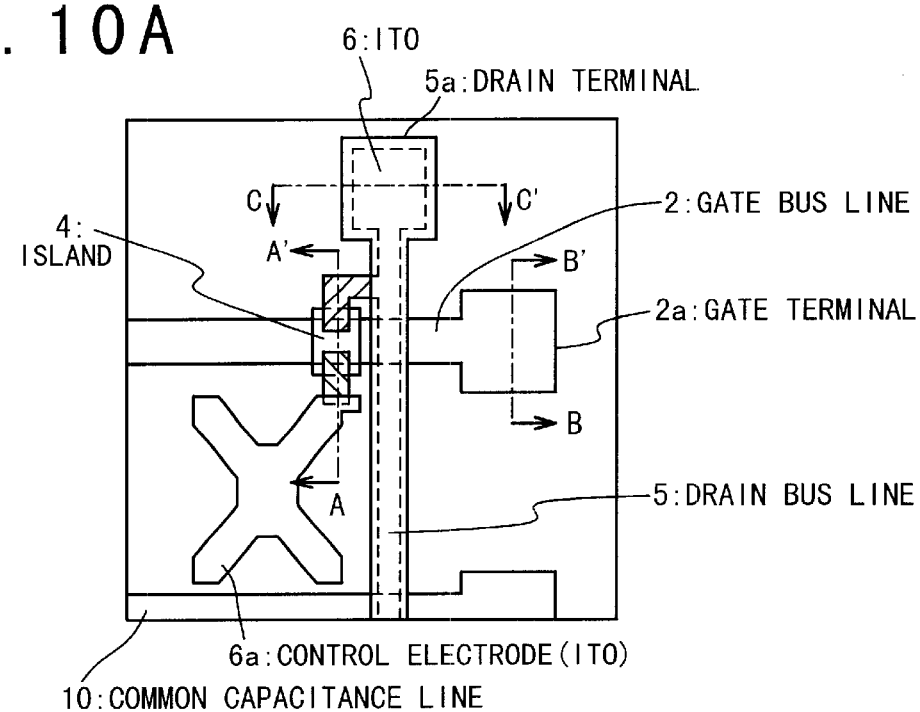
Figure 10B:
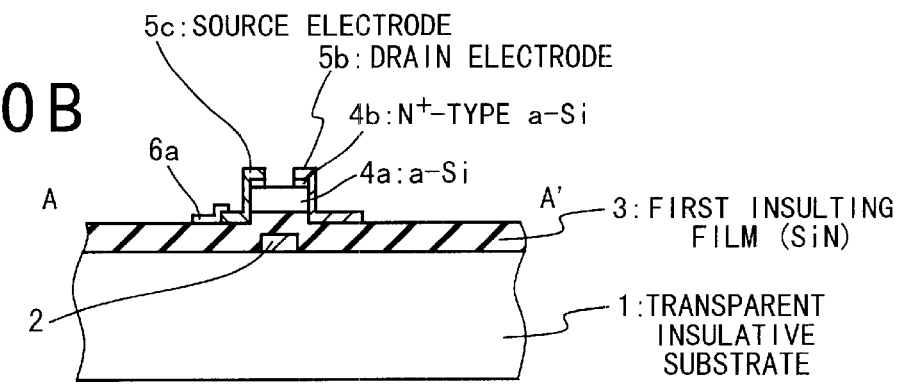
Figure 10C:
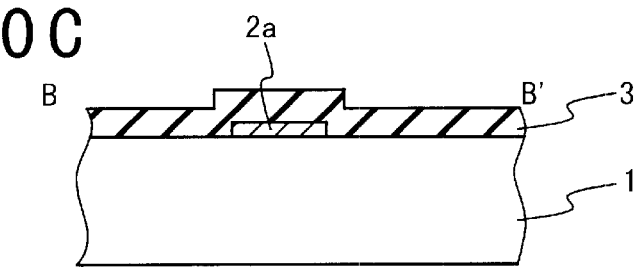
Figure 10D:
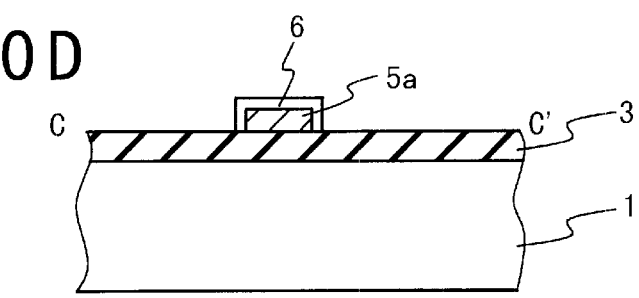
Figure 11A:
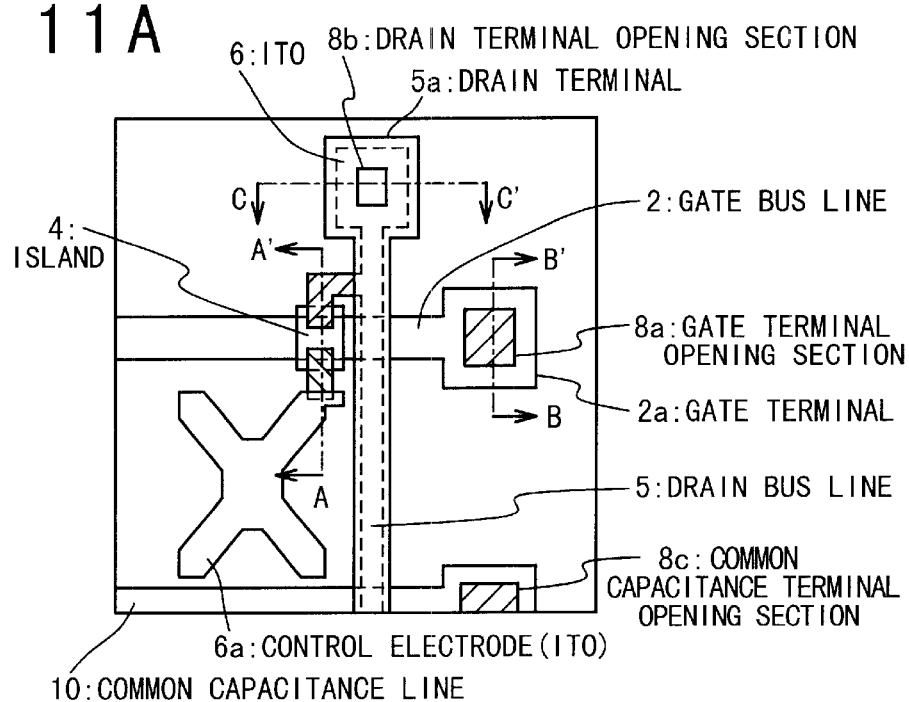
Figure 11B:
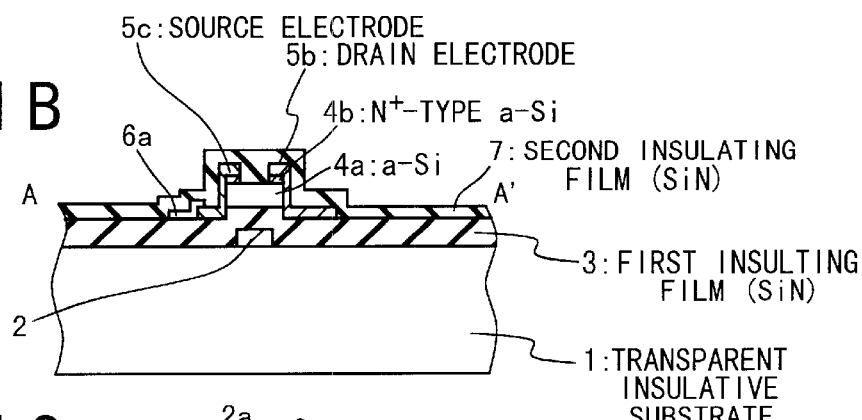
Figure 11C:
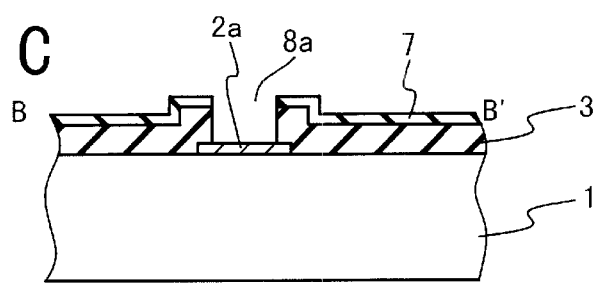
Figure 11D:
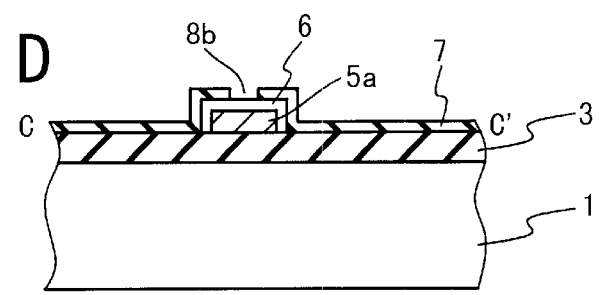
Figure 12A:
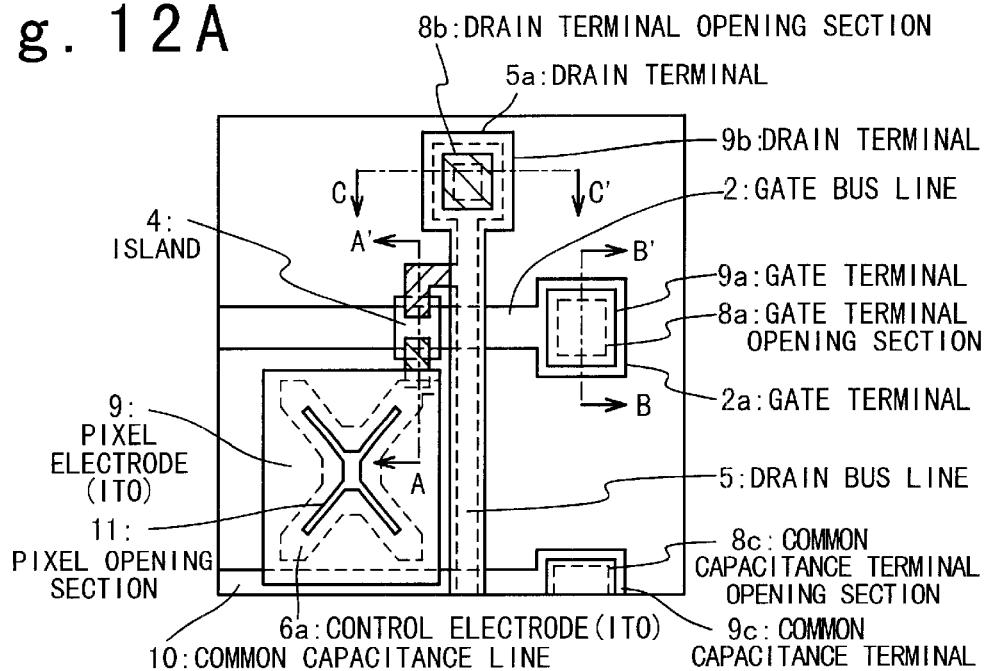
Figure 12B:
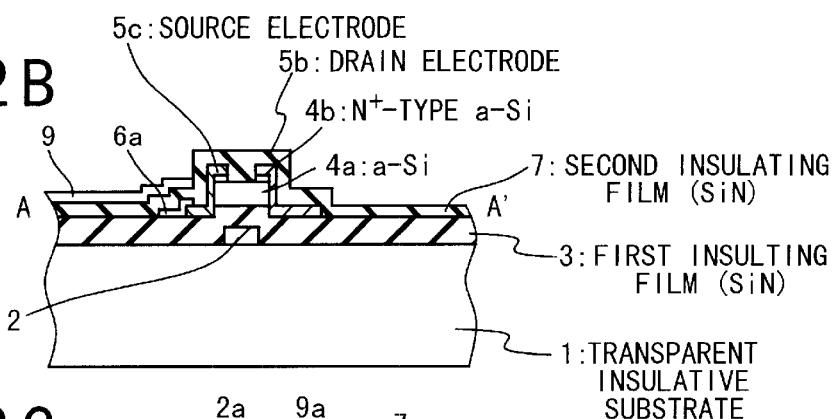
Figure 12C:
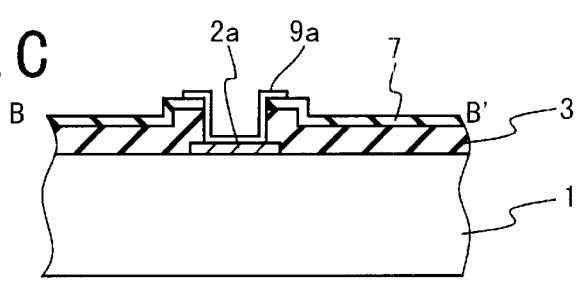
Figure 12D:
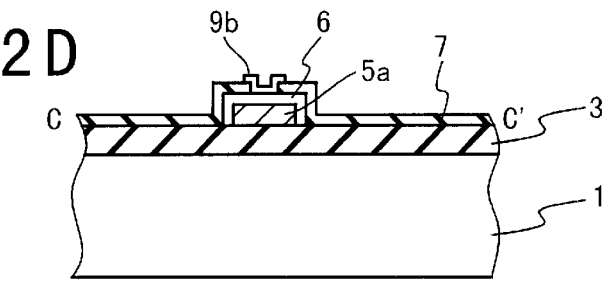
Figure 13A:
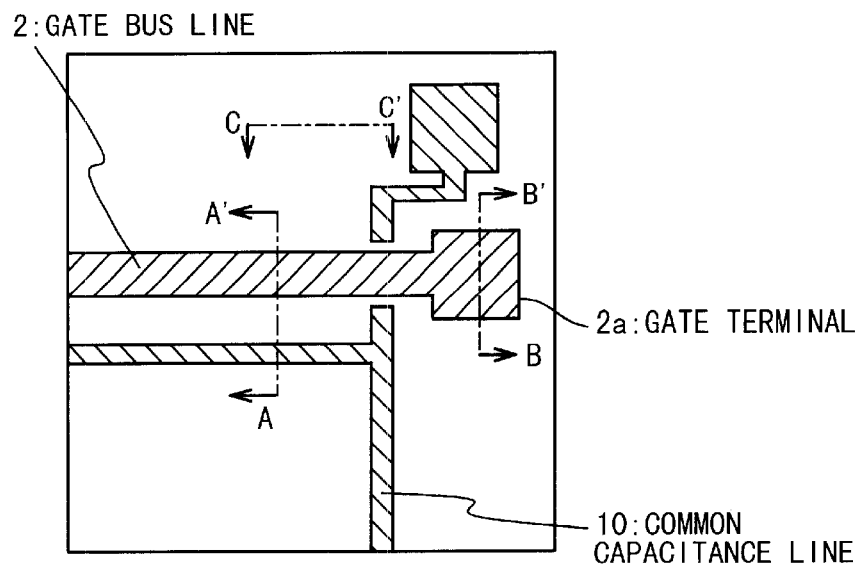
Figure 13B:
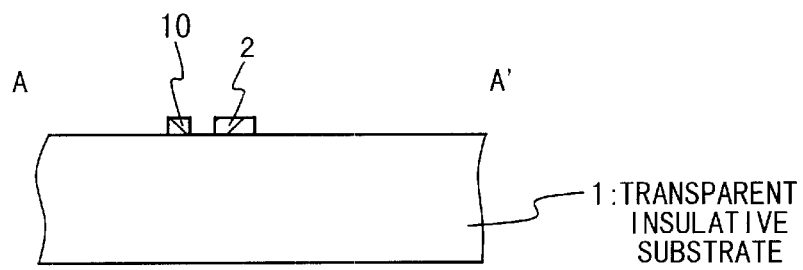
FIGS. 13B, 14B, 15B, 16B and 17B are cross sectional views of the pixel transistor section along the A–A' lines of the plan views, respectively.
Figure 13C:
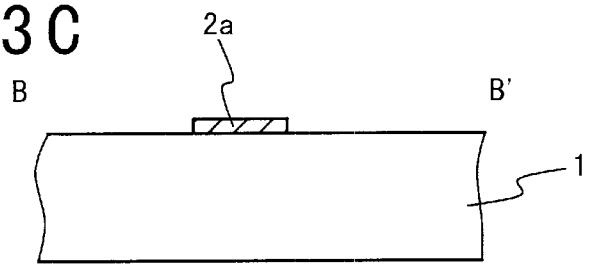
FIGS. 13C, 14C, 15C, 16C and 17C are cross sectional views of a gate terminal section along the B–B' lines of the plan views, respectively.
Figure 13D:
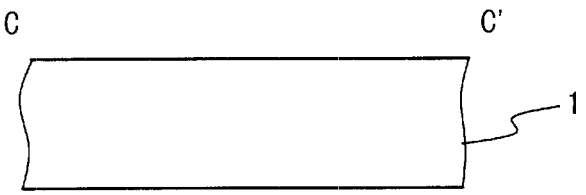
Figure 14A:
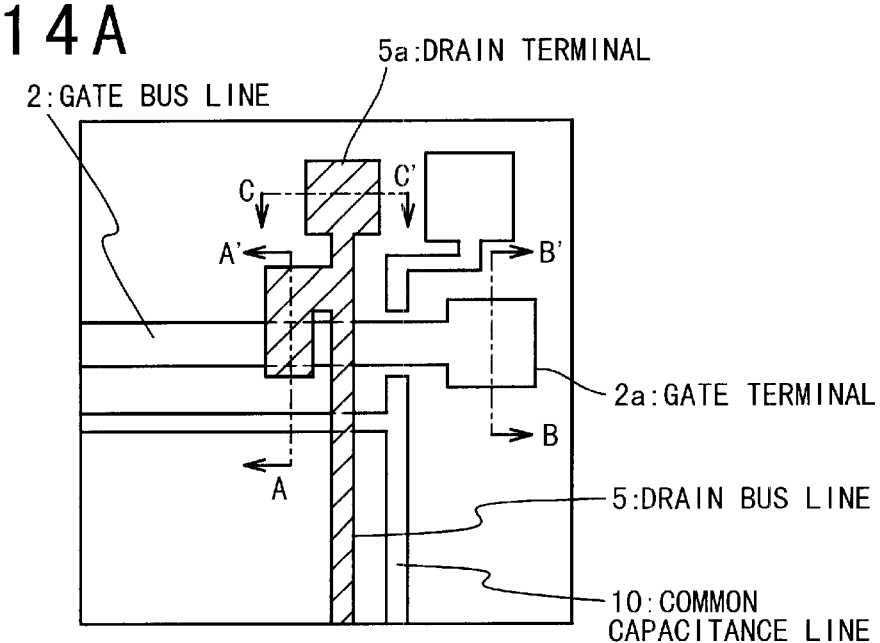
Figure 14B:
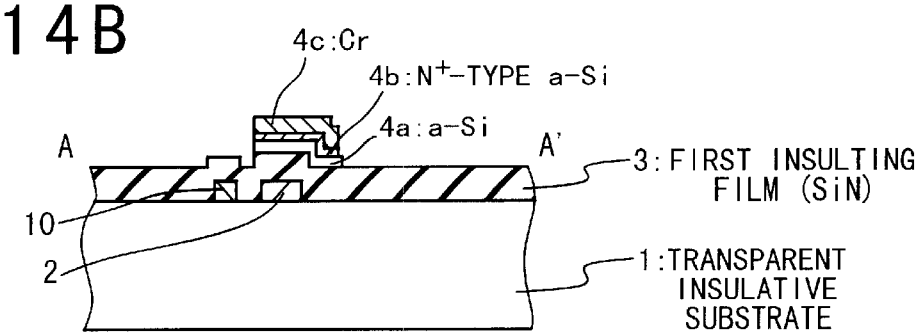
Figure 14C:
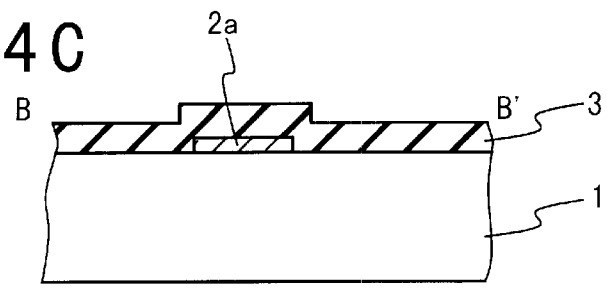
Figure 14D:
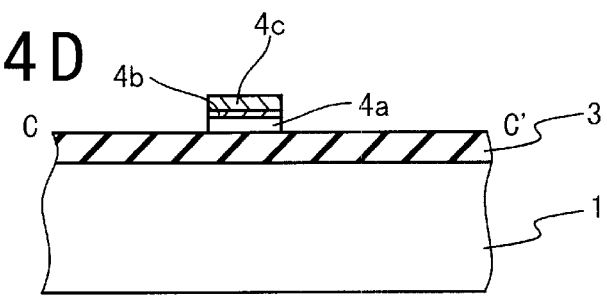
Figure 15A:
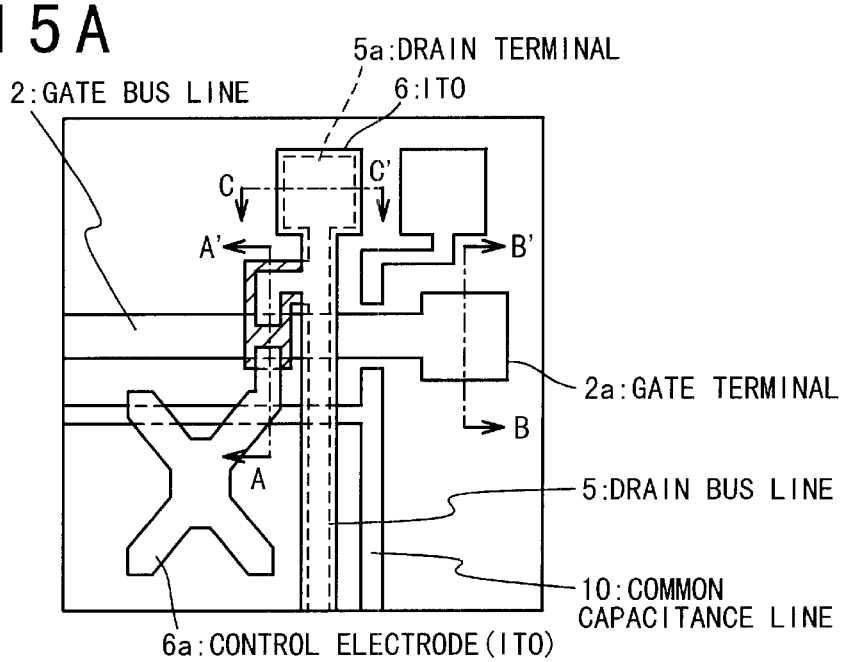
Figure 15B:
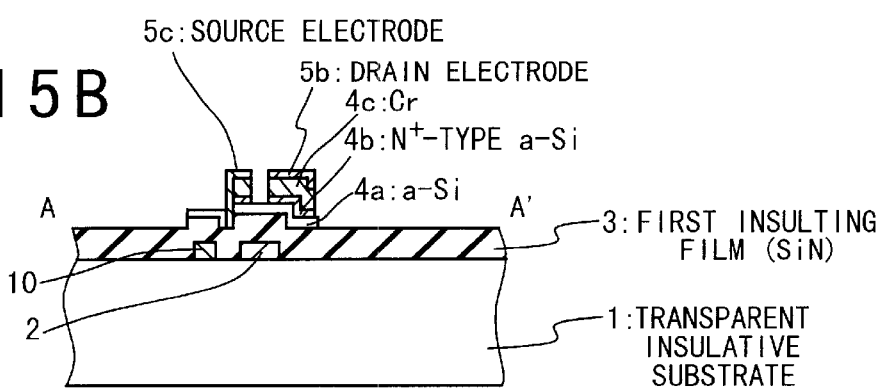
Figure 15C:
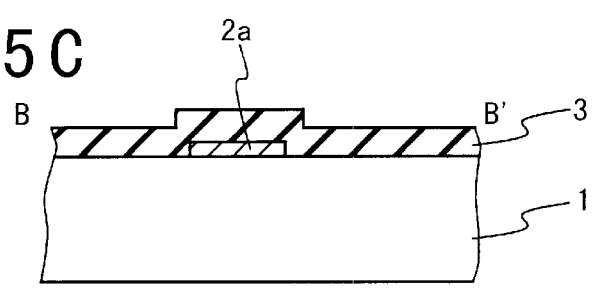
Figure 15D:
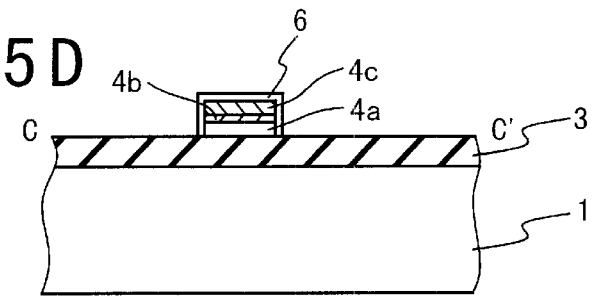
Figure 16A:
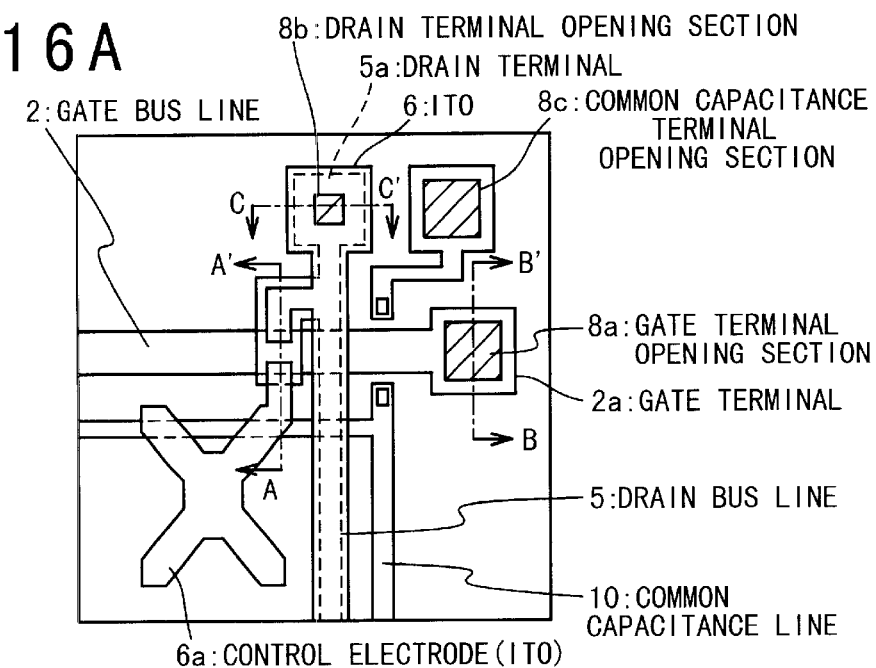
Figure 16B:
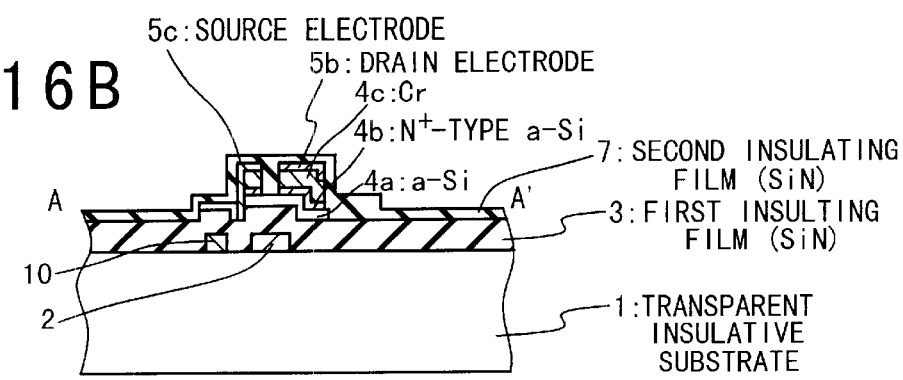
Figure 16C:
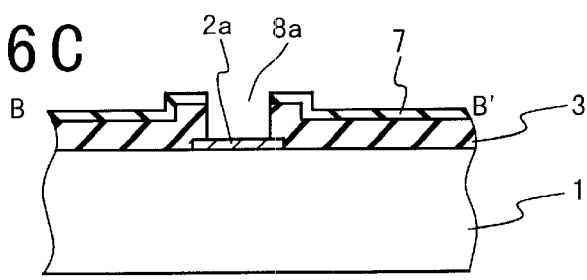
Figure 16D:
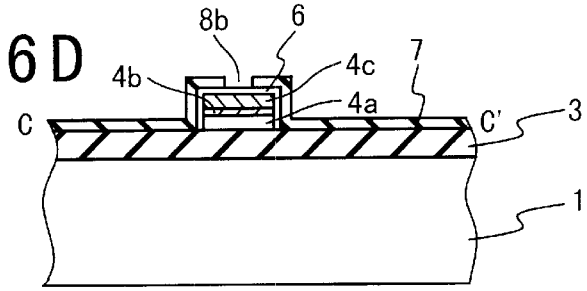
Figure 17A:
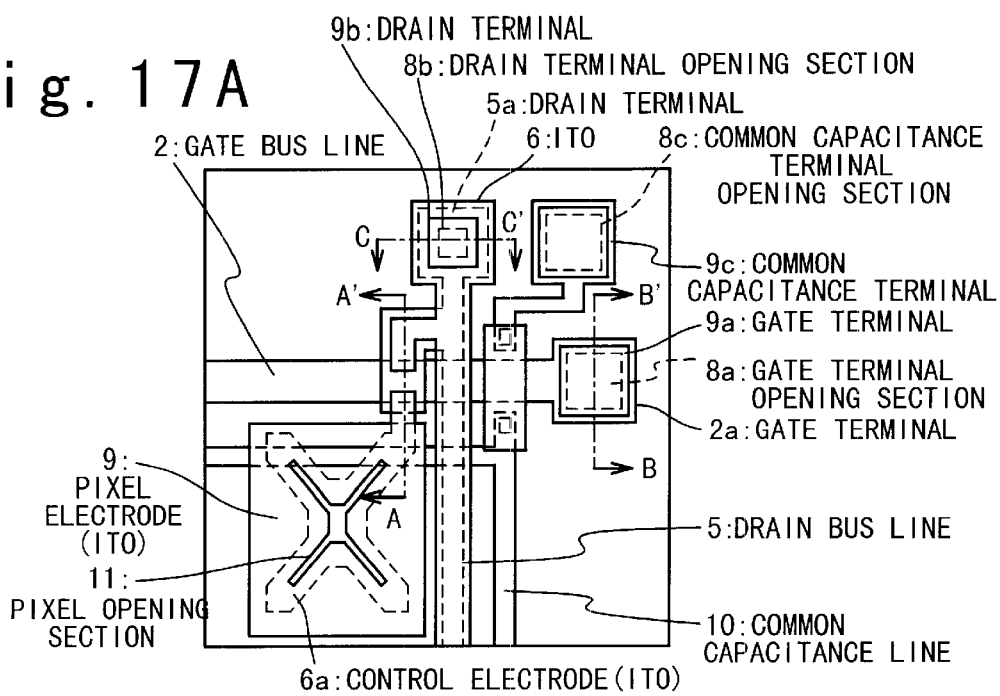
Figure 17B:
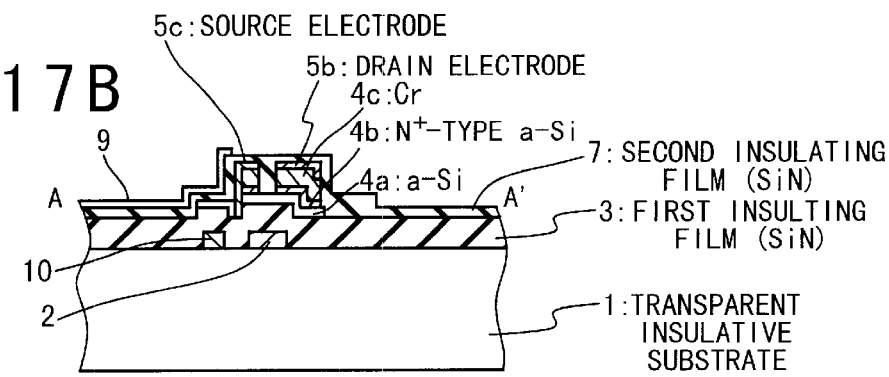
Figure 17C:
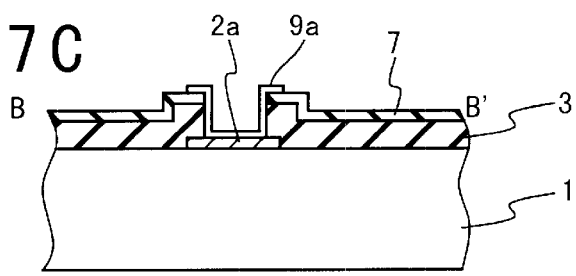
Figure 17D:
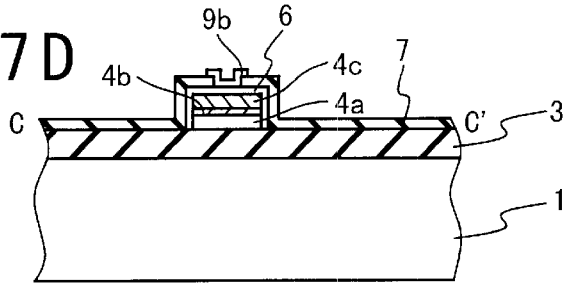
Figure 18A:
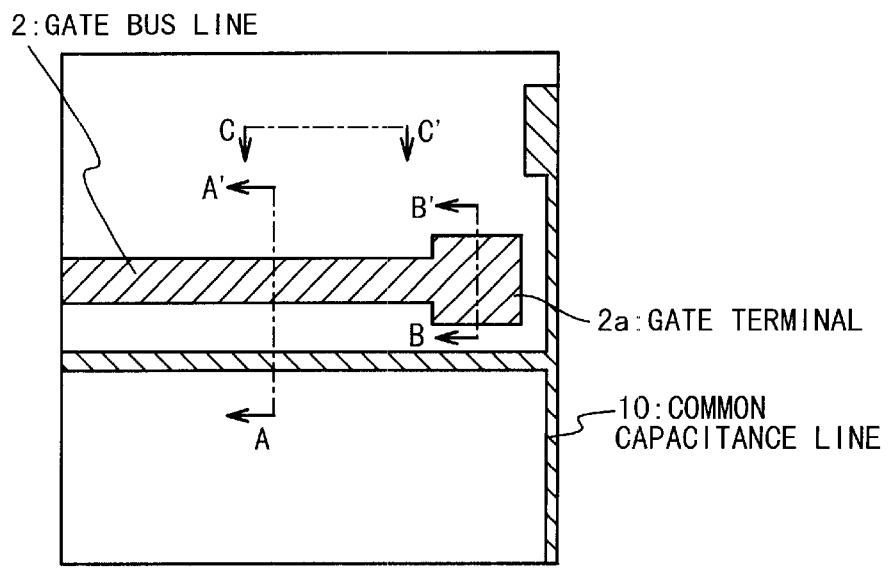
Figure 18B:
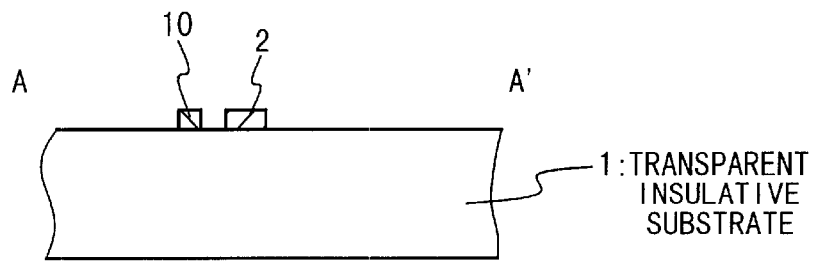
Figure 18C:
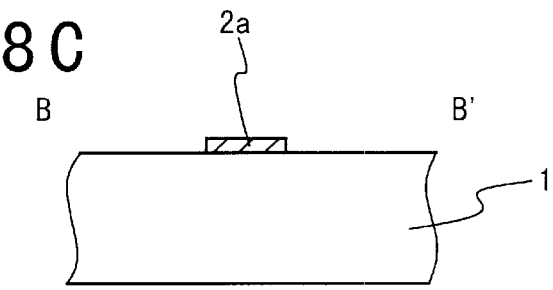
Figure 18D:
Figure 19A:
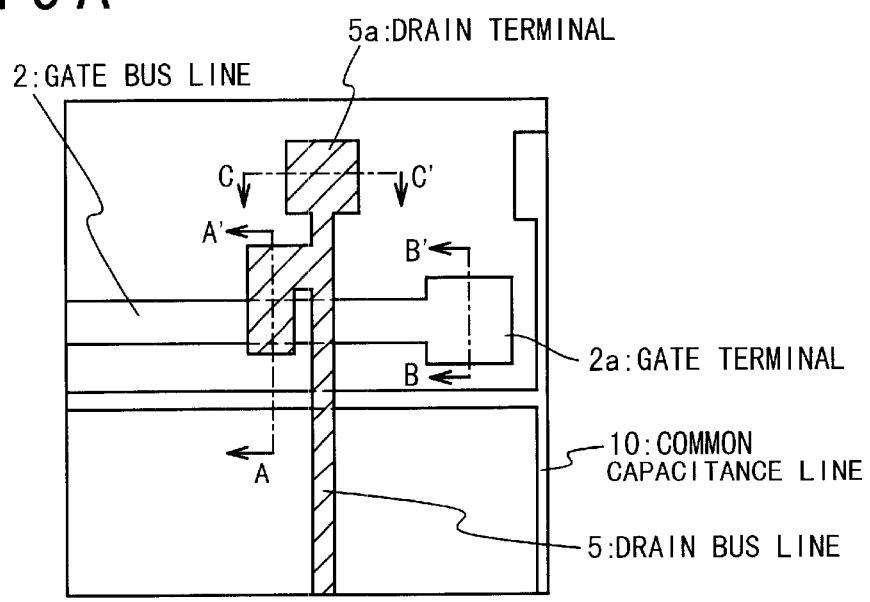
Figure 19B:
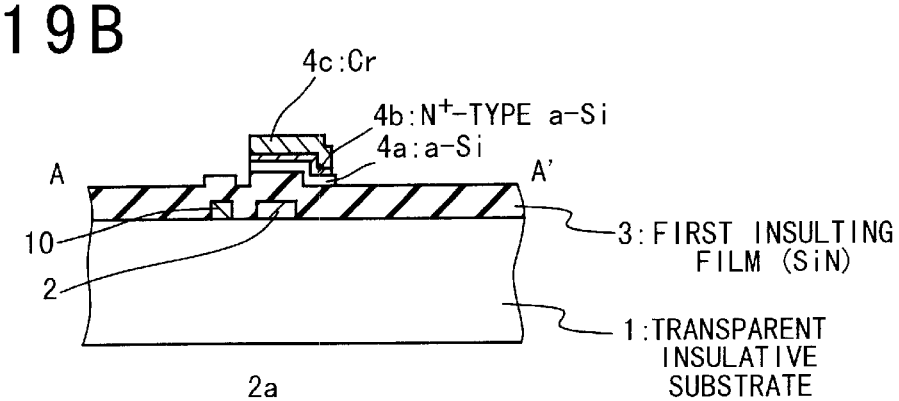
Figure 19C:
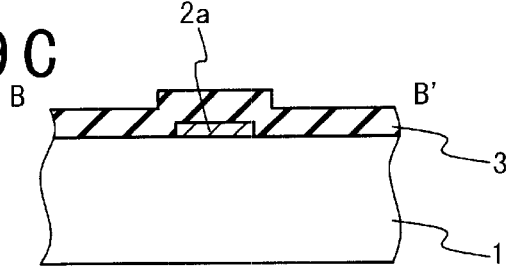
Figure 19D:
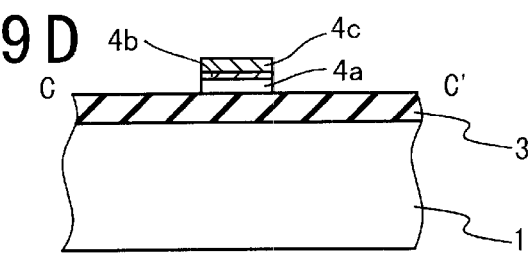
Figure 20A:
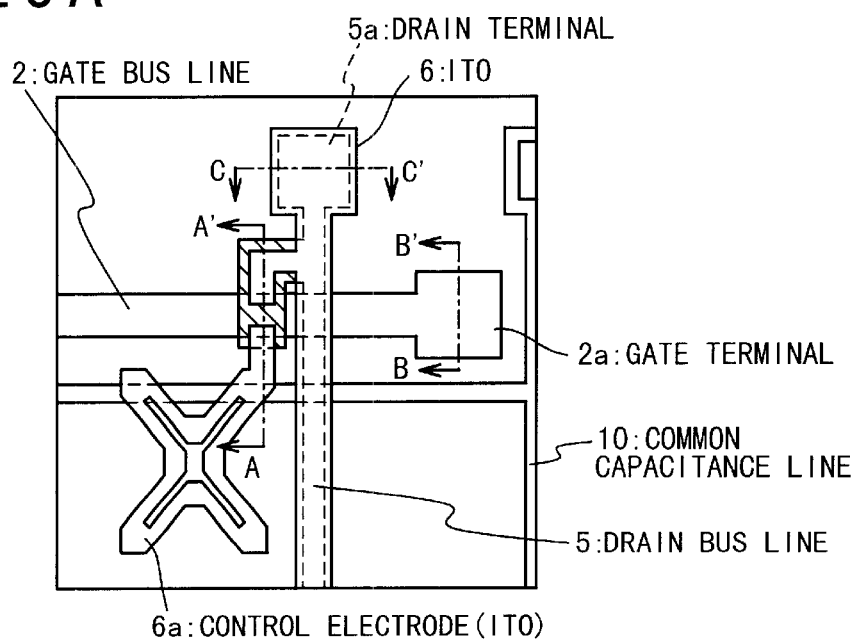
Figure 20B:
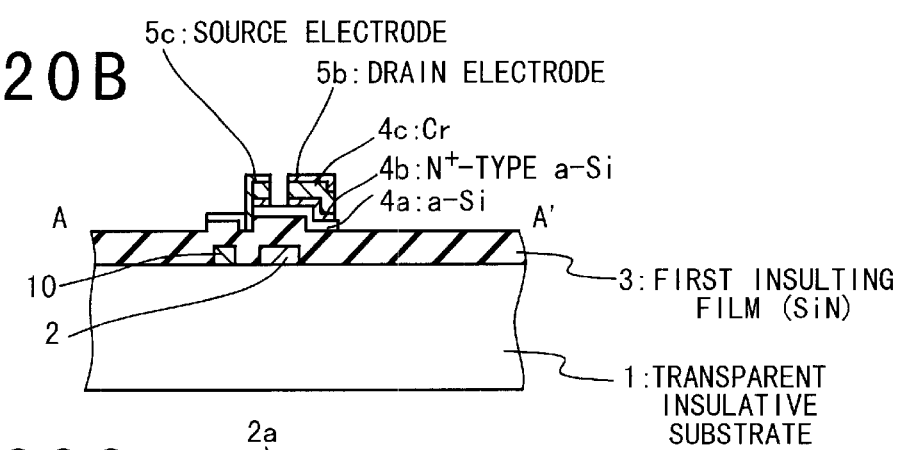
Figure 20C:
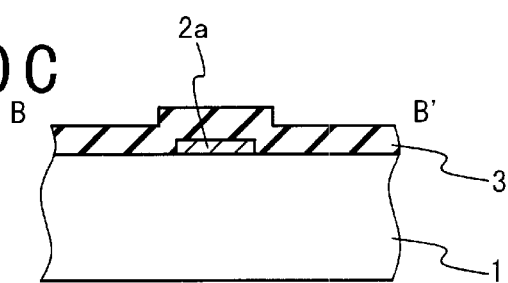
Figure 20D:
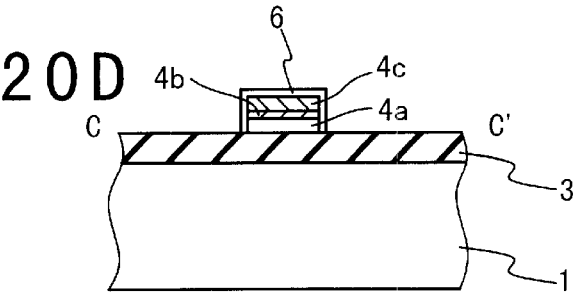
Figure 22A:
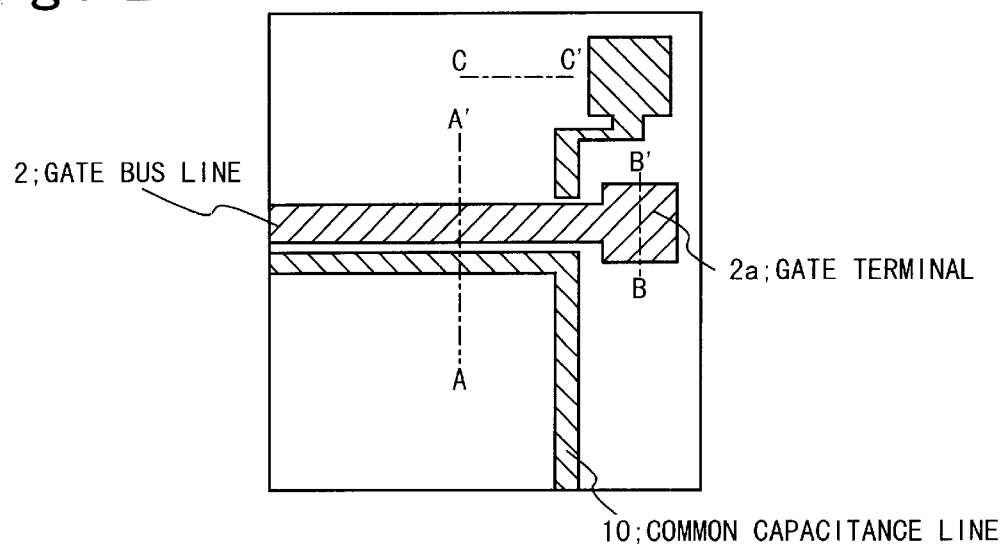
Figure 22B:
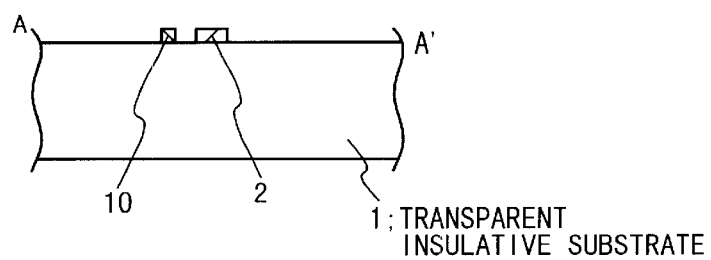
FIGS. 22B, 23B, 24B, 25B and 26B are cross sectional views of the pixel transistor section along the A–A' lines in the plan views, respectively.
Figure 22C:
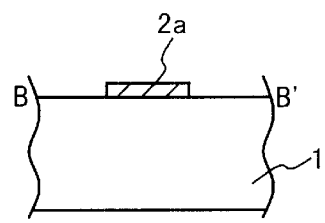
FIGS. 22C, 23C, 24C, 25C and 26C are cross sectional views of the gate terminal section along the B–B' lines in the plan views, respectively.
Figure 22D:
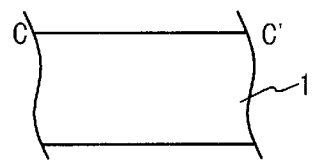
Figure 23A:
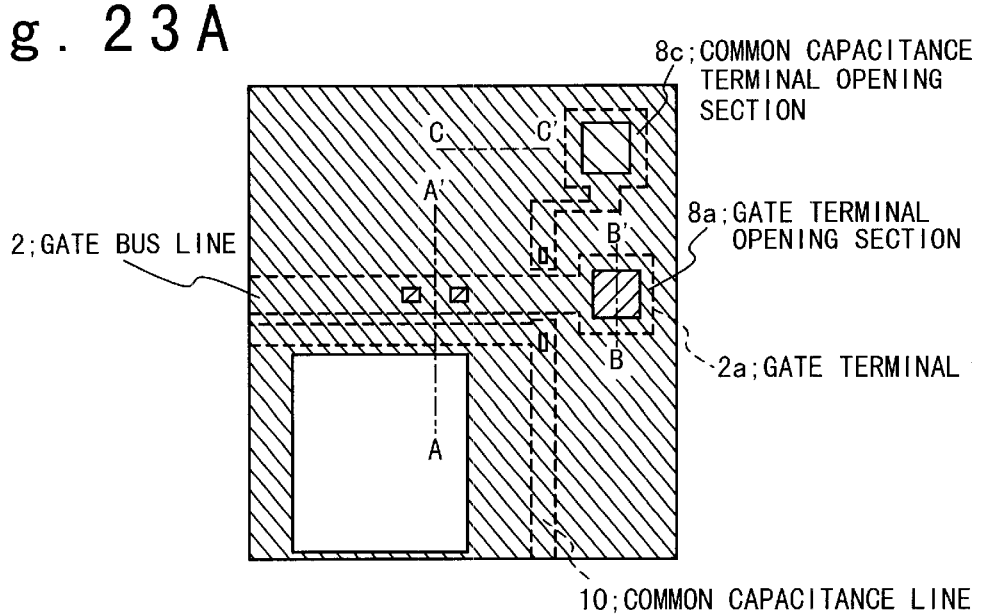
Figure 23B:
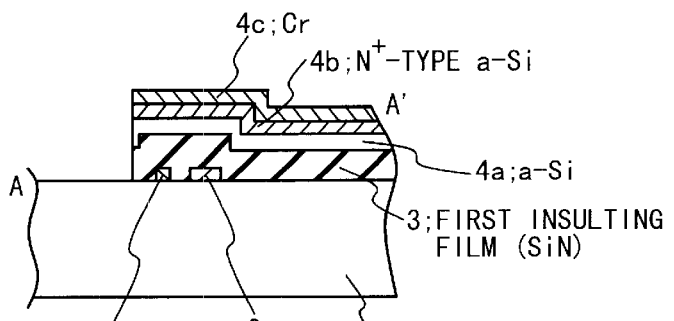
Figure 23C:
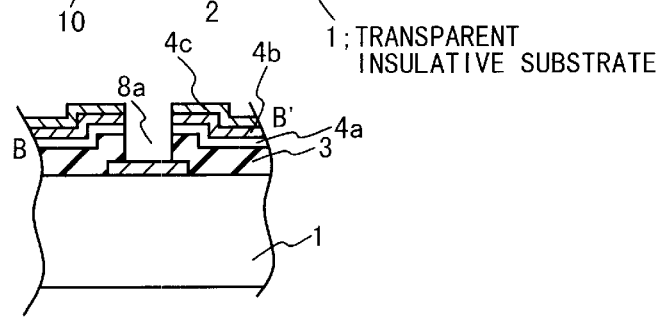
Figure 23D:
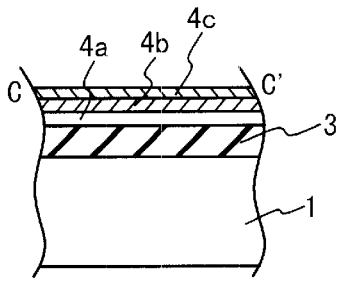
Figure 24A:
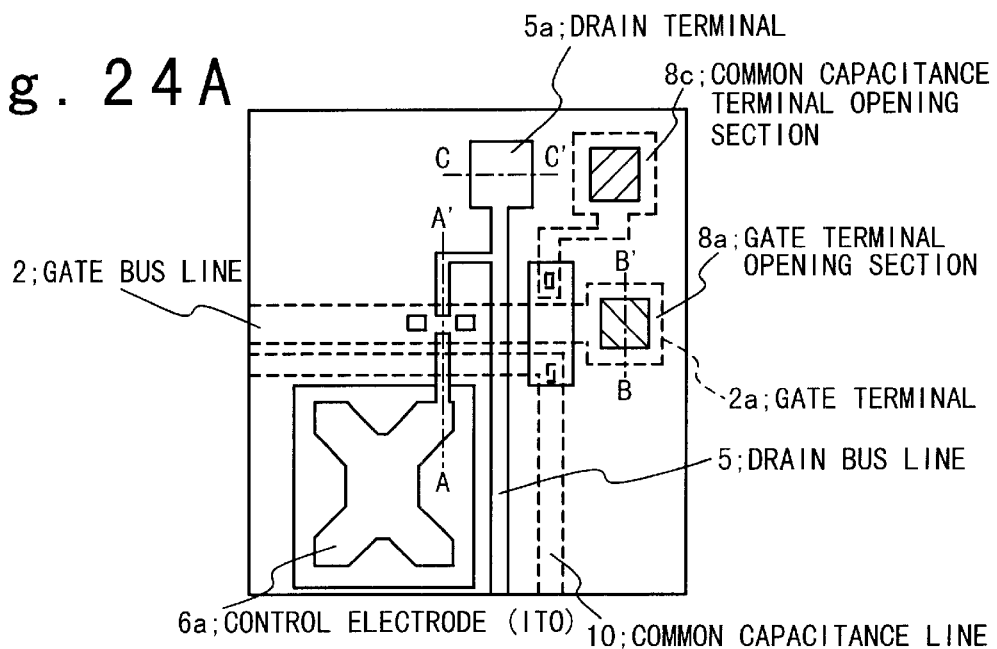
Figure 24B:
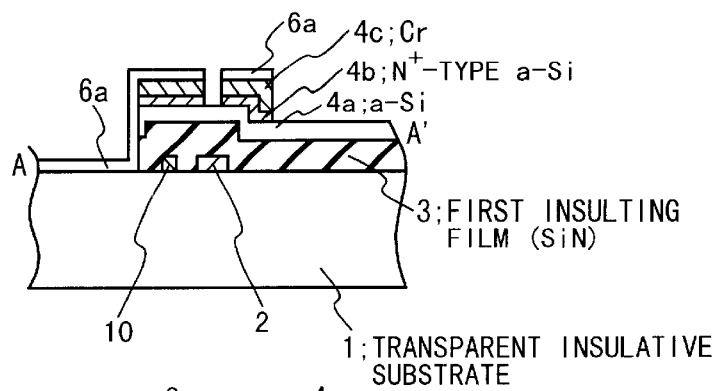
Figure 24C:
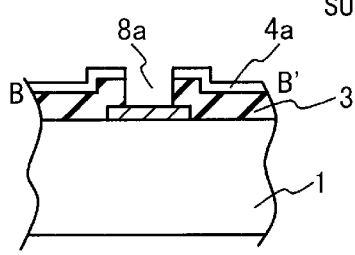
Figure 24D:
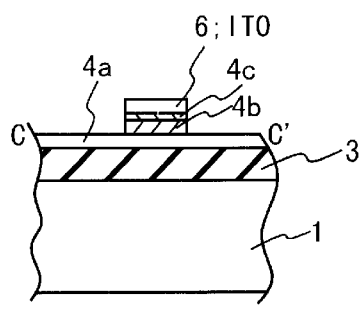
Figure 25A:
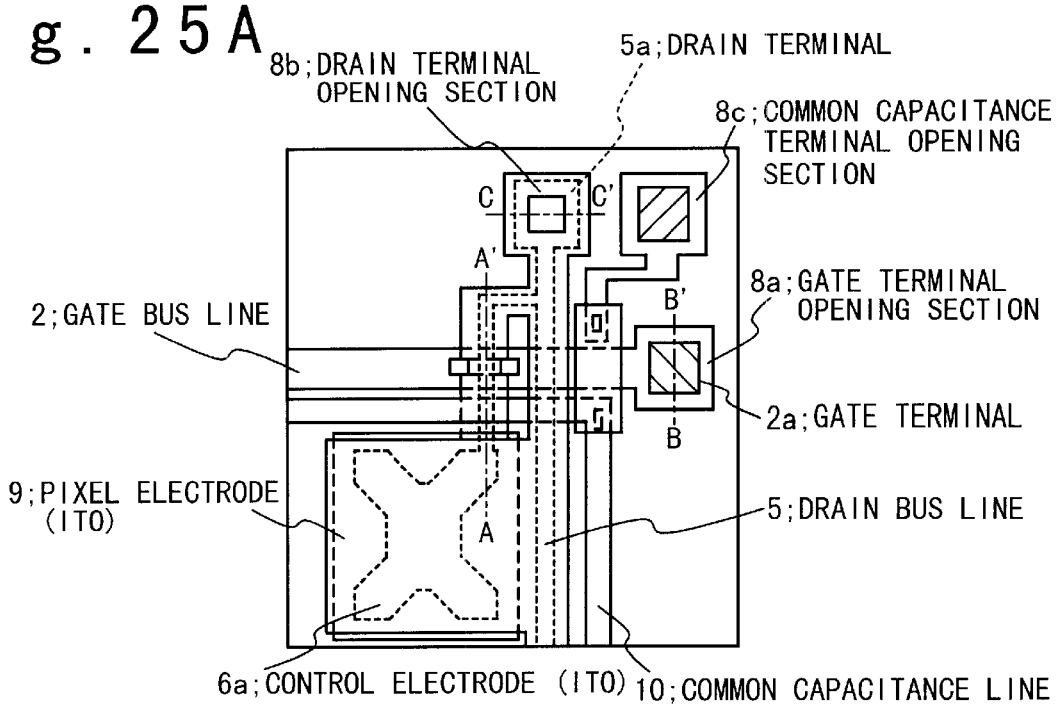
Figure 25B:
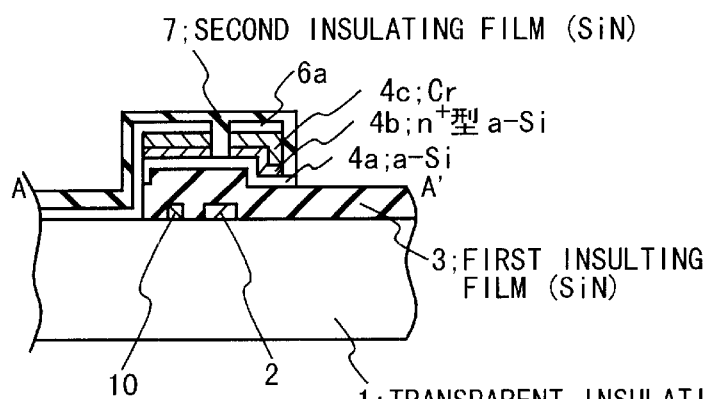
Figure 25C:
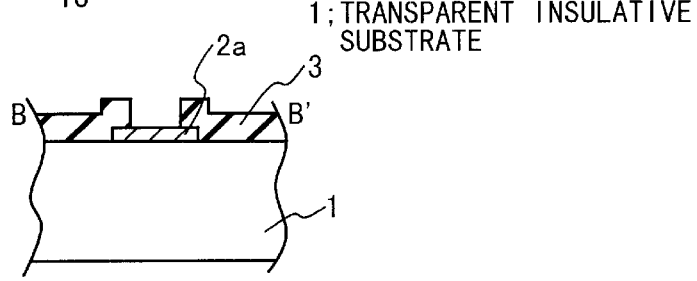
Figure 25D:
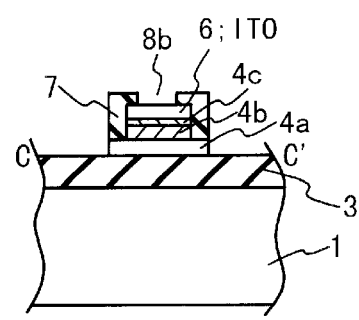
Figure 26A:
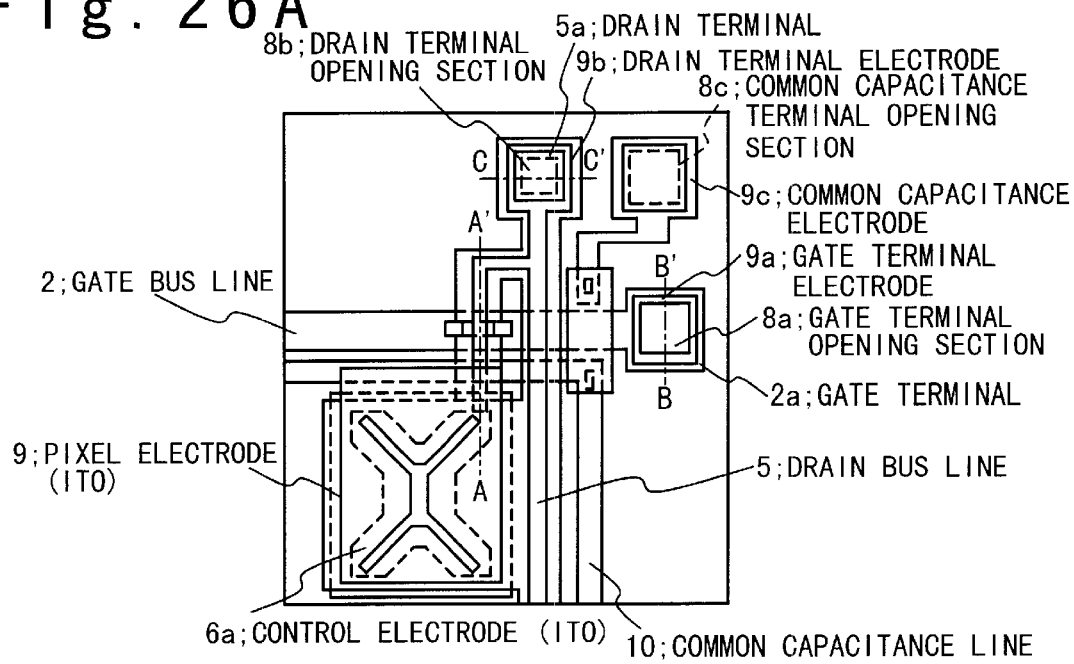
Figure 26B:
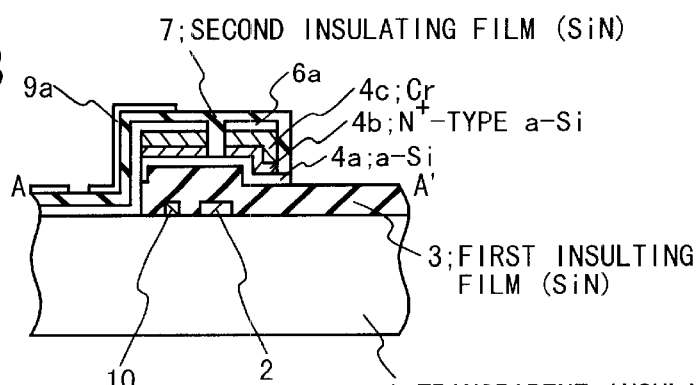
Figure 26C:
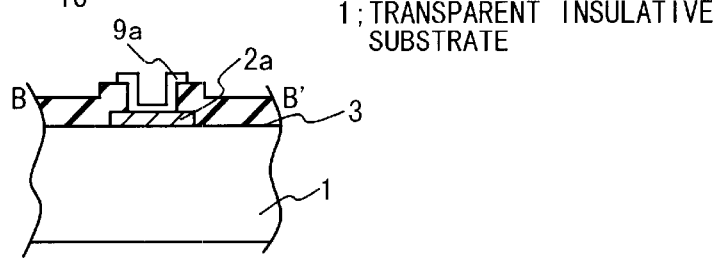
Figure 26D:
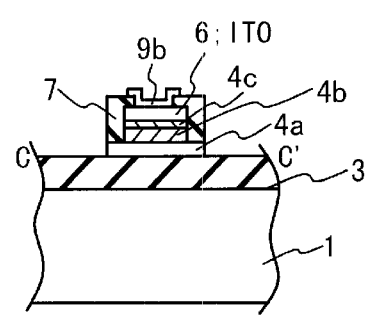
Figure 27A:
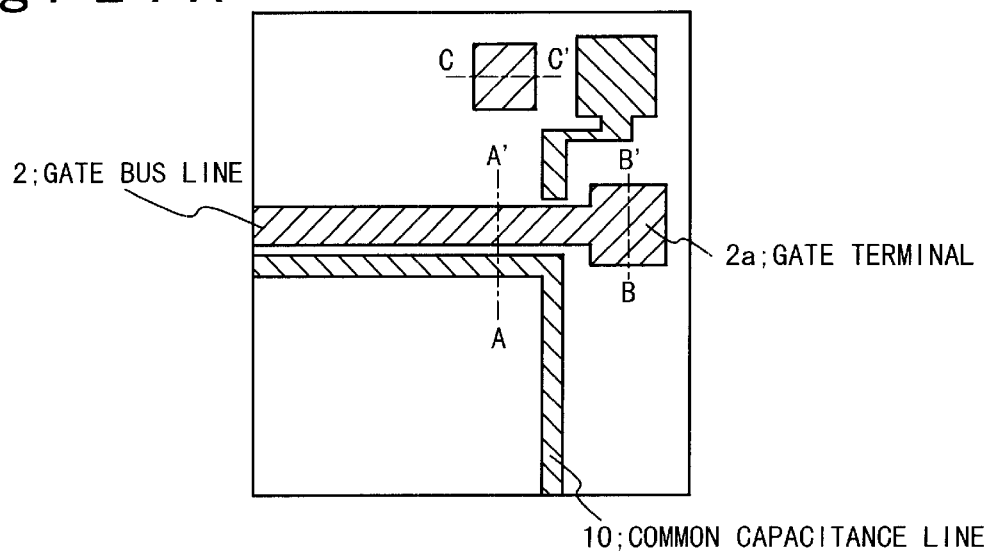
Figure 27B:
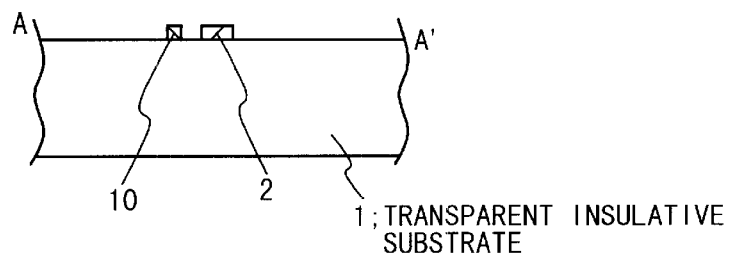
FIGS. 27B, 28B, 29B and 30B are cross sectional views of the pixel transistor section along the A–A' lines of the plan views, respectively.
Figure 27C:
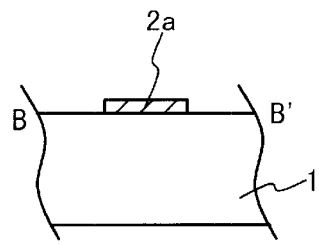
FIGS. 27C, 28C, 29C and 30C are cross sectional views of the gate terminal section along the B–B' lines of the plan views, respectively.
Figure 27D:
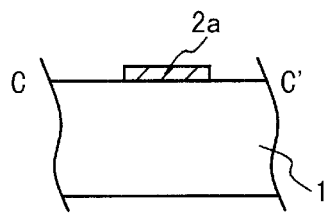
Figure 28A:
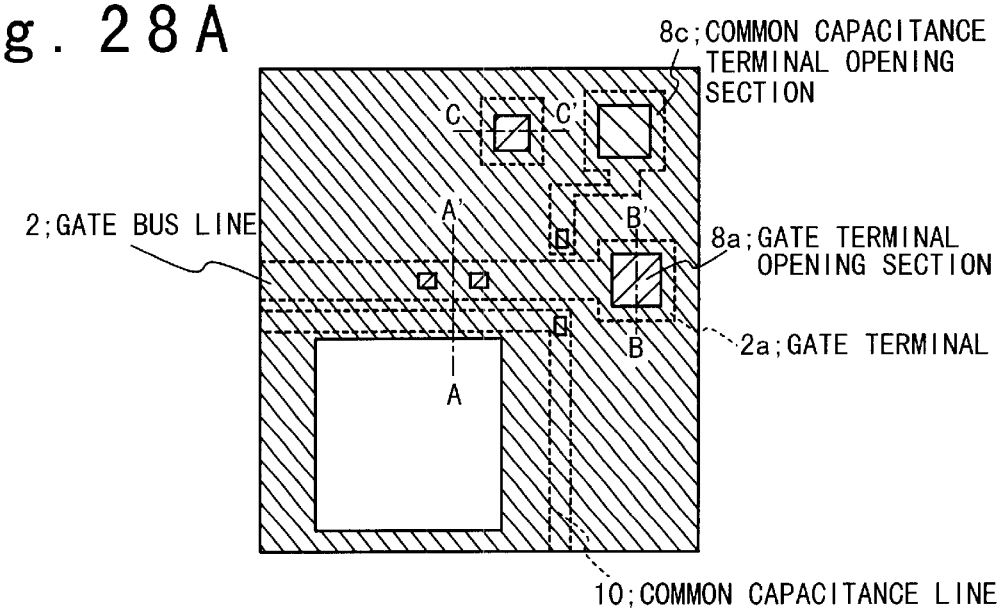
Figure 28B:
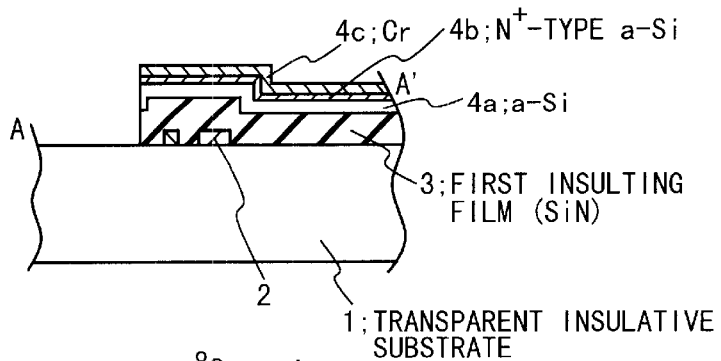
Figure 28C:
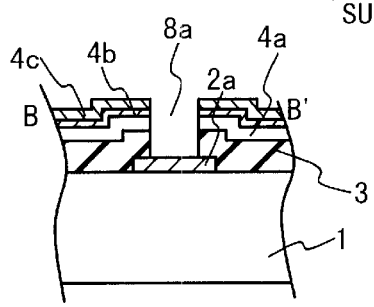
Figure 28D:
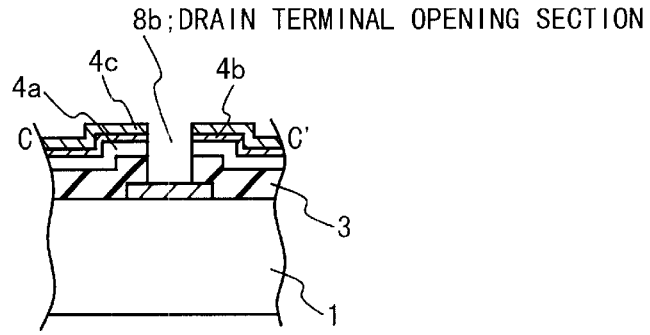
Figure 29A:
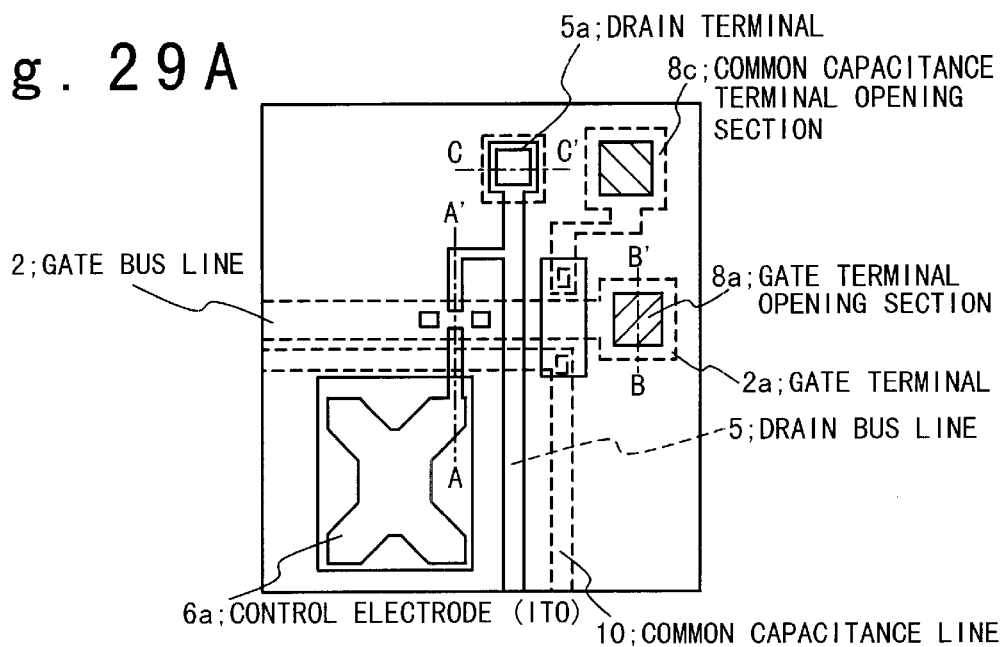
Figure 29B:
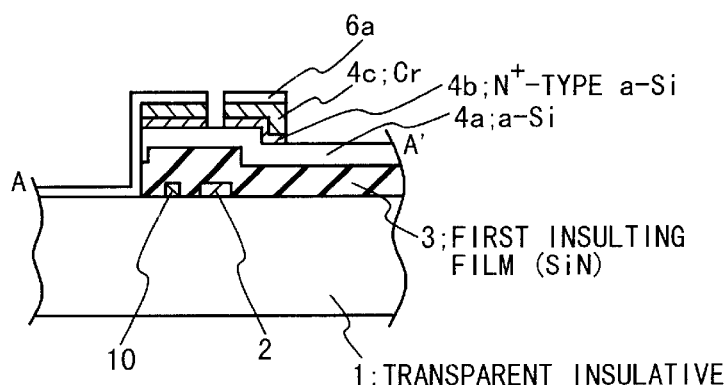
Figure 29C:
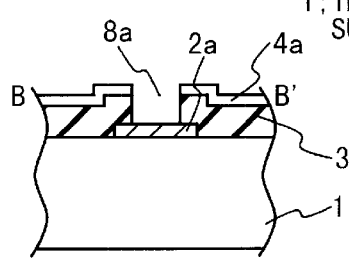
Figure 29D:
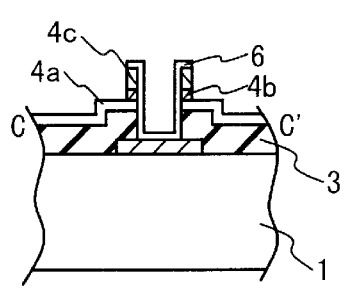
Figure 30A:
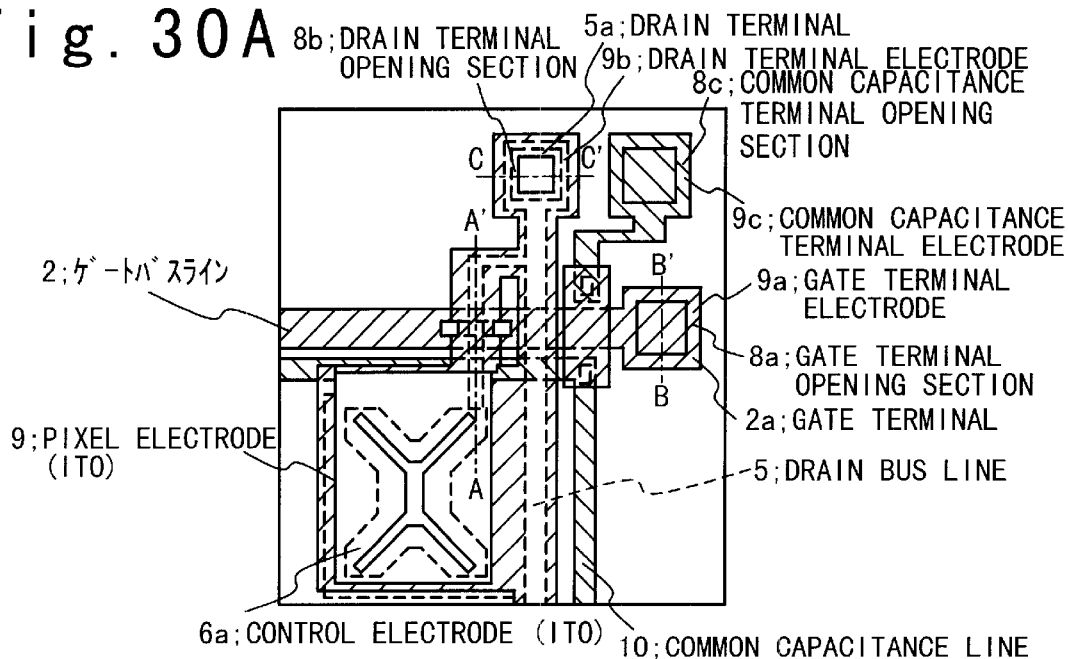
Figure 30B:
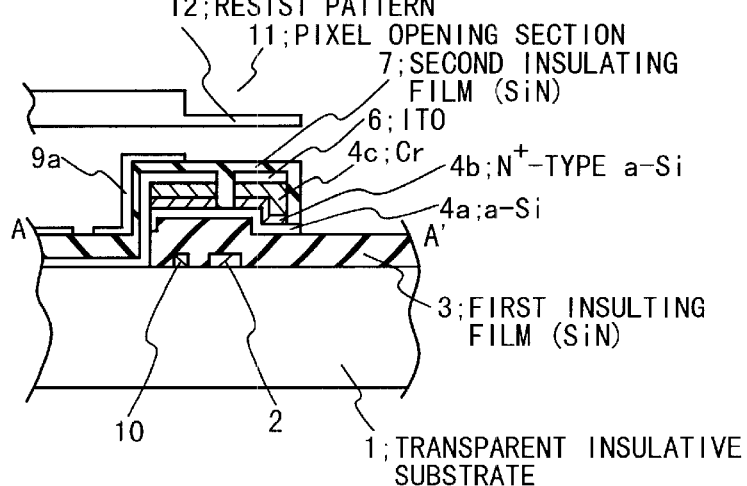
Figure 30C:
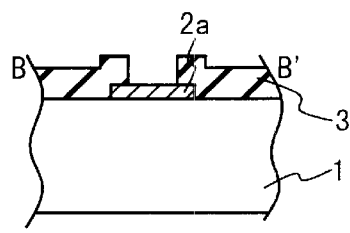
Figure 30D:
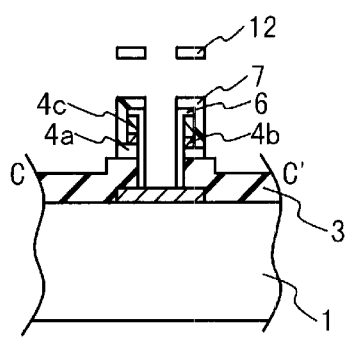
Figure 31A:
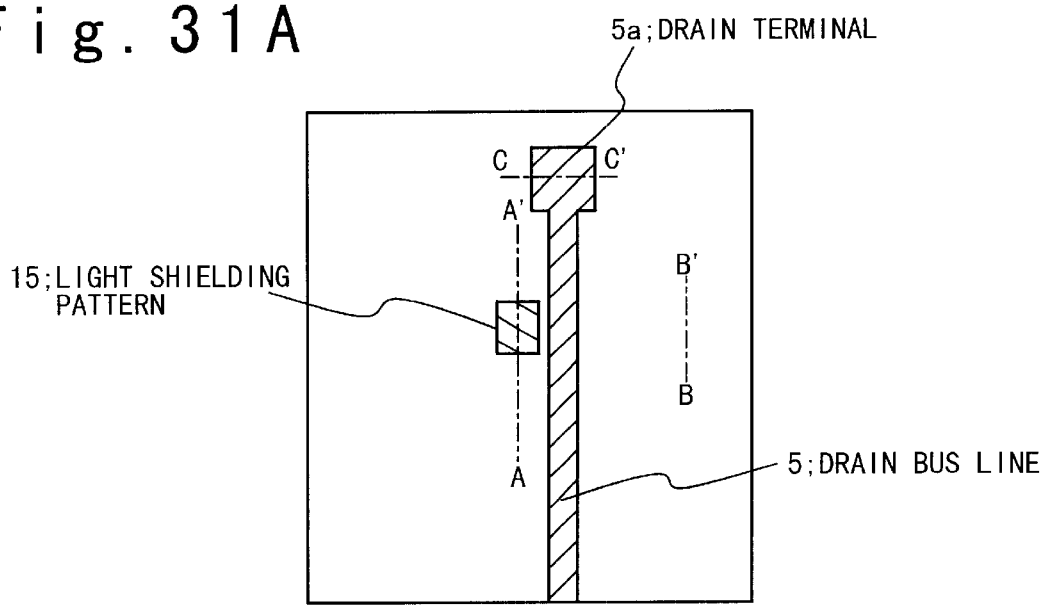
Figure 31B:
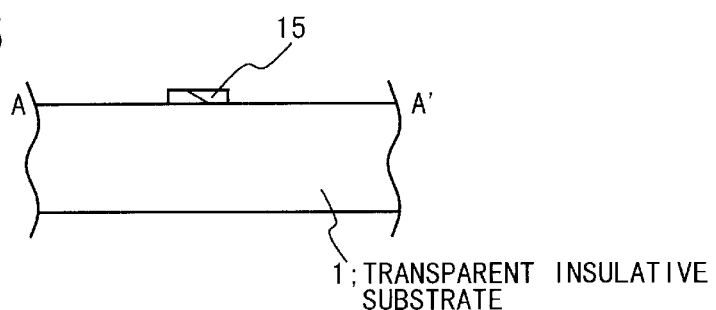
FIGS. 31B, 32B, 33B, 34B and 35B are cross sectional views the pixel transistor section along the A–A' lines of the plan views, respectively.
Figure 31C:
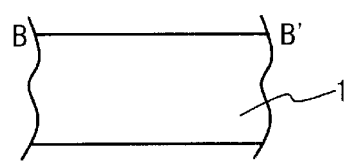
FIGS. 31C, 32C, 33C, 34C and 35C are cross sectional views of the gate terminal section along the B–B' lines of the plan views, respectively.
Figure 31D:
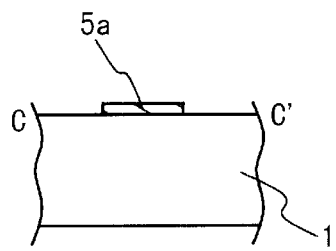
Figure 32A:
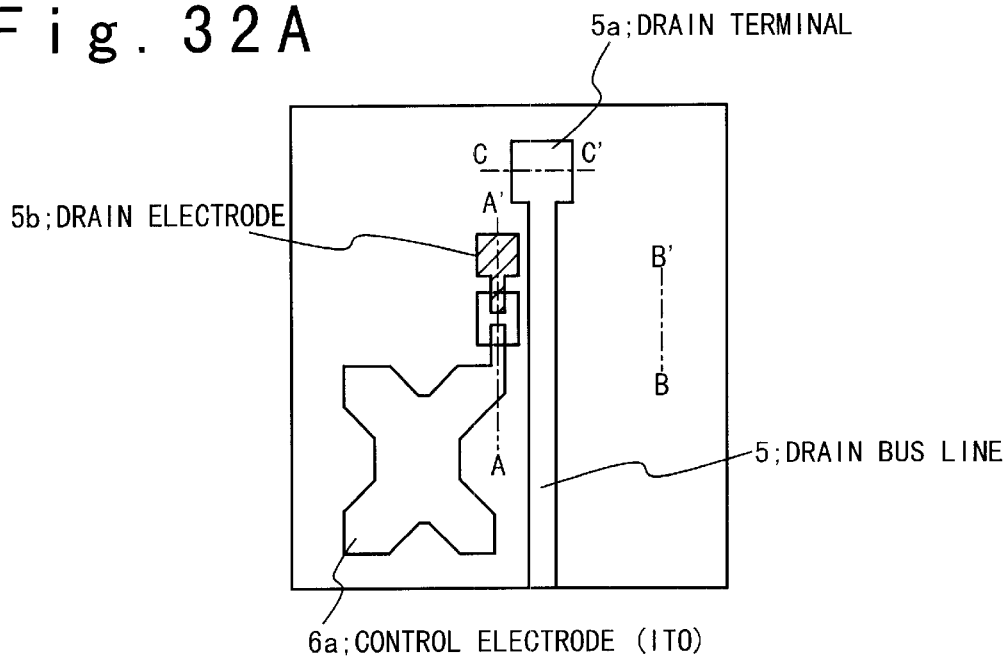
Figure 32B:
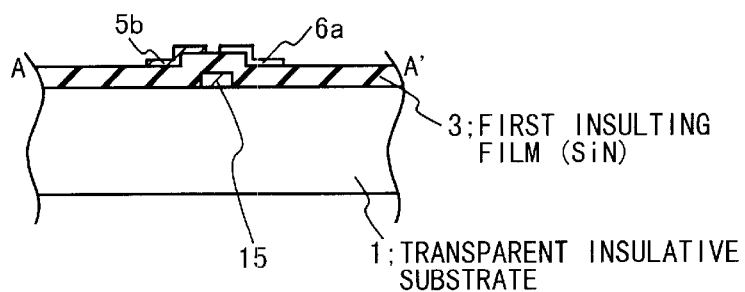
Figure 32C:
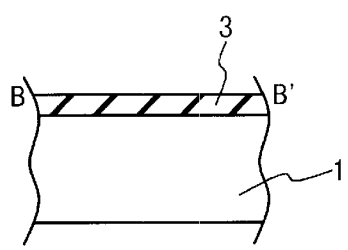
Figure 32D:
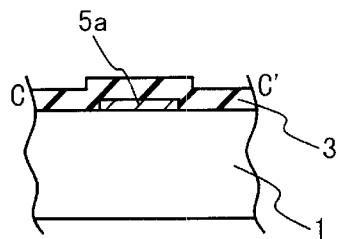
Figure 33A:
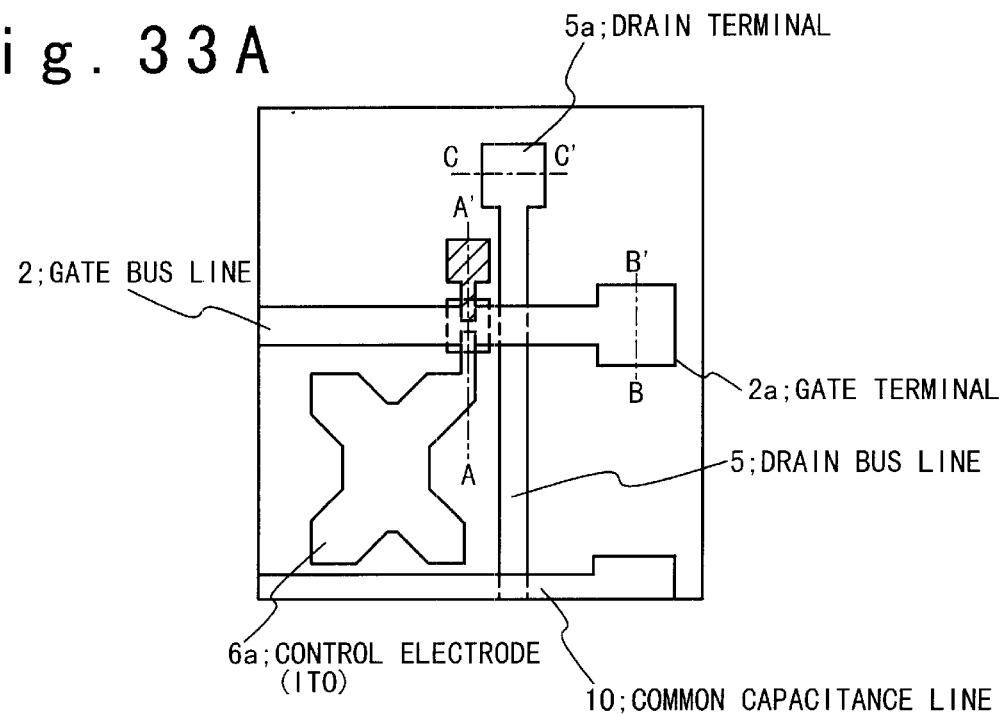
Figure 33B:
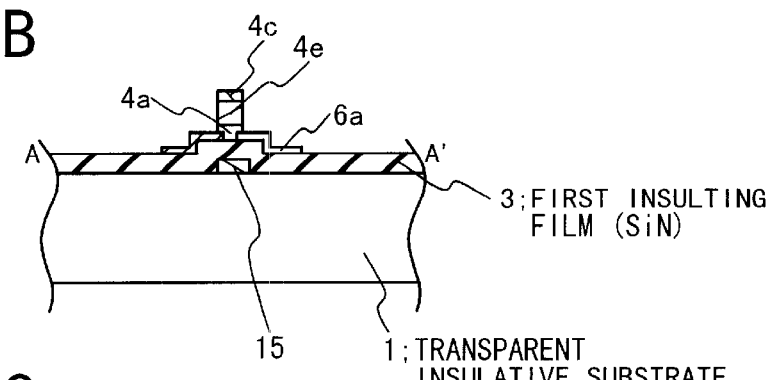
Figure 33C:
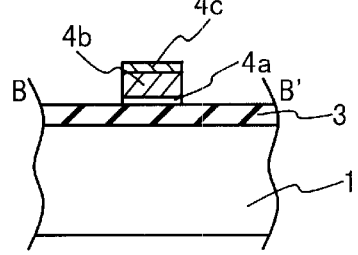
Figure 33D:
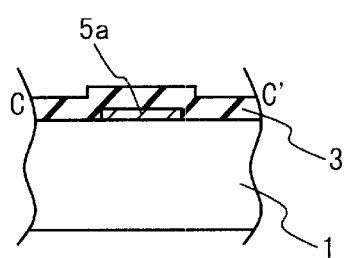
Figure 34A:
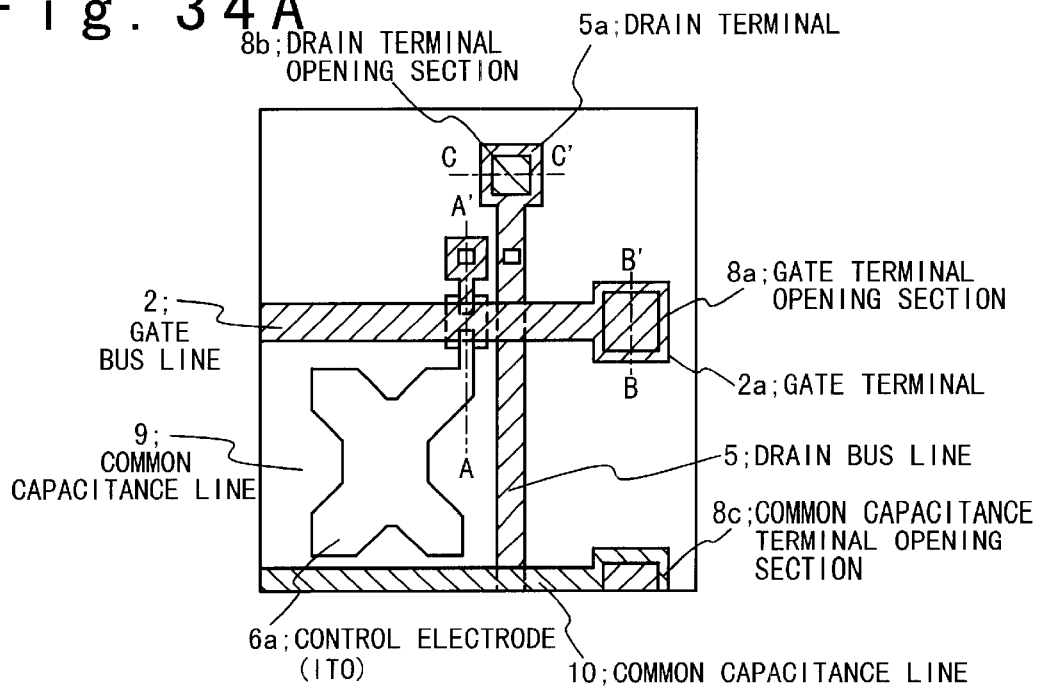
Figure 34B:
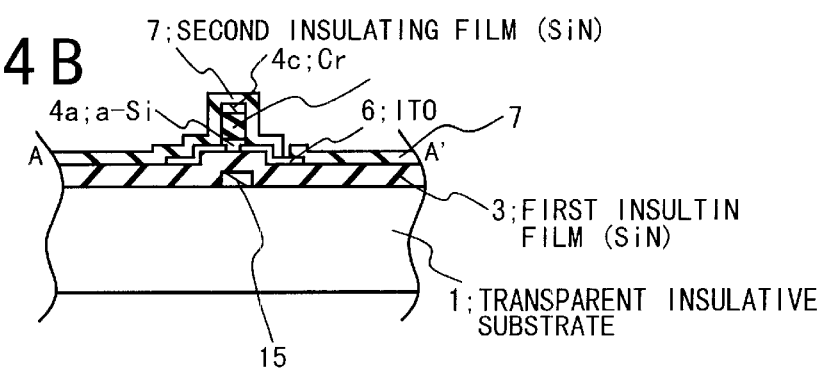
Figure 34C:
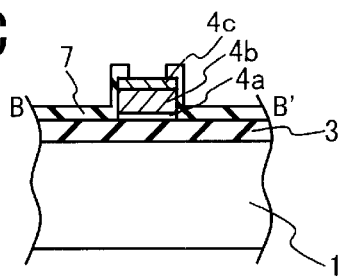
Figure 34D:
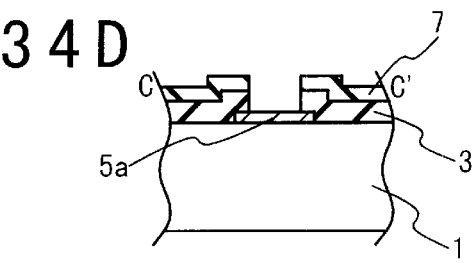
Figure 35A:
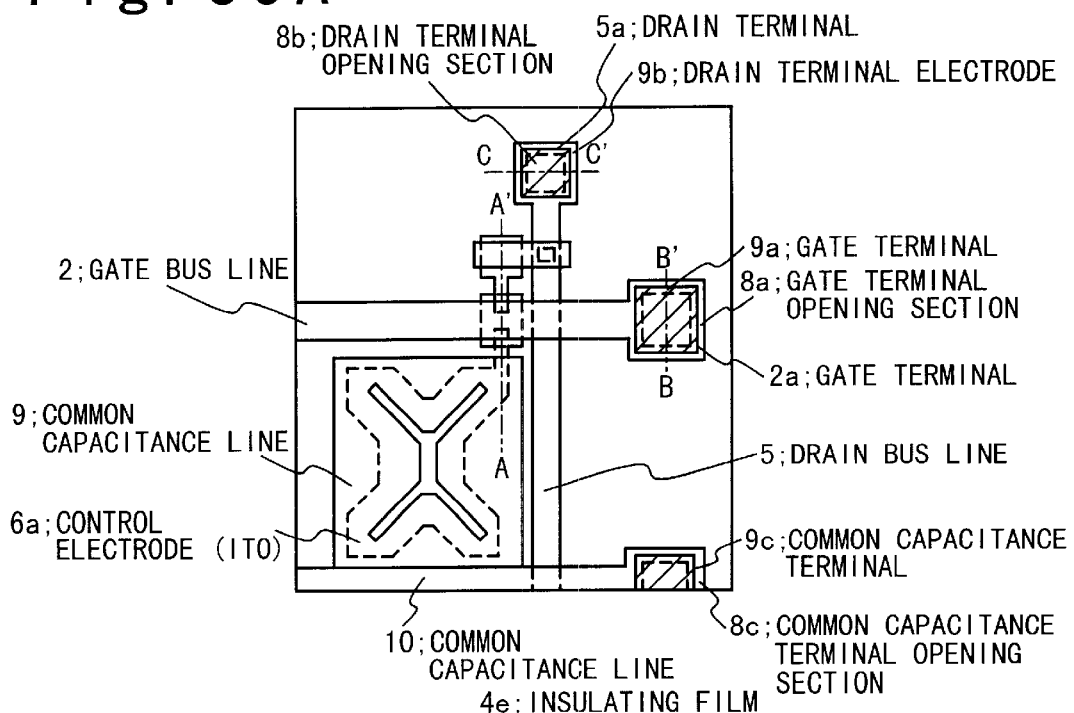
Figure 35B:
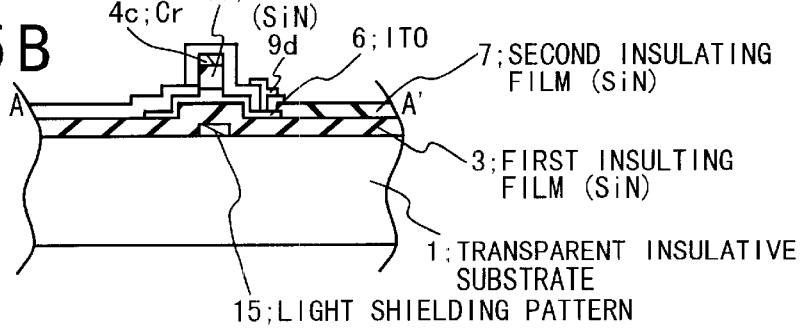
Figure 35C:
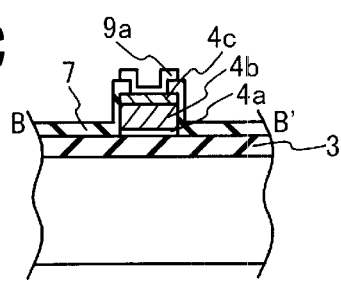
Figure 35D:
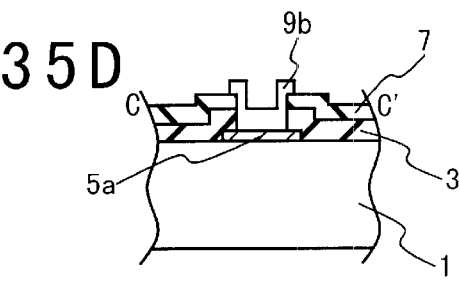

First, a multi-domain liquid crystal display apparatus with an electrically floating pixel electrode structure according to the first embodiment of the present invention will be described with reference to FIG. 7A or FIG. 12D.

FIG. 7A to FIG. 12D show a manufacturing method of an active matrix or TFT substrate of the multi-domain liquid crystal display apparatus. FIGS. 7A, 8A, 9A, 10A, 11A and 12A are plan views of one pixel, respectively. FIGS. 7B, 8B, 9B, 10B, 11B and 12B are cross sectional views of a pixel transistor section along the A–A' lines of the plan views, respectively. FIGS. 7C, 8C, 9C, 10C, 11C and 12C are cross sectional views of a gate terminal section along the B–B' line of the respective plan views, respectively. FIGS. 7D, 8D, 9D, 10D, 11D and 12D are cross sectional views of a drain terminal section along the C–C' line of the plan views, respectively.

The multi-first embodiment domain liquid crystal display apparatus of the electrically floating pixel electrode structure is using liquid crystal having negative permittivity anisotropy, and is a liquid crystal display apparatus of a VA (Vertically Aligned) mode in which the liquid crystal director is directed to have the homeotropic (perpendicular)

orientation to the substrate surface. A plurality of gate bus lines 2 extend in a horizontal the direction on the TFT substrate, a plurality of common capacitance lines 10 extend in the horizontal the direction, and a plurality of drain bus lines 5 extend into the vertical direction. The region surrounded by these lines is one pixel. Each pixel has a pixel transistor (TFT: thin film transistor), the pixel electrode 9 and a control electrode 6a. The pixel transistor has a bottom gate structure and an activated layer is formed of amorphous silicon (a-Si) or polysilicon. Also, the pixel electrode 9 is in the electrically floating state and forms a coupling capacitances together with the control electrode 6a and a common capacitance line 10 through a first insulating film 3 and a second insulating film 7. On the counter substrate, a common counter electrode is formed. The TFT substrate and the counter substrate are opposed to each other to have a predetermined interval and liquid crystal is interposed between them.

The manufacturing method of the multi-domain liquid crystal display apparatus of such electrically floating pixel electrode structure will be described. First, as shown in FIGS. 7A to 7D, an Al layer It is deposited on transparent insulative TFT substrate 1 of glass to have the film thickness of about 200 nm, and then a Ti layer is deposited to have the film thickness of about 50 nm using a sputtering method. After that, a resist pattern is formed in the region where the gate bus line 2, a gate terminal 2a, a common capacitance line 10 should be formed using the first photomask. The Ti/Al layer in the region which is not covered by the resist pattern is removed by a dry etching.

Next, as shown in FIGS. 8A to 8D, a first insulating film 3 of silicon nitride SiNx is deposited on the transparent insulative substrate 1 by a CVD method to have the film thickness of about 0.4 $\mu$m. Subsequently, an amorphous silicon layer 4a and n$^+$-type amorphous silicon layer 4b are deposited as a semiconductor layer to have the film thicknesses of about 0.3 $\mu$m and about 50 nm, respectively. After that, a resist pattern is formed in an island 4 where the pixel transistor should be formed, using a second photomask, and the n$^+$-type amorphous silicon layer 4b exposed by a lithography process using the resist pattern and amorphous silicon layer 4a are removed by a dry etching method.

Subsequently, as shown in FIGS. 9A to 9D, a metal layer of Cr is formed for source/drain electrodes using a sputtering method to have the film thickness of about 200 nm. After that, a resist pattern is formed, using a third photomask, in the region where the source/drain electrodes 5b and 5c and a drain bus line 5 should be formed.

The Cr layer exposed by a lithography process using the resist pattern is removed by a wet etching method and a dry etching method.

Here, in the conventional manufacturing method of the liquid crystal display apparatus, the insulating film is formed to cover the regions of the island 4 and drain bus line 5. However, in this embodiment, as shown in FIGS. 10A to 10D, a layer for a control electrode 6a is deposited on the drain bus line 5, too. The region for the island 4 is protected by an insulating film formed on the control electrode 6a. Therefore, the control electrode 6a is directly formed. In this way, the simplification of the process is attempted. That is, as shown in FIGS. 10A to 10D, the transparent electrode film 6 of ITO is deposited on the entire transparent insulative substrate 1 by a sputtering method to have the film thickness of about 50 nm. After that, a resist pattern is formed using a fourth photomask. The ITO film 6 exposed by a lithography process using the resist pattern is removed by a wet etching method or a dry etching method so that the control electrode 6a is formed to connect with the source electrode 5c. After that, the n$^+$-type amorphous silicon layer 4b in the channel region is removed by a dry etching method, using the source/drain electrodes of Cr or the ITO film formed on the source/drain electrodes as a etching mask. In this way, the pixel transistor is formed.

Next, as shown in FIGS. 11A to 11D, a second insulating film 7 of silicon nitride SiNx is formed by the CVD method to have the film thickness of about 0.3 $\mu$m. After that, using a fifth mask, the resist pattern having an opening is formed for a gate terminal 2a, a drain terminal 5a, and a common capacitance line terminal. The second insulating film 7 exposed by a lithography process using the mask is removed by a dry etching method, and a gate terminal opening 8a, a drain terminal opening 8b, and a common capacitance terminal opening 8c.

Figure 45A:
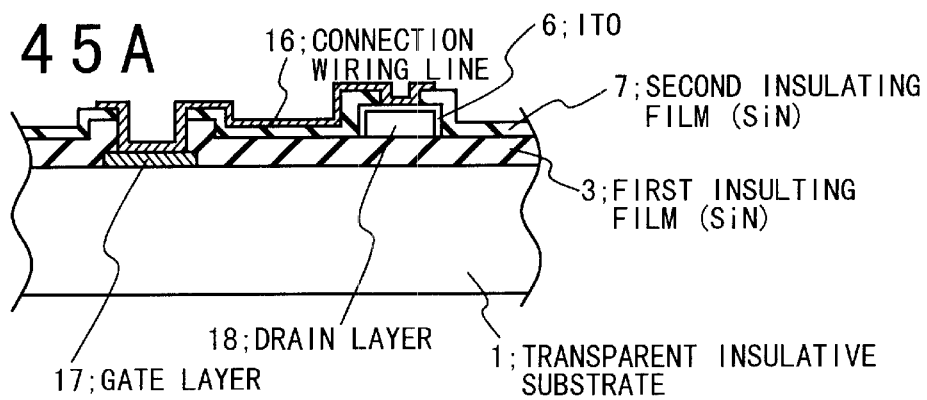
FIGS. 45A to 45C show cross sectional views of the connection structure of a gate layer 17 and a drain layer 18 in a protection transistor.

Next, as shown in FIGS. 12A to 12D, an ITO film for the pixel electrode 9 is deposited on the entire transparent insulative substrate 1 by a sputtering method to have the film thickness of about 50 nm. After that, the exposed ITO film is removed by a wet etching method or a dry etching method using a sixth mask to form the pixel electrode 9 in the electrically floating state through the second insulating film 7 on the control electrode 6a. Also, a pixel opening 11 of a predetermined shape is formed in the pixel electrode 9. Also, a gate terminal electrode 9a, a drain terminal electrode 9b, and a common capacitance terminal electrode 9c are formed in the gate terminal opening 8a, the drain terminal opening 8b, and the common capacitance line opening 8c, respectively. It should be noted that in the liquid crystal display apparatus, a protection transistor is generally provided to prevent electrostatic destruction. However, in case of the manufacturing method in the first embodiment, the connection of the gate layer 17 and the drain layer 18 in the protection transistor has the structure shown in FIG. 45A.

In this way, in accordance with the manufacturing method of the multi-domain liquid crystal display apparatus of the electrically floating pixel structure in this embodiment, the pixel electrode 9 can be formed using six masks to be in the electrically floating state. Also, the pixel electrode 9 can be formed to have coupling capacitances with the control electrode 6a and the common capacitance line 10 through the first insulating film 3 and the second insulating film 7. Therefore, by controlling the control electrode 6a by the pixel transistor in each pixel, two electrode potentials of the control electrode 6a and the pixel electrode 9 can be easily controlled by the single pixel transistor.

It should be noted that the control electrode and the pixel electrode have the shapes shown in the drawings in this embodiment. Also, the case where Cr is used for the source/drain electrode metal and Ti/Al is used for as gate metal is described above. However, the present invention is not limited to the above embodiment. The control electrode and the pixel electrode are sufficient to have the shapes in such a manner that the orientations of liquid crystal molecules can be grouped into a plurality of groups. Also, other material having the same characteristics as the gate metal, the source/drain electrode metal, and the first and second insulating films can be used. For example, refractory metal such as Cr, Mo, Cr/Al and Mo/Al can be used as gate metal and refractory metal such as Mo can be used for the source/drain electrode metal.

[The Second Embodiment]

Next, the multi-domain liquid crystal display apparatus and the manufacturing method with the electrically floating pixel electrode structure according to the second embodiment of the present invention will be described with reference to FIGS. 13A to 17D. FIGS. 13A to 17D show the manufacturing process of the active matrix (TFT) substrate in the multi-domain liquid crystal display apparatus. FIGS. 13A, 14A, 15A, 16A and 17A are plan views of pixel, respectively. FIGS. 13B, 14B, 15B, 16B and 17B are cross sectional views of the pixel transistor section along the A–A' line of the plan views, respectively. FIGS. 13C, 14C, 15C, 16C and 17C are cross sectional views of a gate terminal section along the B–B' line of the plan views, respectively. FIGS. 13D, 14D, 15D, 16D and 17D are cross sectional views of the drain terminal section along the C–C' line of the plan views, respectively. It should be noted that in the second embodiment, the manufacturing process is more reduced compared with the manufacturing process in the first embodiment, and structure similar to the first embodiment can be formed in the lithography (PR) processes of five times.

The multi-domain liquid crystal display apparatus according to the second embodiment is a liquid crystal display apparatus of the VA mode in which liquid crystal molecules having negative permittivity anisotropy are directed to have the homeotropic orientations, as in the first embodiment. In each pixel surrounded with the gate bus lines 2 and the drain bus lines 5, the pixel transistor, the pixel electrode 9 and the control electrode 6a are provided. The pixel electrode 9 is formed to have predetermined coupling capacitances by the control electrode 6a and the common capacitance line 10 through the first insulating film 3 and the second insulating film 7.

The manufacturing method of the multi-domain liquid crystal display apparatus of the electrically floating pixel electrode structure will be described. First, the Al layer is deposited on transparent insulative substrate 1 of glass using the sputtering method, to have the film thickness of about 150 nm, as shown in FIGS. 13A to 13D. Subsequently, the Ti layer is deposited to have the film thickness of about 0.1 $\mu$m. After that, a resist pattern is formed using a first photomask, and the Ti/Al layer exposed by a lithography process using the resist pattern is removed by the dry etching method to form the gate bus line 2, the gate terminal 2a and the common capacitance line 10.

Next, as shown in FIGS. 14A to 14D, the first insulating film 3 composed of silicon nitride SiNx is deposited on the transparent insulative substrate 1 by the CVD method to have the film thickness of about 0.3 $\mu$m. Subsequently, the amorphous silicon layer 4a and the n$^+$-type amorphous silicon layer 4b are is deposited as a semiconductor layer to have the film thicknesses of about 0.2 $\mu$m and about 30 nm, respectively. In this embodiment, the Cr film 4c is deposited on n$^+$-type amorphous silicon layer 4b by the sputtering method, to have the film thickness of about 200 nm. After that, using a second photomask, a resist pattern is formed for the island 4, the source/drain region, and the drain bus line. The Cr film exposed by a lithography process using the resist pattern is removed by a wet etching method or a dry etching method, and then the n$^+$-type amorphous silicon layer 4b and the amorphous silicon layer 4a are removed by a dry etching method.

Next, as shown in FIGS. 15A to 15D, for example, after an ITO film 6 is deposited on the transparent insulative substrate 1 for the transparent electrode by a sputtering method to have the film thickness of about 50 nm, a resist pattern is formed using a third photomask. The exposed ITO film 6 using the resist pattern is removed by a wet etching method or a dry etching method, so that source/drain electrodes 5b and 5c and a control electrode 6a are formed. After that, the Cr film 4c in the channel region is removed by a wet etching method or a dry etching method. Then, using the ITO film 6 as an etching mask, the n$^+$-type amorphous silicon film 4b in the channel region is removed by a dry etching method to form a pixel transistor.

Subsequently, the second insulating film 7 composed of silicon nitride SiNx is formed by a CVD method to have the film thickness of about 0.5 $\mu$m, as shown in FIGS. 16A to 16D. After that, using a fourth mask, a resist pattern having openings is formed for a gate terminal 2a, the drain terminal 5a and the common capacitance line terminal. The second insulating film 7 exposed by a lithography process using the resist pattern and the first insulating film 3 are removed by a dry etching method, and the gate terminal opening 8a, the drain terminal opening 8b and the common capacitance terminal opening 8c are formed.

Figure 45B:
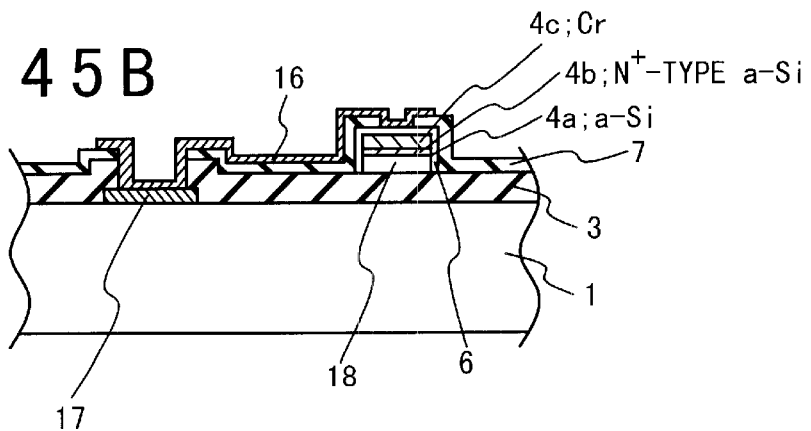

Next, an ITO film is deposited on the transparent insulative substrate 1 for the pixel electrode 9 by the sputtering method to have the film thickness of about 50 nm, as shown in FIGS. 17A to 17D. After that, the ITO film exposed using a fifth mask is removed by a wet etching method or a dry etching method to form the pixel electrode 9 in the electrically floating state through the second insulating film 7 formed on the control electrode 6a. Also, the pixel opening 11 of a predetermined shape is formed in the pixel electrode 9. Also, the gate terminal 9a, the drain terminal 9b, the common capacitance terminal 9c are formed in the gate terminal opening 8a, the drain terminal opening 8b, the common capacitance terminal opening 8c. It should be noted that the connection of the gate layer 17 and the drain layer 18 in the protection transistor has the structure shown in FIG. 45B in this embodiment.

In this way, in accordance with the manufacturing method of the multi-domain liquid crystal display apparatus of the electrically floating pixel structure in the second embodiment, the semiconductor layer of the a-Si layer 4a and the n+-type a-Si layer 4b is deposited and the Cr layer 4c for the source/drain electrodes is deposited. The Cr layer 4c in the channel region is etched using the resist pattern in the formation of the control electrode 6a, and the channel etching is carried out using the ITO film as a mask. Therefore, the liquid crystal display apparatus in which the pixel electrode 9 is in the electrically floating state can be formed by using five masks. Also, the number of the processes can be reduced by one lithography process compared with the first embodiment.

It should be noted that in this embodiment, the example is described in which Cr is used as source/drain electrode metal and Ti/Al is used as gate metal. However, the present invention is not limited to the above embodiment. Other materials having the same characteristics as the gate metal and the source/drain electrode metal may be used in place of the above mentioned materials. For example, Cr, Mo, Cr/Al and Mo/Al may be used as the source/drain electrode metal and Mo may be used as the gate metal as in the first embodiment.

[The Third Embodiment]

Next, the manufacturing method of the multi-domain liquid crystal display apparatus of the electrically floating pixel electrode structure according to the third embodiment of the present invention will be described with reference to FIG. 18A to FIG. 21D. FIG. 18A to FIG. 21D show the manufacturing process of the active matrix substrate of the multi-domain liquid crystal display apparatus according to the third embodiment of the present invention. FIGS. 18A, 19A, 20A and 21A are plan views of one pixel, respectively. FIGS. 18B, 19B, 20B and 21B are cross sectional views of a pixel transistor section along the A–A' line of the plan views, respectively. FIGS. 18C, 19C, 20C and 21C are cross sectional views of the gate terminal section along the B–B' line of the plan views, respectively. FIGS. 18D, 19D, 20D and 21D are cross sectional views of the drain terminal section along the C–C' line of the plan views, respectively. It should be noted that in this embodiment, a part of the processes of the second embodiment is more reduced using halftone exposure technology. The same structure as that of the second embodiment is formed in the lithography (PR) process of four times.

First, the halftone exposure technology will be described. The halftone exposure is a method which binary processing is not carried out to transmit or block off the light based on the existence or non-existence of a shading film on a photomask but a middle part is provided in addition to a transmitting part and a light shielding part for exposure. Specifically, the mask for the halftone exposure has a Cr/CrOx pattern which is finer than a normal pattern or a semitransparent pattern for halftone exposure in addition to the normal Cr/CrOx shading pattern. When the exposure is carried out using such a halftone mask, a halftone pattern region is not fully exposed. That is, the resist pattern is exposed based on the integral value of the exposure light quantity. Therefore, in case of a positive-type resist, a resist pattern does not dissolve fully through the development, and the resist pattern is left with a predetermined thickness.

In this way, if the halftone mask is used, three regions of a region of a thick resist pattern, a region of a thin resist pattern and a region of no resist pattern are formed at the same time in a single mask. Therefore, if the thin resist pattern is removed by an ashing method using an oxygen gas after the first process is carried out using the initial resist pattern, only the thick resist pattern can be left. As a result, the second process can be carried out using the left resist pattern.

However, this technique cannot be applied to all processes. It is necessary that any overlapping region is present between photomasks of the two processes, formed patterns do not receive damage through the ashing process using the oxygen gas, and the halftone mask is within a required pattern precision. An example in which the halftone exposure is applied to the multi-domain liquid crystal display apparatus of the electrically floating pixel structure in the third embodiment will be described below, in consideration of the above viewpoint.

First, as shown in FIGS. 18A to 18D, using the sputtering method, an Al layer is deposited on a transparent insulative substrate 1 of glass to have the film thickness of about 200 nm and then a TiN layer is deposited to have the film thickness of about 0.1 $\mu$m. After that, a resist pattern is formed using a first photomask and the TiN layer and Al layer exposed by a lithography process using the resist pattern are removed by a dry etching method. In this way, a gate bus line 2, a gate terminal 2a, and a common capacitance line 10 are formed.

Next, as shown in FIGS. 19A to 19D, the first insulating film 3 of silicon nitride SiNx is deposited on the transparent insulative substrate 1 by a CVD method to have the film thickness of about 0.4 $\mu$m. Subsequently, an amorphous silicon layer 4a and an n$^+$-type amorphous silicon layer 4b are deposited as a semiconductor layer to have the film thicknesses of about 0.3 $\mu$m and about 50 nm, respectively. In the second embodiment, the Cr layer 4c is deposited on the n$^+$-type amorphous silicon layer 4b. However, in the third embodiment, a Cr layer and a TiN layer 4c are deposited by the sputtering method to have the film thicknesses of about 200 nm and about 100 nm, respectively.

After that, using a second photomask, a resist pattern is formed for a region for an island 4, a source/drain region and a drain bus line. The TiN layer 4d exposed by a lithography process using the resist pattern is removed by a dry etching method, and also the Cr layer 4c is removed by a wet etching method or a dry etching method. After that, the n$^+$-type amorphous silicon layer 4b and the amorphous silicon layer 4a are removed by a dry etching method.

Next, as shown in FIGS. 20A to 20D, an ITO film 6 is deposited for a transparent electrode on the transparent insulative substrate 1 by a sputtering method to have the film thickness of about 50 nm. Then, a resist pattern is formed using a third photomask. The exposed ITO film 6 is removed by a wet etching method or a dry etching method, using a mask to form the source/drain electrodes 5b and 5c and the control electrode 6a. After that, the TiN layer in the channel region is removed by a dry etching method. Subsequently, the Cr layer is removed by a wet etching method and a dry etching method. After that, the n$^+$-type amorphous silicon layer 4b in the channel region is removed by a dry etching method using the ITO film as an etching mask to form a pixel transistor.

Next, as shown in FIGS. 21A to 21D, a second insulating film 7 of silicon nitride SiNx is formed by a CVD method to have the film thickness of about 0.3 $\mu$m. Subsequently, an ITO film 9 is deposited for the pixel electrode 9 by a sputtering method to have the film thickness of about 50 nm. Subsequently, using a fourth halftone mask, a resist pattern 12 is formed to have a thick film thickness in the region of the pixel electrode 9 and openings in a gate terminal 2a and a drain terminal 5a. It should be noted that the resist pattern 12 is illustrated apart from the substrate to be easy in the understanding. After that, the ITO film 9 in a gate terminal opening 8a and a drain terminal opening 8b is removed by a wet etching method or a dry etching method. The second insulating film 7 and first insulating film 3 are removed by a dry etching method. Next, a thin resist pattern portion is removed through an ashing process using an oxygen gas. Subsequently, the ITO film 9 other than a the pixel electrode region is removed by a wet etching method or a dry etching method using the thick resist pattern portion as a mask. In this way, the manufacture of the active matrix substrate is completed.

In accordance with the manufacturing method of the multi-domain liquid crystal display apparatus of the electrically floating pixel structure of the third embodiment, the liquid crystal display apparatus can be manufactured to have the pixel electrode 9 in the electrically floating state using four masks. In this way, the number of processes can be reduced by one PR process compared with the second embodiment.

It should be noted that the third embodiment differs from the second embodiment in that the TiN layer is used instead of the Ti layer for the gate wiring line material. This is to prevent the increase of connection resistance of the gate electrode terminal and the common electrode terminal and the anisotropy conductive film for a long term. Also, the TiN layer is used on the Cr layer as the source/drain electrode material. This reason is same as the above. It should be noted that the anisotropy conductive film is described in "Color Pixel Transistor Liquid Crystal Display" (Kyoritu Syuppan, pages 133–134).

[The Fourth Embodiment]

Next, the manufacturing method of the multi-domain liquid crystal display apparatus of the electrically floating pixel electrode structure according to the fourth embodiment of the present invention will be described with reference to FIG. 22A to FIG. 26D. FIGS. 22A to 26D show the manufacturing process of the active matrix substrate of the multi-domain liquid crystal display apparatus according to the fourth embodiment of the present invention. FIGS. 22A, 23A, 24A, 25A and 26A are plan views of one pixel, respectively. FIGS. 22B, 23B, 24B, 25B and 26B are cross sectional views of the pixel transistor section along the A–A' line in the plan views, respectively. FIGS. 22C, 23C, 24C, 25C and 26C are cross sectional views of the gate terminal section along the B–B' line in the plan views, respectively. FIGS. 22D, 23D, 24D, 25D and 26D are cross sectional views of the drain terminal section along the C–C' line in the plan views, respectively. It should be noted that in the fourth embodiment, a liquid crystal display apparatus is manufactured in the PR processes of five times, like the above mentioned second embodiment.

The manufacturing method of the multi-domain liquid crystal display apparatus of the electrically floating pixel electrode structure of the fourth embodiment will be described. First, an Al layer is deposited on a transparent insulative substrate 1 by a sputtering method to have the film thickness of about 200 nm, as shown in FIGS. 22A to 22D. Subsequently, the Ti layer is deposited to have the film thickness of about 0.1-$\mu$m. After that, a resist pattern is formed using a first photomask and the metal film exposed in this way is removed by a dry etching method to form a gate bus line 2, a gate terminal 2a and a common capacitance line 10.

Next, as shown in FIGS. 23A to 23D, a first insulating film 3 of silicon nitride SiNx is deposited on the transparent insulative substrate 1 by a CVD method to have. the film thickness of about 0.4 $\mu$m. Subsequently, an amorphous silicon layer 4a and an n$^+$-type amorphous silicon layer 4b are deposited as a semiconductor layer to have the film thicknesses of about 0.2 $\mu$m and about 50 nm, respectively. After that, a Cr layer 4c is deposited by a sputtering method to have the film thickness of about 200 nm. Next, a resist pattern is formed using a second photomask. In the fourth embodiment, the resist pattern is formed to have openings in a pixel region, a gate terminal section and a common capacitance terminal section. The Cr layer 4c exposed by a lithography process using the resist pattern is removed by a wet etching method or a dry etching method. After that, the n$^+$-type amorphous silicon layer 4b, the amorphous silicon layer 4a, and the first insulating film 3 are removed by a dry etching method. In this way, a laminate film is removed from the pixel region and also the gate terminal opening 8a and the common capacitance terminal opening 8c are formed.

Next, as shown in FIGS. 24A to 24D, an ITO film 6 is deposited on the transparent insulative substrate 1 by a sputtering method. Then, a resist pattern is formed using a third photomask. The exposed ITO film 6 is removed by a wet etching method or a dry etching method, and a drain bus line 5, source/drain electrodes 5b and 5c and a control electrode 6a are formed. After that, the Cr layer 4c in the channel region is removed by a wet etching method or a dry etching method. The n$^+$-type amorphous silicon layer 4b in the channel region is removed by a dry etching method using the ITO film 6 as an etching mask to form a pixel transistor.

Next, as shown in FIGS. 25A to 25D, a second insulating film 7 composed of silicon nitride SiNx is formed by a CVD method to have the film thickness of about 0.3 $\mu$m. Subsequently, using a fourth mask, a resist pattern is formed to have an opening in a drain terminal 5a, and the second insulating film 7 exposed by a lithography process using the resist pattern is removed by a dry etching method. Also, a drain terminal opening 8b is formed and an unnecessary portion of the amorphous silicon layer 4a is removed.

Figure 45C:
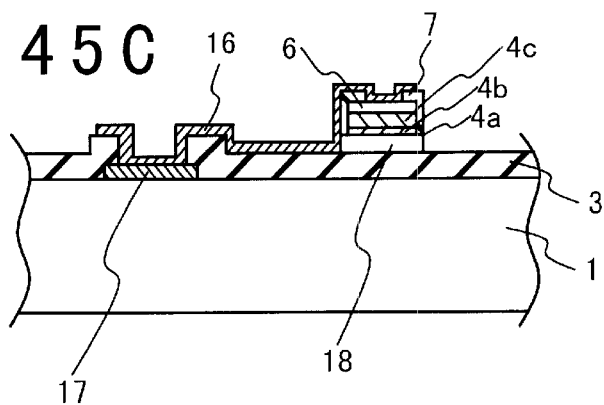

Next, as shown in FIGS. 26A to 26D, an ITO film 9 is deposited for the pixel electrode on the transparent insulative substrate 1 by a sputtering method to have the film thickness of about 50 nm. The ITO film 9 exposed using a fifth mask is removed by a wet etching method or a dry etching method. In this way, the pixel electrode 9 in the electrically floating state is formed through the second insulating film 7 on the control electrode 6a. Also, the pixel opening 11 of a predetermined shape is formed in the pixel electrode 9. In addition, a gate terminal 9a, a drain terminal 9b, and a common capacitance terminal 9c are formed in the gate terminal opening 8a, the drain terminal opening 8b, and the common capacitance terminal opening 8c, respectively. It should be noted that the connection between a gate layer 17 and a drain layer 18 in the protection transistor has the structure shown in FIG. 45C in the fourth embodiment.

Here, in the fourth embodiment, the following technique is applied in a part of the manufacturing process. That is, the first insulating film 3 of silicon nitride, the semiconductor layer such as the amorphous silicon layer 4a and the n$^+$-type amorphous silicon layer 4b, and a drain electrode metal film 4c of Cr are continuously formed, and then the metal film and the semiconductor layer are continuously etched to form the island 4 region and the drain bus line 5 region for the pixel transistor at the same time. This scheme is based on technique by Shigeru KIMURA, Takahiko WATANABE, Tae MIYAHARA, Akihisa MAEDA, Satoshi IOKEDA, Hiroaki TANAKA, Takasuke HAYATA, shoichi KUROHA, Hirohumi IHARA, and Kazushige TAKETI of NEC Corporation, and Hiroyuki UCHIDA, Shusaku KIDO, shinichi NAKATA, Tsutomu HAMADA, sonohisa SHIMODO, Satoshi DOI, and Toshihiko HARANO of Kagoshima NEC Ltd. More specifically, this technique relates to a manufacturing method of a usual TN type active matrix substrate. In a first process, a gate electrode, a gate wiring line and a common wiring line are formed. In a second process, a gate insulating film, a semiconductor layer of an amorphous silicon layer and n$^+$-type amorphous silicon layer, and a metal layer are continuously formed as a laminate layer and then a part of the laminate layer is left on an island region and a drain wiring line region. The metal layer and the semiconductor layer are continuously etched so that only the gate insulating film is left in a gate electrode region and a gate wiring line region. In a third process, after a transparent electrode layer is formed for the pixel electrode, the metal layer and semiconductor layer in a predetermined region are etched using the transparent electrode layer as an etching mask. In a fourth process, a protection insulating film is formed, and then an opening is provided in a predetermined region. In the above mentioned fourth embodiment, the above technique is applied to a part of the manufacturing method of the multi-domain liquid crystal display apparatus of a floating pixel electrode structure to achieve optimization.

In this way, in accordance with the manufacturing method of the multi-domain liquid crystal display apparatus of the electrically floating pixel structure in the fourth embodiment, the semiconductor layer of the amorphous silicon layer 4a and the n$^+$-type amorphous silicon layer 4b are deposited, and then the metal of source/drain electrode film of Cr is continuously formed. A unnecessary part of the amorphous silicon layer 4a and the first insulating film 3 are removed using a fourth photomask, so that the liquid crystal display apparatus can be formed to have the pixel electrode 9 in the electrically floating state using five masks. Like the second embodiment, the number of processes can be reduced by one compared with the first embodiment.

It should be noted that in the fourth embodiment, the example using Cr for the source/drain electrode metal and Ti/Al for the gate metal is described. However, the present invention is not limited to the above embodiment. Other materials having the same characteristics as the gate metal and the source/drain electrode metal can be used. For example, Cr, Mo, Cr/Al, Mo/Al can be used for the gate metal and Mo can be used for the source/drain electrode metal.

[The Fifth Embodiment]

Next, the manufacturing method of the multi-domain liquid crystal display apparatus of the electrically floating pixel electrode structure according to the fifth embodiment of the present invention will be described with reference to FIG. 27A to FIG. 30D. FIG. 27A to FIG. 30D show the manufacturing process of the active matrix substrate of the multi-domain liquid crystal display apparatus according to the fifth embodiment of the present invention. FIGS. 27A, 28A, 29A and 30A are plan views of one pixel, respectively. FIGS. 27B, 28B, 29B and 30B are cross sectional views of the pixel transistor section along the A–A' line of the plan views, respectively. FIGS. 27C, 28C, 29C and 30C are cross sectional views of the gate terminal section along the B–B' line of the plan views, respectively. FIGS. 27D, 28D, 29D and 30D are cross sectional views of the drain terminal section along the C–C' line of the plan views, respectively. It should be noted that in the fifth embodiment, the multi-domain liquid crystal display apparatus is manufactured in the PR process of four times using the halftone exposure technology.

The manufacturing method of the multi-domain liquid crystal display apparatus in the fifth embodiment will be described. First, as shown in FIGS. 27A to 27D, an Al layer is deposited on transparent insulative substrate 1 to have the film thickness of about 200 nm using a sputtering method and a TiN layer is deposited to have the film thickness of about 100 nm. After that, the TiN layer and the Al layer exposed using a first photomask are removed by a dry etching method. In this way, a gate bus line 2, a gate terminal 2a, a drain terminal 5a and a common capacitance line 10 are formed.

Next, as shown in FIGS. 28A to 28D, a first insulating film 3 composed of silicon nitride SiNx is deposited on the transparent insulative substrate 1 by a CVD method to have the film thickness of about 0.4 μm. Subsequently, an amorphous silicon layer 4a and an n+-type amorphous silicon layer 4b are deposited as a semiconductor layer to have the film thicknesses of about 0.3 μm and about 50 nm, respectively. After that, a Cr layer 4c is deposited by a sputtering method to have the film thickness of about 200 nm. Next, a resist pattern is formed using a second photomask. However, in a fifth embodiment, like the fourth embodiment, a resist pattern is formed to have openings in the pixel region, the gate terminal section and the common capacitance terminal section. The Cr layer 4c exposed by a lithography process using the resist pattern is removed by a wet etching method and a dry etching method. After that, the n+-type amorphous silicon layer 4b, the amorphous silicon layer 4a, the first insulating film 3 are removed by a dry etching method to form a gate terminal opening 8a, a drain terminal opening 8b and a common capacitance terminal opening 8c.

Next, an ITO film 6 is deposited for the transparent electrode film by a sputtering method to have the film thickness of about 50 nm, as shown in FIGS. 29A to 29D. The ITO film 6 exposed using a third photomask is removed by a wet etching method or a dry etching method. In this way, a drain bus line 5, source/drain electrodes, and a control electrode 6a are formed. After that, a Cr layer 4c in the channel region is removed by a wet etching method or a dry etching method. Subsequently, the n+-type amorphous silicon layer 4b in the channel region is removed by a dry etching method using the ITO film as an etching mask. In this way, a pixel transistor is formed.

Figure 46A:
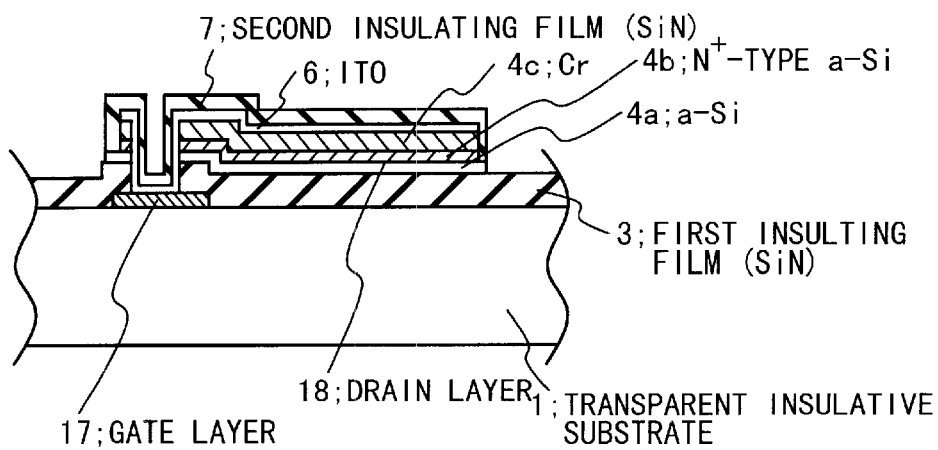
FIGS. 46A and 46B show cross sectional views of the connection structure of a gate layer 17 and a drain layer 18 in the protection transistor.

Next, as shown in FIGS. 30A to 30D, a second insulating film 7 composed of silicon nitride SiNx is formed by a CVD method to have the film thickness of about 0.4 μm. Subsequently, the ITO film 9 is deposited for the pixel electrode 9 to have the film thickness of about 50 nm by the sputtering method. Next, using a fourth halftone mask, a resist pattern 12 is formed to have openings for a gate terminal 2a and drain terminal 5a, and a thick portion for the pixel electrode 9. After that, a portion of the ITO film 9 corresponding to the gate terminal opening 8a and the drain terminal opening 8b is removed by a wet etching method or a dry etching method, and the second insulating film 7 is removed by a dry etching method. Next, a thin portion of the resist pattern is removed by an ashing using an oxygen gas. Also, an unnecessary portion of the a-Si layer 4a is removed. Subsequently, a portion of the ITO film other than a region of the pixel electrode 9 is removed by a wet etching method or a dry etching method using the thick portion of the resist pattern 12 as a mask. It should be noted that the connection of a gate layer 17 and a drain layer 18 in the protection transistor has the structure shown in FIG. 46A in the fifth embodiment.

In this way, in accordance with the manufacturing method of the multi-domain liquid crystal display apparatus of the electrically floating pixel structure in the fifth embodiment, the region for the terminal openings and the region for the pixel electrode are separately etched using the halftone mask. Moreover, a portion unnecessary of the amorphous silicon layer 4a and the first insulating film 3 are removed by use of the halftone mask. Thus, the liquid crystal display apparatus can be formed to have the pixel electrode 9 in the electrically floating state by use of four masks. The number of processes can be reduced by one PR process compared with the fourth embodiment. It should be noted that Al may be used in place of TiN/Al as gate metal, and Mo may be used in place of Cr as source/drain electrode metal.

[The Sixth Embodiment]

Next, the manufacturing method of the multi-domain liquid crystal display apparatus with the electrically floating pixel electrode structure according to the sixth embodiment of the present invention will be described with referring to FIG. 31A to FIG. 35D. FIG. 31A to FIG. 35D show the manufacturing process of the active matrix substrate of the multi-domain liquid crystal display apparatus according to the sixth embodiment of the present invention. FIGS. 31A, 32A, 33A, 34A and 35A are plan views of one pixel, respectively. FIGS. 31B, 32B, 33B, 34B and 35B are cross sectional views the pixel transistor section along the A–A' line of the plan views, respectively. FIGS. 31C, 32C, 33C, 34C and 35C are cross sectional views of the gate terminal section along the B–B' line of the plan views, respectively. FIGS. 31D, 32D, 33D, 34D and 35D are cross sectional views of the drain terminal section along the C—C' line of the plan views, respectively. It should be noted that the liquid crystal display apparatus of an inverse stagger structure is described in the first to fifth embodiments. However, in the sixth embodiment, the manufacturing method of the liquid crystal display apparatus of a forward stagger structure will be described.

Like the first embodiment, the multi-domain liquid crystal display apparatus according to a sixth embodiment is a liquid crystal display apparatus of the VA mode in which a liquid crystal molecules having negative permittivity anisotropy are directed to have homeotropic orientation. A pixel transistor, the pixel electrode 9 and a control electrode 6a are formed in each pixel which is surrounded by gate bus lines 2 and drain bus lines 5. The pixel electrode 9 forms predetermined coupling capacitances through a first insulating film 3 and a second insulating film 7 with a control electrode 6a and a common capacitance line 10. Also, the sixth embodiment has a forward stagger structure and a pixel transistor section is composed by source/drain electrodes, an amorphous silicon semiconductor layer, and a gate electrode layer from the side of the substrate.

The manufacturing method of the multi-domain liquid crystal display apparatus of the electrically floating pixel electrode of such order stagger structure will be described. First, a metal layers such as a Cr layer is deposited on a transparent insulative substrate 1 of glass to have the film thickness of about 100 nm using a sputtering method as shown in FIGS. 31A to 31D. After that, a resist pattern is formed using a first photomask and an exposed portion of the Cr layer by a lithography process using the resist pattern is removed by a wet etching method. In this way, a drain bus line 5, a drain terminal 5a and a light shielding pattern 15 are formed.

Next, as shown in FIGS. 32A to 32D, the first insulating film 3 composed of silicon nitride SiNx is deposited on the transparent insulative substrate 1 by a CVD method to have the film thickness of about 0.4 μm. Subsequently, an ITO film 6 is deposited for the transparent electrode by a sputtering method to have the film thickness of about 0.1 μm. After that, using a second photomask, a resist pattern is formed in the region of the control electrode 6a and the region of drain electrode 5b. An exposed portion of the ITO film 6 is removed by a wet etching method or a dry etching method. In this way, the control electrode 6a and the drain electrode 5b are formed.

After that, the transparent insulative substrate 1 is held in a $PH_3$ plasma atmosphere to carry out $PH_3$ plasma processing. This processing is carried out to form ohmic contact by the ITO film 6 and the amorphous silicon layer. The processing is carried out in the plasma CVD equipment for 5 minutes temperature of 300° C. in the RF power of 0.1 W/cm$^2$ under the pressure of 200 Pa, while supplying $PH_3/H_2$ gas (0.5% $PH_3$) in 1000 sccm.

After that, as shown in FIGS. 33A to 33D, the amorphous silicon layer 4a as a semiconductor layer and an insulating film 4e composed of silicon nitride SiNx are deposited by a CVD method to have the film thicknesses of about 0.1 μm and about 0.4 μm, respectively. Subsequently, an Al layer and a Ti layer are deposited by a sputtering method to have the film thicknesses of about 0.2 μm and about 0.1 μm, respectively. After that, a resist pattern is formed using a third photomask, and potions of the Al layer and Ti layer exposed by a lithography process using the resist pattern are removed by a dry etching method. After that, the insulating film 4e and the amorphous silicon layer 4a are removed by a dry etching method to form a semiconductor region, a gate bus line 2, and a common capacitance line 10.

Next, as shown in FIGS. 34A to 34D, a second insulating film 7 composed of silicon nitride SiNx is formed by a CVD method to have the film thickness of about 0.2 μm. Subsequently, using a fourth mask, a resist pattern is formed to have openings in a gate terminal 2a, a drain terminal 5a, and the common capacitance line terminal. An exposed portion of the second insulating film 7 by a lithography process using the resist pattern and the first insulating film 3 are removed by a dry etching method. In this way, a gate terminal opening 8a, a drain terminal opening 8b, a common capacitance terminal opening 8c, a drain electrode opening 8d, and an opening 8e for a drain electrode connection are formed.

Figure 46B:
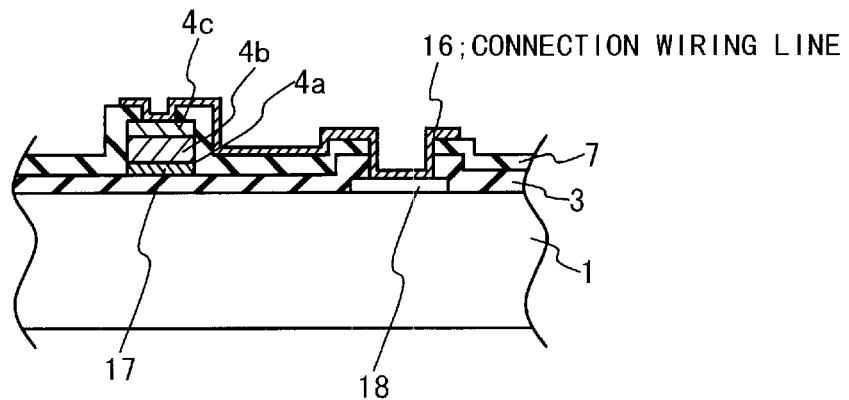

Next, as shown in FIGS. 35A to 35D, an ITO film 9 is deposited for the pixel electrode on the transparent insulative substrate 1 by a sputtering method to have the film thickness of about 50 nm. A portion of the ITO film exposed using a fifth mask is removed by a wet etching method or a dry etching method. In this way, the pixel electrode 9 in the electrically floating state is formed through the second insulating film 7 on the control electrode 6a. Also, a pixel opening 11 of a predetermined shape is formed in the pixel electrode 9. Also, a gate terminal 9a, a drain terminal 9b, and a common capacitance terminal 9c are formed in the gate terminal opening 8a, the drain terminal opening 8b, and the common capacitance terminal opening 8c. Subsequently, a drain electrode and a drain bus line are electrically connected by a connection portion 9d of ITO. It should be noted that the connection portion of a gate layer 17 and a drain layer 18 in the protection transistor has the structure shown in FIG. 46B in the sixth embodiment.

In this way, in accordance with the manufacturing method of the multi-domain liquid crystal display apparatus of the electrically floating pixel and the forward stagger structure in the sixth embodiment, the gate metal layer of Ti/Al is continuously formed after the amorphous silicon layer 4a and the insulating film 4e are formed. Thus, using five masks, the liquid crystal display apparatus can be formed to have the pixel electrode 9 in the electrically floating state.

It should be noted that in the sixth embodiment, the example in which Cr is used as the drain bus line metal and Ti/Al is used as the gate metal was described. However, the present invention is not limited to the above embodiment. For example, Cr, Mo, Cr/Al and Mo/Al can be used as the gate metal and, Mo can be used as the drain bus line metal. In this embodiment, the ITO film is used for the source/drain electrodes. However, a metal layer such as a Cr layer and a Mo layer. In this case, the drain bus line is formed at the same time as the source/drain electrode layer. Also, an additional mask is required.

[The Seventh Embodiment]

Next, a method of forming a the pixel electrode and a control electrode as an element technique in the multi-domain liquid crystal display apparatus of the electrically floating pixel electrode structure according to the seventh embodiment of the present invention will be described with reference to FIGS. 36A to 36H, FIGS. 37A to 37M, and FIGS. 38A to 38I. FIGS. 36A to 36H, FIGS. 37A to 37M, and FIGS. 38A to 38L are cross sectional views of a section in which the control electrode and the pixel electrode overlap with each other in the active matrix substrate of the multi-domain liquid crystal display apparatus in a series of manufacturing processes in order.

In the multi-domain liquid crystal display apparatus in which a liquid crystal domain is divided into a plurality of domains by the control electrode, the liquid crystal molecule orientations are determined based on the shapes of the pixel electrode and control electrode, especially the shape of the opening of the pixel electrode. Therefore, to secure the performance of the liquid crystal display apparatus, these electrodes must be formed to match the mask design size. Especially, in the multi-domain liquid crystal display apparatus of the electrically floating pixel electrode structure shown in the seventh embodiment, orientation division and a liquid crystal drive voltage threshold are determined based on an area ratio of the pixel electrode and the control electrode. Therefore, the areas of the pixel electrode and control electrode must be correctly controlled.

The ITO film used for the pixel electrode and the control electrode is generally processed by a wet etching method to suppress a cost. However, the fitness of the ITO film and the resist pattern is not good, and a long etching time is set to prevent an etching remainder of the ITO film. As a result, it is easy for ITO film to be etched in the lateral direction in case of the wet etching method. Therefore, as shown in FIGS. 6A to 6F, it is not possible to form the pixel electrode and the control electrode to match the design size and the characteristic of the liquid crystal display apparatus has not become uniform. For this reasons, in the seventh embodiment, three kinds of method of forming the pixel electrode and the control electrode which have especially large influence to the view angle characteristic of the liquid crystal display apparatus in the manufacturing method of the liquid crystal display apparatus will be described below in detail with reference to the drawings such that the pixel electrode and the control electrode can be correctly formed.

Figure 36A:
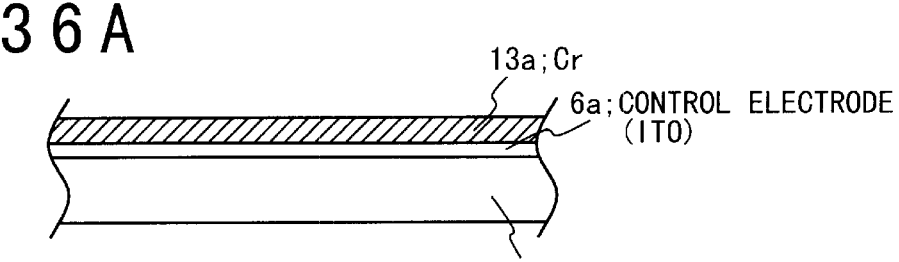
FIGS. 36A to 36H, FIGS. 37A to 37M, and FIGS. 38A to 38L are cross sectional views of a section in which the control electrode and the pixel electrode overlap with each other in three different processes of the manufacturing method of the active matrix substrate of the multi-domain liquid crystal display apparatus of the electrically floating pixel electrode structure according to a seventh embodiment of the present invention.
Figure 36B:
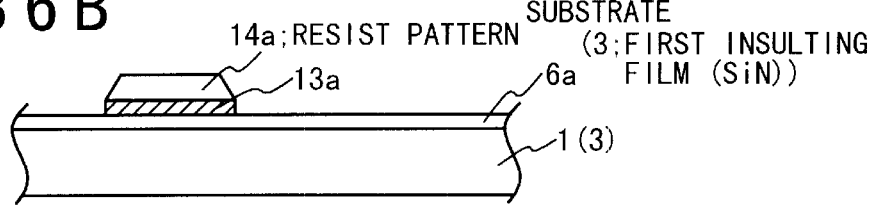

First, the first method will be described with reference to FIGS. 36A to 36H. As shown in FIG. 36A, an ITO film for a control electrode 6a and a conductive film 13a of Cr for a border electrode are continuously formed on a transparent insulative substrate 1 or a first insulating film 3 by a sputtering method. Next, as shown in FIG. 36B, a resist pattern 14a of a predetermined shape is formed using a first photomask and only the Cr layer 13a exposed by a wet etching method is removed. Here, in this embodiment, the Cr layer 13a is etched using the etchant of cerium nitrate ammonium. However, because the Cr layer 13a is excellent in the fitness with the resist, it is difficult to be etched in the lateral direction, compared with the case of the ITO film, so that it is possible to be formed to have the same shape as the resist pattern size.

Figure 36C:
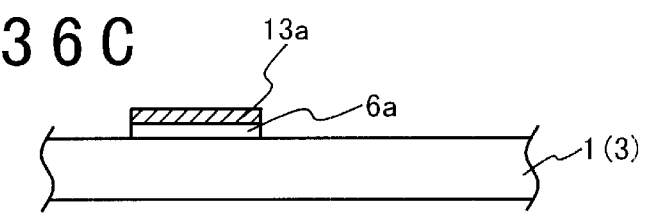
Figure 36D:
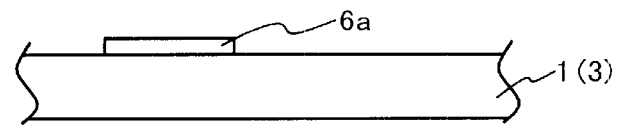

Next, as shown in FIG. 36C, the ITO film is wet-etched using the patterned Cr layer 13a as an etching mask with the mixed acid of nitric acid and hydrochloric acid. In this case, the ITO film is excellent in the fitness with the Cr layer 13a, different from the resist. Therefore, the ITO film can be etched without being etched in the lateral direction, to have the same pattern size of the Cr layer 13a. After that, as shown in FIG. 36D, the Cr layer 13a is removed by a wet etching method so that an ITO film having the same pattern as the resist pattern is obtained.

Figure 36E:
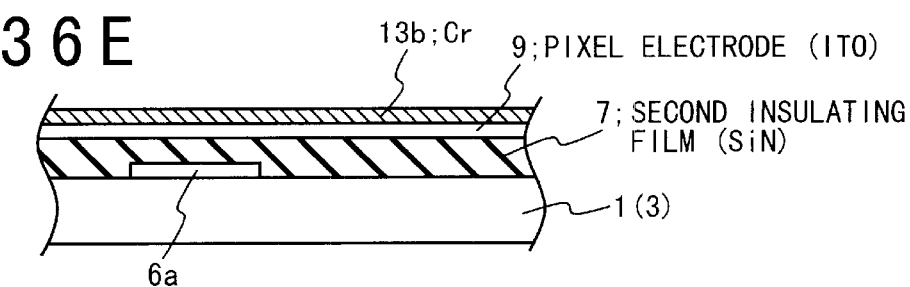
Figure 36F:
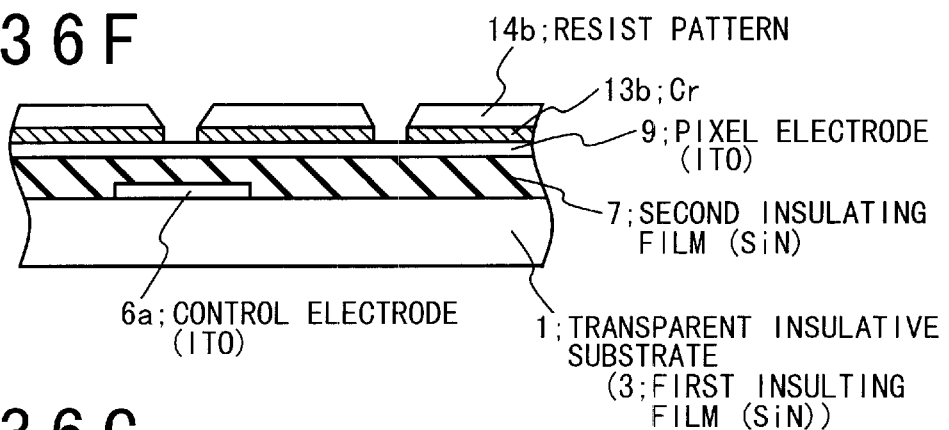
Figure 36G:
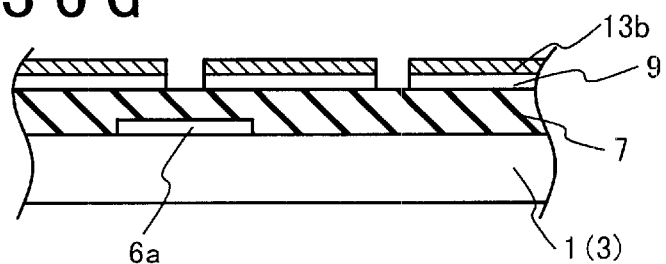

Next, as shown in FIG. 36E, a second insulating film 7 is deposited on the substrate surface. Subsequently, an ITO film for the pixel electrode 9 and a conductive film 13b of Cr for a border electrode are continuously formed by a sputtering method like the process of FIG. 36A. After that, as shown in FIG. 36F, a resist pattern 14b is formed on the Cr layer 13b. The Cr layer 13b is patterned using the resist pattern 14b as an etching mask and a pattern is formed by a wet etching method. Subsequently, the ITO film is wet etched using the patterned Cr layer 13b as an etching mask.

Figure 36H:
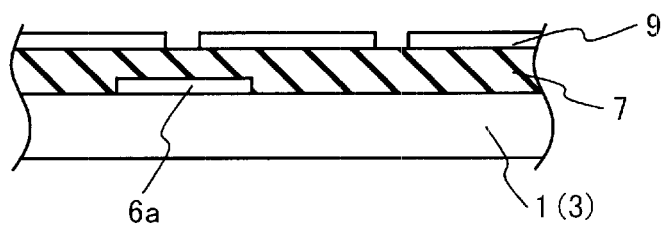

In these process, the fitness of the resist pattern and the Cr layer, and the fitness of the Cr layer and the ITO film are both good. Therefore, the ITO film can be formed to have the same size as the resist pattern. After that, the Cr layer 13b is removed by a wet etching method and the shape shown in FIG. 36H is obtained.

In this way, instead of directly etching the ITO film using the resist pattern 14a or 14b as the mask, the conductive film 13a of Cr formed on the ITO film is etched using a resist pattern 13b as the mask, and then the ITO film is etched using the Cr layer 13a, 13b as the mask. Thus, the ITO film can be formed to have the same size as the resist pattern.

Figure 37A:
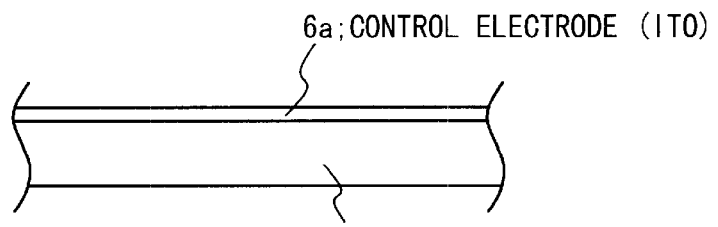
Figure 37B:
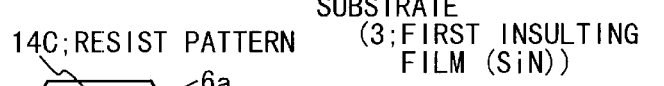
Figure 37C:
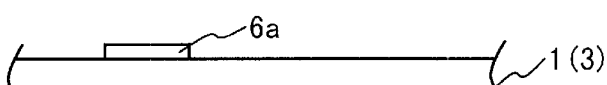

Next, the second method will be described with reference to FIGS. 37A to 37M. First, as shown in FIG. 37A, an ITO film for the control electrode 6a is formed on a transparent insulative substrate 1 or a first insulating film 3. Next, as shown in FIG. 37B, a resist pattern 14c of a predetermined shape is formed using a first photomask. The ITO film exposed using the resist pattern 14c is removed by a wet etching method using the mixed acid of nitric acid and hydrochloric acid. After that, the resist pattern 14c is peeled off as shown in FIG. 37C. Here, the ITO film is formed to have a size smaller than the resist pattern 14c due to the lateral etching.

Figure 37D:
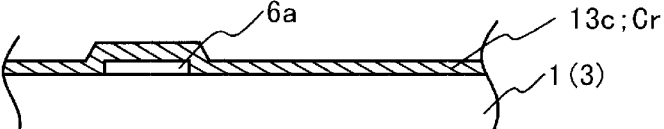
Figure 37E:
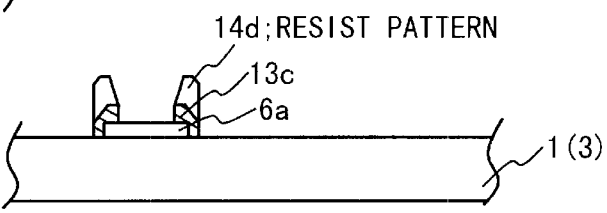
Figure 37F:
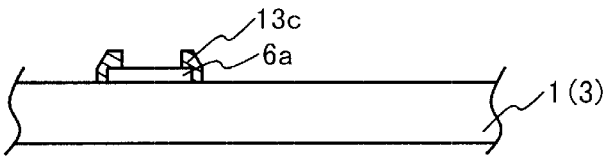

Next, in this embodiment to control the shape of the control electrode correctly, the following processing carried out. First, as shown in FIG. 37D, a conductive layer 13c of Cr excellent in the fitness with the resist is formed on the transparent insulative substrate 1 by a sputtering method. Next, as shown in FIG. 37E, a resist pattern 14d is formed to surround an edge portion of the ITO film using a second photomask and the Cr layer 13c is removed by a wet etching method. After that, the resist pattern 14d is peeled off so that the Cr layer 13c is formed to have the correct size around the edge portion of the ITO film. The area of the control electrode 6a can be correctly controlled by the ITO film and the Cr layer 13c as a unit.

Figure 37G:
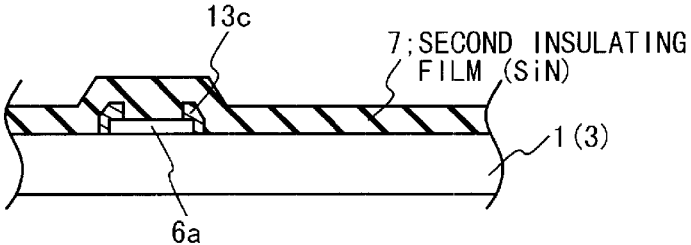
Figure 37H:
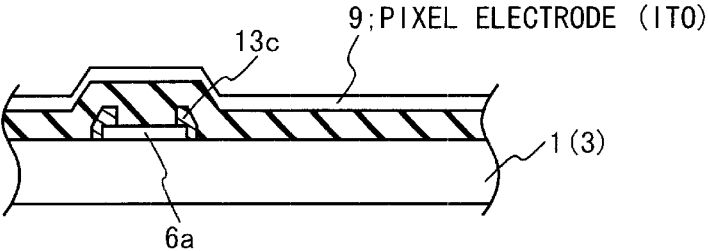
Figure 37I:
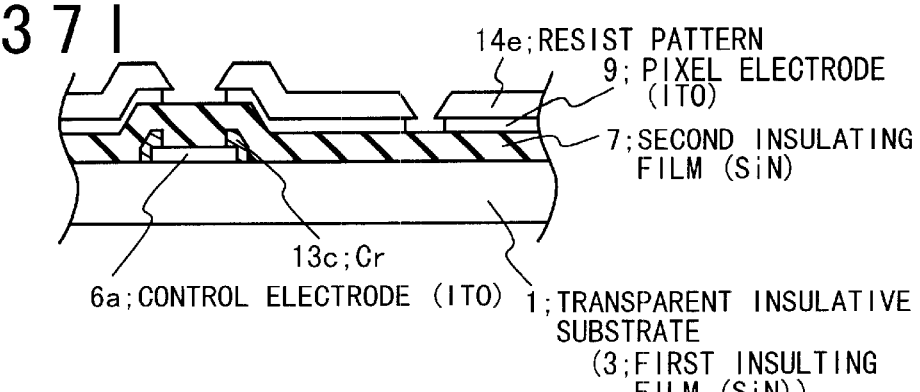
Figure 37J:
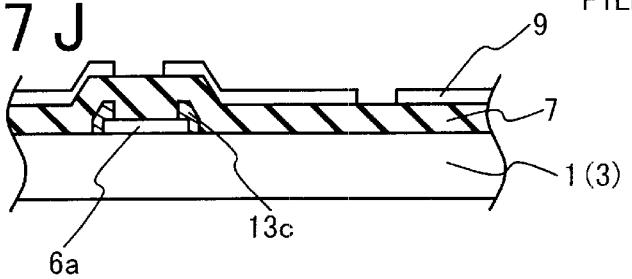
Figure 37K:
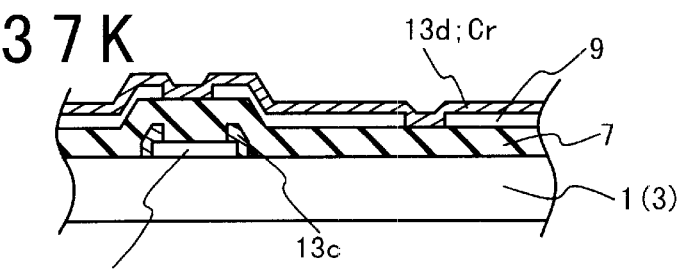
Figure 37L:
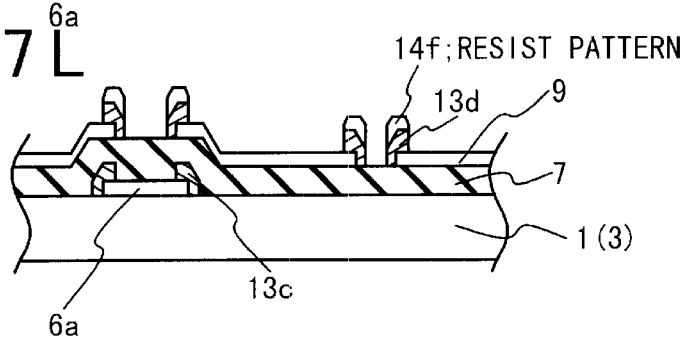
Figure 37M:
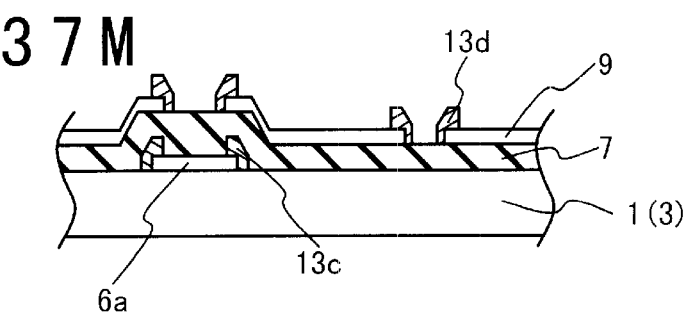

Next, as shown in FIGS. 37G and 37H, a second insulating film 7 is deposited on an entire substrate 1 and subsequently the ITO film for the pixel electrode 9 is deposited. After that, as shown in FIGS. 37I and 37J, a resist pattern 14e is formed, and the ITO film is wet etched using a resist pattern 14e as an etching mask. At this time, the ITO film is more widely etched in the lateral direction than the resist pattern 14e. Next, as shown in FIG. 37K, a conductive film 13d of Cr is deposited on the entire substrate 1 surface and a resist pattern 14f is formed to surround an edge portion of the pixel electrode as shown in FIG. 37L and the Cr layer 13d is wet etched. After that, when the resist pattern 14f is peeled off, the pixel electrode 9 composed of the ITO film and the Cr layer 13d is formed, as shown in FIG. 37M.

In this way, after the ITO film is wet etched using a resist pattern 14c, 14e, the conductive film 13c, 13d of Cr is deposited on the substrate surface. The Cr layer 13c, 13d is formed to surround an edge portion of the ITO film in the same size as a mask. Therefore, it is possible to form the control electrode 6a and the pixel electrode 9 as a unit of the ITO film and the Cr layer 13c, 13d so as to have a correct size.

Figure 38A:
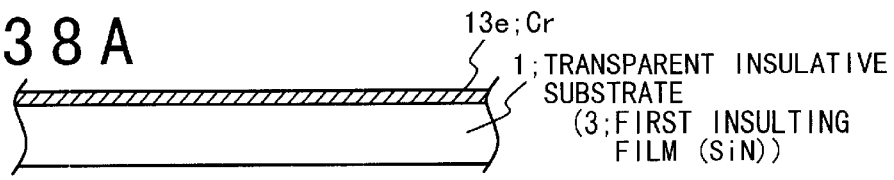
Figure 38B:
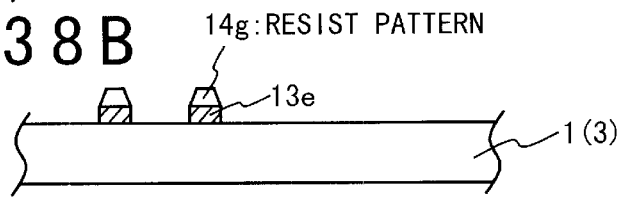
Figure 38C:
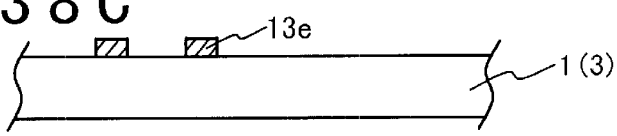

Next, the third method will be described with reference to FIGS. 38A to 38I. First, as shown in FIG. 38A, a conductive film 13e of Cr is formed on a transparent insulative substrate 1 or a first insulating film 3. Subsequently, a resist pattern 14g is formed only in the region for the edge portion of the control electrode and the Cr layer 13e is wet etched. Because the Cr layer 13e is excellent in the fitness with the resist, the Cr layer 13e is patterned to have the same size as the resist pattern.

Figure 38D:
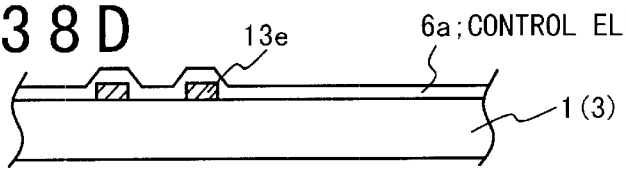

Next, as shown in FIG. 38D, an ITO film for the control electrode 6a is formed on the entire substrate 1 surface by a sputtering method.

Figure 38E:
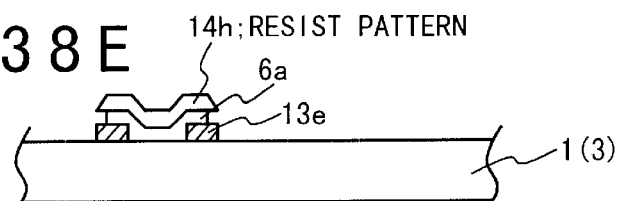
Figure 38F:
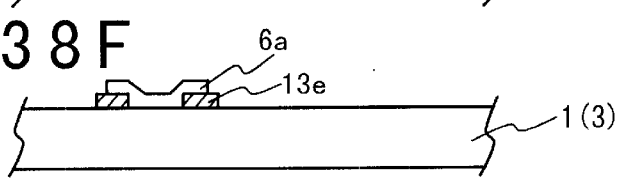

A resist pattern 14h is formed to cover a region of the control electrode 6a as shown in FIGS. 38E and 38F. After that, the ITO film is etched by a wet etching method and the resist pattern 14h is peeled off. At this time, the ITO film is formed to have a size smaller than the resist pattern 14h due to the lateral direction. However, the Cr layer 13e has been formed in the outer border in the previous process. Therefore, the control electrode 6a composed of the Cr layer 13e and the ITO film can be formed in the correct size.

Figure 38G:
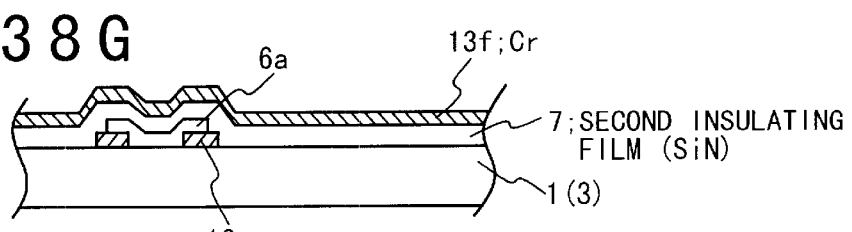
Figure 38H:
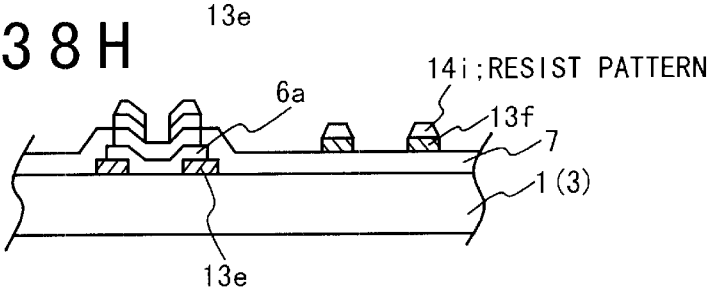
Figure 38I:
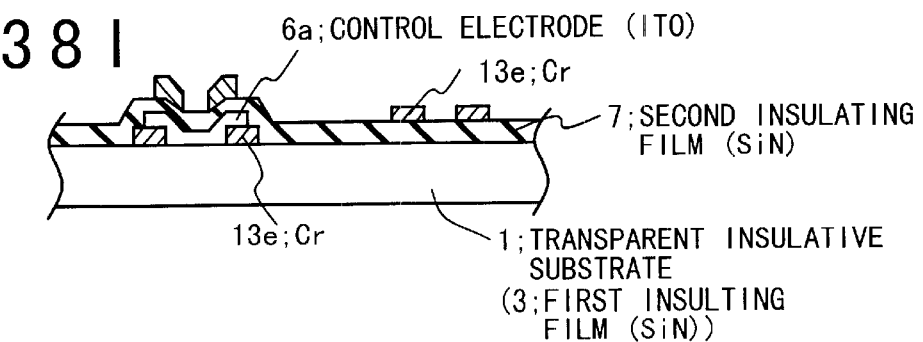
Figure 38J:
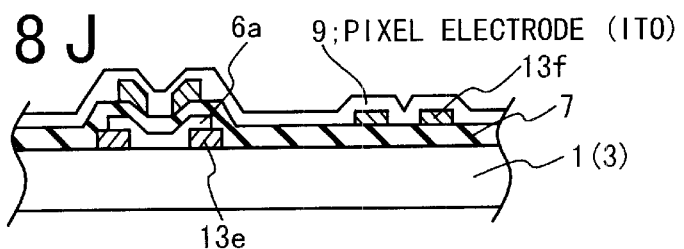
Figure 38K:
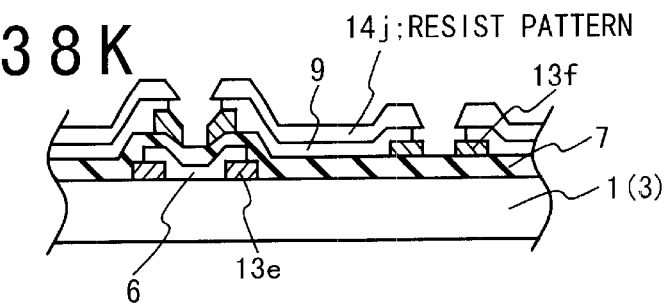
Figure 38L:
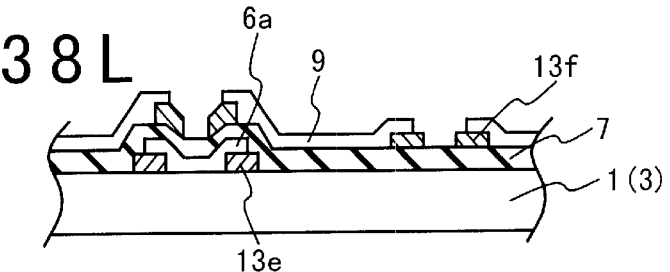
Figure 39A:
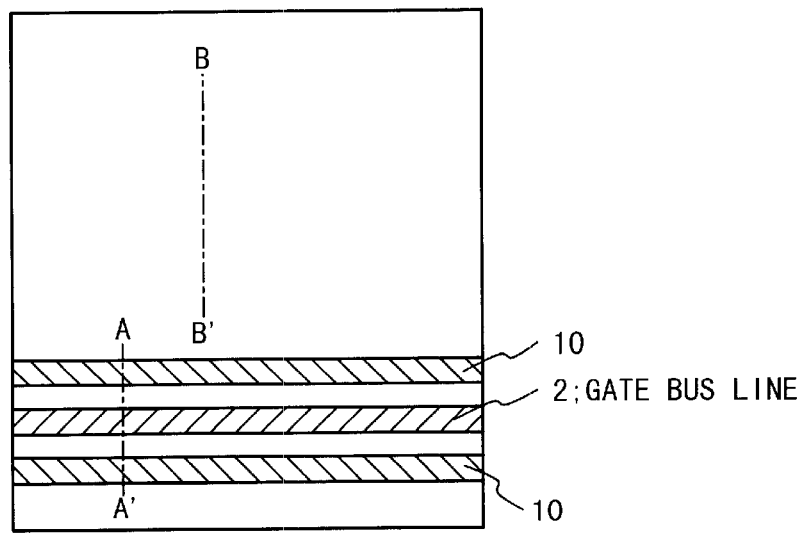
Figure 39B:
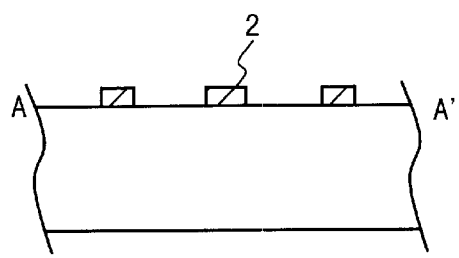
FIGS. 39B, 40B, 41B, 42B, 43B and 44B are cross sectional views of the pixel transistor section along the A–A' lines of the plan views, respectively.
Figure 39C:
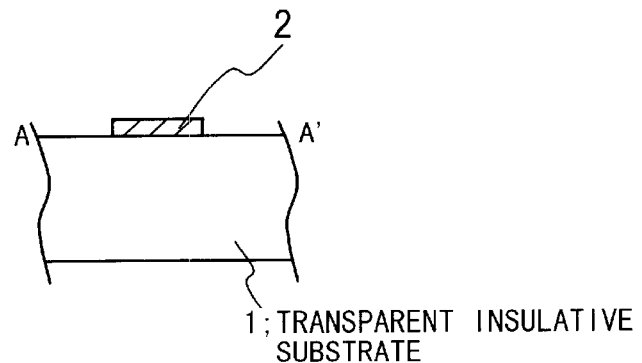
FIGS. 39C, 40C, 41C, 42C, 43C and 44C are cross sectional views of the gate terminal section, respectively.
Figure 39D:
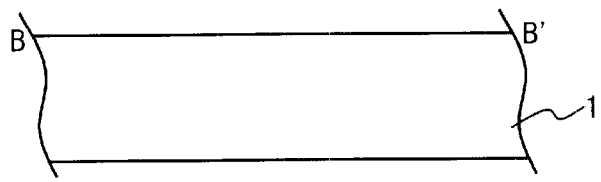
Figure 40A:
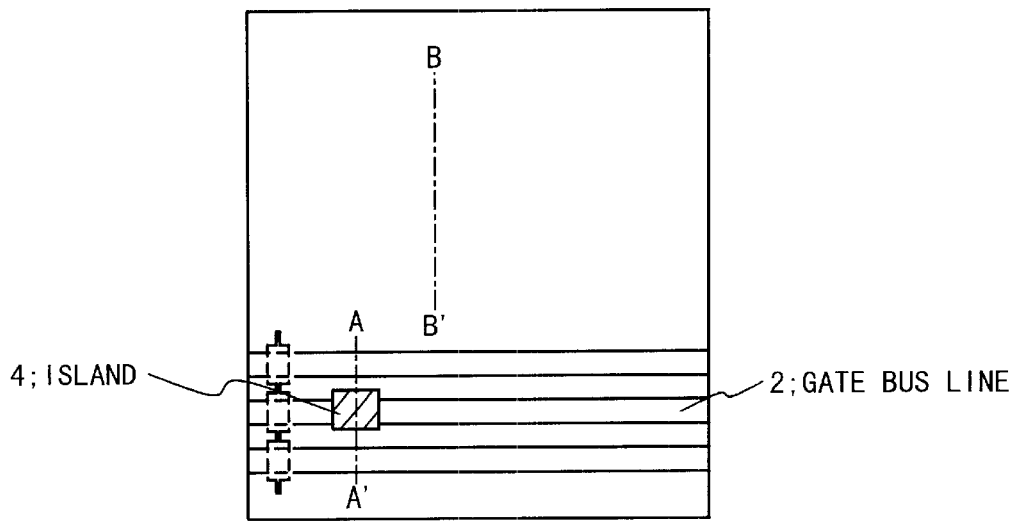
Figure 40B:
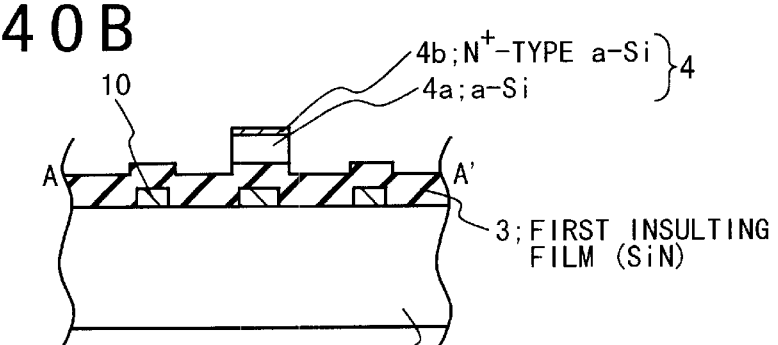
Figure 40C:
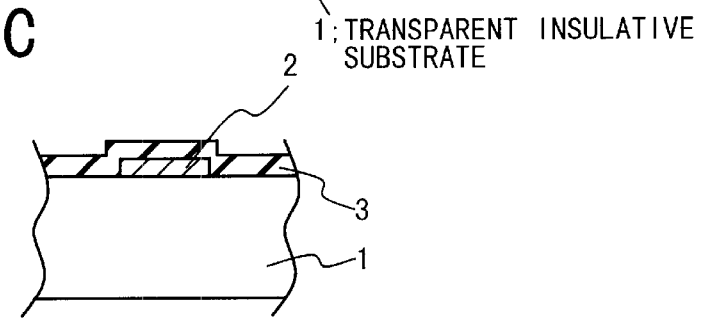
Figure 40D:
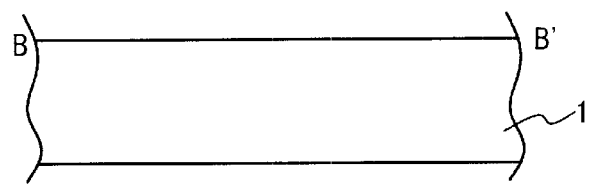
Figure 41A:
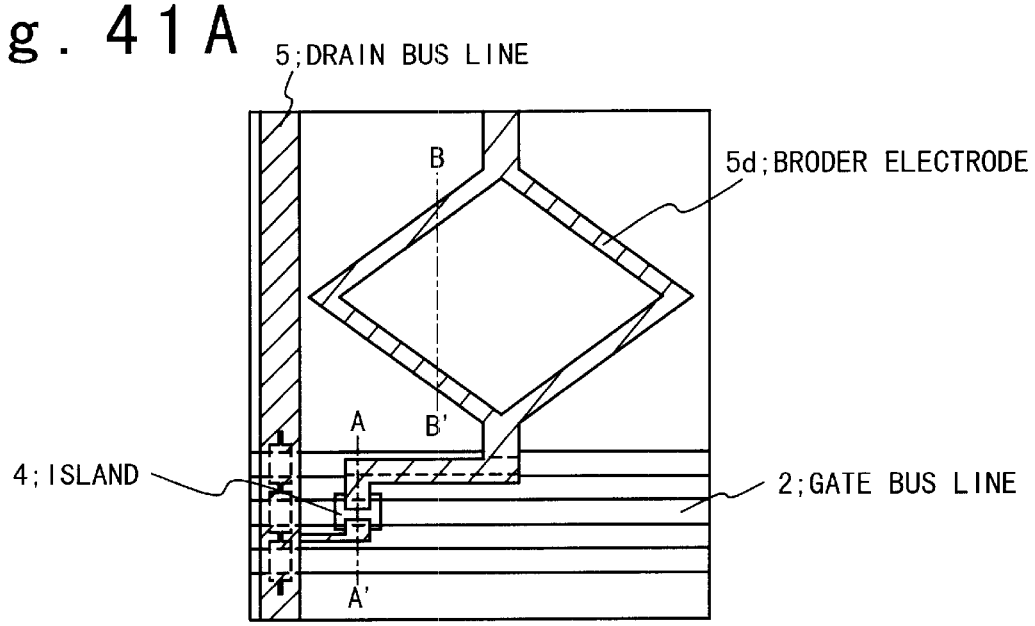
Figure 41B:
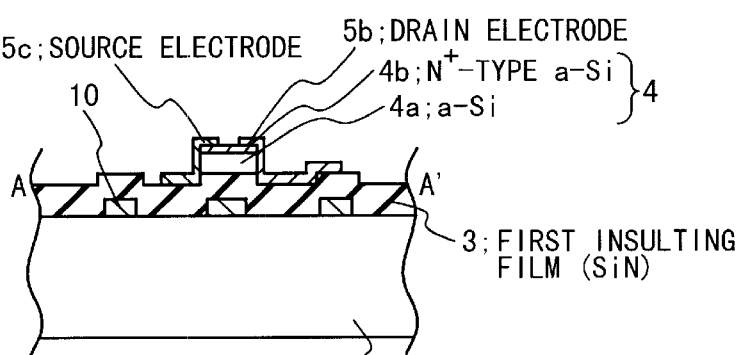
Figure 41C:
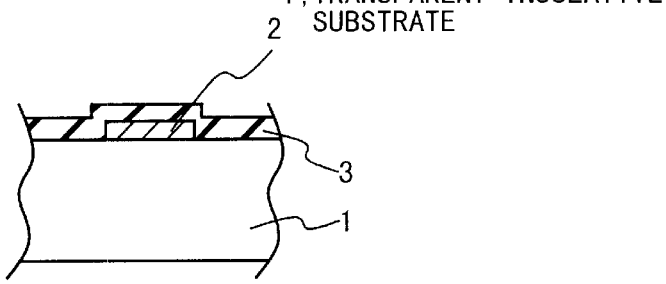
Figure 41D:
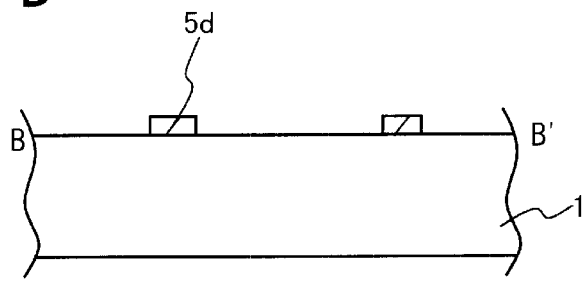
Figure 42A:
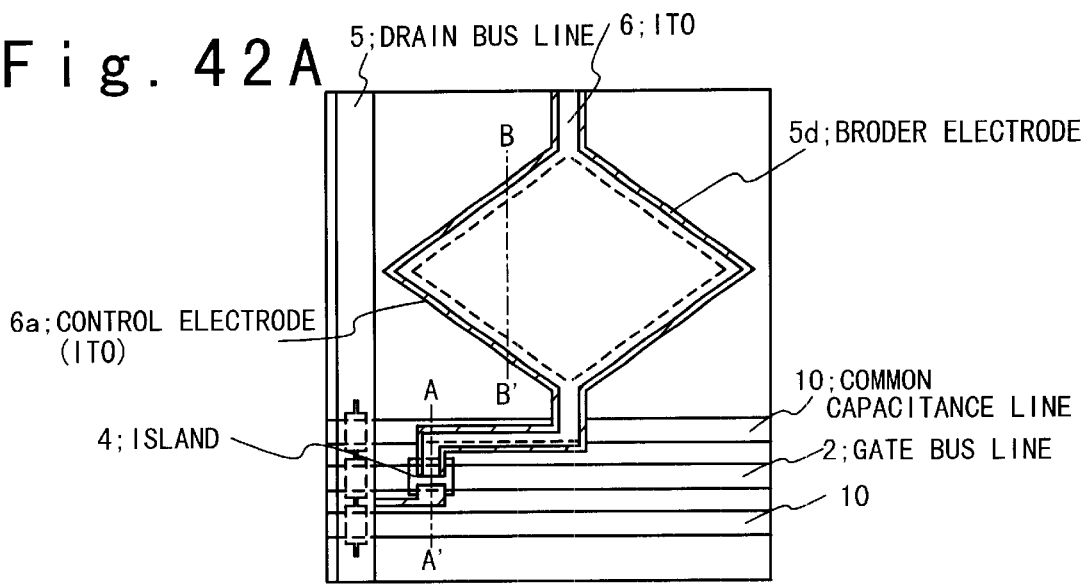
Figure 42B:
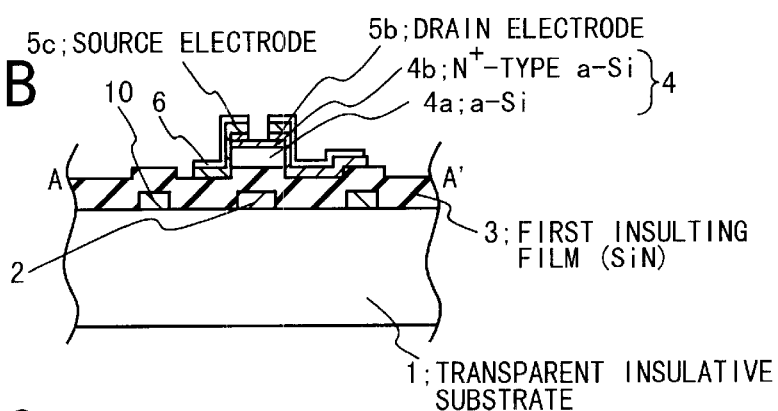
Figure 42C:
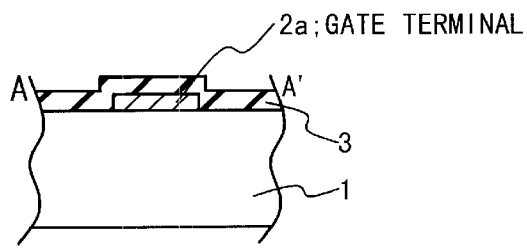
Figure 42D:
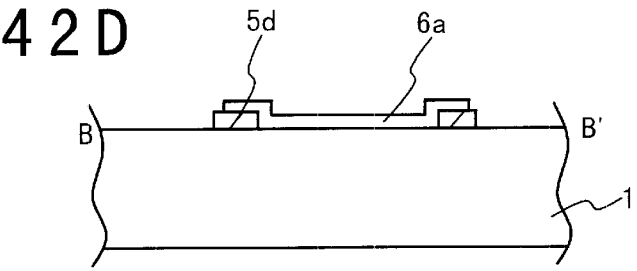
Figure 43A:
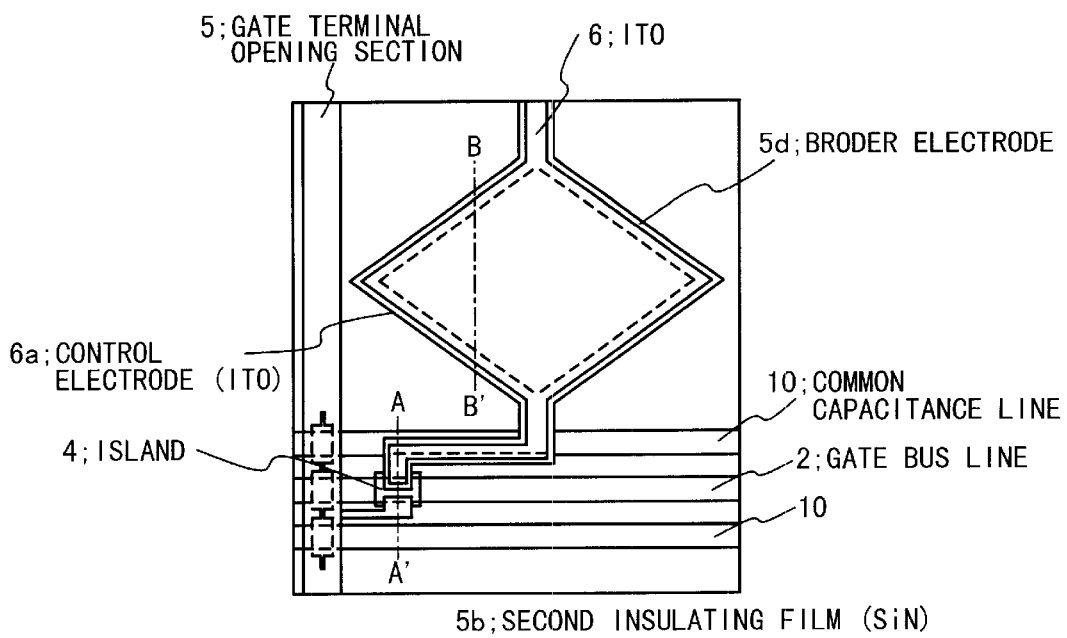
Figure 43B:
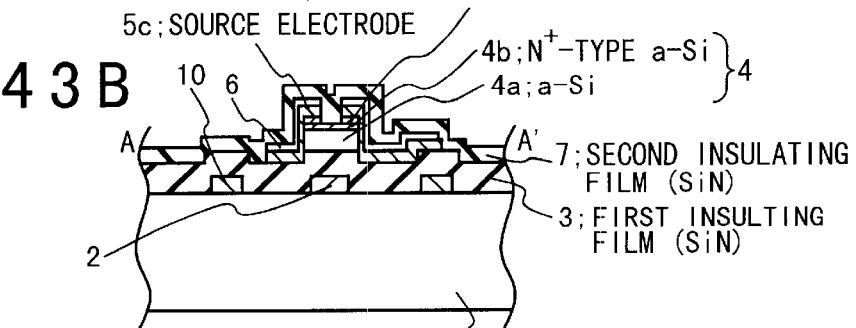
Figure 43C:
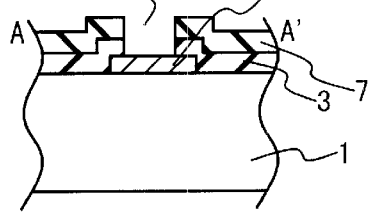
Figure 43D:
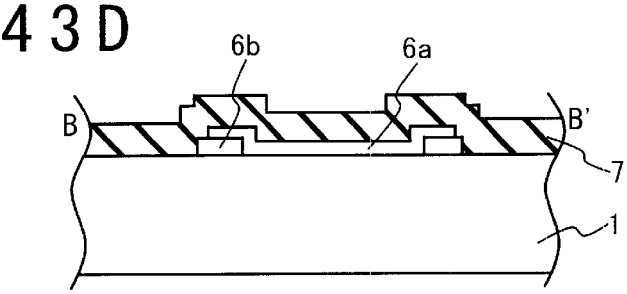
Figure 44A:
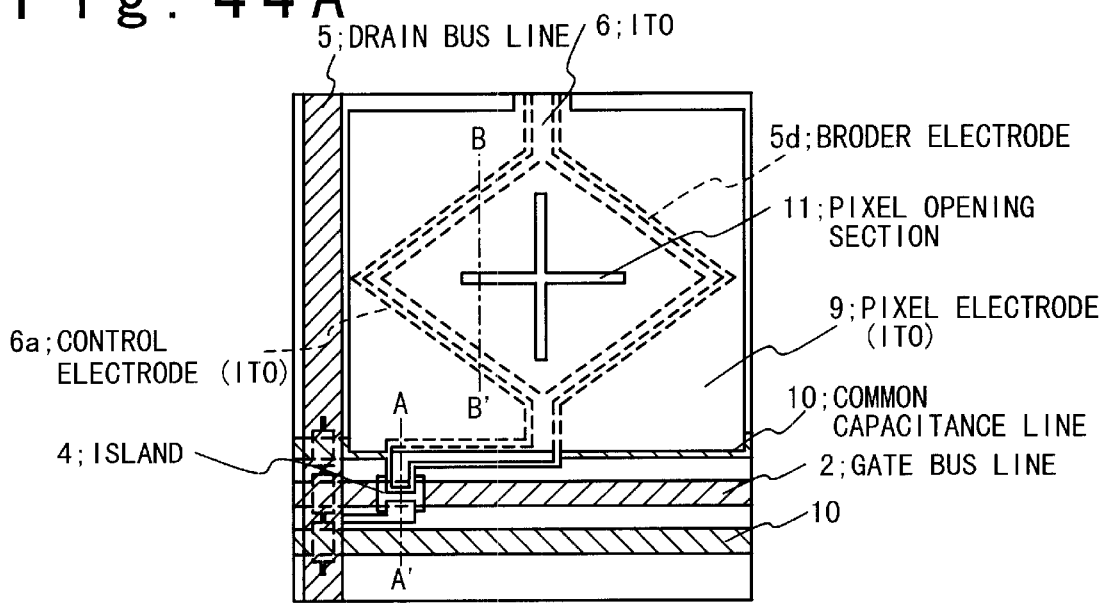
Figure 44B:
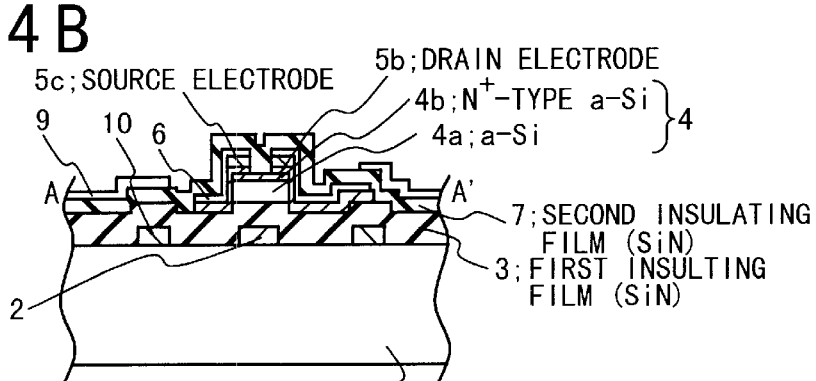
Figure 44C:
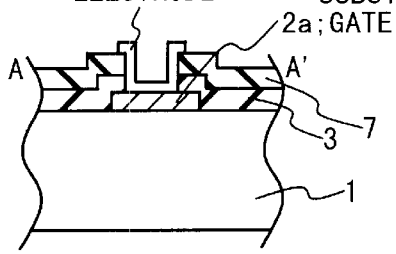
Figure 44D:
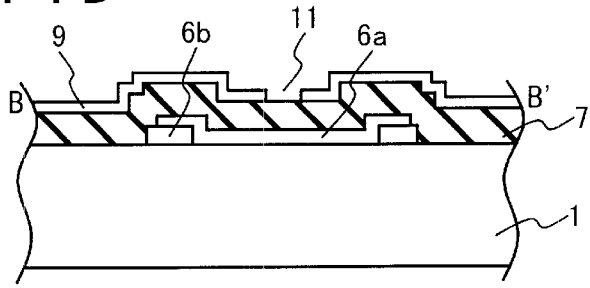

Next, as. shown in FIG. 38G, a second insulating film 7 and a conductive film 13f as a Cr layer are formed on the entire surface of a substrate 1. As shown in FIGS. 38H and 38I, the Cr layer 13f is wet etched using a resist pattern 14i formed in an edge portion of the region of the pixel electrode as a mask. After that, as shown in FIG. 38J, an ITO film for a the pixel electrode 9 is deposited on the entire surface of the substrate 1, and the ITO film is etched using a resist pattern 14j formed on the ITO film as a mask. At this time, the ITO film is etched in the lateral direction but the edge portion of the pixel electrode is covered by the Cr layer 13f. Therefore, the pixel electrode 9 can be formed to have a correct area by both of the ITO film and the Cr layer 13f.

In this way, the conductive films 13e and 13f of the Cr layer are previously formed in the edge portion of the regions for the control electrode 6a and the pixel electrode 9, and then the ITO film is formed. Therefore, even if the ITO film is etched in the lateral direction, the control electrode 6a or the pixel electrode 9 is formed by both of the ITO film and Cr layer 13e, 13f. As the result, the region of the electrode can be correctly controlled.

It should be noted that in this embodiment, the example using the Cr layer as the conductive layer is described. However, it is not limited to the above embodiment and the conductive layer excellent in the fitness with the resist pattern such as a Ti layer can be used in the present invention.

[The Eighth Embodiment]

Next, the manufacturing method of the multidomain liquid crystal display apparatus with the electrically floating pixel electrode structure according to the eighth embodiment of the present invention will be described with reference to FIG. 39A to FIG. 44D. FIG. 39A to FIG. 44D show the manufacturing processes of the active matrix substrate of the multi-domain liquid crystal display apparatus. FIGS. 39A, 40A, 41A, 42A, 43A and 44A are plan views of one pixel, respectively. FIGS. 39B, 40B, 41B, 42B, 43B and 44B are cross sectional views of the pixel transistor section along the A–A' line of the plan views, respectively. FIGS. 39C, 40C, 41C, 42C, 43C and 44C are cross sectional views of the gate terminal section, respectively. FIGS. 39D, 40D, 41D, 42D, 43D and 44D are cross sectional views of the pixel region along the B–B' line of the plan views, respectively. It should be noted that in the eighth embodiment, the method of forming the control electrode and the pixel electrode shown in the seventh embodiment is applied to the first embodiment.

The multi-domain liquid crystal display apparatus with the electrically floating pixel electrode structure according to the eighth embodiment is the liquid crystal display apparatus of the VA mode which uses the liquid crystal molecule having negative permittivity anisotropy and in which the initial orientation of the liquid crystal director is homeotropic orientation to the substrate surface. A pixel transistor, the pixel electrode 9 and a control electrode 6a are formed in each pixel surrounded with gate bus lines 2, common capacitance lines 10 and drain bus lines 5. The control electrode has the structure in which an ITO film bordered with a Cr layer. Also, the pixel electrode 9 is in the electrically floating state and is formed to have predetermined coupling capacitances through a second insulating film 7 and a first insulating film 3 with the control electrode 6a and common capacitance line 10, respectively.

The manufacturing method of the multi-domain liquid crystal display apparatus of such electrically floating pixel electrode structure will be described. First, an Al layer is deposited on a transparent insulative substrate 1 of glass by a sputtering method to have the film thickness of about 200 nm, as shown in FIGS. 39A to 39D. Subsequently, a Ti layer is deposited to have the film thickness of about 0.1 $\mu$m. After that, a resist pattern is formed in the region for gate bus line 2, a gate terminal 2a, and a common capacitance line 10 using a first photomask, and then the metal film is removed from the region which is not covered by the resist pattern by a dry etching method.

Next, a first insulating film 3 composed of silicon nitride SiNx is deposited on the transparent insulative substrate 1 by a CVD method to have the film thickness of about 0.4 $\mu$m, as shown in FIGS. 40A to 40D. Next, an amorphous silicon layer 4a and an n$^+$-type amorphous silicon layer 4b are deposited as the semiconductor layer to have the film thicknesses of about 0.2 $\mu$m and about 50 nm, respectively. After that, a resist pattern is formed for an island 4 region using the second photomask, and the n$^+$-type amorphous silicon layer 4b exposed using the resist pattern and the amorphous silicon layer 4a are removed by a dry etching method.

Subsequently, as shown in FIGS. 41A to 41D, a metal layer such as a Cr layer is formed for source/drain electrodes using a sputtering method to have the film thickness of about 200 nm. After that, a resist pattern is formed in the region for the source/drain electrodes 5b and 5c, a drain bus line 5 and a border electrode 5d of the control electrode using the third photomask. The Cr layer exposed using the resist pattern is wet etched using the etchant of cerium nitrate e ammonium.

Next, as shown in FIGS. 42A to 42D, an ITO film 6 for a transparent electrode is deposited on the transparent insulative substrate 1 by a sputtering method to have the film thickness of about 50 nm, and then a resist pattern is formed using a fourth photomask. The ITO film 6 exposed using the resist pattern is removed by a wet etching method using the mixed acid of nitric acid and hydrochloric acid. In this way, the control electrode 6a is formed to connect with the source electrode 5c. Here, the ITO film 6 is etched in the lateral direction in case of a wet etching method. However, the border electrode 5d of the Cr layer with correct size is previously formed in the edge portion of the ITO film 6 in the eighth embodiment. Therefore, the ITO film 6 and the Cr layer can control the region of the control electrode 6a correctly as a unit. After that, the n$^+$-type amorphous silicon layer 4b in the channel region is removed by a dry etching method using the ITO film 6 as an etching mask to form the pixel transistor.

Subsequently, a second insulating film 7 composed of silicon nitride SiNx is formed by a CVD method to have the film thickness of about 0.3 $\mu$m, as shown in FIGS. 43A to 43D. After that, using the fifth mask, a resist pattern is formed to have openings in a gate terminal 2a, a drain terminal 5a, and a common capacitance line terminal. The exposed second insulating film 7 and the first insulating film 3 are removed by a dry etching method and the gate terminal opening 8a and the drain terminal opening 8b are formed.

Next, as shown in FIGS. 44A to 44D, an ITO film for the pixel electrode 9 is deposited on the transparent insulative substrate 1 by a sputtering method to have the film thickness of about 50 nm. The ITO film exposed using the sixth mask is removed by a wet etching method or a dry etching method. The pixel electrode 9 in the electrically floating state is formed on the control electrode 6a through the second insulating film 7. Also, the pixel opening 11 with a predetermined shape is formed in the pixel electrode 9. Also, the gate terminal 9a and the drain terminal 9b are formed in the gate terminal opening 8a and the drain terminal opening 8b.

In this way, in accordance with the manufacturing method of the multi-domain liquid crystal display apparatus of the electrically floating pixel structure in the eighth embodiment, a border electrode 5d for the control electrode 6a is formed at the same time when the source/drain electrodes are formed. The liquid crystal display apparatus has the pixel electrode 9 in the electrically floating state using six masks, like the first embodiment. Also, it is possible to form the control electrode 6a to have a correct size. Therefore, by controlling the control electrode 6a by the pixel transistor of each pixel, the potential of the pixel electrode 9 is correctly determined based on the region ratio of the electrode.

[The Ninth Embodiment]

Figure 47A:
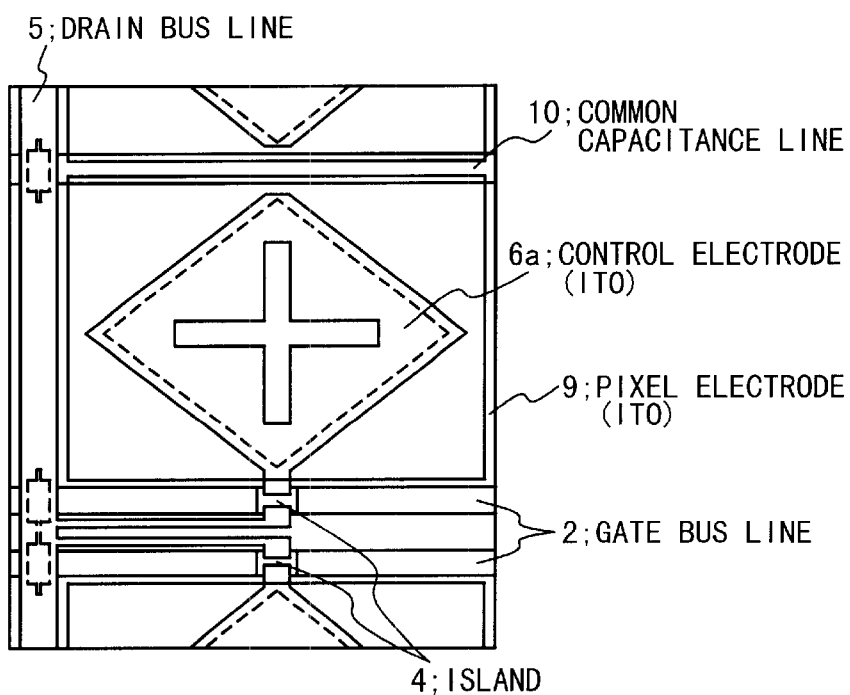
FIGS. 47A and 47B and FIGS. 48A to 48C show the structures of the active matrix substrates of the multi-domain liquid crystal display apparatus according to a ninth embodiment of the present invention.
Figure 47B:
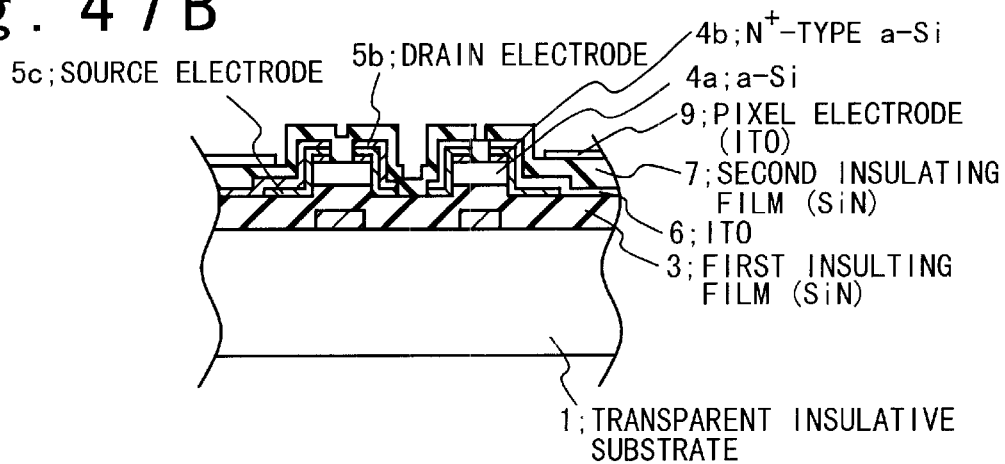
Figure 48A:
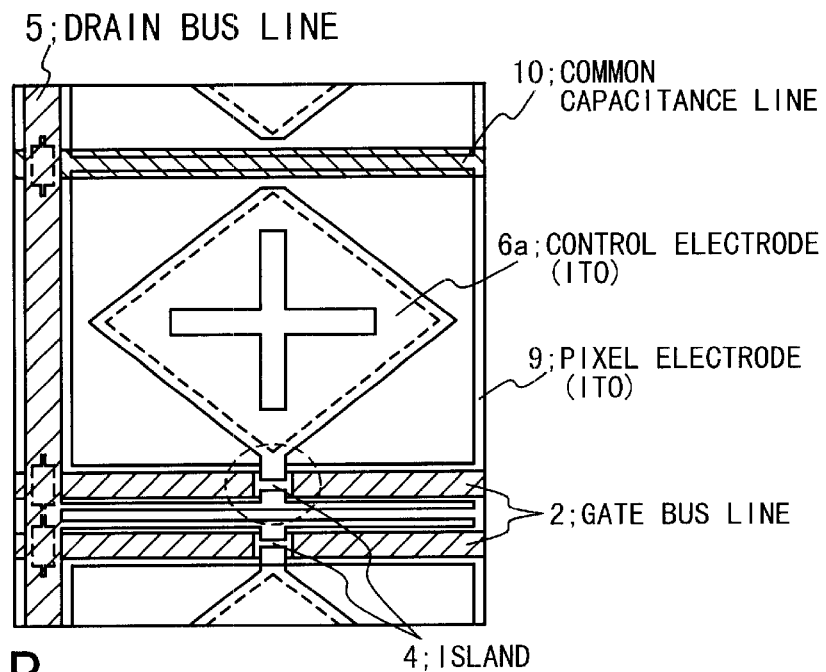
Figure 48B:
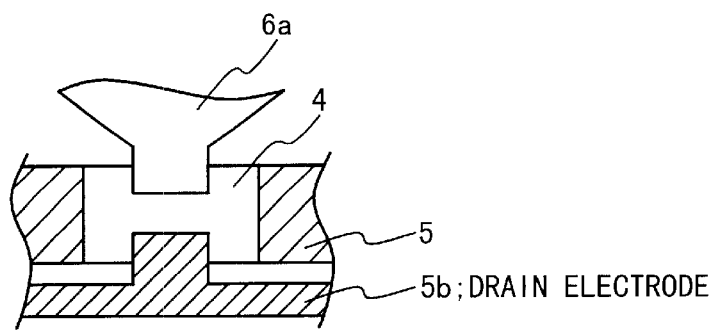
Figure 48C:
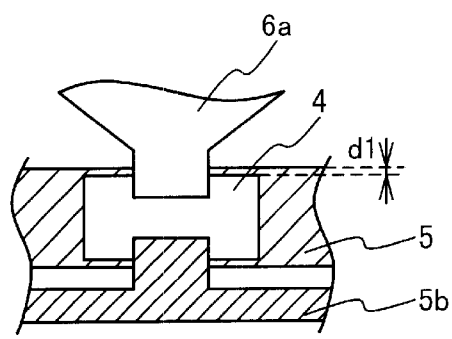

Next, the multi-domain liquid crystal display apparatus of the electrically floating pixel electrode structure according to the ninth embodiment of the present invention will be described with reference to FIGS. 47A and 47B and FIGS. 48A to 48C. FIGS. 47A and 47B show the structure of the active matrix substrate of the multi-domain liquid crystal display apparatus. FIG. 47A is a plan view of one pixel. FIG. 47B is a cross sectional view along the A–A' line of the plan view. Also, FIG. 48A is a pan view of one pixel in a modification of the ninth embodiment. FIGS. 48B and 48C are expanded plan views of a dashed line region, respectively. It should be noted that in this embodiment, a gate bus line, a drain electrode, the shape of an island region are improved and an opening percentage and a view angle characteristic is improved.

First, referring to FIGS. 47A and 47B, the multi-domain liquid crystal display apparatus of the electrically floating pixel electrode structure according to the ninth embodiment has a pixel transistor, a the pixel electrode 9 and a control electrode 6a are formed by each pixel surrounded with gate bus lines 2, and common capacitance lines 10 and drain bus lines 5, like the eighth embodiment. Also, a the pixel electrode 9 in the electrically floating state and forms predetermined coupling capacitances through a second insulating film 7 and a first insulating film 3 with the control electrode 6a and the common capacitance line 10.

Here, in the eighth embodiment, the common capacitance lines 10 are arranged on both sides of the gate bus line 2 of each pixel. However, in the ninth embodiment, the gate bus lines 2 are arranged in parallel such that two pixels adjacent in the direction of the drain bus line 5, i.e., the upper and down directions in the figure are symmetrical with respect to a center line. The common capacitance lines 10 are provided on the opposite side to the gate bus line 2 in each pixel. Two pixels which are continuously formed in the upper and lower directions share the common capacitance lines 10. In this way, the gate bus lines 2 are arranged in parallel and the common capacitance line 10 is shared. As a result, the area of the wiring line which does not contribute to display can be made small so that the opening percentage can be improved.

Also, the first to eighth embodiments, the island 4 where a pixel transistor is formed is formed in the neighborhood of the intersection of the gate bus line 2 and the drain bus line 5. However, in this embodiment, the island 4 is provided on gate bus line 2 on a vertical symmetrical axis of the pixel. The reason is as follows. That is, generally, the control electrode 6a and the pixel electrode 9 are formed to be symmetrical in the left and right sides in the multi-domain liquid crystal display apparatus. Also, the directions of the orientations of liquid crystal molecules are opposite in the left and right portions of the pixel. In this way, the improvement of the view angle characteristic is attempted. When the conductive patterns such as the source/drain electrodes other than the control electrode 6a and the pixel electrode 9 are formed to be asymmetry, the symmetry of the pixel is disturbed.

For example, when the source electrode 5c which is connected with the control electrode 6a is formed to be asymmetry, liquid crystal molecules in the neighborhood of the source electrode 5c have been turned to the direction which is different from the original direction of the orientation, because of the influence of the potential of the source electrode 5c. It is not possible to compensate for the chroma in the left and right portions of the pixel when the distortion of such a direction of the orientation is caused. Also, there is caused a coloring problem. Therefore, in the ninth embodiment, a pixel transistor is provided on a symmetrical axis of the pixel, and the source electrode 5c is symmetrically formed on either side. Thus, the view angle characteristic is improved.

Also, the liquid crystal molecules in the neighborhood of the drain electrode 5b are turned to the direction which is different from the original direction of the orientation, because of the influence of the potential of the drain electrode 5b for connecting the drain bus line 5 and the pixel transistor. In order to prevent it, the drain electrode 5b may be arranged to be symmetrical in the pixel. For example, as shown in FIG. 48A, the drain electrode 5b may be symmetrically arranged on either side by extending the drain electrode 5b to the right direction of the figure in addition to the interval of the pixel transistor and the drain bus line 5. The arrangement makes the direction of orientation of the liquid crystal molecule in the neighborhood of the drain electrode 5b symmetrical on either side, resulting in suppression of the coloring problem.

Also, when the region for the island 4 is formed to stick out of gate bus line 2 in addition to the structure of the ninth embodiment, backlight light is irradiated from below the TFT substrate and is incident on the amorphous silicon layer 4a so that charges are generated. As a result, the characteristic of the transistor has sometimes degraded. Therefore, as shown by FIG. 48B which is an expanded view of the broken line section of FIG. 48A, the island 4 is formed to have the same width as the gate bus line 2 or to have a width narrower than the gate bus line 2, as shown in FIG. 48C. As a result, the backlight light can be shielded by the gate bus line 2 so that the degradation of the transistor characteristic of the pixel transistor can be prevented.

In this way, in accordance with the liquid crystal display apparatus in this embodiment, the gate bus lines 2 of the two pixels adjacent in the direction of the drain bus line 5, i.e., the upper and lower directions in the figure are arranged. The common capacitance line 10 is arranged on the opposite position to the gate bus line in the pixel and is shared by two pixels on the both sides of the line 10. In this way, the number of wiring lines can be reduced so that it is possible to improve opening percentage. Also, a pixel transistor is formed on gate bus line 2 on a symmetrical position with respect to a central vertical line in the pixel, so that the disorder of the direction of orientation due to the potentials of the drain electrode 5b and source electrode 5c can be prevented. Thus, the multi-domain liquid crystal display apparatus with good view angle characteristic can be formed. Moreover, when the pixel transistor is formed not to stick out of the gate bus line 2, the backlight light which is incident on the pixel transistor can be shielded by the gate bus line 2, result in prevention of the degradation of the transistor characteristic.

It should be noted that in the first to eighth embodiments, the liquid crystal display apparatus of the VA mode is described which uses the liquid crystal having negative permittivity anisotropy and the initial orientation of the liquid crystal director is directed to homeotropic orientation to the substrate surface. Each of the structure of the gate bus lines arranged in parallel, the symmetrical structure of the source/drain electrodes in the left and right directions, and the light shielding structure of by the gate bus line to the island in this embodiment is not limited to application to the liquid crystal display apparatus of the VA mode. That is applicable to the other liquid crystal display apparatus of the TN structure and the IPS structure.

[The Tenth Embodiment]

Figure 49:
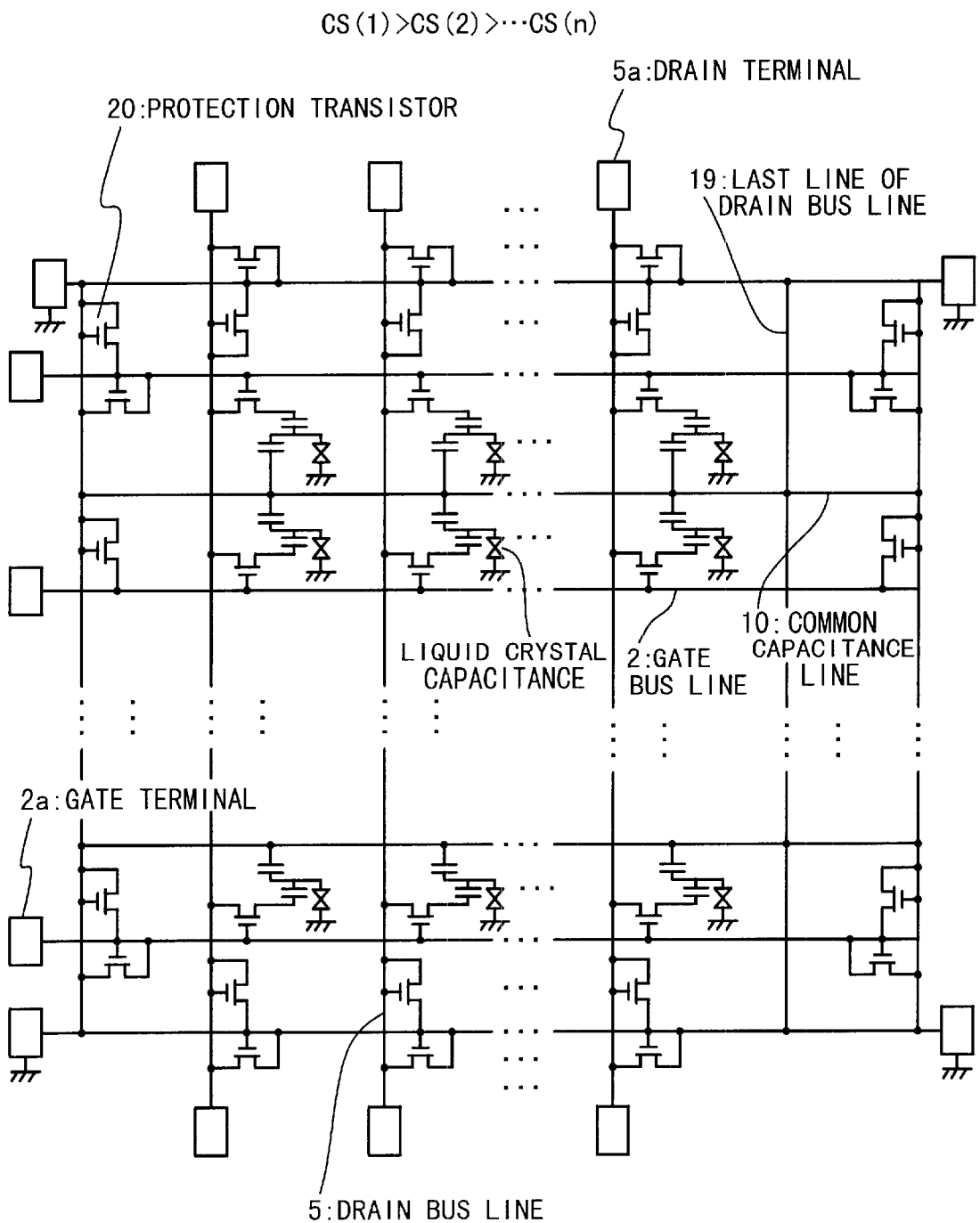
FIG. 49 is a diagram showing an equivalent circuit of the multi-domain liquid crystal display apparatus.
Figure 50A:
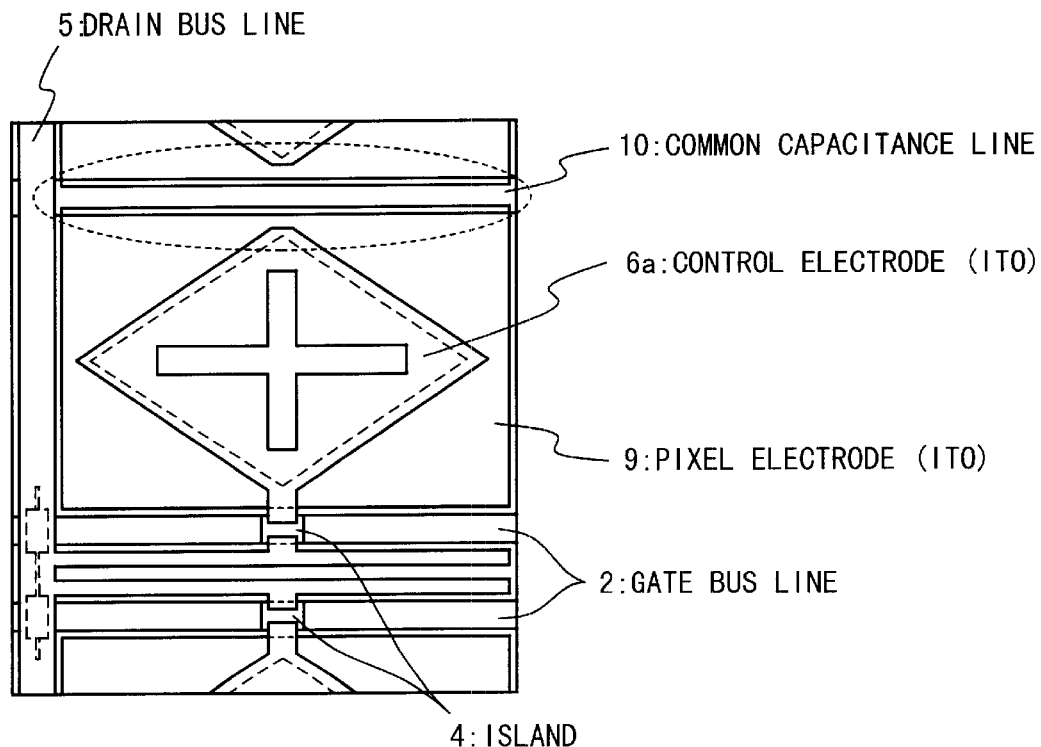
Figure 50B:
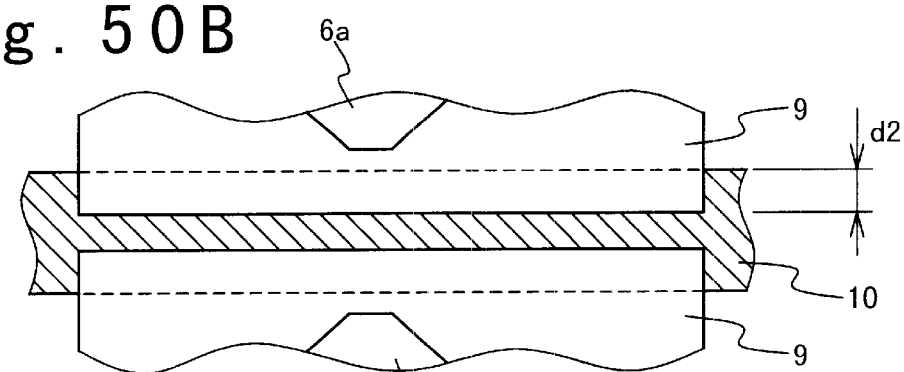
Figure 50C:
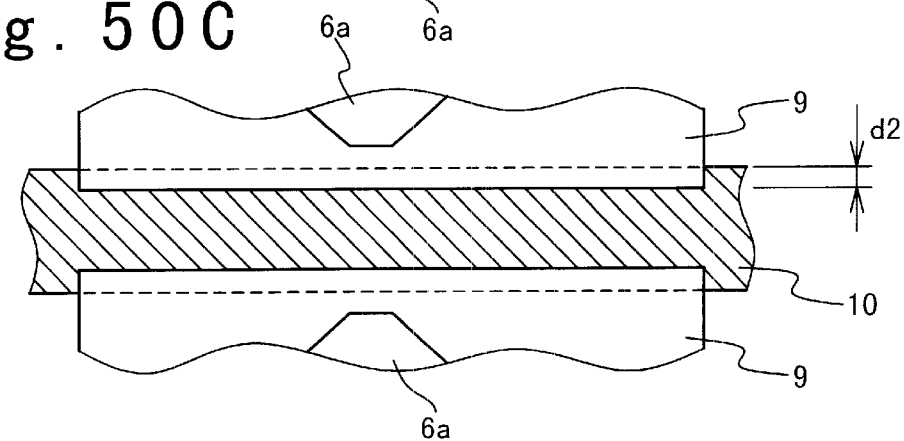
Figure 51:
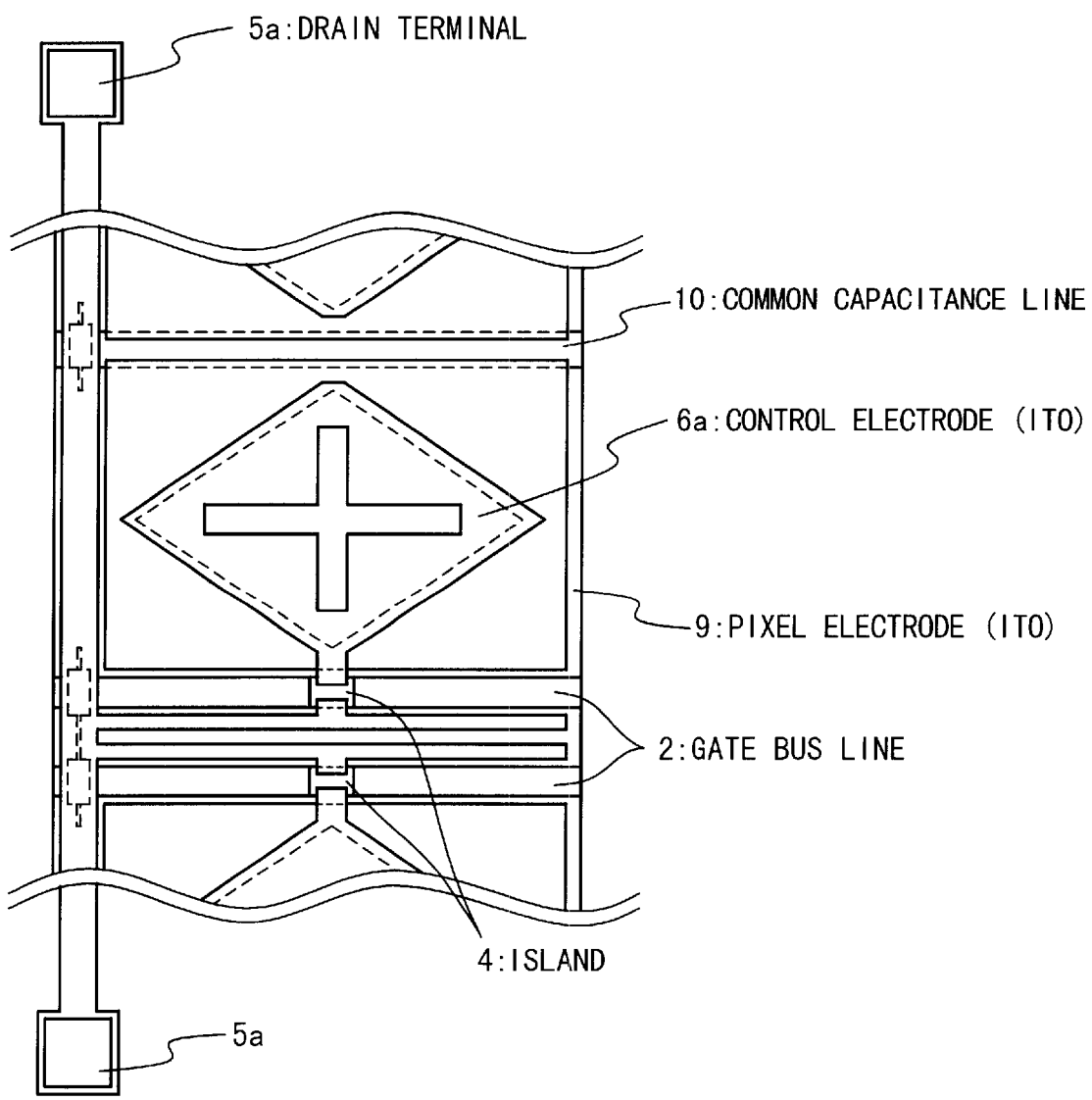
FIG. 51 is a plan view of the active matrix substrate of the liquid crystal display apparatus according to a modification of the tenth embodiment.
Figure 52:
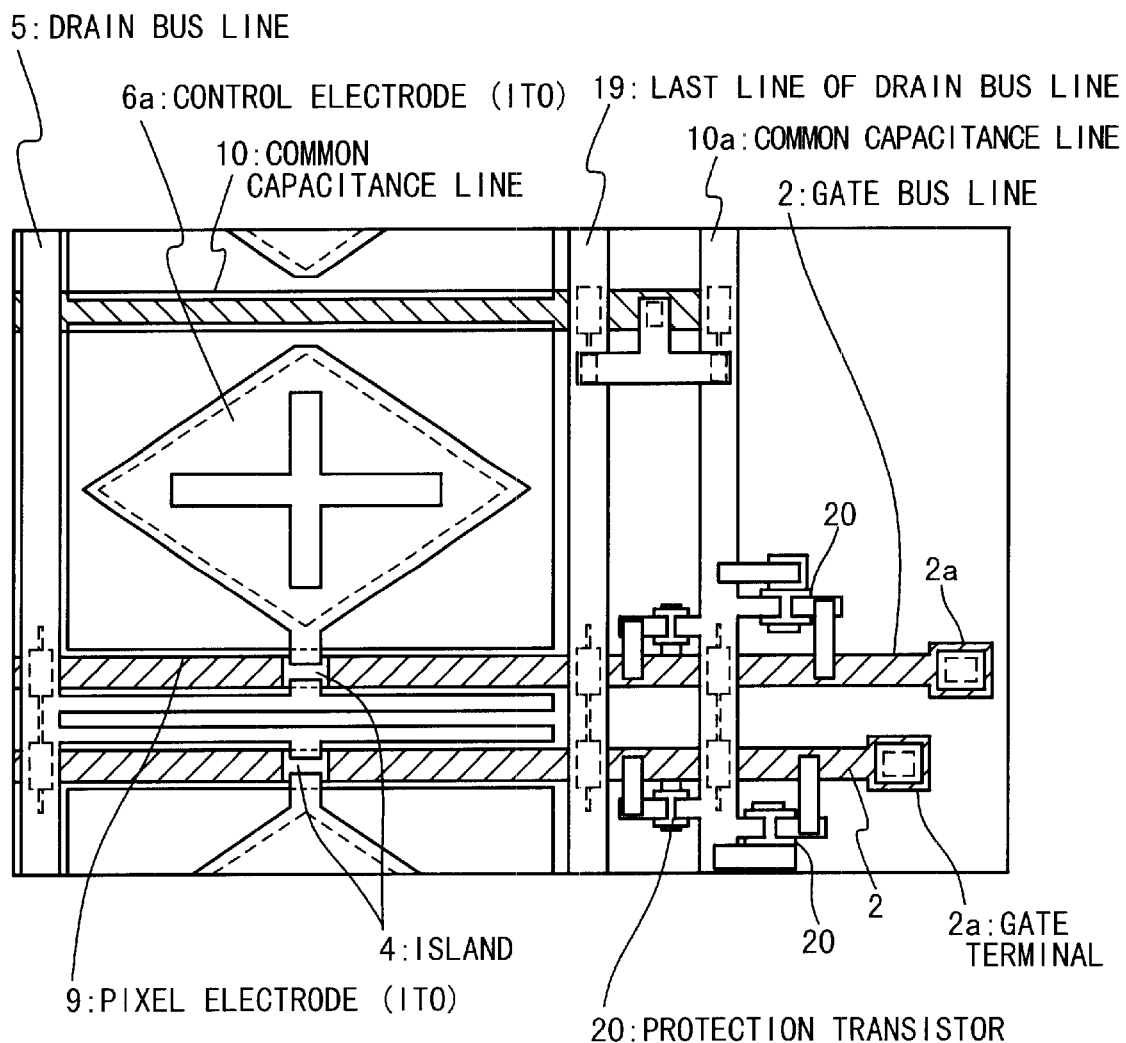
FIG. 52 shows a dummy drain bus line provided for the right or left side of the column of pixels in the ends of the gate bus line 2 in the liquid crystal display apparatus according to another modification of the tenth embodiment.

Next, the multi-domain liquid crystal display apparatus with the electrically floating pixel electrode structure according to the tenth embodiment of the present invention will be described with reference to FIG. 49 and FIG. 50A to FIG. 52. FIG. 49 is a diagram showing an equivalent circuit of the multi-domain liquid crystal display apparatus. Also, FIGS. 50A to 50C are plan views of the structure of the active matrix substrate of the liquid crystal display apparatus. FIG. 50A is a plan views of one pixel, and FIGS. 50B and 50C are expanded plan views of the neighborhood of the common capacitance line in the broken line region of the plan view. Also, FIGS. 51 and 52 are plan views of end portions of a drain bus line and gate bus line on the active matrix substrate showing the tenth embodiment. It should be noted that the uniformity of the display in the panel is improved in this embodiment.

First, the structure of the multi-domain liquid crystal display apparatus of the electrically floating pixel electrode structure will be described with reference to the equivalent circuit of FIG. 49. The pixel electrode 9 in the electrically floating state and forms coupling capacitances through the insulating film with the control electrode 6a and the common capacitance line 10, respectively. In the moment that the gate bus line 2 is selected, a signal voltage is written from the drain bus line 5 to the control electrode 6a connected with the source terminal through the pixel transistor. At this time, the potential of a the pixel electrode 9 in the electrically floating state is set to a predetermined potential between the control electrode 6a potential and the common capacitance line 10 potential in accordance with the ratio with coupling capacitances. When the gate bus line 2 is set to the OFF state, the potential of the pixel electrode 9 is reduced by a feed-through voltage ΔVfd and after that, the potential is gradually small through leak in accordance with predetermined holding characteristic.

This feed-through voltage ΔVfd is caused by that the charge charged in the liquid crystal capacitance and an accumulation capacitance when the gate voltage VG is turned ON is redistributed when the gate voltage VG is turned OFF. In case of the electrically floating pixel electrode structure, when it is supposed that a capacity between the electrically floating pixel electrode and the common capacitance wiring line is CS, and a parasitic capacitance between the gate line and the source electrode is CGS, this feed-through voltage ΔVfd is approximately expressed as follow.

$$\Delta Vfd = (CGS/(CGS+CS)) \times Vg \quad (1)$$

Aiming at a single gate bus line 2, the voltage Vg applied to the gate bus line 2 through the gate bus terminal drives the pixel transistors provided for the neighborhood of the intersections with the drain bus line 5 in order. At this time, when the pixel which is far from the gate terminal is driven, the voltage Vg becomes small gradually due to the voltage drop by the wiring line resistance. In the case, ΔVfd changes gradually in the direction of the gate bus line 2, gradation occurs in the potential of the pixel electrode 9 so that the uniformity of the display in the panel is degraded.

Therefore, in this embodiment, to prevent the change of the feed-through voltage ΔVfd which accompanies the voltage drop of the voltage Vg, i.e., the change of the voltage of the pixel electrode 9, the capacity CS between the pixel electrode 9 and the common capacitance line 10 is changed for every pixel to compensate the decrease of the voltage Vg. This will be described with reference to FIG. 49 and FIGS. 50B and 50C which are expanded plan views of a region of the common capacitance line 10.

First, as shown in FIG. 50B, in the pixel having the small voltage drop near a gate terminal, i.e., the left pixel of FIG. 49, the overlapping width d2 of the pixel electrode 9 and the common capacitance line 10 is wide. On the other hand, as shown in FIG. 50C, in the pixel far from the gate terminal, that is, on the right side of FIG. 49, the overlapping width d3 of the pixel electrode 9 and the common capacitance line 10 is made narrow. In this way, the overlapping width of the electrodes or the overlapping area becomes smaller in the pixel far from the gate terminal. As a result, the capacity CS becomes small. Therefore, it is possible to compensate the voltage drop of the voltage Vg into the direction of the gate bus line 2 by the capacity CS, so that the change of feed-through voltage ΔVfd is suppressed over the whole panel and the change of the voltage of the pixel electrode 9 can be restrained.

Also, for the purpose of the improvement of the uniformity of the display of the whole panel, it is important to prevent the voltage drop of the drain bus line 5 and the delay of the signal in addition to prevention of the voltage drop in the gate bus line 2. As shown in FIG. 51, the drain terminals can be provided for both ends of each drain bus line 5. In this way, when the drain terminals are provided for both ends of the drain bus line 5, a distance between the drain terminal and each pixel can be made short. The decrease of the potential of the drain bus line 5 which is written in the control electrode 6a and the delay due to the wiring line of the drain bus line 5 can be prevented so that the uniformity of the display can be improved over the whole panel.

Also, the voltage drop and the delay due to the wiring line can be eased if the metal film of Cr for the gate bus line 2 and the drain bus line 5 is made thick, and a bus line may be formed of metal with high electric conductivity such as Mo and Al in place of Cr.

It should be noted that in the liquid crystal display apparatus of the electrically floating pixel electrode structure according to the present invention, the drain bus line 5 is composed of a laminate film of a metal layer such as the Cr layer for the source/drain electrodes and the ITO film for the control electrode 6a (the first embodiment), or a laminate film of a semiconductor layer of the amorphous silicon layer 4a and the n$^+$-type amorphous silicon layer 4b, the metal layer such as the Cr layer for the source/drain electrodes and the ITO film for the control electrode 6a (the second to fifth embodiments), as shown in the manufacturing method of the above embodiments. Therefore, the resistance of the drain bus line 5 is small, compared with the conventional liquid crystal display apparatus. Also, the structure of the present invention is excellent in the voltage drop and the viewpoint of the prevention of the wiring line delay.

As described above, the uniformity of the display of the whole panel is described. Considering the columns of pixels, the columns of pixels other than the column of pixels on the rightmost side in FIG. 49 into the direction of the gate bus line 2 are sandwiched by the drain bus line 5 which is connected with the pixel transistors of the pixels of each column and the drain bus line 5 of the neighbor column of pixels. On the other hand, there is not one of the drain bus lines in the column of pixels on the rightmost or leftmost side in FIG. 49, for example.

Here, liquid crystal molecules in the neighborhood of the drain bus line 5 in each pixel undergoes influence of the potential of the drain bus line 5 and is directed to have the orientation which is different from the original orientation. However, the drain bus lines 5 exist on both sides in the column of pixels except for the column of pixels on the rightmost or leftmost side. Therefore, the region where the orientations are opposite in the left and right regions of the pixel is formed. As the result, symmetry of the orientations is kept. The column of pixels undergoes influence of the drain bus line 5 in the left side of the figure and does not undergo the influence in the right side of the figure. Therefore, the symmetry of the orientations is lost and the coloring is caused.

For this reason, a dummy drain bus line 19 is provided outside the column of pixels on the rightmost or leftmost side such that the symmetry is kept. In this way, it is prevented that the coloring is caused around the panel. As a result, the uniformity of the display can be improved. In this case, the potential to be applied to the dummy drain bus line 5a is the same potential as that of the common capacitance line 10, the same potential as that of the neighbor drain bus line 5, the same potential as that of the drain bus line 5 connected with the column of pixels on the position opposite to the concerned column of pixels in the panel, or an average of potentials applied to the drain bus lines 5.

For example, the potential of the common capacitance line 10 is applied as shown on the right side of FIG. 52 on the circuit diagram. On the structure, as shown in FIG. 52, the dummy drain bus line 19 is provided for the right or left side of the column of pixels in the ends of the gate bus line 2. The dummy drain bus line 19 and the common capacitance line 10 are connected through contact holes provided for both.

In this way, the overlapping area of the pixel electrode 9 and the common capacitance line 10 is made smaller depending on the distance from the drain terminal, so that the capacitances between both of the electrodes are made small gradually. Also, the drain terminals are provided for both ends of the drain bus line. In this way, the influence of the voltage drop on the drain bus line 5 and the influence of the signal delay can be prevented so that the display can be made uniform over the whole panel. Also, the dummy drain bus line 19 is provided outside the column of pixels on the rightmost or leftmost side in the direction of the gate bus line 2. Therefore, the symmetry of each pixel is secured and it is possible to prevent the coloring around the panel.

It should be noted that in this embodiment, the liquid crystal display apparatus of the VA mode using the liquid crystal molecules having negative permittivity anisotropy and directed in the perpendicular orientation is described. However, the present invention is not limited to the above embodiment, and can be applied to the other liquid crystal display apparatuses of the TN structure and the IPS structure, like the ninth embodiment.

[The Eleventh Embodiment]

Figure 53A:
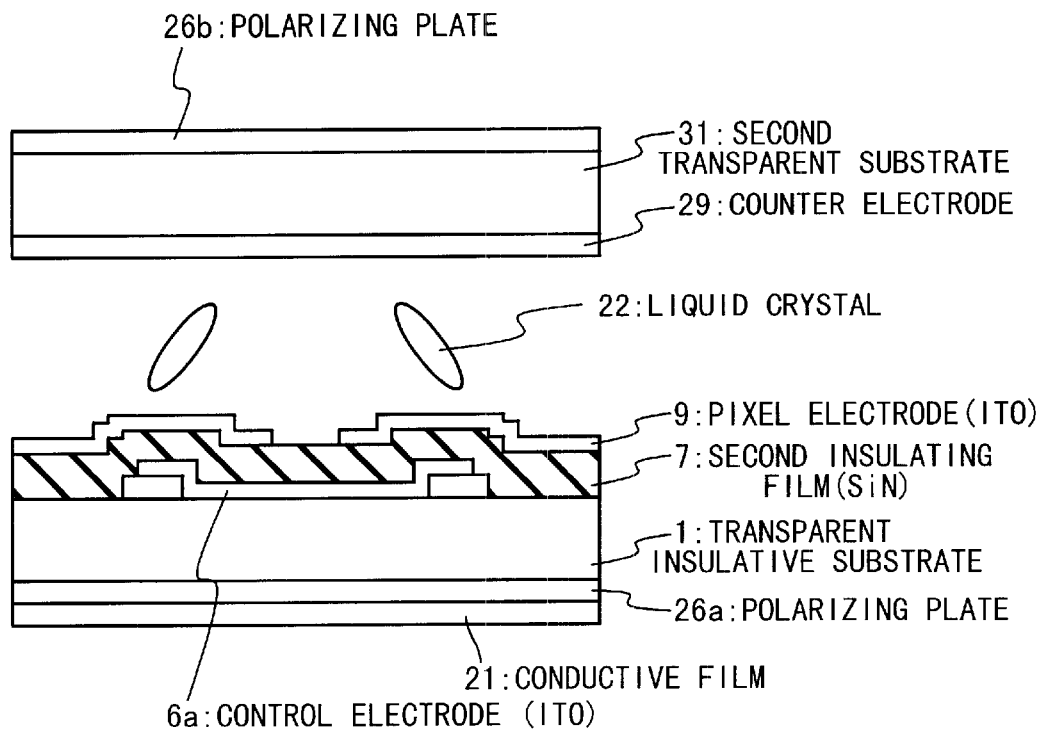
FIGS. 53A and 53B are cross sectional views showing the structure of the pixel region of the multi-domain liquid crystal display apparatus according to an eleventh embodiment of the present invention.
Figure 53B:
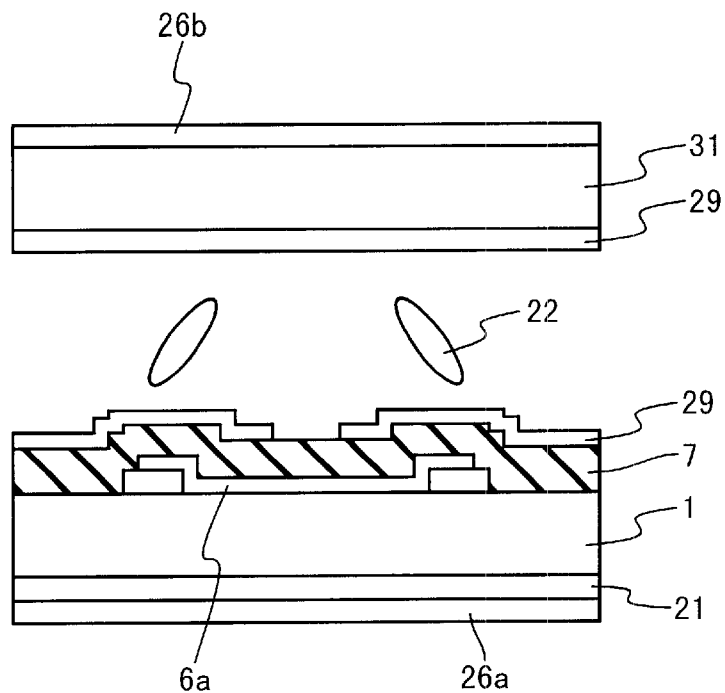
Figure 54A:
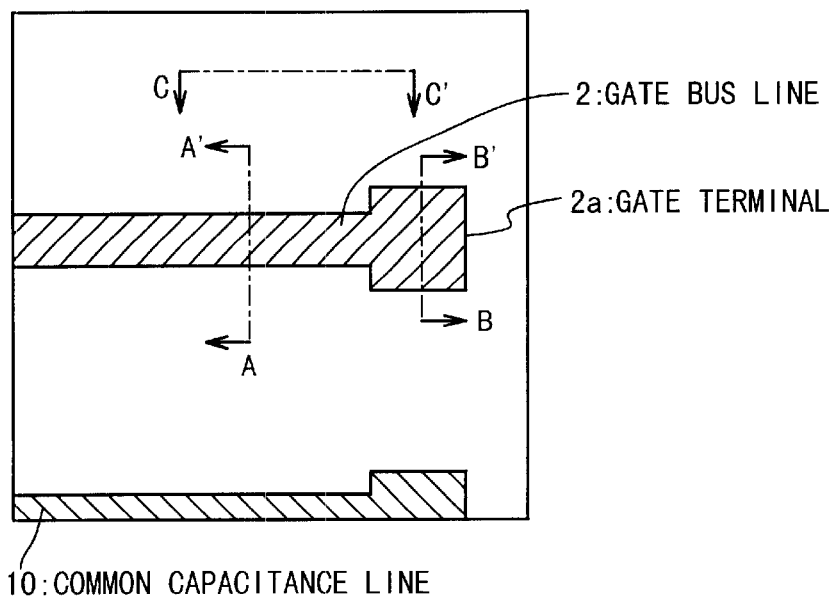
Figure 54B:
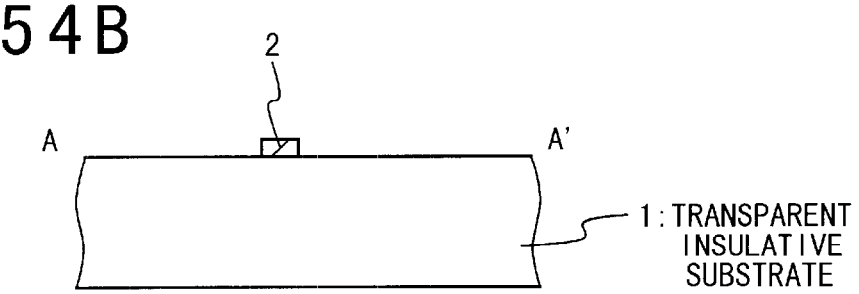
FIGS. 54B, 55B, 56B, 57B, 58B, 59B, and 60B are cross sectional views of the TFT section along the A–A' lines of the plan views, respectively.
Figure 54C:
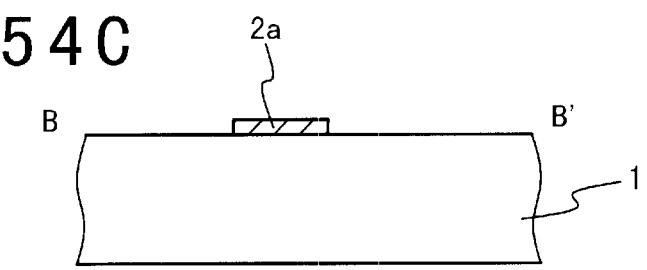
FIGS. 54C, 55C, 56C, 57C, 58C, 59C, and 60C are cross sectional views of the gate terminal section along the B–B' lines of the plan views, respectively.
Figure 54D:
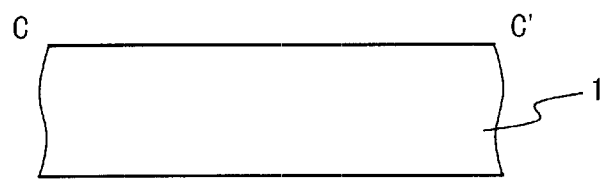
Figure 55A:
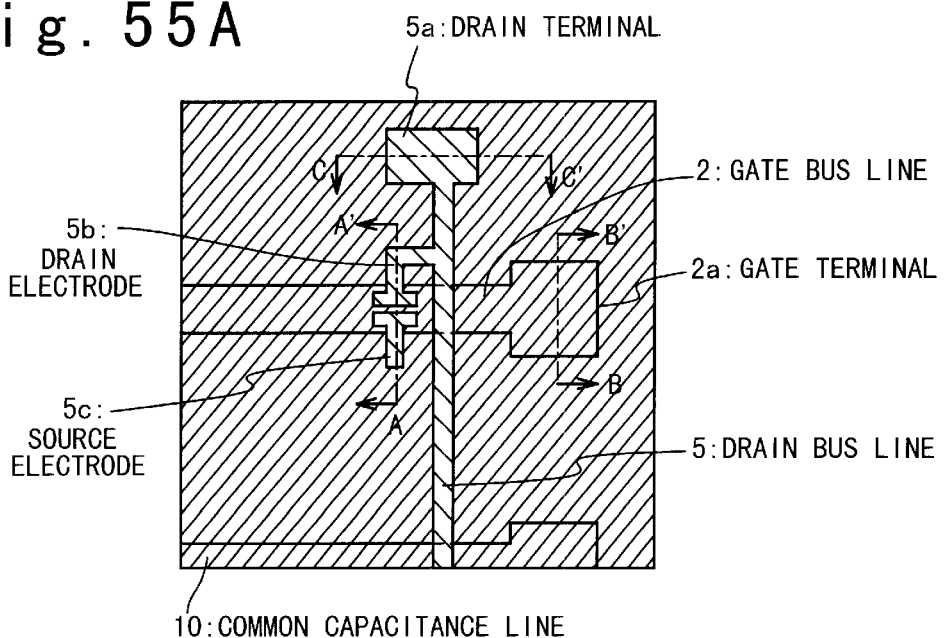
Figure 55B:
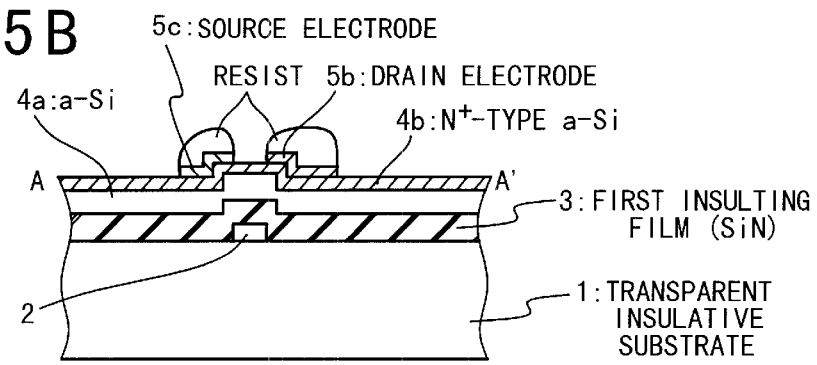
Figure 55C:
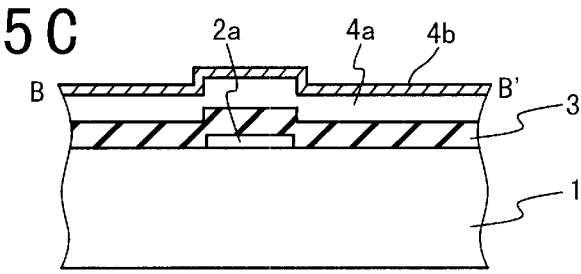
Figure 55D:
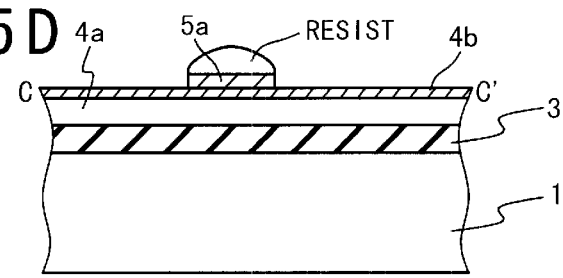
Figure 56A:
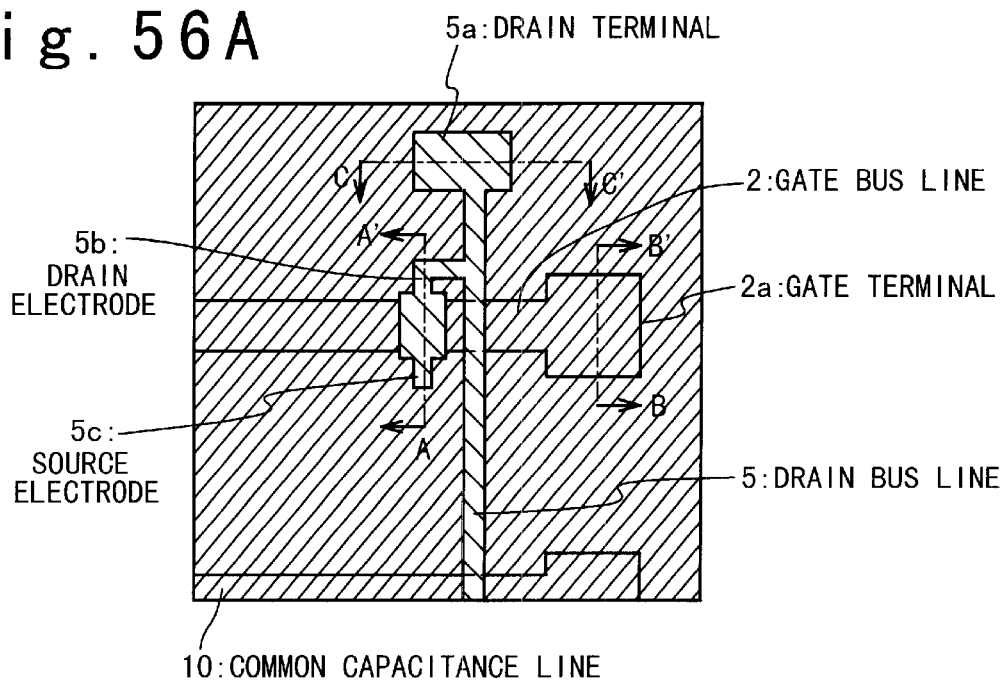
Figure 56B:
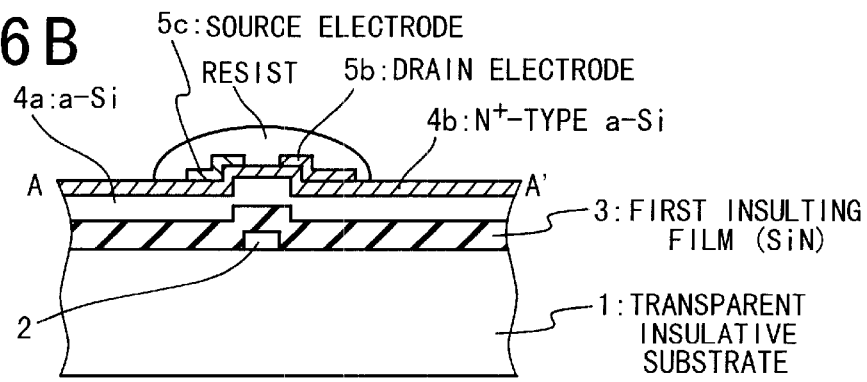
Figure 56C:
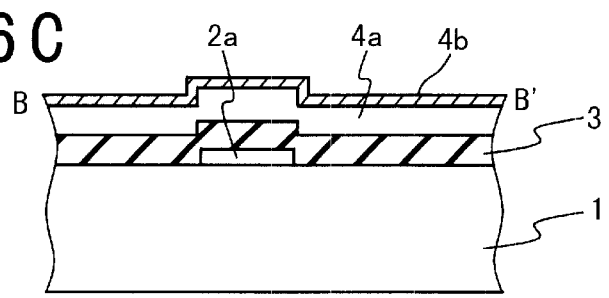
Figure 56D:
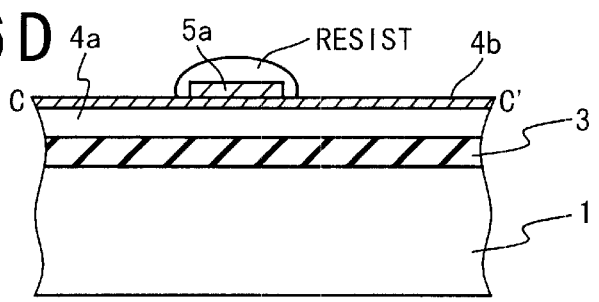

Next, the multi-domain liquid crystal display apparatus with the electrically floating pixel electrode structure according to the eleventh embodiment of the present invention will be described with reference to FIGS. 53A and 53B. FIGS. 53A and 53B are cross sectional views showing the structure of the pixel region of the multi-domain liquid crystal display apparatus. It should be noted that in the eleventh embodiment, a conductive film is formed of outside the TFT substrate and an electrostatic measure is carried out to the liquid crystal display apparatus.

In the multi-domain liquid crystal display apparatus of the electrically floating pixel electrode structure, the pixel electrode 9 is in the electrically floating state and forms the coupling capacitances through the insulating film with the control electrode 6a and the common capacitance line 10, respectively. Therefore, the multi-domain liquid crystal display apparatus of the electrically floating pixel electrode structure is easy to receive the influence of static electricity and external electric field to the substrate compared with the conventional liquid crystal display apparatus of usual structure.

Therefore, in this embodiment, a conductive film 21 is formed on or above the opposite surface of the active matrix substrate to the counter substrate the liquid crystal display apparatus. For example, as shown in FIG. 53A, the conductive film 21 such as an ITO film and an organic conductive film to transmit light and to have conductivity is formed after a polarizing plate 16a are put on the TFT substrate of the side of the pixel transistor. The conductive film 21 is grounded at the end of the substrate. Besides, as shown in 56B, a conductive film 21 is formed on or above the opposite surface of the active matrix substrate to the counter substrate, and then a polarizing plate 16a is put on the conductive film 21. Thus, the charging up of the static electricity and the influence of an external electric field can be prevented.

It should be noted that the conductive film 21 is formed on the side of the TFT substrate in the eleventh embodiment. The reason is that a counter electrode is formed on the entire inner surface of the counter substrate to prevent the electrostatically charging and influence of external electric field. Moreover, to improve the effect, it is possible to form a conductive film 21 on the side of the counter substrate. Also, the conductive film 21 in the eleventh embodiment can apply to the liquid crystal display apparatus of the perpendicular orientation liquid crystal display apparatus and the liquid crystal display apparatus of the TN structure or IPS structure in addition to the liquid crystal display apparatus of the VA mode. This is the same as the ninth and tenth embodiments.

[The Twelfth Embodiment]

The manufacturing method of the multi-domain liquid crystal display apparatus of the electrically floating pixel electrode structure according to the twelfth embodiment of the present invention will be described with reference to FIG. 54A to FIG. 60D. FIG. 54A to FIG. 60D show the manufacturing processes of the active matrix substrate of the multi-domain liquid crystal display apparatus. FIGS. 54A, 55A, 56A, 57A, 58A, 59A, and 60A are plan views of one pixel, respectively. FIGS. 54B, 55B, 56B, 57B, 58B, 59B, and 60B are cross sectional views of the TFT section along the A–A' line of the plan views, respectively. FIGS. 54C, 55C, 56C, 57C, 58C, 59C, and 60C are cross sectional views of the gate terminal section along the B–B' line of the plan views, respectively. FIGS. 54D, 55D, 56D, 57D, 58D, 59D and 60D are cross sectional views of the drain terminal section along the C–C' line of the plan views, respectively.

The multi-domain liquid crystal display apparatus with the electrically floating pixel electrode structure according to the twelfth embodiment is the liquid crystal display apparatus of the VA (Vertically Aligned) mode which uses the liquid crystal with negative permittivity anisotropy, and which the initial orientation of the liquid crystal director has homeotropic (perpendicular) orientation to the substrate surface. One pixel is composed by the region surrounded with a plurality of the gate bus lines 2 extending into a row direction, and the common capacitance lines 10 and a plurality of the drain bus lines 5 extending into a column direction. Each pixel has a TFT, a pixel electrode 9 and a control electrode 6a. The TFT is of a bottom gate structure and is formed using an amorphous layer (a-Si layer) or a polysilicon layer as an active layer. Also, the pixel electrode 9 is in the electrically floating state. The pixel electrode 9 forms predetermined coupling capacitances through a first insulating film 3 and/or a second insulating film 7 with the control electrode 6a and the common capacitance line 10, respectively. Then, a common electrode is formed on a counter substrate, and both the substrates are supported to have a predetermined interval and liquid crystal is interposed between them.

The manufacturing method of the multi-domain liquid crystal display apparatus of such electrically floating pixel electrode structure will be described. A Cr layer is deposited on a transparent insulative substrate 1 of glass to have the film thickness of about 200 nm using a sputtering method, as shown in FIGS. 54A to 54D. After that, a resist pattern is formed in the region for the gate bus line 2, the gate terminal 2a, and the common capacitance line 10 using a first photomask. The Cr layer in the region which is not covered by the resist pattern is removed by a wet etching method.

Next, a first insulating film 3 of silicon nitride SiNx is deposited on the transparent insulative substrate 1 by a CVD method to have the film thickness of about 0.4 μm, as shown in FIGS. 55A to 55D. Then, an a-Si layer 4a and an $n^+$-type a-Si layer 4b are deposited as a semiconductor layer to have the film thicknesses of about 0.3 μm and about 50 nm, respectively. Subsequently, a metal layer such as a Cr layer for source/drain electrodes is deposited using a sputtering method to have the film thickness of about 200 nm. After that, a resist pattern is formed in the region for a drain terminal 5a and the source/drain electrodes 5b and 5c and the drain bus line 5 using a second photomask. The exposed Cr layer is removed by a wet etching method and a dry etching method.

Next, the above-mentioned resist pattern is exposed in the vapor atmosphere of organic solvent for resist such as NMP (N-methyl-2-pyrrolidone) so that the resist pattern is deformed as shown in FIGS. 56A to 56D.

Next, the exposed $n^+$-type a-Si layer 4b and the a-Si layer 4a are removed by a dry etching method using the deformed resist pattern. When the resist pattern is peeled off, the structure shown in FIGS. 57A to 57D can be obtained.

Next, a transparent electrode film 6 such as an ITO film is deposited on the transparent insulative substrate 1 by a sputtering method to have the film thickness of about 50 nm. After that, a resist pattern is formed using a third photomask. The ITO film 6 exposed as shown in FIGS. 58A to 58D is removed by a wet etching method or a dry etching method. Thus, the control electrode 6a is formed to connect with the source electrode 5c. After that, the $n^+$-type a-Si layer 4b in the channel region and a part of the a-Si layer 4a are removed by a dry etching method to form a TFT, using the ITO film 6 on the source/drain metal layer of Cr, or the source/drain metal layer an etching mask.

Next, a second insulating film 7 of silicon nitride SiNx is formed by a CVD method to have the film thickness of about 0.3 μm. Then, using a fourth mask, a resist pattern is formed to have openings in the gate terminal 2a, the drain terminal 5a, and the common capacitance line terminal. The exposed second insulating film 7 and the first insulating film 3 are removed by a dry etching method. As shown in FIGS. 59A to 59D, the gate terminal opening 8a, the drain terminal opening 8b, and the common capacitance terminal opening 8c are formed.

Next, an ITO film 9 is deposited for the pixel electrode 9 on the transparent insulative substrate 1 by a sputtering method to have the film thickness of about 50 nm. After that, the ITO film 9 exposed using a fifth mask is removed by a wet etching method or a dry etching method. The pixel electrode 9 is formed to be in the electrically floating state through the second insulating film 7 on the control electrode 6a, as shown in FIGS. 60A to 60D. Also, the pixel opening 11 of a predetermined shape is formed in the pixel electrode 9. Also, the gate terminal 9a, the drain terminal 9b, the common capacitance terminal 9c are formed in the gate terminal opening 8a, the drain terminal opening 8b, and the common capacitance terminal opening 8c. It should be noted that in the liquid crystal display apparatus, a protection transistor is generally provided to prevent electrostatic destruction. However, in case of the manufacturing method of this embodiment, the connection of the gate layer 17 and the drain layer 18 in the protection transistor has the structure shown in FIG. 45A.

In this way, in accordance with the manufacturing method of the multi-domain liquid crystal display apparatus of the electrically floating pixel structure in this embodiment, the liquid crystal display apparatus with the pixel electrode 9 in the electrically floating state electrically can be formed using the five masks. The pixel electrode 9 can form coupling capacitances through the first insulating film 3 and the second insulating film 7, with the control electrode 6a and the common capacitance line 10, respectively. Therefore, the control electrode 6a is controlled by the TFT of each pixel. In this way, two electrode potentials of the control electrode 6a and the pixel electrode 9 can be easily controlled by one TFT.

It should be noted that in this embodiment, the control electrode and the pixel electrode have the shapes shown in the figures and Cr is used for the gate metal and source/drain electrodes. However, the present invention is not limited to the above embodiment. If the control electrode and the pixel electrode are sufficient to have the shapes in such a manner that the control electrode and the pixel electrode can divide the orientation of liquid crystal into a plurality of groups. Also, the other materials having equivalent characteristics may be used for the gate metal, the source/drain electrode metal, and the first and the second insulating films. For example, Cr/Al, Mo may be used as electrode metal and Mo may be used as the source/drain electrode metal.

[The Thirteenth Embodiment]

The manufacturing method of the multi-domain liquid crystal display apparatus with the electrically floating pixel!electrode structure according to the thirteenth embodiment of the present invention will be described with reference to FIG. 54A to FIG. 58D, FIGS. 61A to 61D and FIGS. 62A to 62D. FIG. 54A to FIG. 58D, FIGS. 61A to 61D and FIGS. 62A to 62D show the manufacturing processes of the active matrix substrate of the multi-domain liquid crystal display apparatus. FIGS. 54A, 55A, 56A, 57A, 58A, 61A and 62A are plan views of one pixel, respectively. FIGS. 54B, 55B, 56B, 57B, 58B, 61B and 62B are cross sectional views of a TFT section along the A–A' line of the plan views, respectively. FIGS. 54C, 55C, 56C, 57C, 58C, 61C and 62C are cross sectional views of a gate terminal section along the B–B' line of the plan views, respectively. FIGS. 54D, 55D, 56D, 57D, 58D, 61D and 62D are cross sectional views of a drain terminal section along the C–C' line of the plan views, respectively.

The multi-domain liquid crystal display apparatus of the electrically floating pixel electrode structure according to the thirteenth embodiment is the liquid crystal display apparatus of the VA(Vertically Aligned) mode which uses the liquid crystal having negative permittivity anisotropy, and in which the initial orientation of the liquid crystal director has homeotropic (perpendicular) orientation to the substrate surface. One pixel is formed by the region surrounded by a plurality of the gate bus lines 2 extending into a row direction, and the common capacitance lines 10 and a plurality of the drain bus lines 5 extending into a column. Each pixel has a TFT, a pixel electrode 9 and a control electrode 6a. The TFT is bottom gate structure and is formed using an amorphous silicon (a-Si) layer or a polysilicon layer as the active layer. The pixel electrode 9 is in the electrically floating state. Also, the pixel electrode 9 forms in predetermined coupling capacitances through a first insulating film 3 and a second insulating film 7, with the control electrode 6a and the common capacitance line 10, respectively. Then, a common electrode is formed on a counter substrate, and both the substrates are supported to have a predetermined interval and liquid crystal is interposed between them.

Figure 57A:
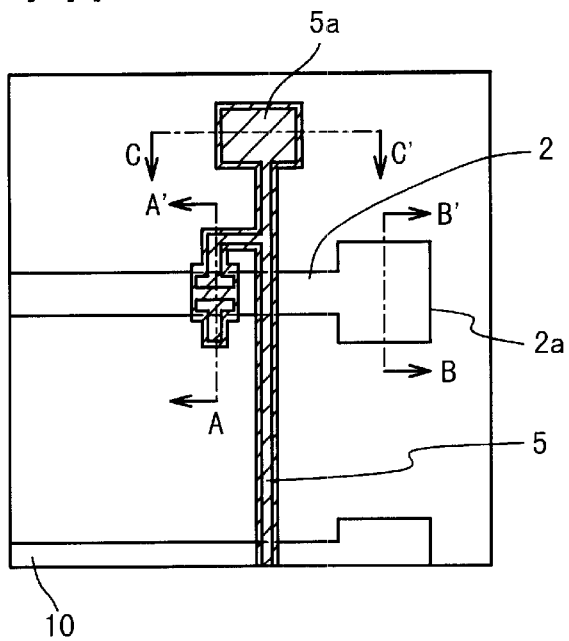
Figure 57B:
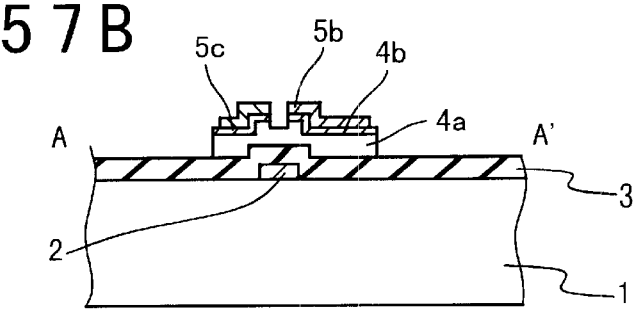
Figure 57C:
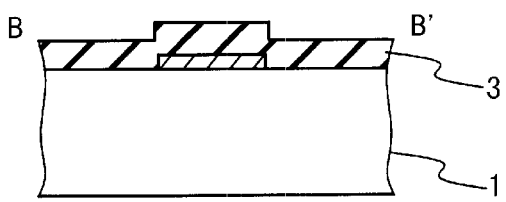
Figure 57D:
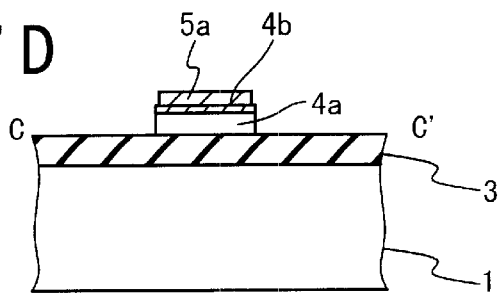
Figure 58A:
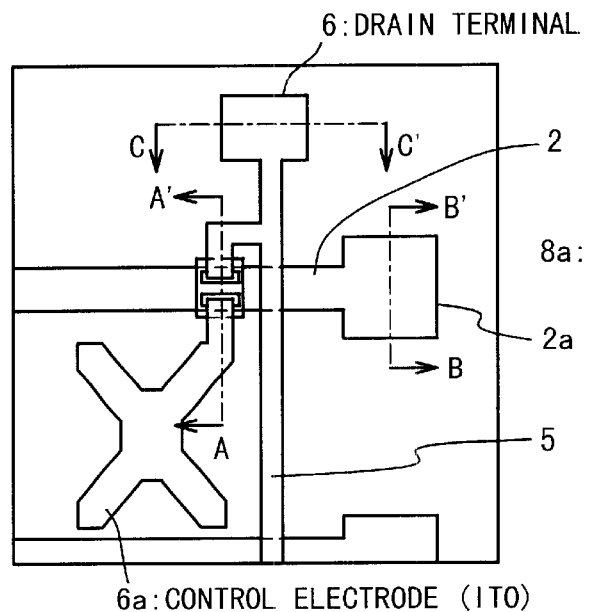
Figure 58B:
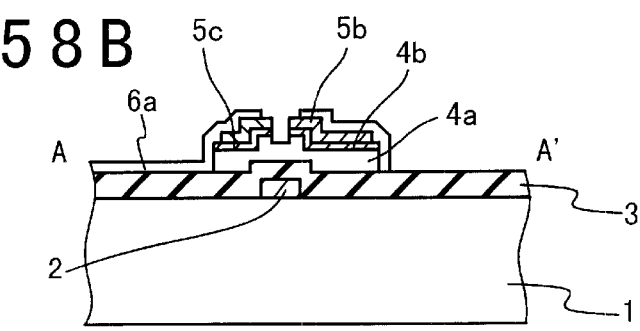
Figure 58C:
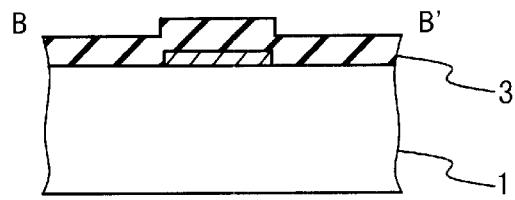
Figure 58D:
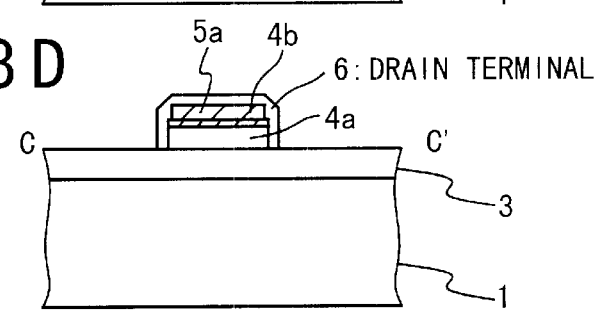
Figure 59A:
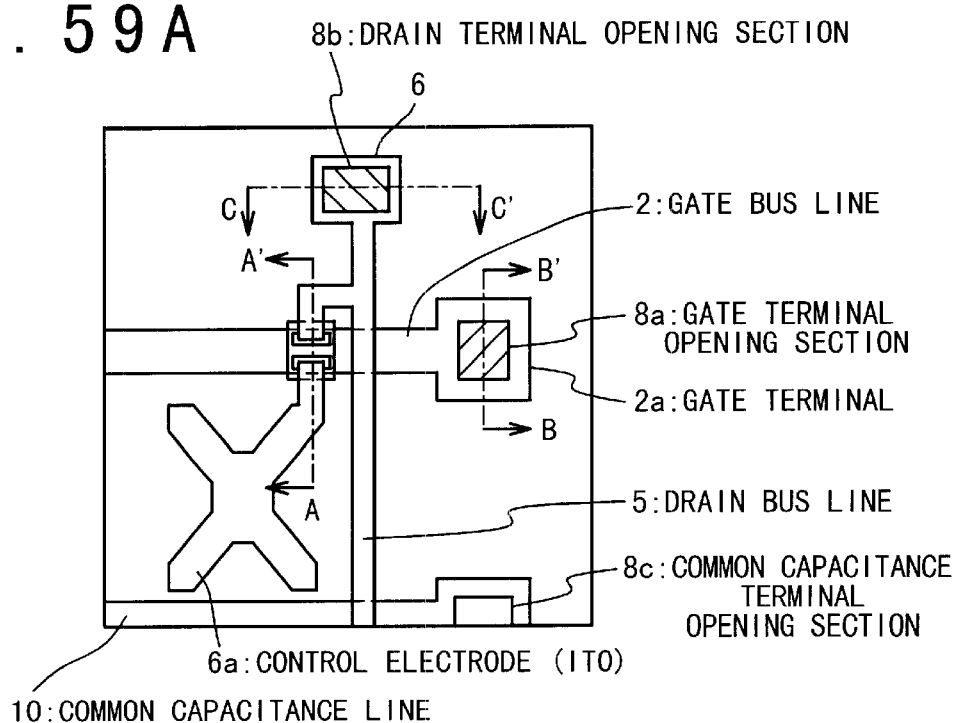
Figure 59B:
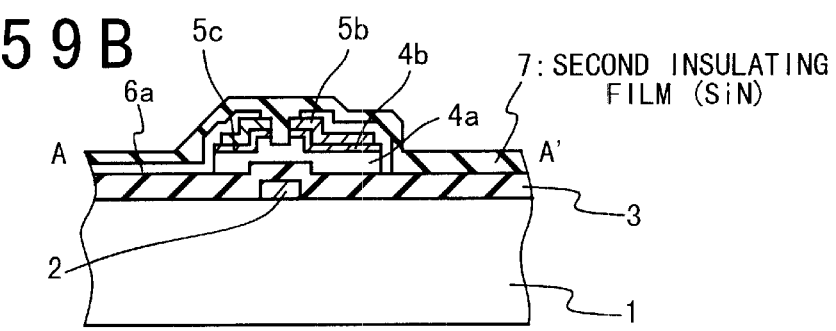
Figure 59C:
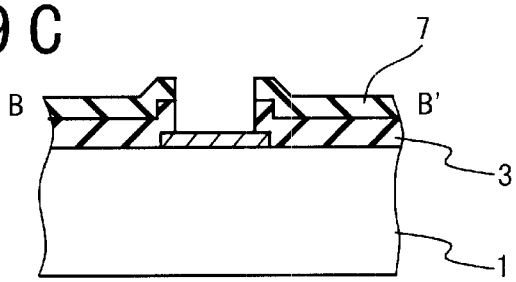
Figure 59D:
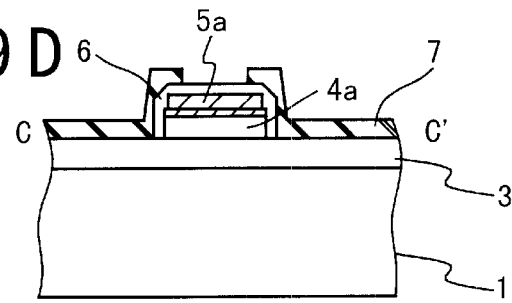
Figure 60A:
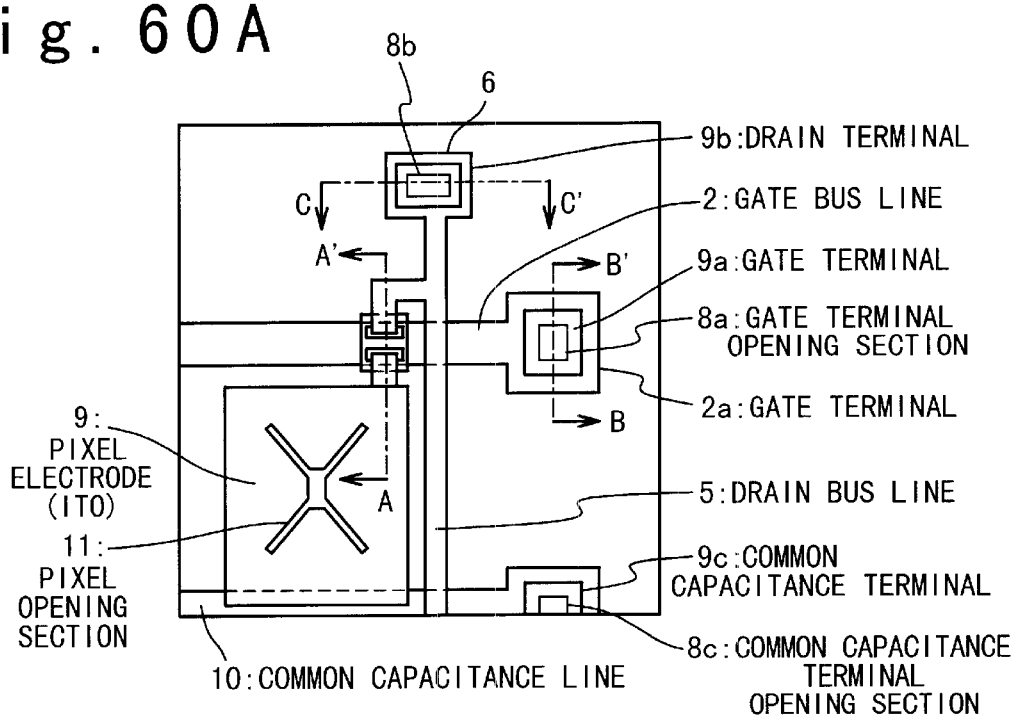
Figure 60B:
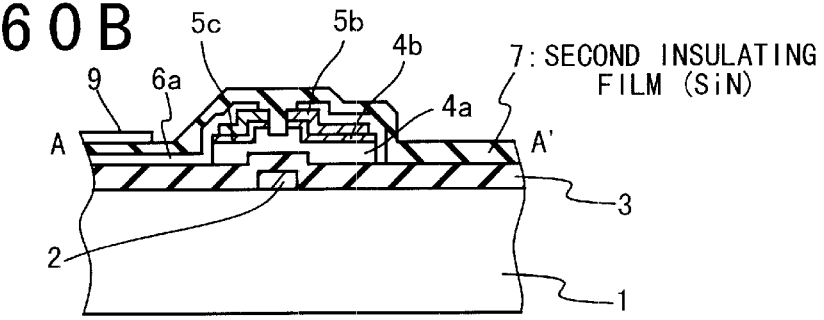
Figure 60C:
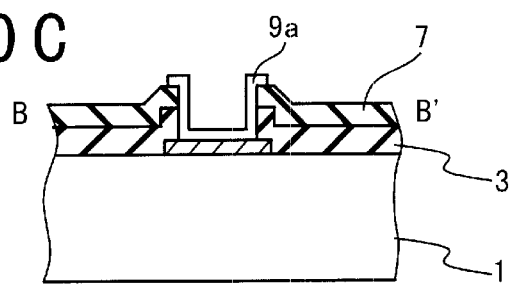
Figure 60D:
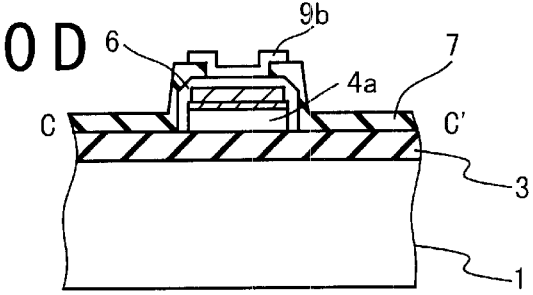
Figure 61A:
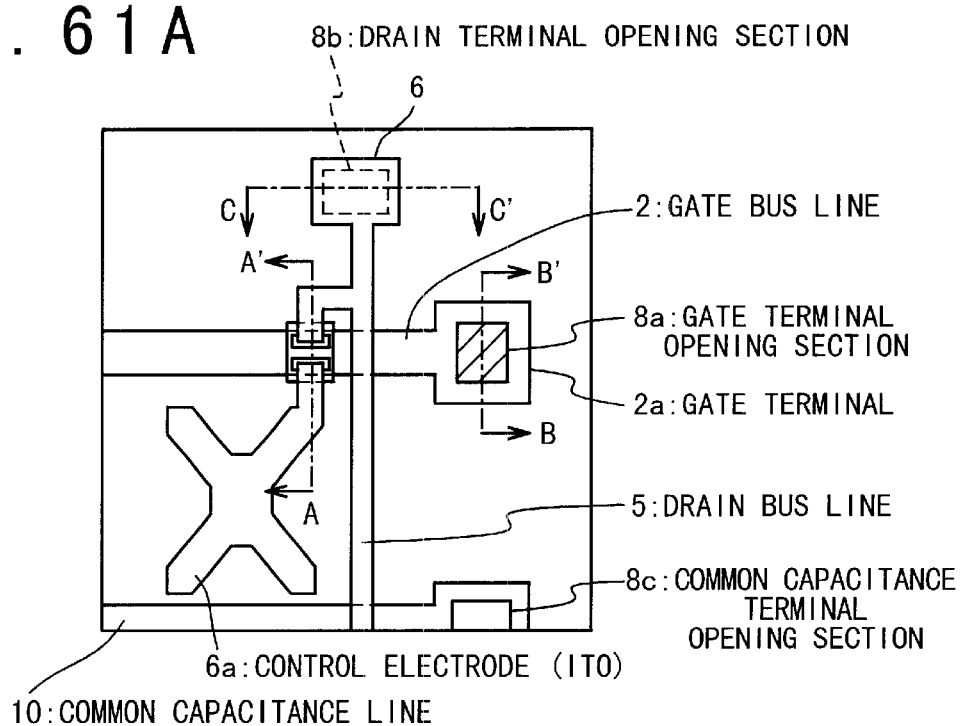
Figure 61B:
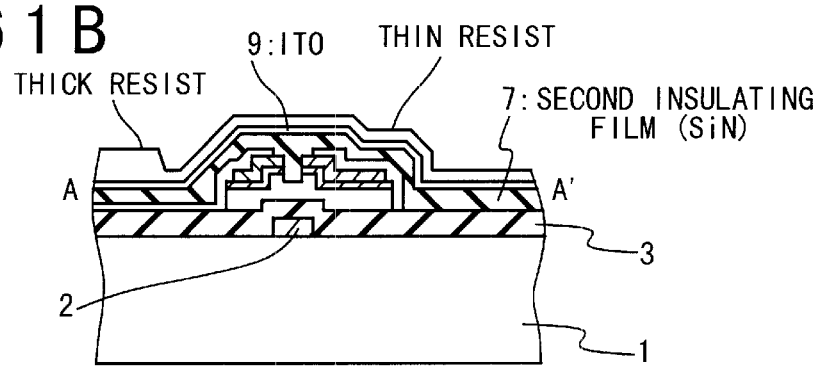
FIGS. 61B and 62B are cross sectional views of a TFT section along the A–A' lines of the plan views, respectively.
Figure 61C:
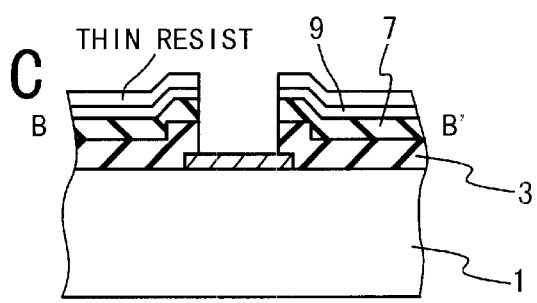
FIGS. 61C and 62C are cross sectional views of a gate terminal section along the B–B' lines of the plan views, respectively.
Figure 61D:
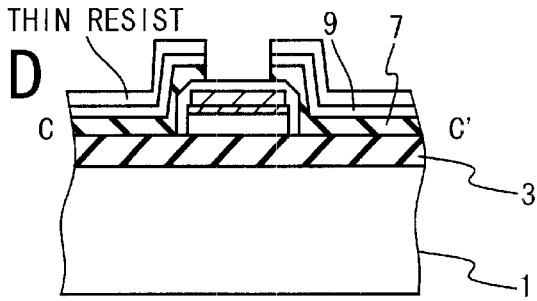
Figure 62A:
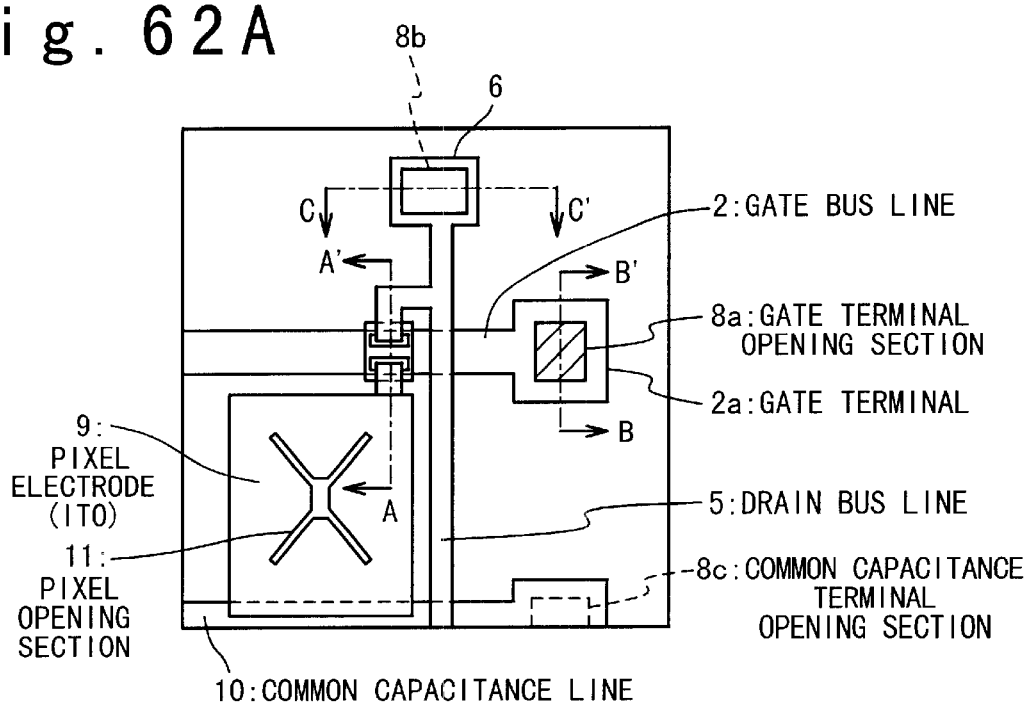
Figure 62B:
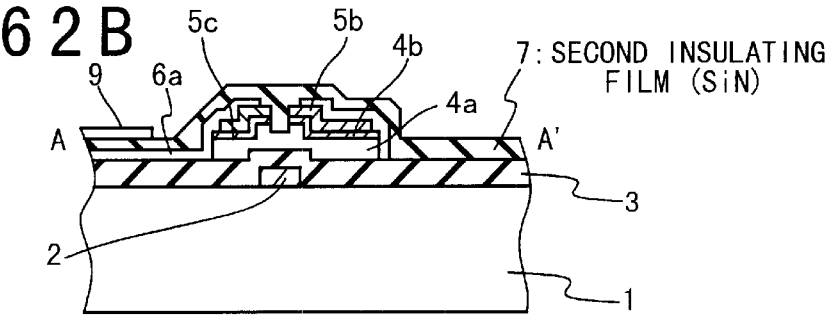
Figure 62C:
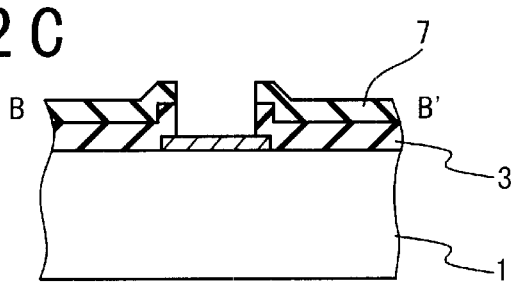
Figure 62D:
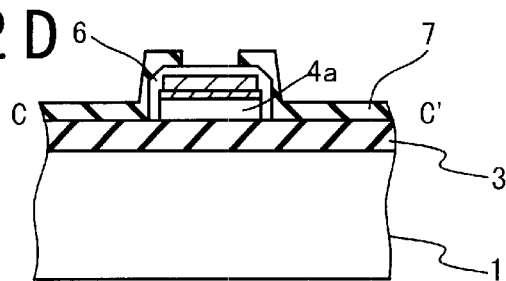
Figure 63A:
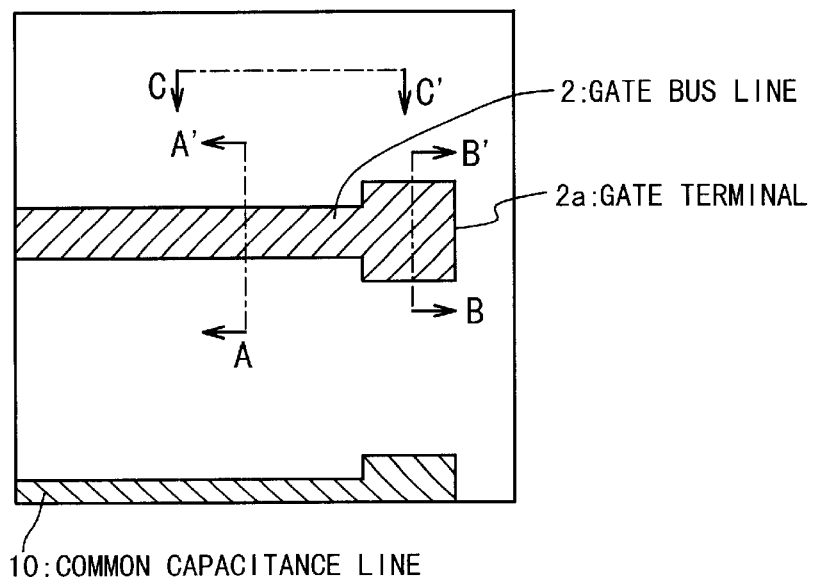
Figure 63B:
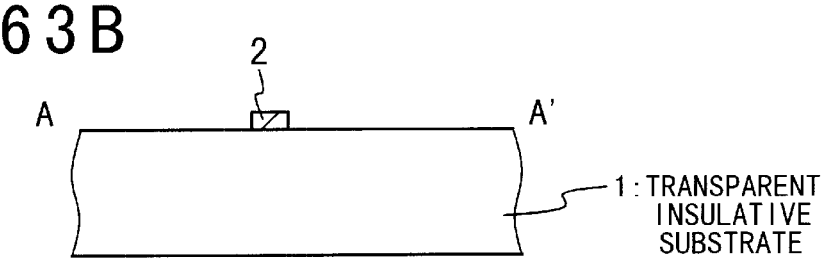
FIGS. 63B, 64B, 65B, 66B, 67B and 68B are cross sectional views of a TFT section along the A–A' lines of the plan views, respectively.
Figure 63C:
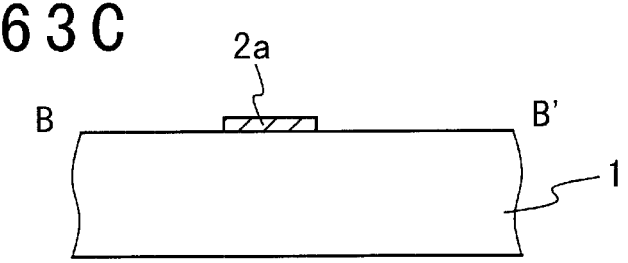
FIGS. 63C, 64C, 65C, 66C, 67C and 68C are cross sectional views of a gate terminal section along the B–B' lines of the plan views, respectively.
Figure 63D:
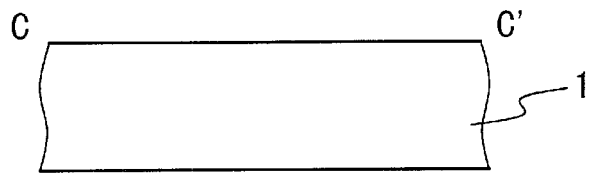
Figure 64A:
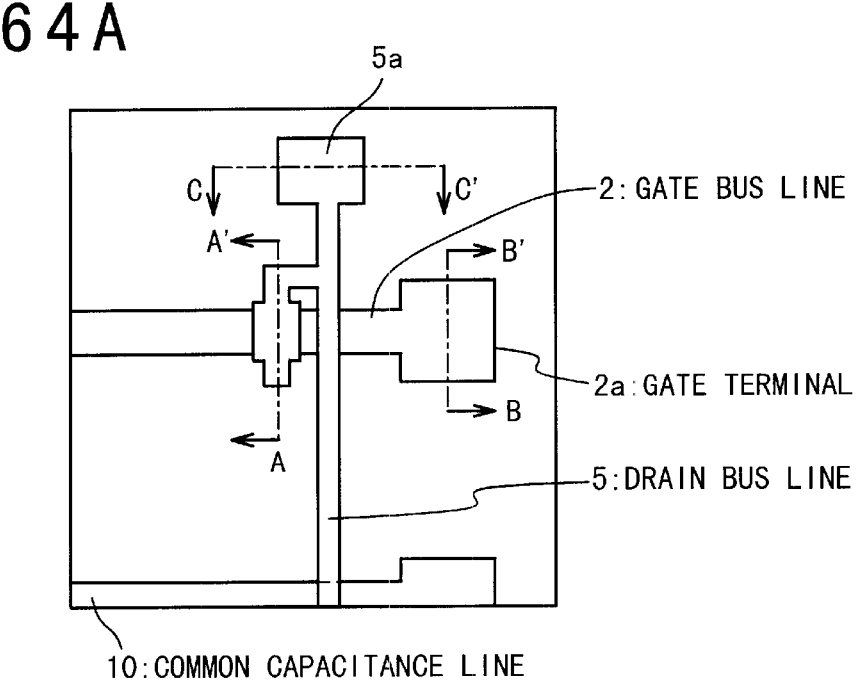
Figure 64B:
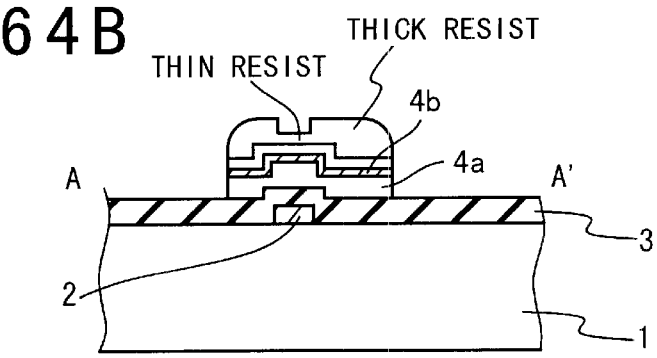
Figure 64C:
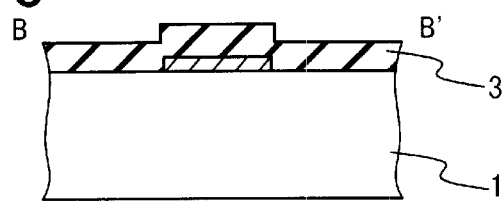
Figure 64D:
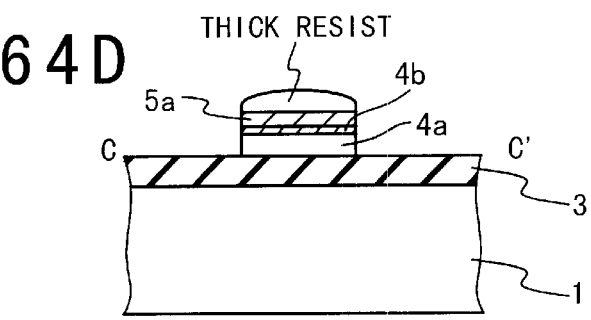
Figure 65A:
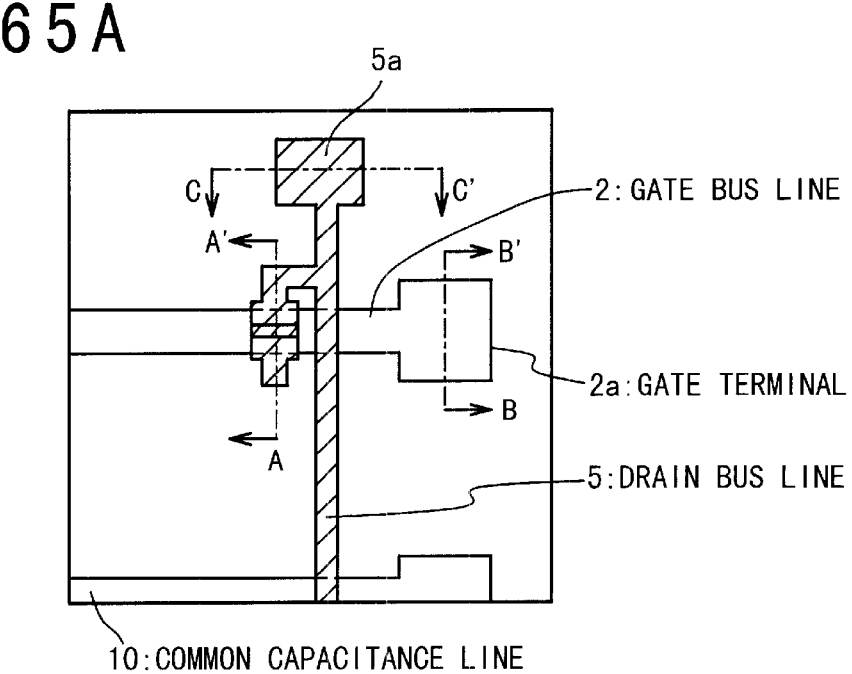
Figure 65B:
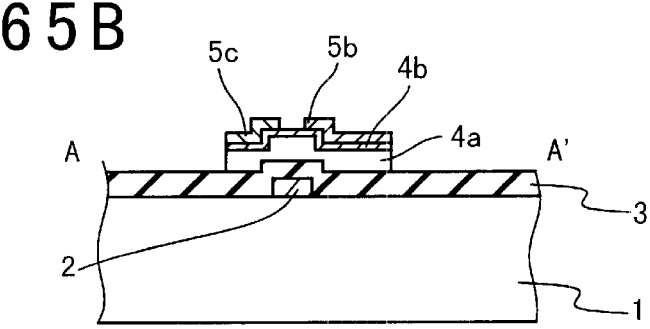
Figure 65C:
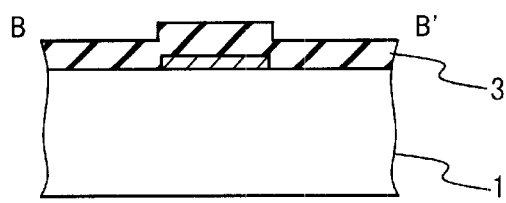
Figure 65D:
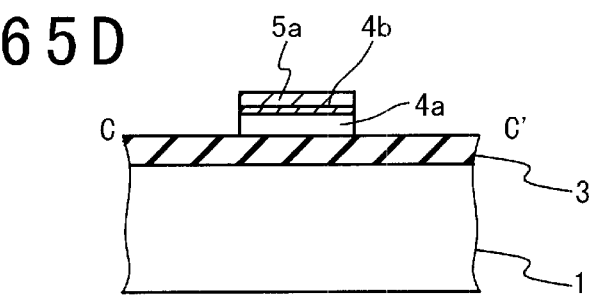
Figure 66A:
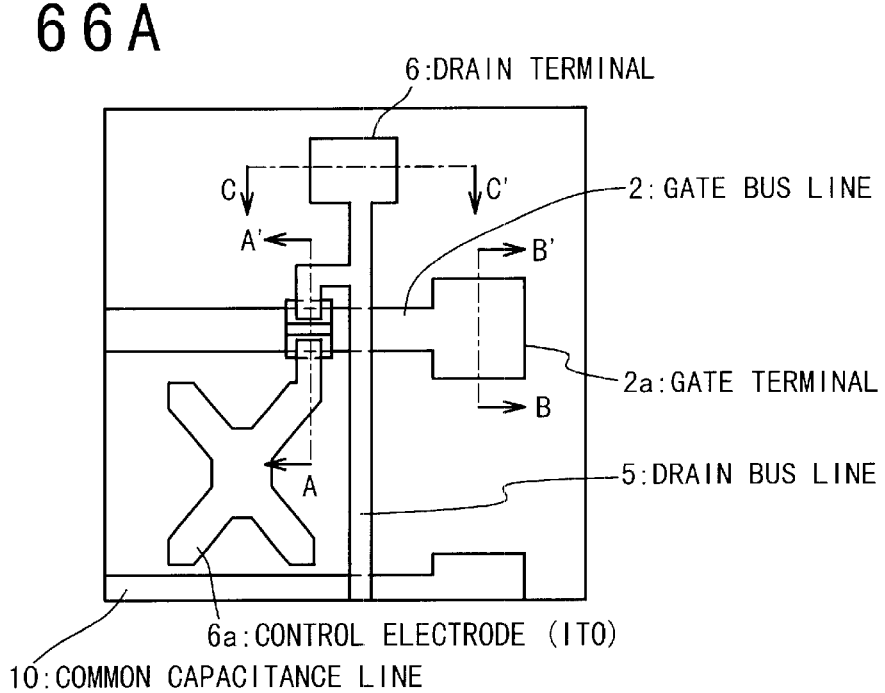
Figure 66B:
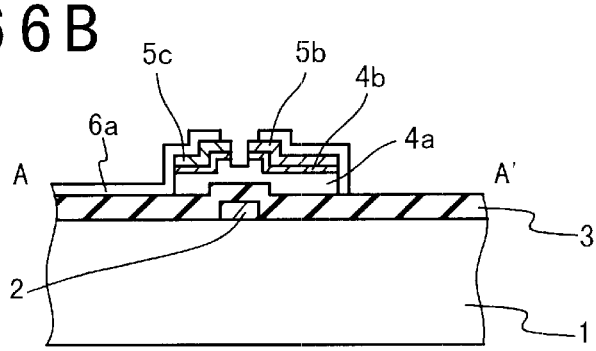
Figure 66C:
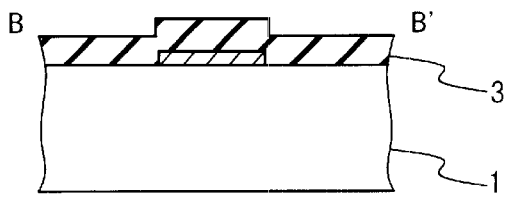
Figure 66D:
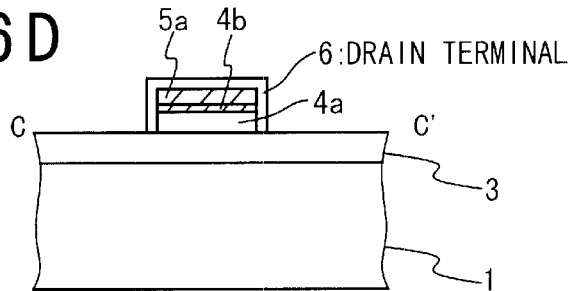
Figure 67A:
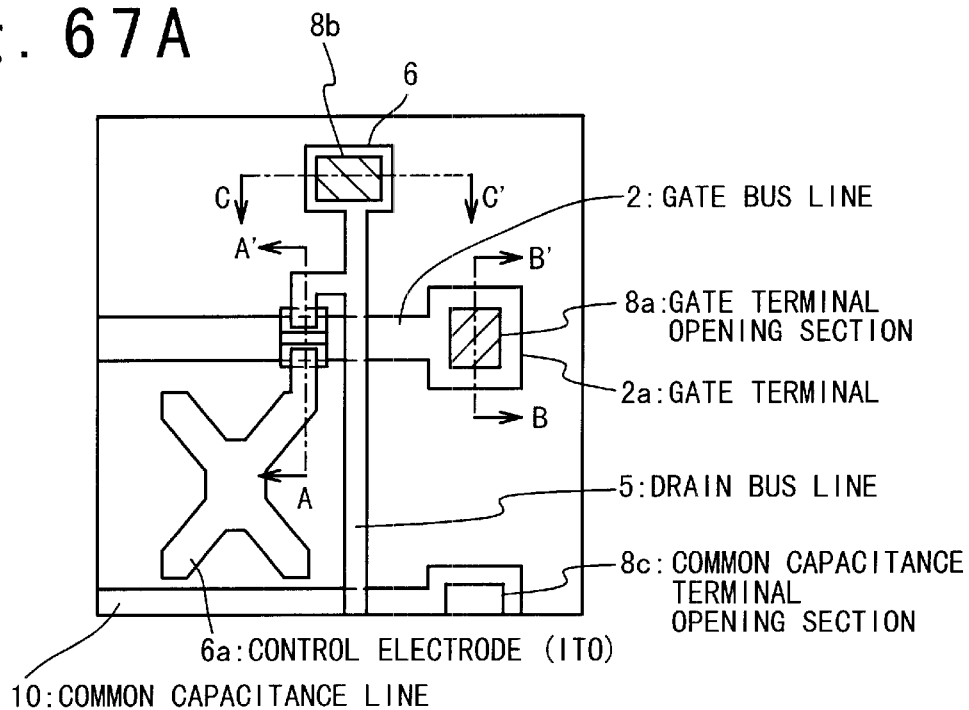
Figure 67B:
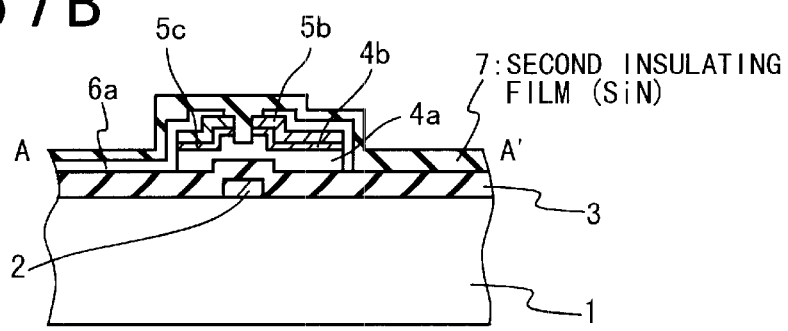
Figure 67C:
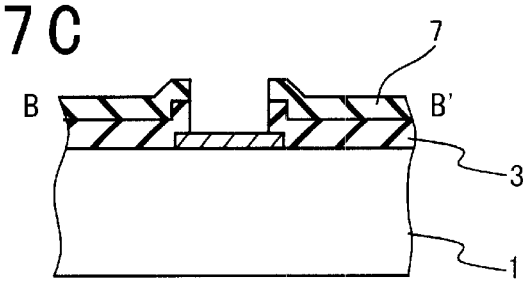
Figure 67D:
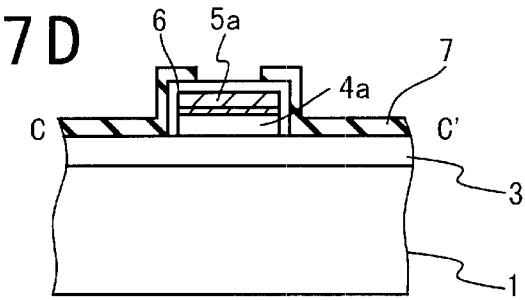

The manufacturing method of the multi-domain liquid crystal display apparatus of such electrically floating pixel electrode structure will be described. A Cr layer and a CrN layer are deposited on a transparent insulative substrate 1 of glass to have the film thickness of about 200 nm using a sputtering method, as shown in FIG. 57A or 57D. After that, a resist pattern is formed in the region for the gate bus line 2, the gate terminal 2a, and the common capacitance line 10 using a first photomask. The CrN layer and the Cr layer in the region which are not covered by the resist pattern are removed by a wet etching method.

Next, as shown in FIGS. 58A to 58D, a first insulating film 3 of silicon nitride SiNx is deposited on the transparent insulative substrate 1 by a CVD method to have the film thickness of about 0.4 $\mu$m. Then, an a-Si layer 4a and an n$^+$-type a-Si layer 4b are deposited as a semiconductor layer to have the film thicknesses of about 0.3 $\mu$m and about 50 nm, respectively. Subsequently, a metal layer such as a Cr layer for source/drain electrodes is deposited using a sputtering method to have the film thickness of about 200 nm. After that, a resist pattern is formed in the region as the drain terminal 5a and the source/drain electrodes 5b and 5c and the drain bus line 5 using a second photomask. The exposed Cr layer is removed by a wet etching method and a dry etching method.

Next, the above-mentioned resist pattern is exposed in the vapor atmosphere of organic solvent for resist such as NMP so that the resist pattern is deformed as shown in FIGS. 59A to 59D.

Next, the exposed n$^+$-type a-Si layer 4b and the a-Si layer 4a are removed by a dry etching method using the deformed resist pattern. When the resist pattern is peeled off, the structure shown in FIGS. 60A to 60D can be obtained.

Next, a transparent electrode film 6 such as an ITO film is deposited on the transparent insulative substrate 1 by a sputtering method to have the film thickness of about 50 nm. After that, a resist pattern is formed using a third photomask. The ITO film 6 exposed as shown in FIGS. 61A to 61D is removed by a wet etching method or a dry etching method. Thus, the control electrode 6a is formed to connect with the source electrode 5c. After that, the n$^+$-type a-Si layer 4b in the channel region and a part of the a-Si layer 4a are removed by a dry etching method to form a TFT, using the ITO film 6 on the source/drain metal layer of Cr, or the source/drain metal layer an etching mask.

Next, a second insulating film 7 of silicon nitride SiNx is formed by a CVD method to have the film thickness of about 0.3 $\mu$m. Subsequently, an ITO film 9 is formed for the pixel electrode 9 by a sputtering method to have the film thickness of about 50 nm. After that, as shown in FIGS. 61A to 61D, a thick resist pattern of about 2 $\mu$m is formed in the region of the ITO film for the pixel electrode, using a fourth mask and a halftone exposure method. Also, a thin resist pattern of about 1 $\mu$m is formed in the region other than the above-mentioned pixel region to have openings in the gate terminal and the drain terminal. Then, the openings of the gate terminal and the drain terminal are formed by a dry etching method. Next, the thin portion of the above resist pattern is removed by an oxygen ashing method. After that, as shown in FIGS. 62A to 62D, the ITO film 9 in the unnecessary region other than the region of the thick resist pattern that the above is etched and the pixel electrode 9, the gate terminal opening 8a, the drain terminal opening 8b, and the common capacitance terminal opening 8c are formed.

In this way, in accordance with the manufacturing method of the multi-domain liquid crystal display apparatus of the electrically floating pixel structure in this embodiment, the liquid crystal display apparatus with the pixel electrode 9 in the electrically floating state electrically can be formed using the five masks. The pixel electrode 9 can form coupling capacitances through the first insulating film 3 and the second insulating film 7, with the control electrode 6a and the common capacitance line 10, respectively. Therefore, the control electrode 6a is controlled by the TFT of each pixel. In this way, two electrode potentials of the control electrode 6a and the pixel electrode 9 can be easily controlled by one TFT.

[The Fourteenth Embodiment]

The manufacturing method of the multi-domain liquid crystal display apparatus with the electrically floating pixel electrode structure according to the fourteenth embodiment of the present invention will be described with reference to FIGS. 63A to 68D. FIG. 63A to FIG. 68D are diagrams showing the manufacturing processes of the active matrix substrate of multidomain liquid crystal display apparatus. FIGS. 63A, 64A, 65A, 66A, 67A and 68A are plan views of one pixel. FIGS. 63B, 64B, 65B, 66B, 67B and 68B are cross sectional views of a TFT section along the A–A' lines of the plan views, respectively. FIGS. 63C, 64C, 65C, 66C, 67C and 68C are cross sectional views of a gate terminal section along the B–B' lines of the plan views, respectively. FIGS. 63D, 64D, 65D, 66D, 67D and 68D are cross sectional views of a drain terminal section along the C–C' lines of the plan views, respectively.

The multi-domain liquid crystal display apparatus with the floating pixel electrode structure according to the fourteenth embodiment is a liquid crystal display apparatus of the VA mode in which liquid crystal molecules having negative permittivity anisotropy are directed to have the homeotropic orientations. In each pixel surrounded with the gate bus lines 2 extending in a row direction and the drain bus lines 5 extending in a column direction, a pixel transistor, a pixel electrode 9 and a control electrode 6a are provided. The thin film transistor (TFT) has a bottom gate structure and the active layer is formed of amorphous silicon (a-Si) or polysilicon. The pixel electrode 9 is in an electrically floating state. Also, the pixel electrode 9 is formed to have predetermined coupling capacitances with the control electrode 6a and the common capacitance line 10 through the first insulating film 3 and the second insulating film 7. A counter electrode is formed on a counter substrate. The TFT substrate and the counter substrate are supported in a predetermined distance and liquid crystal is interposed between the substrates.

The manufacturing method of multi-domain liquid crystal display apparatus of the electrically floating pixel electrode structure will be described.

First, a Cr layer is deposited on a transparent insulative substrate 1 of glass using a sputtering method to have the film thickness of about 200 nm, as shown in FIGS. 63A to 63D. After that, using a first photomask, a resist pattern is formed in a region for a gate bus line 2, a gate terminal 2a and a common capacitance line 10. Then, the Cr layer in the region which is not covered by the resist pattern is removed by a wet etching.

Next, a first insulating film 3 of silicon nitride SiNx is deposited to the entire transparent insulative substrate 1 by a CVD method to have the film thickness of about 0.4 μm as shown in FIGS. 64A to 64D. Subsequently, an a-Si layer 4a and an n+-type a-Si 4b are deposited as a semiconductor layer using a sputtering method to have the film thicknesses of about 0.3 μm and about 50 nm, respectively. Then, a metal layer of Cr is deposited for source/drain electrodes to have the film thickness of about 200 nm. After that, a resist pattern is formed in the region for the semiconductor layer of a pixel transistor which contains a drain terminal 5a and the source/drain electrodes 5b and 5c and the region for a drain bus line 5 using a second photomask. Moreover, after the Cr layer exposed using the resist pattern is removed by a wet etching method, the exposed n⁺-type a-Si 4b and the a-Si 4a are removed by a dry etching method. At this time, the resist pattern is formed thick in the region for the drain terminal 5a and the source/drain electrodes 5b and 5c and the region for the drain bus line 5 by the above-mentioned halftone exposing method to have the film thickness of about 2 μm. Also, in the region for the channel of the pixel transistor, the resist pattern is formed thin to have the film thickness of about 1 μm.

Next, the thin portion of the resist pattern is removed by an ashing method using an oxygen gas. A portion of the metal layer of Cr is removed by a wet etching method and a dry etching method to form the region for the channel of the pixel transistor using the thick portion of the resist pattern as a mask. When the resist pattern is peeled off, the structure is obtained as shown in FIGS. 65A to 65D.

Next, a transparent conductive film 6 of ITO is deposited to the entire surface of the transparent insulative substrate 1 by a sputtering method to have the film thickness of about 50 nm. After that, a resist pattern is formed using a third photomask. As shown in FIGS. 66A to 66D, the ITO film 6 exposed using the resist pattern is removed by a wet etching method or a dry etching method and the control electrode 6a is formed which is connected with the source electrode 5c. After that, using the ITO film on the Cr source/drain metal layer, or the source/drain metal layer as an etching mask, a portion of the n+-type a-Si layer 4b and a-Si layer 4a in the channel region is removed by a dry etching to form a TFT.

Next, a second insulating film 7 of silicon nitride SiNx is deposited by a CVD method to have the film thickness of about 0.3 μm. After that, using a fourth mask, a resist pattern is formed to have opening sections in the gate terminal 2a, drain terminal 5a and common capacitance line terminal. Then, the second insulating film 7 and the first insulating film 3 exposed using the resist pattern removed by a dry etching method, and a gate terminal opening 8a, a drain terminal opening 8b and a common capacitance line terminal opening 8c are formed as shown in FIGS. 67A to 67D.

Figure 68A:
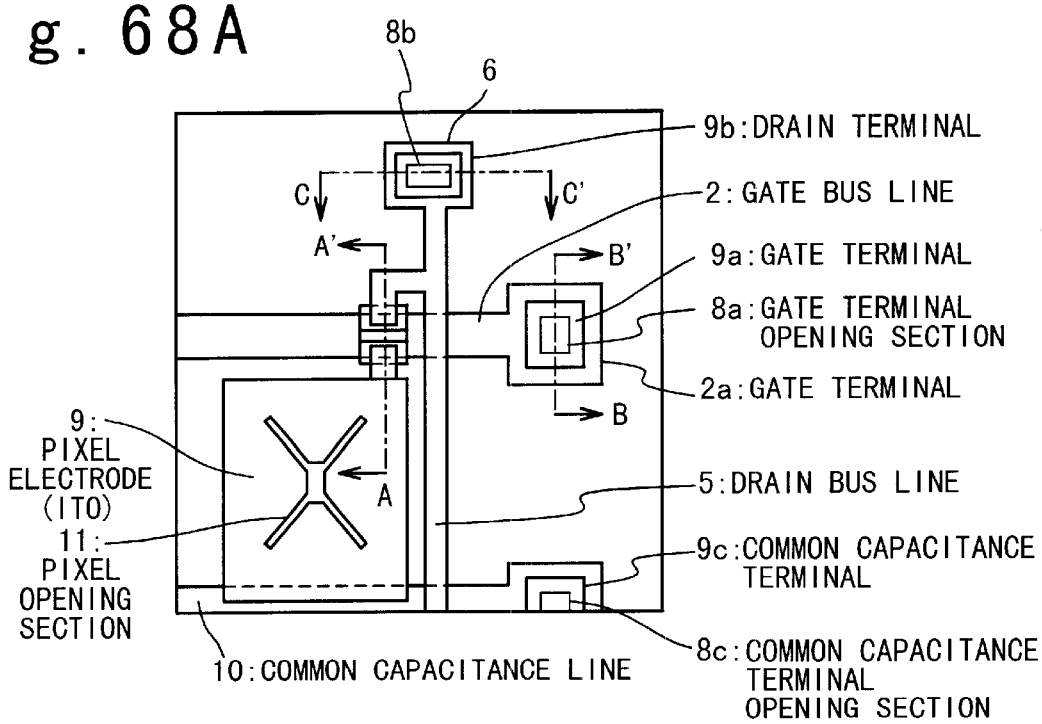
Figure 68B:
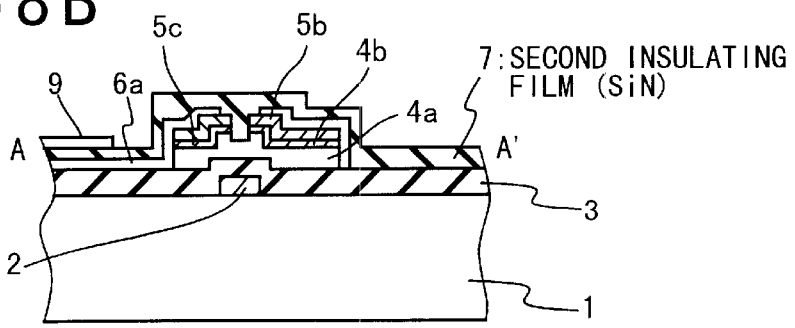
Figure 68C:
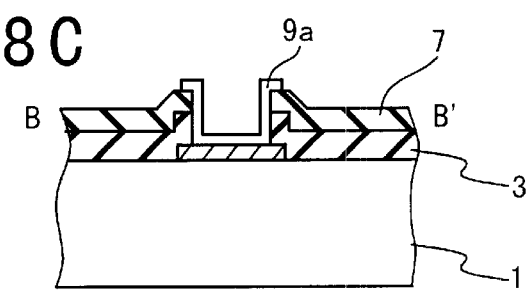
Figure 68D:
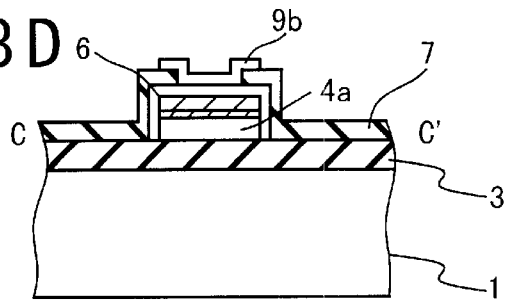
Figure 69A:
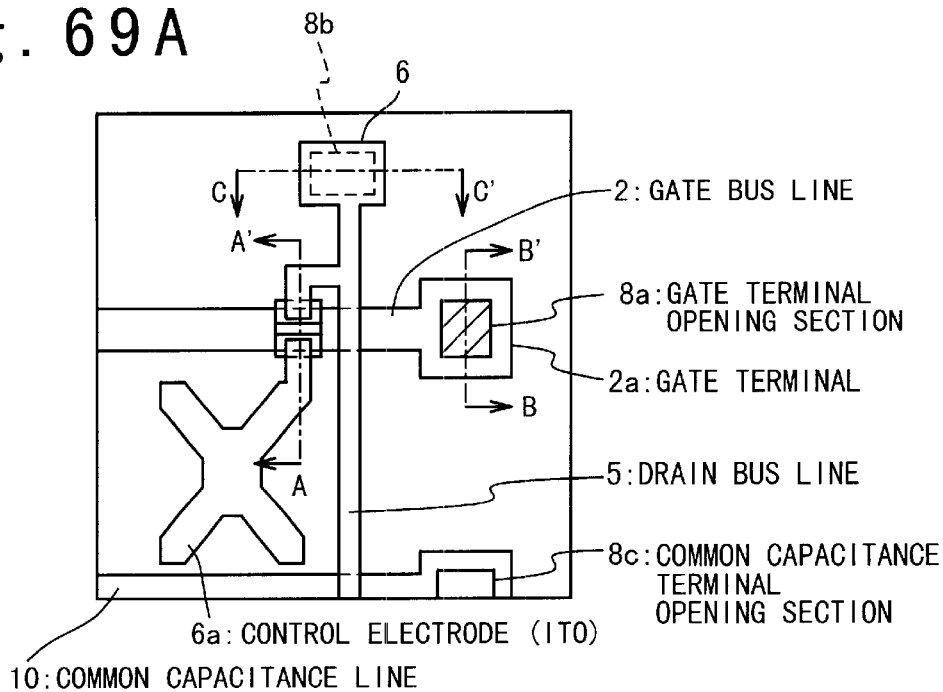
FIGS. 69A and 70A are plan views of one pixel, respectively.
Figure 69B:
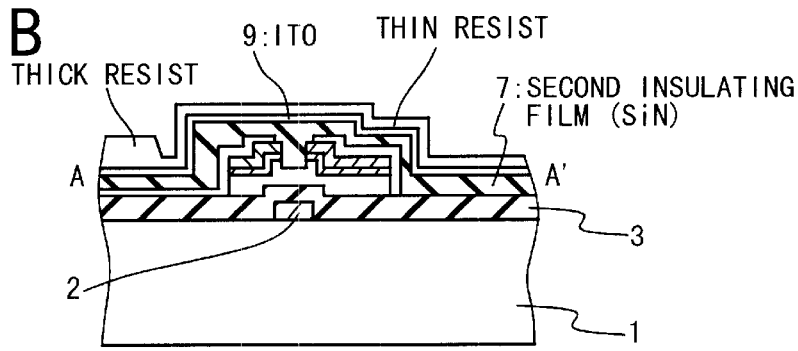
FIGS. 69B and 70B are cross sectional views of a TFT section along the A–A' lines of the plan views, respectively.
Figure 69C:
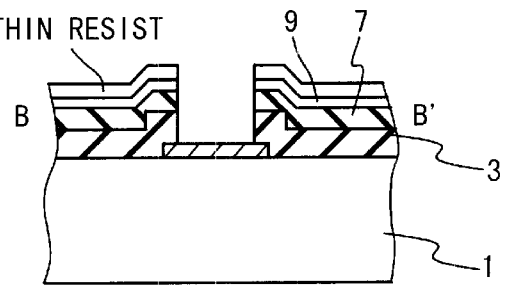
FIGS. 69C and 70C are cross sectional views of a gate terminal section along the B–B' lines of the plan views, respectively.
Figure 69D:
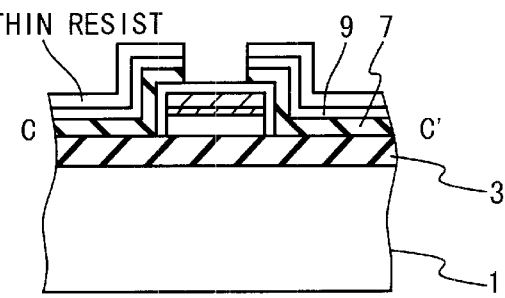
Figure 70A:
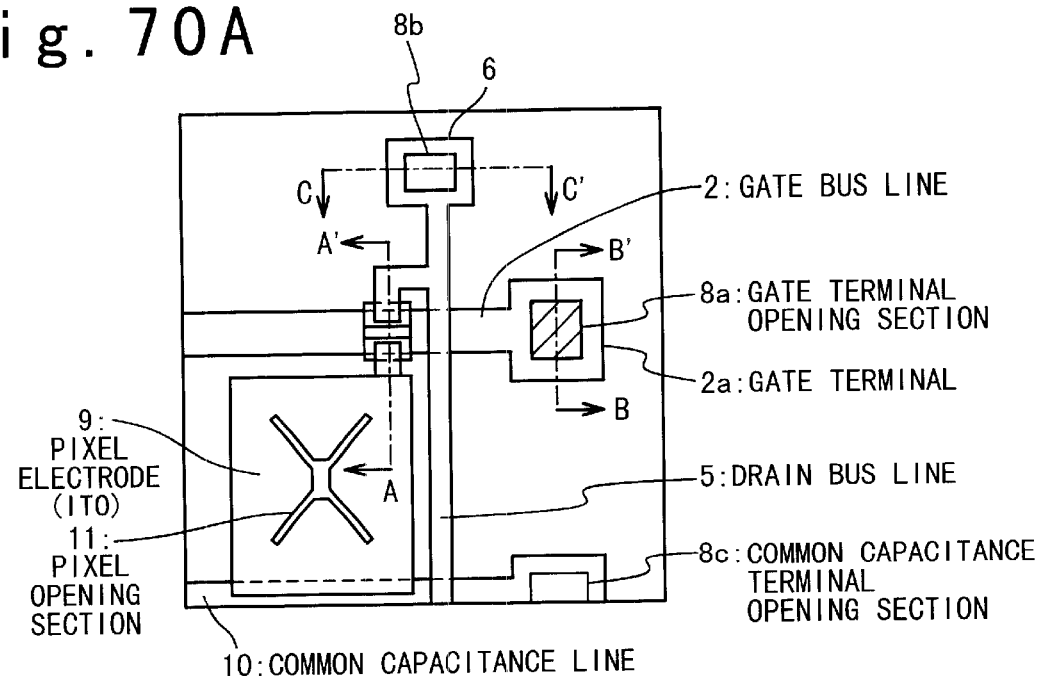
Figure 70B:
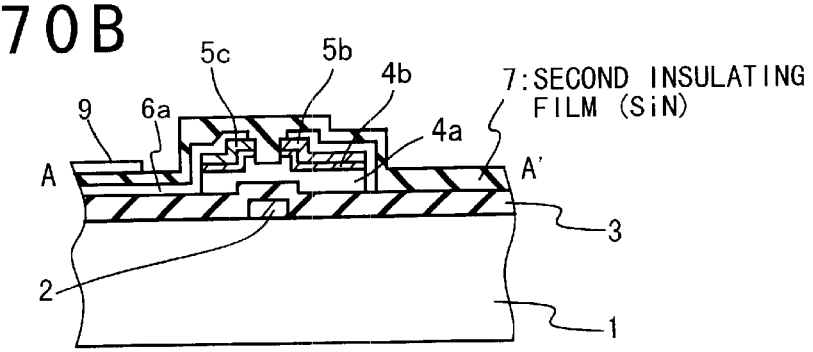
Figure 70C:
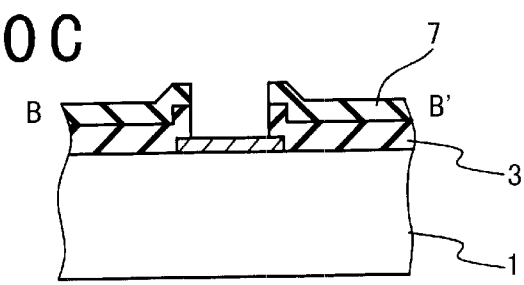
Figure 70D:
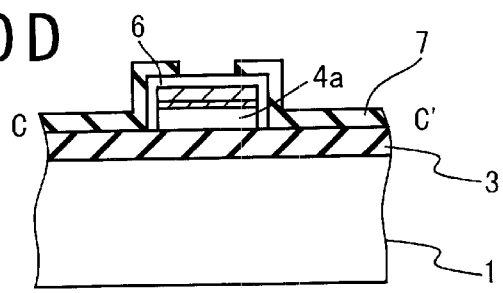

Next, an ITO film for the pixel electrode 9 is deposited on the entire surface of the transparent insulative substrate 1 by a sputtering method to have the film thickness of about 50 nm. After that, the ITO film exposed using a fifth mask is removed by a wet etching method or a dry etching method. As shown in FIGS. 68A to. 68D, the pixel electrode 9 is in the electrically floating condition and is formed above the control electrode 6a through the second insulating film 7. Also, a pixel opening 11 of a predetermined shape is formed in the pixel electrode 9. Also, a gate terminal electrode 9a, a drain terminal electrode 9b, and a common capacitance line terminal electrode 9c are formed in the gate terminal opening 8a, the drain terminal opening 8b and the common capacitance line terminal opening 8c. It should be noted that in the liquid crystal display apparatus, a protection transistor is generally provided to prevent electrostatic destruction. In case of the manufacturing method of this embodiment, a gate layer 17 and a drain layer 18 in the protection transistor are connected to have the connection structure shown in FIG. 45A.

In this way, according to this embodiment, the multi-domain liquid crystal display apparatus of the floating pixel structure can be manufactured using the five masks. The pixel electrode 9 forms capacitances through the second insulating film 7 and the first insulating film 3 with the control electrode 6a and the common capacitance line 10, respectively. Therefore, by controlling the control electrode 6a by the TFT of each pixel, two electrode potentials of the control electrode 6a and the pixel electrode 9 can be easily controlled.

It should be noted that in this embodiment, the control electrode and the pixel electrode have the shapes shown in the figures, and, Cr is used as gate metal and Cr is used as source/drain electrode metal. However, the present invention is not limited to the above embodiment. The control electrode and the pixel electrode have any shapes if they can groups the liquid crystal molecules to have a plurality of orientation directions. Also, other materials may be used if they have the same characteristic as the gate metal, the source/drain electrode metal, and the first and second insulating films. For example, Mo, Cr/Al, Mo/Al may be used as the gate metal, and Mo may be used as the source/drain electrode metal.

[The Fifteenth Embodiment]

The manufacturing method of the multi-domain liquid crystal display apparatus with the electrically floating pixel electrode structure according to the fifteenth embodiment of the present invention will be described with reference to FIG. 63A to FIG. 66D and FIGS. 69A to 70D. FIG. 63A to FIG. 66D and FIGS. 69A to 70D are diagrams showing the manufacturing processes of the active matrix substrate of multi-domain liquid crystal display apparatus. FIGS. 63A, 64A, 65A, 66A, 69A and 70A are plan views of one pixel. FIGS. 63B, 64B, 65B, 66B, 69B and 70B are cross sectional views of a TFT section along the A–A' lines of the plan views, respectively. FIGS. 63C, 64C, 65C, 66C, 69C and 70C are cross sectional views of a gate terminal section along the B–B' lines of the plan views, respectively. FIGS. 63D, 64D, 65D, 66D, 69D and 70D are cross sectional views of a drain terminal section along the C–C' lines of the plan views, respectively.

The multi-domain liquid crystal display apparatus with the floating pixel electrode structure according to the fifteenth embodiment is a liquid crystal display apparatus of the VA mode in which liquid crystal molecules having negative permittivity anisotropy are directed to have the homeotropic orientations. In each pixel surrounded with the gate bus lines 2 extending in a row direction and the drain bus lines 5 extending in a column direction, a pixel transistor, a pixel electrode 9 and a control electrode 6a are provided. The thin film transistor (TFT) has a bottom gate structure and the active layer is formed of amorphous silicon (a-Si) or polysilicon. The pixel electrode 9 is in an electrically floating state. Also, the pixel electrode 9 is formed to have predetermined coupling capacitances with the control electrode 6a and the common capacitance line 10 through the first insulating film 3 and the second insulating film 7. A counter electrode is formed on a counter substrate. The TFT substrate and the counter substrate are supported in a predetermined distance and liquid crystal is interposed between the substrates.

The manufacturing method of multi-domain liquid crystal display apparatus of the electrically floating pixel electrode structure will be described.

First, a Cr layer and a CrN layer are deposited on a transparent insulative substrate 1 of glass using a sputtering method to have the film thicknesses of about 200 nm and about 100 nm, as shown in FIGS. 63A to 63D. After that, using a first photomask, a resist pattern is formed in a region for a gate bus line 2, a gate terminal 2a and a common capacitance line 10. Then, the Cr layer in the region which is not covered by the resist pattern is removed by a wet etching.

Next, a first insulating film 3 of silicon nitride SiNx is deposited to the entire transparent insulative substrate 1 by a CVD method to have the film thickness of about 0.4 μm as shown in FIGS. 64A to 64D. Subsequently, an a-Si layer 4a and an n+-type a-Si 4b are deposited as a semiconductor layer using a sputtering method to have the film thicknesses of about 0.3 μm and about 50 nm, respectively. Then, a metal layer of Cr is deposited for source/drain electrodes to have the film thickness of about 200 nm. After that, a resist pattern is formed in the region for the semiconductor layer of a pixel transistor which contains a drain terminal 5a and the source/drain electrodes 5b and 5c and the region for a drain bus line 5 using a second photomask. Moreover, after the Cr layer exposed using the resist pattern is removed by a wet etching method, the exposed n+-type a-Si 4b and the a-Si 4a are removed by a dry etching method. At this time, the resist pattern is formed thick in the region for the drain terminal 5a and the source/drain electrodes 5b and 5c and the region for the drain bus line 5 by the above-mentioned halftone exposing method to have the film thickness of about 2 μm. Also, in the region for the channel of the pixel transistor, the resist pattern is formed thin to have the film thickness of about 1 μm.

Next, the thin portion of the resist pattern is removed by an ashing method using an oxygen gas. A portion of the metal layer of Cr is removed by a wet etching method and a dry etching method to form the channel region of the pixel transistor using the thick portion of the resist pattern as a mask. When the resist pattern is peeled off, the structure is obtained as shown in FIGS. 65A to 65D.

Next, a transparent conductive film 6 of ITO is deposited to the entire surface of the transparent insulative substrate 1 by a sputtering method to have the film thickness of about 50 nm. After that, a resist pattern is formed using a third photomask. As shown in FIGS. 66A to 66D, the ITO film 6 exposed using the resist pattern is removed by a wet etching method or a dry etching method, and the control electrode 6a is. formed which is connected with the source electrode 5c. After that, using the ITO film on the Cr source/drain metal layer, or the source/drain metal layer as an etching mask, a portion of the n+-type a-Si layer 4b and a-Si layer 4a in the channel region is removed by a dry etching to form a TFT.

Next, a second insulating film 7 of silicon nitride SiNx is deposited by a CVD method to have the film thickness of about 0.3 μm. Then, an ITO film for the pixel electrode 9 is deposited by a sputtering method to have the film thickness of about 50 nm. After that, using a fourth mask and a halftone exposing method, a thick resist pattern is formed to have the film thickness of about 2 μm on a portion of the ITO film for the pixel electrode region, as shown in FIGS. 69A to 69D. Also, a thin resist pattern is formed in a region other than the pixel electrode region to have the film thickness of about 1 μm and to have opening sections in the gate terminal 2a and drain terminal 5a. Then, the openings are formed for the gate terminal 2a and drain terminal 5a by a dry etching method. Next, the thin resist pattern is removed by an oxygen ashing method. Thereafter, as shown in FIGS. 70A to 70D, the ITO film which is not covered by the thick resist pattern is removed through an etching process, and the pixel electrode 9, a gate terminal opening section 8a, a drain terminal opening section 8b and a common capacitance line terminal opening section 8c are formed.

In this way, according to this embodiment, the multi-domain liquid crystal display apparatus of the floating pixel structure can be manufactured using the four masks. The pixel electrode 9 forms capacitances through the second insulating film 7 and the first insulating film 3 with the control electrode 6a and the common capacitance line 10, respectively. Therefore, by controlling the control electrode 6a by the TFT of each pixel, two electrode potentials of the control electrode 6a and the pixel electrode 9 can be easily controlled.

Also, in the manufacturing methods in the twelfth to fifteenth embodiments, the liquid crystal display apparatus can be manufactured using the four or five masks so that the number of processes can be reduced. Also, in the process of forming the control electrode, the ITO film can be formed on the drain bus line to form a redundant wiring line. Therefore, the break out of the drain bus line is reduced to improve the production yield. That is, the present invention can eliminate the drawback of the conventional liquid crystal display apparatus in which the pixel electrode is formed on the second insulating film, as shown in the conventional examples.

With the above mentioned various embodiments of the present invention, two or more embodiments can be combined in a scope of no contradiction. Also, a capacitance by the control electrode and the pixel electrode is formed using the first and second insulating films 3 and 7. However, it may be formed using at least one of the first and second insulating films 3 and 7.

As described above, the liquid crystal display apparatus according to the present invention is a multi-domain liquid crystal display apparatus which has the thin film transistors provided in the neighborhood of the intersections of the gate bus lines and the drain bus lines, pixel electrodes, and control electrodes connected with the source terminal of each of the thin film transistors. The pixel electrode forms capacitance through the second insulating film provided with the control electrode. The voltage applied to the control electrode is applied to the pixel electrode through the capacitance. The drain bus line is formed of the laminate film composed of semiconductor layer of the thin film transistor, the Cr film of the source/drain electrodes, and the electrode film of ITO for the control electrode.

Also, in the liquid crystal display apparatus according to the present invention, the pixels are formed as a pair in the column direction or in the drain bus line direction. The gate bus lines for the pair of pixels are arranged in a center portion between the pixels. The common capacitance line is used in common by one pixel of the pair and a pixel outside of the one pixel. In this way, the opening percentage is improved.

Also, the thin film transistor is provided onto a centerline of the pixel in the column direction. The drain electrodes extend symmetrically on either side. Thus, the symmetry of the pixel is secured. Also, the thin film transistor is formed so as not to stick out of the gate bus line so that the influence of the backlight light can be avoided.

Also, in the liquid crystal display apparatus according to the present invention, the pixel electrode and the common capacitance line are formed to partially overlap by a predetermined width to form a capacitance. In the pixels arranged in the direction of the gate bus line, the voltage drop of the gate signal is compensated based on the capacitance corresponding to the overlapping area to keep feed-through voltage constant. That is, the pixel electrode and the common capacitance line are formed such that the overlapping width or area is smaller depending on the distance from the gate terminal.

Also, the liquid crystal display apparatus according to the present invention, one or more dummy bus lines are provided such that the pixel are sandwiched by two bus lines. The dummy bus line is applied with a predetermined potential. Also, drain terminals are provided for both ends of the drain bus line so that the influence of the drain bus line can be eliminated.

Also, the conductive film such as an ITO film or an organic conductive film is provided on the polarizing plate or between the TFT substrate and the polarizing plate on the side of the substrate opposite to the counter substrate. Therefore, the charging and influence of the external electric field can be prevented.

In this way, in the present invention, the multi-domain liquid crystal display apparatus of the floating pixel electrode structure in which the pixel electrode is connected with the control electrode and the common capacitance line through capacitances, can be manufactured in less processes. In the present invention, after deposition of the semiconductor layer of an a-Si layer and an n$^+$-type a-Si layer, a source/drain metal layer is deposited. These layers are etched using the resist pattern in case of the formation of the control electrode. Also, after the deposition of the second insulating film, the pixel electrode film is deposited before the terminal openings are formed. The regions for the terminal openings and the region other than the region of the pixel electrode are etched using a single half tone mask.

Also, in the present invention, the pixel electrode and the control electrode can be formed in the correct size. For this purpose, instead of directly etching the ITO film using a resist pattern as a mask, the conductive film of Cr is formed onto the ITO film and the conductive film is etched using a resist pattern as a mask and then the ITO film is etched using the etched conductive film as a mask. Alternatively, the ITO film is wet etched using a resist pattern and then the conductive film is formed to surround of the peripheral portion of the etched ITO film. Otherwise, the conductive film is previously formed in the outer border for the region of the control electrode or pixel electrode, and then the ITO film is deposited.

Also, the common capacitance line is arranged between two pixels and used in common by the two pixels. Thus, the wiring area is reduced so that the opening percentage is increased.

Also, in the present invention, the display can be made uniform over the whole panel. For this purpose, the thin film transistor is formed on a symmetrical line of the pixel in the column direction. Also, the dummy bus line is provided such that each of the pixels is sandwiched by two drain bus lines or a set of the drain bus line and the dummy bus line. In this way, the symmetry of the pixel can be secured so that the influence of the potential of the source/drain electrodes and the influence of the potential of the drain bus lines can be made symmetric. In addition, the width or area overlapping between the pixel electrode and the common capacitance line are adjusted to be smaller depending on the distance from the gate signal terminal. Also, the drain terminals are provided for both ends of the drain bus line. Thus, the voltage drop in the bus line and the influence of the signal delay can be prevented.

Also, in the present invention, the conductive layer is provided on the outer side of the TFT substrate to prevent the influence of electrostatic charging and the influence of the external electric field.

What is claimed is:

1. A liquid crystal display apparatus comprising:
   a first substrate;
   a second substrate; and
   a liquid crystal layer interposed between said first substrate and said second substrate, and
   wherein said first substrate comprises on a surface facing said second substrate:
   a plurality of gate bus lines extending into a row direction;
   a plurality of drain bus lines extending into a column direction; and
   a plurality of pixels arranged in matrix, and wherein each of said plurality of pixels comprises:
      a portion of one of said plurality of gate bus lines associated with said pixel;
      a portion of one of said plurality of drain bus lines associated with said pixel;
      a portion of a capacitance line associated with said pixel;
      a pixel transistor having a source and a drain which is connected with said associated drain bus line;
      a control electrode connected with said source and formed in at least a portion of a region of said pixel; and
      a pixel electrode which is in an electrically floating state and which is formed to cover said control electrode and a portion of said capacitance line through at least one of a first insulating film and second insulating film.

2. The liquid crystal display apparatus according to claim 1, wherein in said pixel, a first capacitance is formed from said pixel electrode and said control electrode and a second capacitance is formed from said pixel electrode and said capacitance line, and
   in a row of said pixels associated with said associated gate bus line, said second capacitances are different depending on a distance from a gate signal supply terminal on said associated gate bus line.

3. The liquid crystal display apparatus according to claim 2, wherein at least one of said first capacitances and said second capacitances in the row of said pixels are changed such that the change compensates for a voltage drop of a gate signal from said gate signal supply terminal to keep a feed-through voltage of said pixel transistor constant.

4. The liquid crystal display apparatus according to claim 2, wherein said second capacitance is decreased in the row of said pixels depending on the distance from the gate signal supply terminal.

5. The liquid crystal display apparatus according to claim 2, wherein an area of said pixel electrode overlapping with said capacitance line portion is decreased depending on the distance from said gate signal supply terminal in the row of said pixels.

6. The liquid crystal display apparatus according to claim 1, wherein said control electrode comprises:
a conductive layer; and
a bordering layer formed in a peripheral portion of said conductive layer.

7. The liquid crystal display apparatus according to claim 1, wherein the pixels adjacent in said column direction are symmetrical with respect to a line extending in said row direction between the pixels.

8. The liquid crystal display apparatus according to claim 7, wherein said associated gate bus line portion is provided in a lower portion of an upper one of said adjacent pixels, and said associated gate bus line portion is provided in an upper portion of a lower one of said adjacent pixels.

9. The liquid crystal display apparatus according to claim 7, wherein said capacitance line portion is provided in an upper portion of an upper one of said adjacent pixels, and said capacitance line portion is provided in a lower portion of a lower one of said adjacent pixels.

10. The liquid crystal display apparatus according to claim 8, wherein said associated drain bus line has two drain lines extending in said row direction between said associated gate bus line portion in said lower portion of said upper pixel and said associated gate bus line portion in said upper portion of said lower pixel, and
said pixel transistors of said upper and lower pixels are formed to be connected with said two drain lines, respectively.

11. The liquid crystal display apparatus according to claim 10, wherein said two drain lines extend toward said drain bus line associated with said pixels adjacent in said row direction.

12. The liquid crystal display apparatus according to claim 1, wherein each of said plurality of pixels is symmetrical with respect to a center line thereof extending in said column direction, except for said associated drain bus line portion.

13. The liquid crystal display apparatus according to claim 1, wherein said pixel transistor of each of said plurality of pixels is formed such that said pixel transistor does not stick out of said associated gate bus line portion.

14. The liquid crystal display apparatus according to claim 1, further comprising:
at least one dummy line provided for at least one of a left portion from a leftmost column of said pixels and a right portion from a rightmost column of said pixels in said row direction.

15. The liquid crystal display apparatus according to claim 14, wherein said dummy line is applied with either of a same potential as that of said capacitance line, a same potential as that of adjacent one of said plurality of drain bus lines, a same potential as that of one drain bus line opposite to said associated drain bus line in said plurality of drain bus lines, and an average of potentials of said plurality of drain bus lines.

16. The liquid crystal display apparatus according to claim 1, further comprising:
a conductive film provided on or above a surface of said first substrate on an opposite side to said second substrate.

17. The liquid crystal display apparatus according to claim 1, wherein said pixel electrode has an opening section.

18. The liquid crystal display apparatus according to claim 1, wherein said pixel transistor comprises:
said associated gate bus line;
a first insulating film formed to cover said associated gate bus line;
a semiconductor layer formed on said first insulating film;
a drain contact layer and a source contact layer formed on said semiconductor layer; and
a drain electrode connected to said drain contact layer and a source electrode connected to said source contact layer.

19. The liquid crystal display apparatus according to claim 18, wherein each of said plurality of drain bus lines is a laminate film composed of a metal film formed of same material as that of said source electrode or said drain electrode of said pixel transistor, and a conductive film formed of same material as that of said control electrode.

20. The liquid crystal display apparatus according to claim 18, wherein each of said plurality of drain bus lines is a laminate film composed of a semiconductor layer formed of same material as that of said semiconductor layer, a metal film formed of same material as that of said source electrode and said drain electrode of said pixel transistor, and a conductive film formed of same material as that of said control electrode.

21. The liquid crystal display apparatus according to claim 1, wherein said pixel transistor comprises:
a drain electrode and a source electrode formed on said facing surface of said first substrate to said second substrate on said first insulating film;
a semiconductor layer formed on said insulating film portion, said source electrode and said drain electrode;
a third insulating film formed on said semiconductor layer;
said gate electrode formed on said third insulation film; and
a light shielding layer provided between said first substrate and said first insulating film.

22. The liquid crystal display apparatus according to claim 21, wherein said associated gate bus line includes a laminate film comprising:
a semiconductor layer formed of same material as that of said semiconductor layer;
an insulating film formed of same material as that of said third insulating film; and
a conductive film formed of same material as that of said gate electrode.

23. The liquid crystal display apparatus according to claim 21, wherein said source electrode is a portion of said control electrode.

24. The liquid crystal display apparatus according to claim 18, wherein each of said control electrode and said pixel electrode is formed of a transparent conductive film, and
each of said source electrode and said drain electrode is formed of a refractory metal film.

25. The liquid crystal display apparatus according to claim 24, wherein said refractory metal is a material selected from the group consisting of Cr, Mo and an alloy which has at least one of them as a main component.

26. The liquid crystal display apparatus according to claim 1, wherein a drain terminal is formed in each of ends of said plurality of the drain bus lines.

27. A manufacturing method of a liquid crystal display apparatus in which a plurality of pixels are arranged in a matrix in a column direction and a row direction, comprising the steps of:
(a) forming a plurality of gate bus lines and a plurality of capacitance lines on a substrate;
(b) forming a first insulating film to cover said substrate and said plurality of gate bus lines at least;

(c) forming a plurality of drain bus lines on said first insulating film;

(d) in a region of each of said plurality of pixels, forming a pixel transistor which has a source and a drain on an associated one of said plurality of gate bus lines through said first insulating film, wherein said drain of said pixel transistor is connected with an associated one of said plurality of drain bus lines;

(e) forming a control electrode connected with said source of said pixel transistor in a portion in said pixel region;

(f) forming a second insulating film to cover said first insulating film, said pixel transistor and said plurality of drain bus lines at least; and (g) forming a pixel electrode in said pixel region to cover said control electrode and a portion of said capacitance line through at least one of said first insulating film and said second insulating film.

28. The manufacturing method according to claim 27, wherein said (d) step comprises the steps of:

(h) forming a semiconductor layer and a contact layer on said associated gate bus line through said first insulating film;

(i) patterning said semiconductor layer and said contact layer in an island manner based on a region for said pixel transistor;

(j) forming an electrode layer to cover said contact layer and said semiconductor layer; and (k) etching said electrode layer to form a source and a drain.

29. The manufacturing method according to claim 28, wherein said (e) step of forming said control electrode is carried out subsequent to said (k) step.

30. The manufacturing method according to claim 27, wherein said (c) step of said drain bus line comprises the steps of:

forming a first conductive layer on said first insulating film at a same time as said (j) step; and forming a second conductive layer provided on said first conductive layer or covering said first conductive layer at a same time as said (e) step of forming said control electrode.

31. The manufacturing method according to claim 27, wherein said (d) step comprises the steps of:

(l) depositing a semiconductor layer, a contact layer and an electrode layer in order on said associated gate bus line through said first insulating film;

(m) patterning said semiconductor layer, said contact layer and said electrode layer in an island manner based on a region for said pixel transistor;

(n) depositing a control electrode film to cover said electrode layer, said contact layer and said semiconductor layer; and (o) etching said control electrode film, said electrode layer and said contact layer, and forming a source electrode composed of a source contact layer, a lower source electrode on said source contact layer and an upper source electrode on said lower source electrode, and a drain composed of a drain contact layer, a lower drain electrode on said drain contact layer and an upper drain electrode on said lower drain electrode.

32. The manufacturing method according to claim 31, wherein said (e) step of forming said control electrode is carried out at same time as said (n) step and (o) step.

33. The manufacturing method according to claim 31, wherein said (c) step of forming said drain bus line comprises the steps of:

patterning a first laminate layer of said semiconductor layer, said contact layer and said electrode layer at a same time as said (m) step; and forming a first conductive layer provided on or covering said first laminate layer at a same time as said (n) step and said (o) step.

34. The manufacturing method according to claim 31, wherein said (m) step comprises the step of:

patterning said semiconductor layer, said contact layer, said electrode layer and said first insulating film, in each said pixel region, and said (n) step comprises the step of:

depositing said control electrode film to cover said electrode layer and said substrate.

35. The manufacturing method according to claim 27, wherein said (d) step comprises the steps of:

(p) depositing a semiconductor layer, a contact layer and an electrode layer in order as a first laminate layer on said gate bus line through said first insulating film;

(q) patterning said electrode layer using a resist pattern to form a source electrode and a drain electrode;

(r) deforming said resist pattern using organic solvent; and (s) patterning said contact layer and said semiconductor layer in an island manner for a region for said pixel transistor using said deformed resist pattern.

36. The manufacturing method according to claim 35, wherein said (e) step of forming said control electrode is carried out subsequent to said (s) step.

37. The manufacturing method according to claim 35, wherein said (c) step of forming said drain bus line comprises the steps of:

patterning said first laminate layer at same time as said (q) step; and forming a second conductive layer provided on or covering said first laminate layer at same time as said (e) step.

38. The manufacturing method according to claim 27, wherein said (d) step comprises the steps of:

(t) depositing a semiconductor layer, a contact layer and an electrode layer in order as a first laminate layer on said gate bus line through said first insulating film;

(u) forming a resist layer having a thick portion and a thin portion on said electrode layer by changing an integral value of an exposure light quantity;

(v) patterning said electrode layer, said contact layer and said semiconductor layer using said resist pattern in an island manner;

(w) after said thin portion of said resist layer is removed through an ashing process, removing said electrode layer for a channel region of said pixel transistor using said thick portion of said resist layer, to form a source electrode and a drain electrode.

39. The manufacturing method according to claim 27, wherein said (e) step of forming said control electrode is carried out said (w) step.

40. The manufacturing method according to claim 35, wherein said (c) step of forming said drain bus line comprises the steps of:

patterning said first laminate layer at same time as said (v) step; and forming a second conductive layer provided on or covering said first laminate layer at same time as said (e) step.

41. The manufacturing method according to claim 27, wherein said (g) step of forming said control electrode comprises the steps of:
    depositing a pixel electrode film;
    forming a resist layer having a thick portion and a thin portion on said pixel electrode film by changing an integral value of an exposure light quantity;
    removing said pixel electrode film and said second insulating film or a set of said second insulating film and said first insulating film in a predetermined region in order using said resist layer;
    removing said thin portion of said resist layer by an ashing process; and
    patterning said pixel electrode film using the thick portion of said resist layer to form said pixel electrode.

42. The manufacturing method according to claim 27, wherein said (e) step of forming said control electrode comprises the steps of:
    depositing a control electrode film;
    depositing a conductive film on said control electrode film;
    patterning said conductive film using a resist pattern; and
    patterning said control electrode film using said patterned conductive film as a mask.

43. The manufacturing method according to claim 27, wherein said (e) step comprises the steps of:
    depositing a control electrode film;
    patterning said control electrode film; and
    forming a conductive film in a peripheral portion of the patterned control electrode film to form said control electrode.

44. The manufacturing method according to claim 27, wherein said (e) step comprises the steps of:
    depositing a conductive film;
    patterning said conductive film to have a loop;
    depositing a control electrode film on the patterned conductive film; and
    patterning said control electrode film such that an edge portion of said control electrode film is on the patterned conductive film.

45. The manufacturing method according to claim 27, wherein said (g) step of forming said pixel electrode comprises the steps of:
    depositing a pixel electrode film;
    depositing a conductive film on said pixel electrode film;
    patterning said conductive film using a resist pattern; and
    patterning said pixel electrode film using the patterned conductive film.

46. The manufacturing method according to claim 27, wherein said (g) step of forming said pixel electrode comprises the steps of:
    depositing a pixel electrode film;
    patterning said pixel electrode film; and
    forming a conductive film in a peripheral portion of the patterned pixel electrode film to form said pixel electrode.

47. The manufacturing method according to claim 27, wherein said (g) step of forming said pixel electrode comprises the steps of:
    depositing a conductive film;
    patterning said conductive film to have a loop;
    depositing a pixel electrode film on the patterned conductive film; and
    patterning said control electrode film such that an edge portion of said patterned pixel electrode film is on the patterned conductive film.

48. The manufacturing method according to claim 27, wherein a first capacitance is formed from said pixel electrode and said control electrode and a second capacitance is formed from said pixel electrode and said capacitance line, in each said pixel, and
    said (g) step of forming said pixel electrode comprises the step of:
        forming said pixel electrode in a row of said pixels associated with said associated gate bus line such that said second capacitances are different depending on a,distance from a gate signal supply terminal connected to said associated gate bus line.

49. The manufacturing method according to claim 48, wherein said (g) step of forming said pixel electrode comprises the step of:
    forming said pixel electrode such that said second capacitances are decreased depending on the distance from the gate signal supply terminal connected to said associated gate bus line in the associated row of said pixels.

50. The manufacturing method according to claim 48, wherein said (g) step of forming said pixel electrode comprises the step of:
    forming said pixel electrode such that an overlapping area of said pixel electrode and said capacitance line portion is decreased depending on the distance from the gate signal supply terminal.

51. The manufacturing method according to claim 27, wherein said pixel is formed such that the pixels adjacent in said column direction are symmetrical with respect to a line extending in said row direction between the pixels.

52. The manufacturing method according to claim 51, wherein said associated gate bus line portion is provided in a lower portion of an upper one of said adjacent pixels, and said associated gate bus line portion is provided in an upper portion of a lower one of said adjacent pixels.

53. The manufacturing method according to claim 51, wherein said capacitance line portion is provided in an upper portion of an upper one of said adjacent pixels, and said capacitance line portion is provided in a lower portion of a lower one of said adjacent pixels.

54. The manufacturing method according to claim 52, wherein said step of forming said drain bus line comprises the step of:
    forming two drain lines extending in said row direction between said associated gate bus line portion in said lower portion of said upper pixel and said associated gate bus line portion in said upper portion of said lower pixel, and
    said pixel transistors of said upper and lower pixels are formed to be connected with said two drain lines, respectively.

55. The manufacturing method according to claim 54, wherein said two drain lines are formed to extend toward said drain bus line associated with said pixels adjacent in said row direction.

56. The manufacturing method according to claim 27, wherein each of said plurality of pixels is formed to be symmetrical with respect to a center line thereof extending in said column direction, except for said associated drain bus line portion.

57. The manufacturing method according to claim 27, wherein said pixel transistor of each of said plurality of pixels is formed such that said pixel transistor does not stick out of said associated gate bus line portion.

58. The manufacturing method according to claim 27, further comprising the step of:

forming at least one dummy line for at least one of a left portion from a leftmost column of said pixels and a right portion from a rightmost column of said pixels in said row direction.

59. The manufacturing method according to claim 27, further comprising the step of:

forming a conductive film provided on or above a surface of said first substrate on an opposite side to said second substrate.

60. The manufacturing method according to claim 27, wherein said step of forming said drain bus line further comprises the step of:

forming drain terminals in both ends of each of said plurality of drain bus lines.

61. A manufacturing method of a liquid crystal display apparatus comprising a plurality of pixels in a matrix in a row direction and a column direction, said manufacturing method comprising the steps of:

(a) forming a plurality of light shielding layers on a substrate;

(b) forming a first insulating film to cover said substrate and said plurality of light shielding layers at least;

(c) forming a plurality of drain bus lines;

(d) forming a control electrode in a portion of a region for each of said plurality of pixels;

(e) in said pixel region, forming a pixel transistor above an associated one of said plurality of light shielding layers, wherein said pixel transistor has a source connected to said control electrode, a drain connected with an associated one of said plurality of drain bus lines, and an associated one of a plurality of gate bus lines;

(f) forming a plurality of capacitance lines;

(g) forming a second insulating film to cover said first insulating film, said pixel transistor and said plurality of gate bus lines at least; and (h) forming a pixel electrode in said pixel region to cover said control electrode and a portion of said capacitance line through at least one of said first insulating film and said second insulating film.

62. The manufacturing method according to claim 61, wherein said (e) step comprises the steps of:

(i) forming a source electrode and a drain electrode on said associated light shielding layer through said first insulating film;

(j) after 5-valence element plasma processing is carried out, depositing a and an electrode layer in order;

(k) patterning said electrode layer, said third insulating film and said semiconductor layer to form said plurality of gate bus lines.

63. The manufacturing method according to claim 62, wherein said (f) step of forming said plurality of capacitance lines is carried out at same time as said (k) step.

64. The manufacturing method according to claim 62, wherein said (d) step of forming said control electrode is carried out at same time as said (i) step such that said control electrode and said source electrode are formed unitarily.

65. The manufacturing method according to claim 61, wherein said (c) step of forming said plurality of drain bus lines is carried out at same time as said (a) step.

66. The manufacturing method according to claim 62, wherein said (c) step of forming said plurality of drain bus lines is carried out at same time as said (i) step.

67. The manufacturing method according to claim 61, wherein each of said control electrode and said pixel electrode is formed of a transparent conductive film.

68. The manufacturing method according to claim 61, wherein each of said source electrode and said drain electrode is formed of a refractory metal film.

69. The manufacturing method according to claim 61, wherein said (d) step of forming said control electrode comprises the steps of:

depositing a control electrode film;

depositing a conductive film on said control electrode film;

patterning said conductive film using a resist pattern; and patterning said control electrode film using said patterned conductive film as a mask.

70. The manufacturing method according to claim 61, wherein said (d) step comprises the steps of:

depositing a control electrode film;

patterning said control electrode film; and forming a conductive film in a peripheral portion of the patterned control electrode film to form said control electrode.

71. The manufacturing method according to claim 61, wherein said (d) step comprises the steps of:

depositing a conductive film;

patterning said conductive film to have a loop;

depositing a control electrode film on the patterned conductive film; and patterning said control electrode film such that an edge portion of said control electrode film is on the patterned conductive film.

72. The manufacturing method according to claim 61, wherein said (h) step of forming said pixel electrode comprises the steps of:

depositing a pixel electrode film;

depositing a conductive film on said pixel electrode film;

patterning said conductive film using a resist pattern; and patterning said pixel electrode film using the patterned conductive film.

73. The manufacturing method according to claim 61, wherein said (h) step of forming said pixel electrode comprises the steps of:

depositing a pixel electrode film;

patterning said pixel electrode film; and forming a conductive film in a peripheral portion of the patterned pixel electrode film to form said pixel electrode.

74. The manufacturing method according to claim 61, wherein said (h) step of forming said pixel electrode comprises the steps of:

depositing a conductive film;

patterning said conductive film to have a loop;

depositing a pixel electrode film on the patterned conductive film; and patterning said control electrode film such that an edge portion of said patterned pixel electrode film is on the patterned conductive film.

75. The manufacturing method according to claim 61, wherein a first capacitance is formed from said pixel electrode and said control electrode and a second capacitance is formed from said pixel electrode and said capacitance line, in each said pixel, and said (h) step of forming said pixel electrode comprises the step of:

forming said pixel electrode in a row of said pixels associated with said associated gate bus line such that said second capacitances are different depending on a distance from a gate signal supply terminal connected to said associated gate bus line.

76. The manufacturing method according to claim 75, wherein said (h) step of forming said pixel electrode comprises the step of:

forming said pixel electrode such that said second capacitances are decreased depending on the distance from the gate signal supply terminal connected to said associated gate bus line in the associated row of said pixels.

77. The manufacturing method according to claim 75, wherein said (h) step of forming said pixel electrode comprises the step of:

forming said pixel electrode such that an overlapping area of said pixel electrode and said capacitance line portion is decreased depending on the distance from the gate signal supply terminal.

78. The manufacturing method according to claim 61, wherein said pixel is formed such that the pixels adjacent in said column direction are symmetrical with respect to a line extending in said row direction between the pixels.

79. The manufacturing method according to claim 78, wherein said associated gate bus line portion is provided in a lower portion of an upper one of said adjacent pixels, and said associated gate bus line portion is provided in an upper portion of a lower one of said adjacent pixels.

80. The manufacturing method according to claim 78, wherein said capacitance line portion is provided in an upper portion of an upper one of said adjacent pixels, and said capacitance line portion is provided in a lower portion of a lower one of said adjacent pixels.

81. The manufacturing method according to claim 78, wherein said step of forming said plurality of drain bus lines comprises the step of:

forming two drain lines extending in said row direction between said associated gate bus line portion in said lower portion of said upper pixel and said associated gate bus line portion in said upper portion of said lower pixel, and said pixel transistors of said upper and lower pixels are formed to be connected with said two drain lines, respectively.

82. The manufacturing method according to claim 81, wherein said two drain lines are formed to extend toward said drain bus line associated with said pixels adjacent in said row direction.

83. The manufacturing method according to claim 61, wherein each of said plurality of pixels is formed to be symmetrical with respect to a center line thereof extending in said column direction, except for said associated drain bus line portion.

84. The manufacturing method according to claim 61, wherein said pixel transistor of each of said plurality of pixels is formed such that said pixel transistor does not stick out of said associated gate bus line portion.

85. The manufacturing method according to claim 61, further comprising the step of:

forming at least one dummy line for at least one of a left portion from a leftmost column of said pixels and a right portion from a rightmost column of said pixels in said row direction.

86. The manufacturing method according to claim 61, further comprising the step of:

forming a conductive film provided on or above a surface of said first substrate on an opposite side to said second substrate.

87. The manufacturing method according to claim 61, wherein said (c) step of forming said plurality of drain bus lines further comprises the step of:

forming drain terminals in both ends of each of said plurality of drain bus lines.

* * * * *